United States Patent
Lee et al.

(10) Patent No.: US 10,491,969 B2
(45) Date of Patent: Nov. 26, 2019

(54) BROADCAST RECEPTION DEVICE AND OPERATING METHOD THEREOF, AND COMPANION DEVICE INTEROPERATING WITH THE BROADCAST RECEPTION DEVICE AND OPERATING METHOD THEREOF

(71) Applicant: LG ELECTRONICS INC., Seoul (KR)

(72) Inventors: Jinwon Lee, Seoul (KR); Younghun Song, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/124,904

(22) PCT Filed: Mar. 9, 2015

(86) PCT No.: PCT/KR2015/002230
§ 371 (c)(1),
(2) Date: Sep. 9, 2016

(87) PCT Pub. No.: WO2015/137669
PCT Pub. Date: Sep. 17, 2015

(65) Prior Publication Data
US 2017/0105055 A1  Apr. 13, 2017

Related U.S. Application Data

(60) Provisional application No. 61/950,790, filed on Mar. 10, 2014.

(51) Int. Cl.
*H04N 21/858* (2011.01)
*H04N 21/2343* (2011.01)
(Continued)

(52) U.S. Cl.
CPC . *H04N 21/8586* (2013.01); *H04N 21/234327* (2013.01); *H04N 21/4108* (2013.01);
(Continued)

(58) Field of Classification Search
CPC ......... H04N 21/4126; H04N 21/43615; H04N 21/25825; H04N 21/4828; H04N 21/8586;
(Continued)

(56) References Cited

U.S. PATENT DOCUMENTS 7,580,005 B1 * 8/2009 Palin ..................... G06F 3/1423
345/1.1
2004/0168121 A1 * 8/2004 Matz ................. G06F 17/30867
715/255
(Continued)

FOREIGN PATENT DOCUMENTS

CN 1653813 A 8/2005
CN 102461076 A 5/2012
(Continued)

*Primary Examiner* — Cynthia M Fogg
(74) *Attorney, Agent, or Firm* — Birch, Stewart, Kolasch & Birch, LLP

(57) ABSTRACT

A companion device is provided for interoperating with a broadcast service that a broadcast reception device receives. The companion device comprises a communication unit and a control unit. The communication unit transmits a discovery request to the broadcast reception device, receives a discovery response from the broadcast reception device, transmits a description request to the broadcast reception device, and receives a description response from the broadcast reception device. The description response is used for connecting the companion device with the broadcast reception device. The control unit transmits a request for the broadcast service and receives a response from the broadcast reception device. The response includes device capability information signaling a capability of a device necessary for presenting a media
(Continued)

component included in the broadcast service. The control unit receives the media component when a capability of the companion device satisfies the device capability that the device capability information includes.

13 Claims, 83 Drawing Sheets

(51) Int. Cl.
    *H04N 21/41* (2011.01)
    *H04N 21/434* (2011.01)
    *H04N 21/436* (2011.01)
    *H04N 21/488* (2011.01)
    *H04N 21/81* (2011.01)
    *H04N 21/439* (2011.01)
    *H04N 21/482* (2011.01)

(52) U.S. Cl.
    CPC ....... *H04N 21/439* (2013.01); *H04N 21/4345* (2013.01); *H04N 21/43615* (2013.01); *H04N 21/482* (2013.01); *H04N 21/4884* (2013.01); *H04N 21/814* (2013.01)

(58) Field of Classification Search
    CPC ........... H04N 21/4108; H04N 21/4345; H04N 21/439; H04N 21/482; H04N 21/4884; H04N 21/814; H04N 21/25841; H04N 21/4882; H04N 21/6125; H04N 21/4524
    USPC ............................................. 725/109, 33, 35
    See application file for complete search history.

(56) References Cited

U.S. PATENT DOCUMENTS

| | | | |
|---|---|---|---|
| 2005/0166222 A1* | 7/2005 | Tully, Jr. | G08B 25/085 725/33 |
| 2006/0161946 A1* | 7/2006 | Shin | H04L 12/2827 725/33 |
| 2006/0200842 A1* | 9/2006 | Chapman | H04N 7/163 725/34 |
| 2006/0273893 A1* | 12/2006 | Warner | G08B 25/006 340/531 |
| 2007/0011256 A1 | 1/2007 | Klein | |
| 2007/0118851 A1* | 5/2007 | Yun | G08B 25/004 725/33 |
| 2007/0136743 A1* | 6/2007 | Hasek | G08B 25/085 725/33 |
| 2010/0223407 A1 | 9/2010 | Dong et al. | |
| 2012/0079029 A1 | 3/2012 | Damola et al. | |
| 2012/0096503 A1 | 4/2012 | Slothouber et al. | |
| 2012/0254927 A1* | 10/2012 | Kim | H04N 21/41407 725/109 |
| 2012/0270534 A1* | 10/2012 | Filipov | H04L 12/281 455/420 |
| 2012/0291060 A1 | 11/2012 | Relyea et al. | |
| 2012/0304233 A1 | 11/2012 | Roberts et al. | |
| 2013/0007814 A1* | 1/2013 | Cherian | H04L 65/605 725/62 |
| 2013/0034704 A1 | 2/2013 | Lynch | |
| 2013/0055323 A1 | 2/2013 | Venkitaraman et al. | |
| 2013/0159857 A1* | 6/2013 | Zaloshnja | H04L 65/605 715/716 |
| 2013/0347044 A1* | 12/2013 | Lee | H04N 21/2387 725/88 |
| 2015/0095956 A1* | 4/2015 | Kano | H04N 21/4126 725/80 |
| 2015/0237406 A1 | 8/2015 | Ochoa et al. | |
| 2016/0219344 A1 | 7/2016 | Dong et al. | |

FOREIGN PATENT DOCUMENTS

| | | |
|---|---|---|
| CN | 103155490 A | 6/2013 |
| CN | 103385006 A | 11/2013 |
| EP | 2677757 A2 | 12/2013 |
| KR | 10-2014-0004730 A | 1/2014 |
| KR | 10-2014-0016906 A | 2/2014 |
| WO | WO 2010/140941 A1 | 12/2010 |
| WO | WO 2013/089675 A1 | 6/2013 |

* cited by examiner

[Fig. 1]
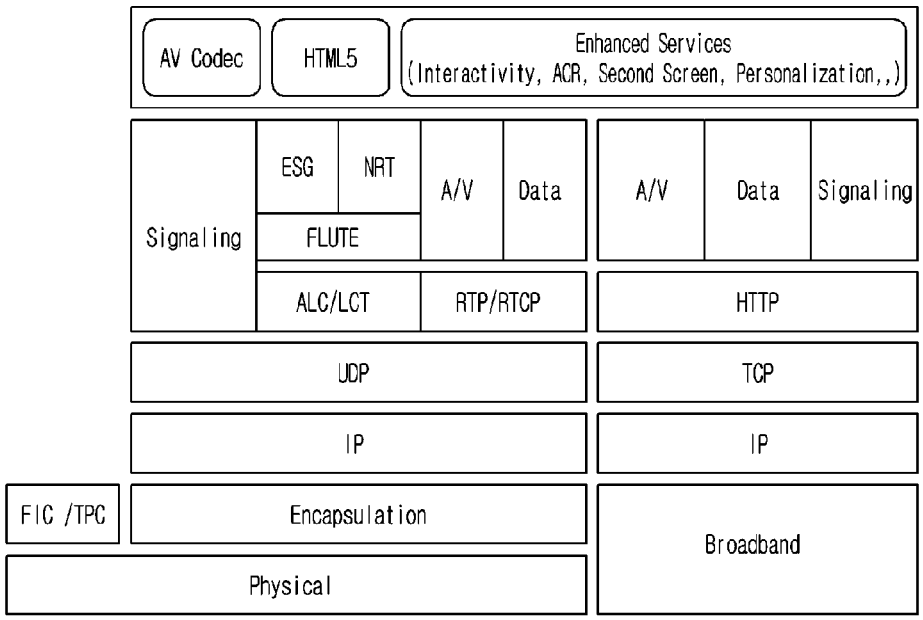
[Fig. 2]
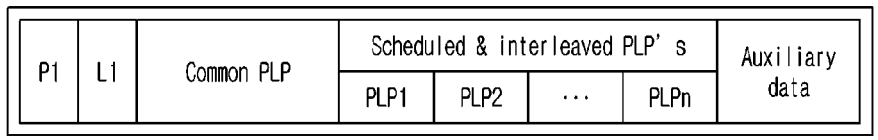
[Fig. 3]
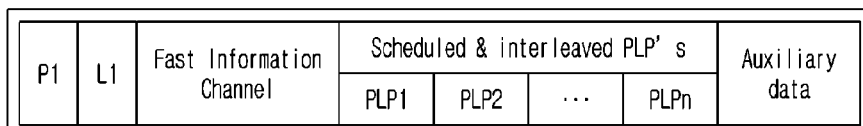
[Fig. 4]
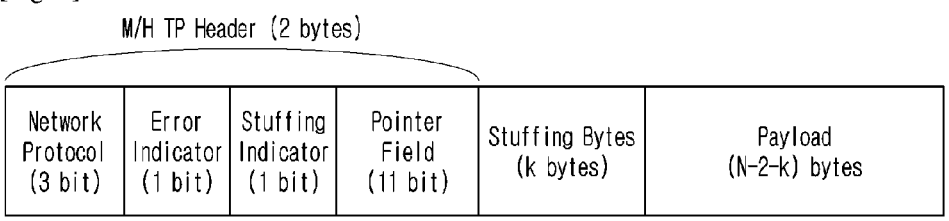
[Fig. 5]
| network_protocol Value | Meaning |
|---|---|
| 000 | IPv4 (conforming to RFC STD05 [5]) |
| 001-110 | ATSC reserved |
| 111 | framed_packet_type |

[Fig. 6]
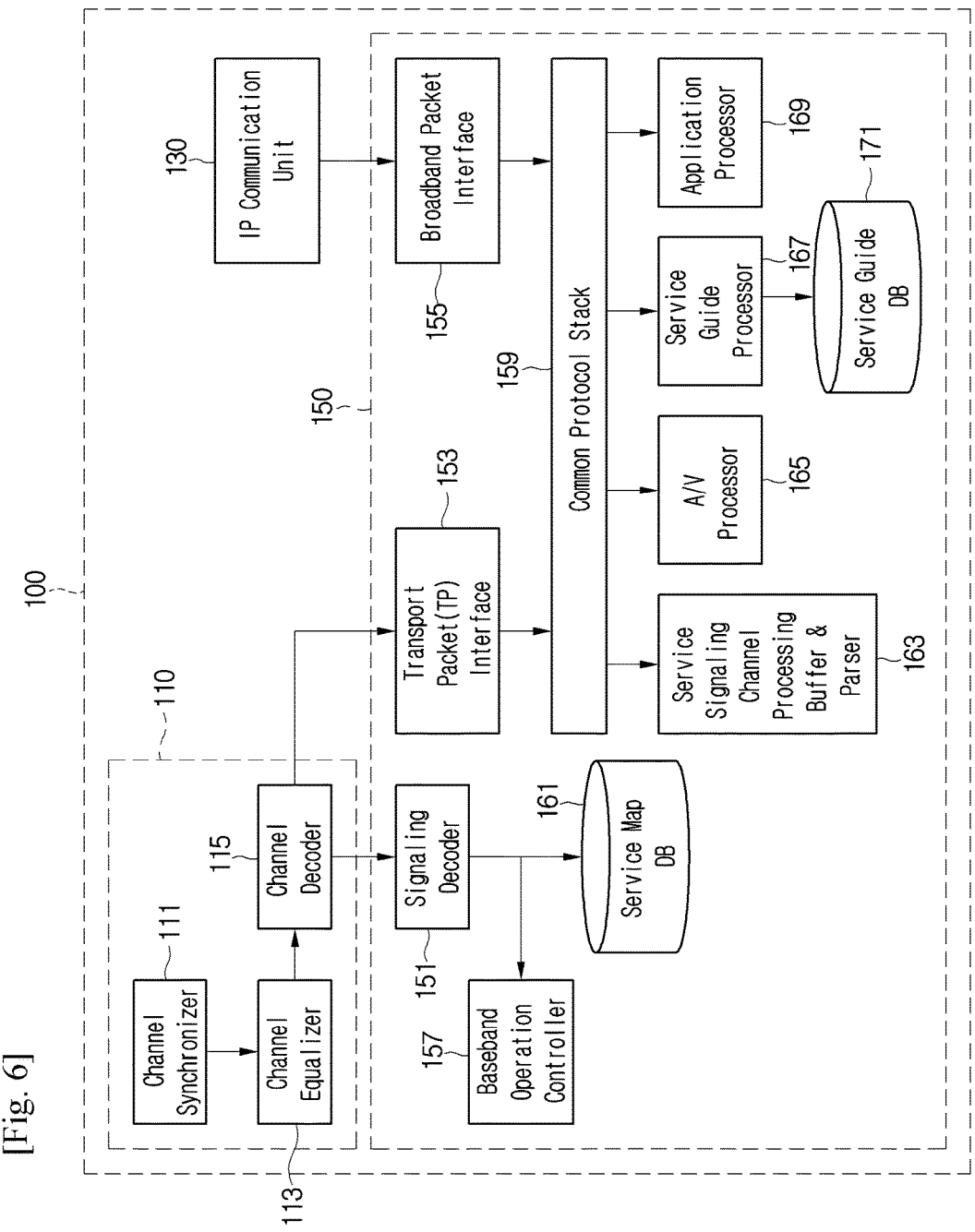

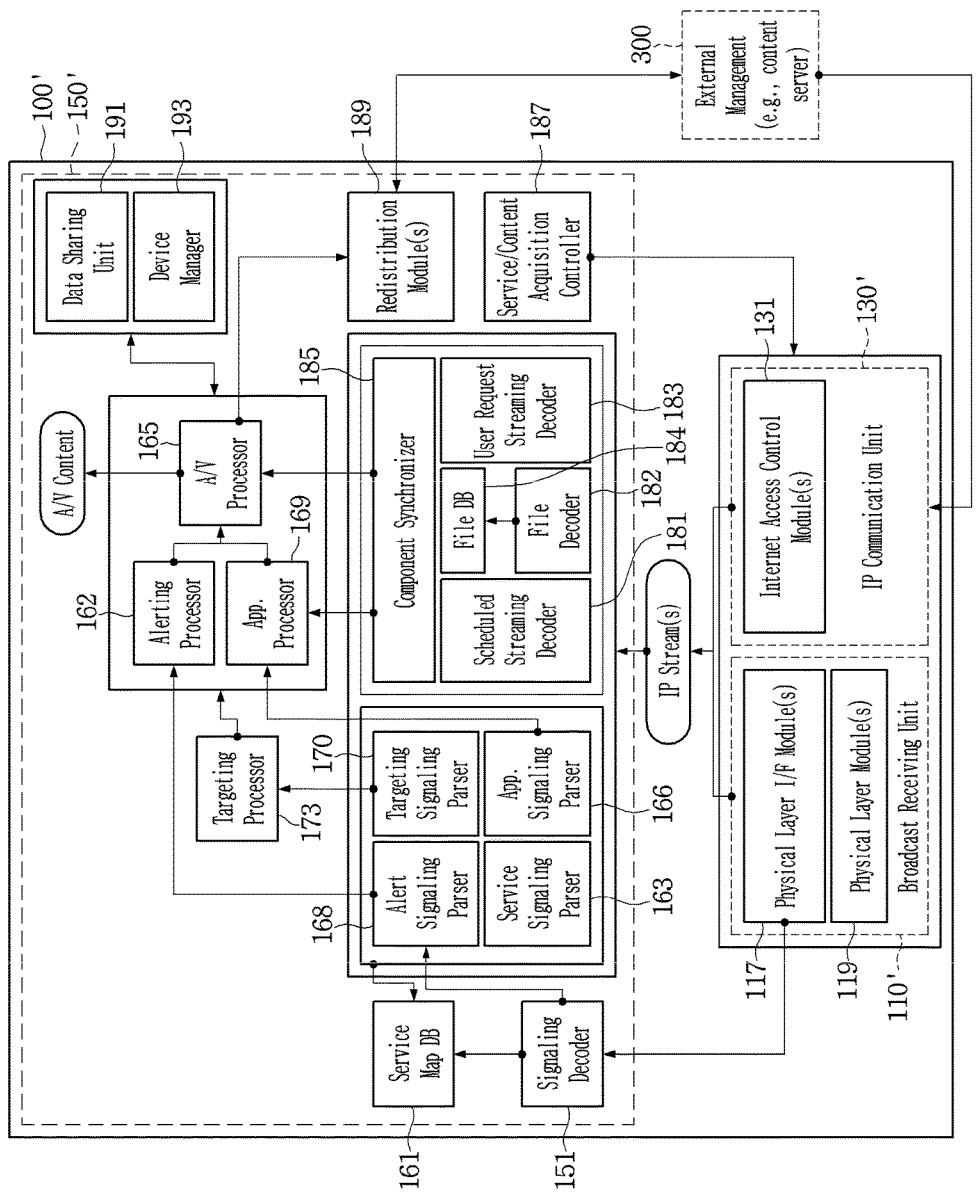
[Fig. 7]

[Fig. 8]
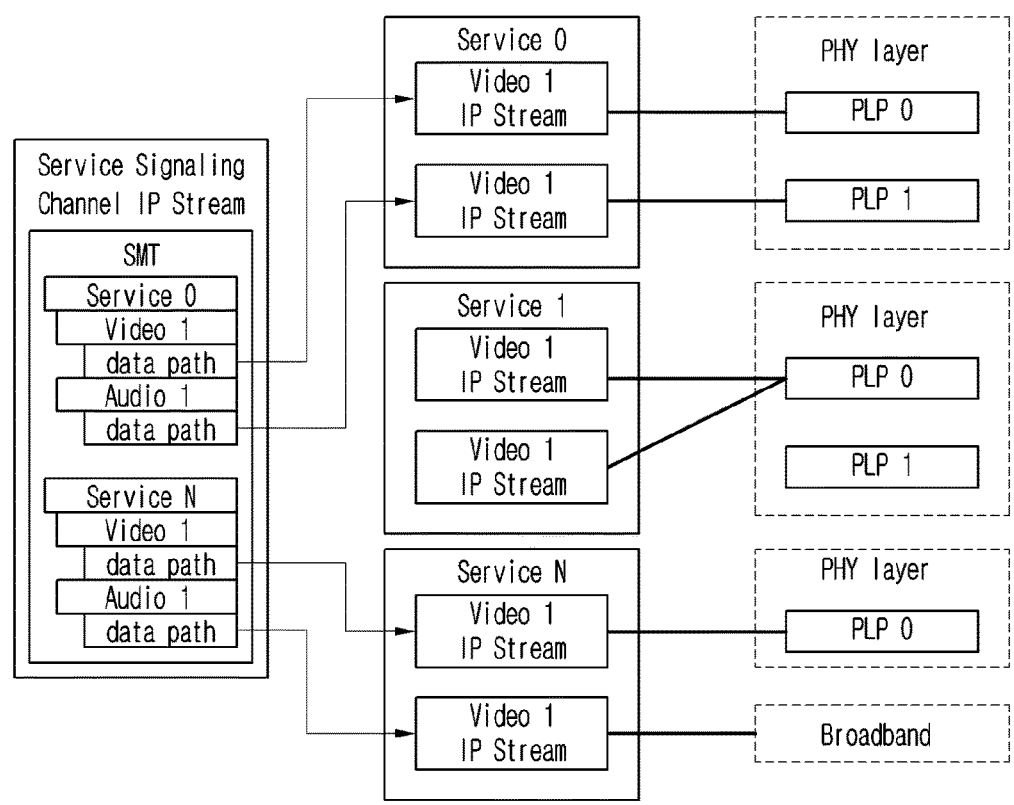

[Fig. 9]

| Syntax | No. of Bits | Format |
|---|---|---|
| service_map_table_section() { | | |
|     table_id | 8 | 0xDB |
|     section_syntax_indicator | 1 | '0' |
|     private_indicator | 1 | '1' |
|     reserved | 2 | '11' |
|     section_length | 12 | uimsbf |
|     table_id_extension { | | |
|         SMT_protocol_version | 8 | uimsbf |
|         reserved | 8 | uimsbf |
|     } | | |
|     reserved | 2 | '11' |
|     version_number | 5 | uimsbf |
|     current_next_indicator | 1 | bslbf |
|     section_number | 8 | uimsbf |
|     last_section_number | 8 | uimsbf |
|     num_services | 8 | uimsbf |
|     for (i=0; i<num_services; i++) | | |
|     { | | |
|         service_id | 16 | uimsbf |
|         reserved | 2 | '11' |
|         service_status | 2 | uimsbf |
|         SP_indicator | 1 | bslbf |
|         short_service_name_length /* m */ | 3 | uimsbf |
|         short_service_name | 16*m | bslbf |
|         reserved | 2 | '11' |
|         service_category | 6 | uimsbf |
|         reserved | 3 | '111' |
|         num_components | 5 | uimsbf |
|         for (j=0; j<num_components; j++) | | |
|         { | | |
|             essential_component_indicator | 1 | bsblf |
|             reserved | 3 | '111' |
|             num_component_level_descriptors | 4 | uimsbf |
|             for (k=0; k<num_component_level_descriptors; k++) | | |
|             { | | |
|                 component_level_descriptor() | var | |
|             } | | |
|         } | | |
|         reserved | 4 | '1111' |
|         num_service_level_descriptors | 4 | uimsbf |
|         for (m=0; m<num_service_level_descriptors; m++) | | |
|         { | | |
|             service_level_descriptor() | var | |
|         } | | |
|     } | | |

[Fig. 10]

| service_category | Meaning |
|---|---|
| 0x00 | The service category is not specified |
| 0x01 | Basic TV |
| 0x02 | Basic Radio |
| 0x03 | RI service - Rights Issuer service |
| 0x04 | Not specified by the current version of this standard. |
| 0x05 | Not specified by the current version of this standard. |
| 0x06 | Not specified by the current version of this standard. |
| 0x07 | Not specified by the current version of this standard. |
| 0x08 | Service Guide - Service Guide (Announcement) |
| 0x09 | Emergency Alerting |
| 0x0A | Not specified by the current version of this standard. |
| 0x0B ~ 0xFF | Reserved for future use. |

[Fig. 11]

| Syntax | No. of Bits | Format |
|---|---|---|
| service_map_table_section() { | | |
|   table_id | 8 | 0xDB |
|   section_syntax_indicator | 1 | '0' |
|   private_indicator | 1 | '1' |
|   reserved | 2 | '11' |
|   section_length | 12 | uimsbf |
|   table_id_extension | | |
|     SMT_protocol_version | 8 | uimsbf |
|     ensemble_id | 8 | uimsbf |
|   } | | |
|   reserved | 2 | '11' |
|   version_number | 5 | uimsbf |
|   current_next_indicator | 1 | bslbf |
|   section_number | 8 | uimsbf |
|   last_section_number | 8 | uimsbf |
|   num_services | 8 | uimsbf |
|   for (i=0; i<num_services; i++) | | |
|   { | | |
|     service_id | 16 | uimsbf |
|     multi_ensemble_service | 2 | uimsbf |
|     service_status | 2 | uimsbf |
|     SP_indicator | 1 | bslbf |
|     short_service_name_length/* m */ | 3 | uimsbf |
|     short_service_name | 16*m | bslbf |
|     channel_number | 16 | uimsbf |
|     service_category | 6 | uimsbf |
|     reserved | 2 | '11' |
|     num_components | 5 | uimsbf |
|     for (j=0; j<num_components; j++) | | |
|     { | | |
|       essential_component_indicator | 1 | bsblf |
|       reserved | 3 | '111' |
|       num_component_level_descriptors | 4 | uimsbf |
|       for (k=0; k<num_component_level_descriptors; k++) | | |
|       { | | |
|         component_level_descriptor() | var | |
|       } | | |
|     } | | |
|     reserved | 4 | '1111' |
|     num_service_level_descriptors | 4 | uimsbf |
|     for (m=0;m<num_service_level_descriptors; m++) | | |
|     { | | |
|       service_level_descriptor() | var | |
|     } | | |
|   reserved | 4 | '1111' |
|   num_ensemble_level_descriptors | 4 | uimsbf |
|   for (n=0; n<num_ensemble_level_descriptors; n++) { | | |
|   { | | |
|     ensemble_level_descriptor() | var | |
|   } | | |
| } | | |

[Fig. 12]

| Syntax | No. of Bits | Format |
|---|---|---|
| stream_identifier_descriptor(){ | | |
|   descriptor_tag | 8 | uimsbf |
|   descriptor_length | 8 | uimsbf |
|   component_tag | 8 | uimsbf |
| } | | |

[Fig. 13]

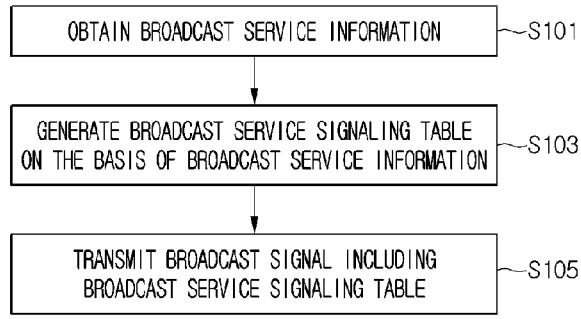

[Fig. 14]

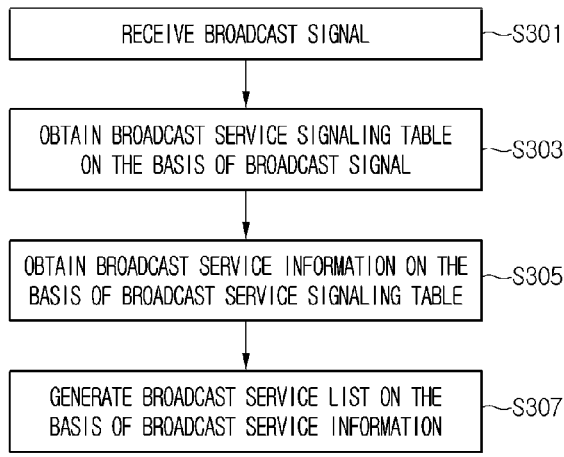

[Fig. 15]

| Syntax | No. of Bits | Format |
|---|---|---|
| data_path_descriptor() { | | |
|     descriptor_tag | 8 | uimsbf |
|     descriptor_length | 8 | uimsbf |
|     delivery_network_type | 8 | uimsbf |
|         data_path(delivery_network_type) | var | |
| } | | |

[Fig. 16]

| delivery_network_type value | |
|---|---|
| 0x00 | IPv4/IPv6 flows through same broadcast or over the cellular network |
| 0x01 | IPv4/IPv6 flows through different broadcast |
| 0x02 | FLUTE session through same broadcast |
| 0x03 | FLUTE session through different broadcast |
| 0x04 | MPEG-2 stream through different broadcast |
| 0x05 | packet-based flows through different broadcast |
| 0x06 | packet-based flows through IP-based broadcast network |
| 0x07 | URL |
| 0x08-0xFF | Reserved |

[Fig. 17]

| Syntax | No. of Bits | Format |
|---|---|---|
| data_path() { | | |
|     IP_version_flag | 1 | bslbf |
|     source_IP_address_flag | 1 | bslbf |
|     destination_IP_address_flag | 1 | bslbf |
|     reserved | 5 | '11111' |
|     if (source_IP_address_flag) | | |
|         source_IP_address | 32 or 128 | uimsbf |
|     if (destination _IP_address_flag) | | |
|         destination_IP_address | 32 or 128 | uimsbf |
|     port_num_count | 8 | |
|     if(port_num_count > 0) | | |
|         destination_UDP_port_num | 16 | uimsbf |
| } | | |

[Fig. 18]

| Syntax | No. of Bits | Format |
|---|---|---|
| data_path() { | | |
|     transport_stream_id | 16 | uimsbf |
|     IP_version_flag | 1 | bslbf |
|     source_IP_address_flag | 1 | bslbf |
|     destination_IP_address_flag | 1 | bslbf |
|     reserved | 5 | '11111' |
|     if (source_IP_address_flag) | | |
|         source_IP_address | 32 or 128 | uimsbf |
|     if (destination _IP_address_flag) | | |
|         destination_IP_address | 32 or 128 | uimsbf |
|     port_num_count | 8 | |
|     if(port_num_count > 0) | | |
|         destination_UDP_port_num | 16 | uimsbf |
| } | | |

[Fig. 19]

| Syntax | No. of Bits | Format |
|---|---|---|
| data_path() { | | |
|     IP_version_flag | 1 | bslbf |
|     source_IP_address_flag | 1 | bslbf |
|     reserved | 6 | '111111' |
|     if (source_IP_address_flag) | | |
|         source_IP_address | 32 or 128 | uimsbf |
|     destination_IP_address | 32 or 128 | uimsbf |
|     destination_UDP_port_num | 16 | uimsbf |
|     tsi | 16 | uimsbf |
| } | | |

[Fig. 20]

| Syntax | No. of Bits | Format |
|---|---|---|
| data_path() { | | |
|     transport_stream_id | 16 | uimsbf |
|     IP_version_flag | 1 | bslbf |
|     source_IP_address_flag | 1 | bslbf |
|     reserved | 6 | '111111' |
|     if (source_IP_address_flag) | | |
|         source_IP_address | 32 or 128 | uimsbf |
|     destination_IP_address | 32 or 128 | uimsbf |
|     destination_UDP_port_num | 16 | uimsbf |
|     tsi | 16 | uimsbf |
| } | | |

[Fig. 21]

| Syntax | No. of bits | Format |
|---|---|---|
| data_path() { | | |
|     transport_stream_id | 16 | uimsbf |
|     reserved | 3 | bslbf |
|     pid | 13 | uimsbf |
| } | | |

[Fig. 22]

| Syntax | No. of Bits | Format |
|---|---|---|
| data_path() { | | |
|     transport_stream_id | 16 | uimsbf |
|     packet_id | 16 | uimsbf |
| } | | |

[Fig. 23]

| Syntax | No. of Bits | Format |
|---|---|---|
| data_path() { | | |
|     IP_version_flag | 1 | bslbf |
|     source_IP_address_flag | 1 | bslbf |
|     reserved | 6 | '111111' |
|     if (source_IP_address_flag) | | |
|         source_IP_address | 32 or 128 | uimsbf |
|     destination_IP_address | 32 or 128 | uimsbf |
|     destination_UDP_port_num | 16 | uimsbf |
|     packet_id | 16 | uimsbf |
| } | | |

[Fig. 24]
| Syntax | No. of bits | Format |
|---|---|---|
| data_path() {<br>    URL_length<br>    for (i = 0; i < URL_length; i++){<br>        URL_char<br>    }<br>} | 8<br><br>8 | <br><br><br>bslbf |
[Fig. 25]
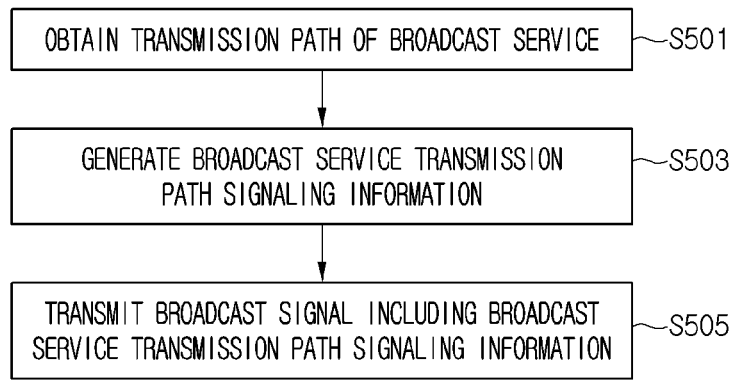
[Fig. 26]
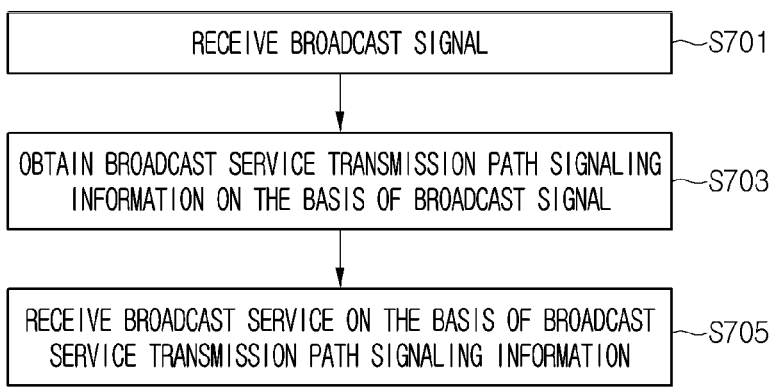

[Fig. 27]

| Syntax | No. of Bits | Format |
|---|---|---|
| component_descriptor() { | | |
|     descriptor_tag | 8 | uimsbf |
|     descriptor_length | 8 | uimsbf |
|     component_type | 7 | uimsbf |
|     component_encryption_flag | 1 | bslbf |
|     if (component_encryption_flag == '1') { | | |
|         num_STKM_streams | 8 | uimsbf |
|         for (i=0; i<num_STKM_streams; i++) { | | |
|             STKM_stream_id | 8 | uimsbf |
|         } | | |
|     } | | |
|     transport_parameters_text_length | 8 | uimsbf |
|     transport_parameters_text() | var | |
|     component_data(component_type) | var | |
| } | | |

[Fig. 28]

| component_type | Meaning |
|---|---|
| 0-34 | Assigned or reserved by IANA, except that 20-24, 27, and 29-30 are unassigned |
| 35 | H.264/AVC video stream component or H.264/SVC base layer stream component |
| 36 | SVC enhancement layer stream component |
| 37 | HE AAC v2 audio stream component |
| 38 | FLUTE file delivery session |
| 39 | STKM stream component |
| 40 | LTKM stream component |
| 41 | OMA-RME DIMS stream component |
| 42 | NTP timebase stream component |
| 43-70 | [Unassigned by IANA and reserved by ATSC for possible future use] |
| 71-76 | Reserved by IANA |
| 77-95 | Unassigned by IANA |
| 96-127 | Designated by IANA for dynamic use |

[Fig. 29]

| Syntax | No. of Bits | Format |
|---|---|---|
| component_data() { | | |
|     version | 8 | uimsbf |
|     profile | 8 | uimsbf |
| } | | |

[Fig. 30]

| | |
|---|---|
| Content Component | Essence of a single type plus the relevant Metadata, e.g., a video track, an audio track, Closed Captions, a video enhancement layer, a webpage, an interactive application, etc. |
| Simple Audio Component | Audio component that is a single encoding of a sound sequence with a particular set of encoding parameters. |
| Simple Video Component | Video component that is a single encoding of a picture sequence with a particular set of encoding parameters. |
| Continuous Component | A component that is presented in a continuous stream (e.g., audio, video or closed captioning). |
| Elementary Component | A continuous component that is a single encoding (e.g., a single encoding of a sound sequence, or a single encoding of a picture sequence, or a single closed caption track). |
| Composite Component | A component that consists of a collection of continuous components which have the same media type, and which represent the same scene, and which are to be combined in some combination to produce a presentation (e.g., music, dialog and effects audio components that are to be mixed to give complete audio, or left and right 3D views that are to be combined to give 3D pictures). |
| Composite Audio Component | Compound component consisting of a collection of audio components which are to be combined to produce a sound sequence (e.g., a collection of audio components that are to be mixed). |
| Composite Video Component | Compound component consisting of a collection of video components which are to be combined to produce a picture sequence (e.g., a collection of 3D components that are to be combined to form 3D video; or a base video encoding along with one or more enhancement encodings). |
| Adaptive (alternatively called PickOne) Component | A component that consists of a collection of continuous components which have the same media type, and which represent the same scene, and one of which is to be selected to produce a presentation (e.g., a set of audio components encoded from the same sound sequence with different bitrates, or a set of video components encoded from the same picture sequence with different bit rates, or a regular closed caption track and an "easy reader" closed caption track for the same dialog). |
| Adaptive Audio Component | A component consisting of a collection of audio components, one of which is to be selected to produce a sound sequence (e.g., a collection of audio components encoded from the same sound sequence with different bitrates). |
| Adaptive Video Compone | A component consisting of a collection of video components, one of which is to be selected to produce a picture sequence (e.g., a collection of video components encoded from the same picture sequence with different encoding parameters). |
| Complex Component | Either a composite component or an adaptive component |

[Fig. 31]

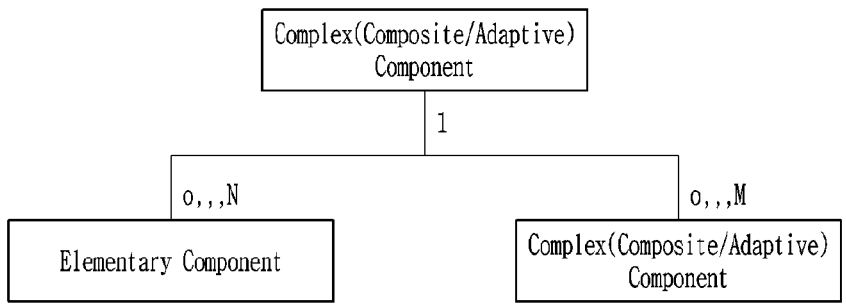

[Fig. 32]
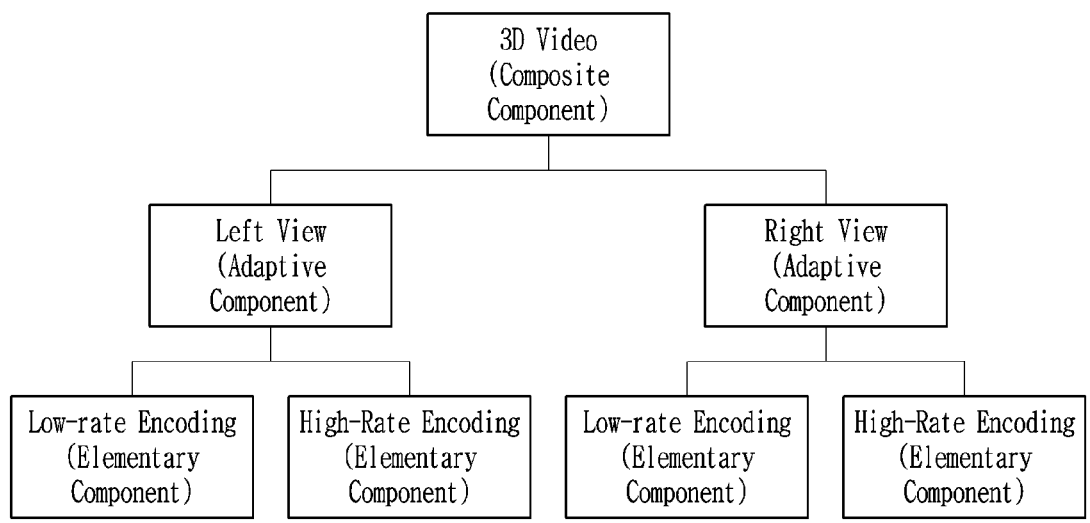

[Fig. 33]
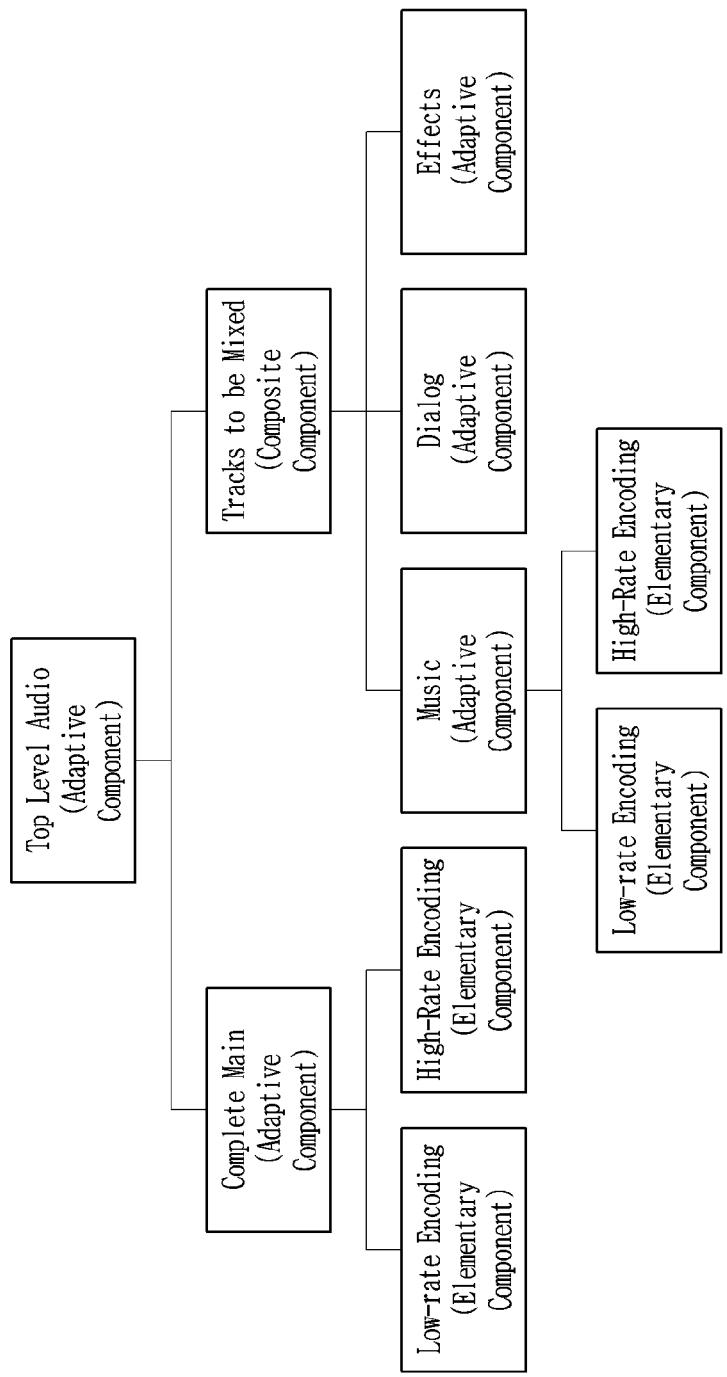

[Fig. 34]

| Continuous Component | A Content Component that is presented in a continuous stream (e.g., audio, video or closed captioning). |
|---|---|
| Elementary Component | A Continuous Component that is a single encoding (e.g., a single encoding of a sound sequence, or a single encoding of a picture sequence, or a single closed caption track). |
| Composite Component | A Content Component that consists of a collection of Continuous Components which have the same Content type, and which represent the same scene, and which are to be combined in some combination to produce a presentation (e.g., music, dialog and effects audio components that are to be mixed to give complete audio, or left and right 3D views that are to be combined to give 3D pictures). |
| PickOne Component | A Content Component that consists of a collection of Continuous Components which have the same Content type, and which represent the same scene, and exactly one of which is to be selected to produce a presentation (e.g., a set of audio components encoded from the same sound sequence with different bitrates, or a set of video components encoded from the same picture sequence with different bit rates, or a regular closed caption track and an "easy reader" closed caption track for the same dialog). |
| Complex Component | Either a Composite Component or a PickOne Component |
| Presentable Component | A Continuous Component that is intended for presentation to the user. Such a component can be an Elementary Component or a Complex Component. |

[Fig. 35]

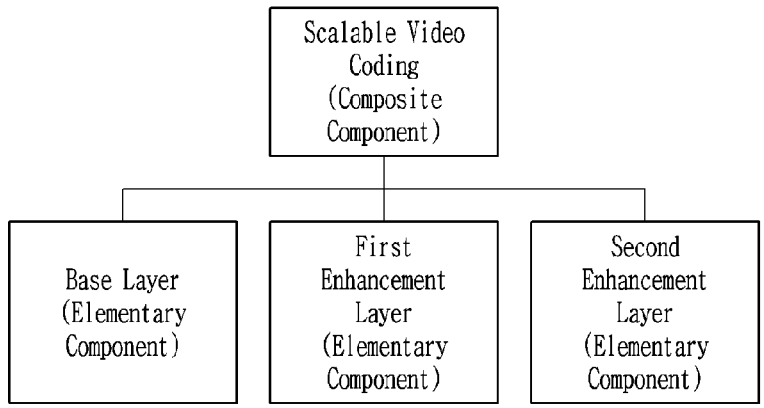

[Fig. 36]

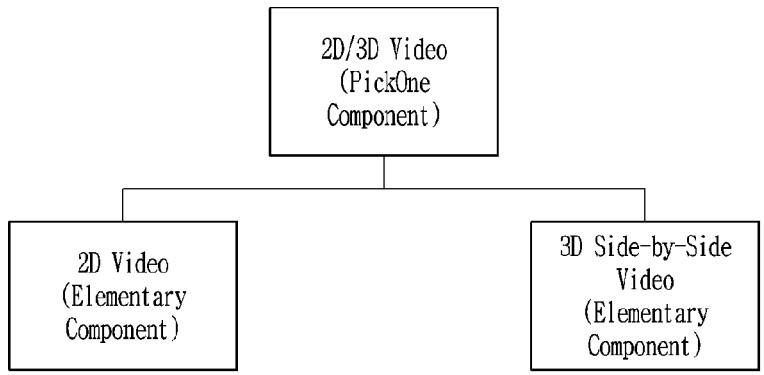

[Fig. 37]
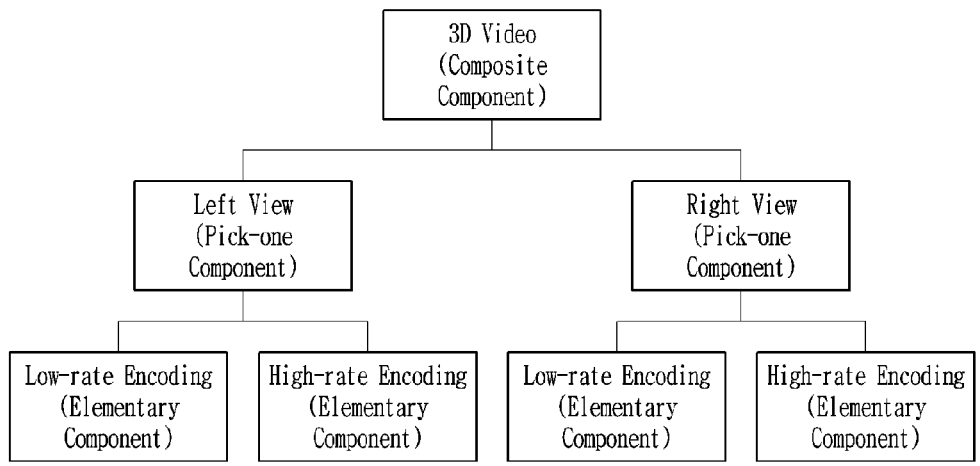
[Fig. 38]
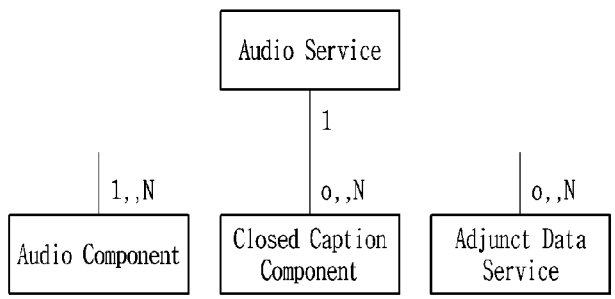
[Fig. 39]
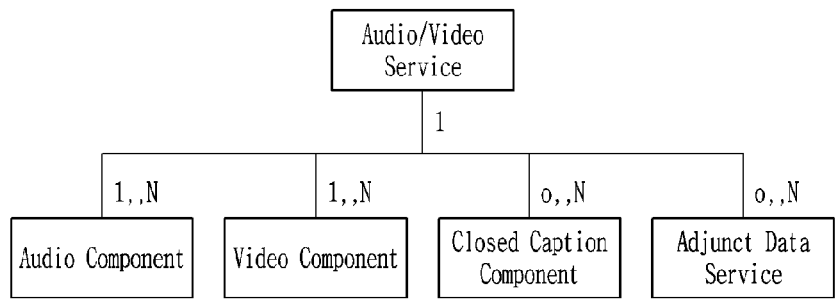
[Fig. 40]
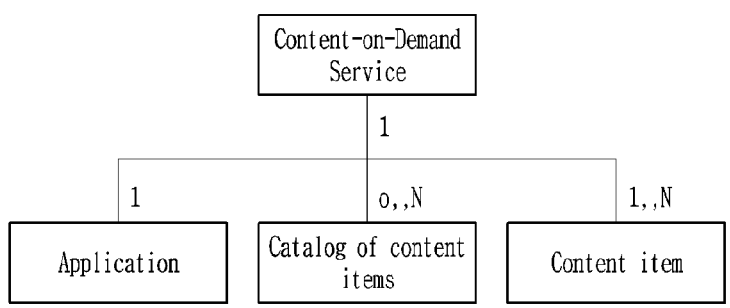

[Fig. 41]

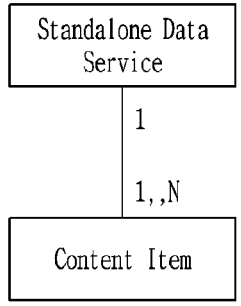

[Fig. 42]

| Syntax | No. of bits | Format |
|---|---|---|
| component_descriptor(){ | | |
|     descriptor_tag | 8 | uimsbf |
|     descriptor_length | 8 | uimsbf |
|     component_type | 4 | uimsbf |
|     target_device_flag | 1 | bslbf |
|     if(target_device_flag == 0x01) { | | |
|         target_device | 3 | uimsbf |
|     } | | |
|     else { | | |
|         reserved | 3 | '111' |
|     } | | |
|     text_length | 8 | uimsbf |
|     for (i=0;i<text_length;i++){ | | |
|         text_char | 8 | uimsbf |
|     } | | |
|     if(component_type == 0x00) { | | |
|         component_data_type | 8 | uimsbf |
|         component_data(component_data_type) | var | |
|     } | | |
|     else if( component_type == 0x01 \|\| component_type == 0x02 ) { | | |
|         complex_component_data() | var | |
|     } | | |
| } | | |

[Fig. 43]

| component_data_type | Meaning |
|---|---|
| 0-34 | Assigned or reserved by IANA, except that 20-24, 27, and 29-30 are unassigned |
| 35 | H.264/AVC video stream component or H.264/SVC base layer stream component |
| 36 | SVC enhancement layer stream component |
| 37 | HE AAC v2 audio stream component |
| 38 | FLUTE file delivery session |
| 39 | STKM stream component |
| 40 | LTKM stream component |
| 41 | OMA-RME DIMS stream component |
| 42 | NTP timebase stream component |
| 43-69 | [Unassigned by IANA and reserved by ATSC for possible future use] |
| 70 | HEVC video stream component |
| 71 | ISO base media file format stream component |
| 72-76 | Reserved by IANA |
| 77-95 | Unassigned by IANA |
| 96-127 | Designated by IANA for dynamic use |

[Fig. 44]

| Syntax | No. of bits | Format |
|---|---|---|
| complex_component_data(){ | | |
|     aggregation_type | 3 | uimsbf |
|     reserved | 1 | '111111' |
|     target_device_flag | 1 | bslbf |
|     if(target_device_flag == 0x01) { | | |
|         target_device | 3 | uimsbf |
|     } | | |
|     else { | | |
|         reserved | 3 | '111' |
|     } | | |
|     num_sub_component | 8 | uimsbf |
|     for (i=0;i<num_sub_component;i++){ | | |
|         sub_component_id | 8 | uimsbf |
|         if(aggregation_type==0x01){ | | uimsbf |
|             general_media_type | 8 | uimsbf |
|             sub_component_role(general_media_type) | 8 | uimsbf |
|         } | | |
|         ... | | |
|     } | | |
| } | | |

[Fig. 45]

| Syntax | No. of bits | Format |
|---|---|---|
| complex_component_descriptor(){ | | |
|     descriptor_tag | 8 | uimsbf |
|     descriptor_length | 8 | uimsbf |
|     complex_component_data() | var | |
| } | | |

[Fig. 46]

| Syntax | No. of bits | Format |
|---|---|---|
| associated_component_list_descriptor(){ | | |
|     descriptor_tag | 8 | uimsbf |
|     descriptor_length | 8 | uimsbf |
|     num_associated_component | 8 | uimsbf |
|     for (i=0;i<num_associated_component;i++){ | | |
|         component_id | 8 | uimsbf |
|         component_type | 4 | uimsbf |
|         if(component_type == 0x00) { | | |
|             component_data_type | 8 | uimsbf |
|         } | | |
|         general_media_type | 8 | uimsbf |
|         component_data_type | 8 | uimsbf |
|     } | | |
| } | | |

[Fig. 47]

| Syntax | No. Bits | Format |
|---|---|---|
| NRT_information_section{ | | |
|     table_id | 8 | TBD |
|     section_syntax_indicator | 1 | '0' |
|     private_indicator | 1 | '1' |
|     reserved | 2 | '11' |
|     section_length | 12 | uimsbf |
|     table_id_extension { | | |
|         protocol_version | 8 | uimsbf |
|         subnet_id | 8 | uimsbf |
|     } | | |
|     reserved | 2 | '11' |
|     version_number | 5 | uimsbf |
|     current_next_indicator | 1 | '1' |
|     section_number | 8 | uimsbf |
|     last_section_number | 8 | uimsbf |
|     service_id | 16 | uimsbf |
|     NRT_information_block() | var | |
| } | | |

[Fig. 48]

| Syntax | No. Bits | Format |
|---|---|---|
| NRT_information_block(){ | | |
|     time_span_start | 32 | uimsbf |
|     time_span_length | 16 | uimsbf |
|     num_content_items_in_section | 8 | uimsbf |
|     for (j=0; j< num_content_items_in_section; j++) { | | |
|         content_id | 32 | uimsbf |
|         updates_available | 1 | bslbf |
|         content_security_conditions_indicator | 1 | bslbf |
|         master_item | 1 | bslbf |
|         playback_length_included | 1 | bslbf |
|         playback_delay_included | 1 | bslbf |
|         expiration_included | 1 | bslbf |
|         content_size_included | 1 | bslbf |
|         available_on_internet | 1 | bslbf |
|         available_in_broadcast | 1 | bslbf |
|         target_included | 1 | bslbf |
|         reserved | 6 | '111111' |
|         if (playback_length_included==1) { | | |
|             playback_length_in_seconds | 24 | uimsbf |
|         } | | |
|         if (playback_delay_included==1) { | | |
|             playback_delay | 24 | uimsbf |
|         } | | |
|         if (expiration_included==1) { | | |
|             expiration | 32 | uimsbf |
|         } | | |
|         if (content_size_included==1) { | | |
|             content_size | 40 | uimsbf |
|         } | | |
|         if (target_included==1) { | | |
|             target | 8 | uimsbf |
|         } | | |
|         content_name_length | 8 | uimsbf |
|         content_name_text() | var | |
|         num_content_descriptors | 8 | uimsbf |
|         for (i=0; i<num_content_descriptors; i++) { | | |
|             content_descriptor() | var | |
|         } | | |
|     } | | |
|     num_descriptors | 8 | uimsbf |
|     for (i=0; i<num_descriptors; i++) { | | |
|         descriptor() | var | |
|     } | | |
| } | | |

[Fig. 49]

| Syntax | No. of Bits | Format |
|---|---|---|
| NRT_service_descriptor() { | | |
|     descriptor_tag | 8 | uimsbf |
|     descriptor_length | 8 | uimsbf |
|     reserved | 2 | '11' |
|     consumption_model | 6 | uimsbf |
|     auto-update | 1 | bslbf |
|     storage_reservation_present | 1 | bslbf |
|     default_content_size_present | 1 | bslbf |
|     target_present | 1 | bslbf |
|     reserved | 4 | '1111' |
|     if (storage_reservation_present==1) { | | |
|         storage_reservation | 24 | uimsbf |
|     if (default_content_size_present==1) { | | |
|         default_content_size | 40 | uimsbf |
|     } | | |
|     if(target_device_present== 1) { | | |
|         target | 8 | uimsbf |
|     } | | |
|     for (j=0; j< N; j++) { | | |
|         reserved | 8 | bslbf |
|     } | | |
| } | | |

[Fig. 50]

| Syntax | No. of bits | Format |
|---|---|---|
| image_icon_descriptor() { | | |
|     descriptor_tag | 8 | uimsbf |
|     descriptor_length | 8 | uimsbf |
|     descriptor_number | 4 | uimsbf |
|     last_descriptor_number | 4 | uimsbf |
|     icon_id | 8 | uimsbf |
|     if (descriptor_number == 0x00) { | | |
|         icon_transport_mode | 2 | uimsbf |
|         position_flag | 1 | bslbf |
|         if (position_flag == 0x01) { | | |
|             coordinate_system | 3 | uimsbf |
|             icon_horizontal_origin | 13 | uimsbf |
|             icon_vertical_origin | 13 | uimsbf |
|         } | | |
|         else { | | |
|             reserved_future_use | 5 | '11111' |
|         } | | |
|         icon_type_length /*N*/ | 8 | uimsbf |
|         icon_type_chars() | 8*N | uimsbf |
|         if (icon_transport_mode == 0x00 ) { | | |
|             icon_data_length /*M*/ | 8 | uimsbf |
|             icon_data_bytes() | 8*M | uimsbf |
|         } | | |
|         else if (icon_transport_mode == 0x01 ) { | | |
|             url_length /*K*/ | 8 | uimsbf |
|             url() | 8*K | uimsbf |
|         } | | |
|         else if (icon_transport_mode == 0x02 ) { | | |
|             icon_content_linkage | 32 | uimsbf |
|         } | | |
|     } | | |
|     else { | | |
|         icon_data_length/*L*/ | 8 | uimsbf |
|         icon_data_bytes() | 8*L | uimsbf |
|     } | | |
| } | | |

[Fig. 51]

| Value | Meaning |
|---|---|
| 0x00 | The icon is delivered in the icon_data_bytes |
| 0x01 | The location of the icon file is identified by URL carried in the url_char sequence of bytes. |
| 0x02 | The icon file is delivered via a FLUTE session. |
| 0x03 | reserved |

[Fig. 52]

| Value | Meaning |
|---|---|
| 0x00 | The coordinate system is 720x576 |
| 0x01 | The coordinate system is 1280x720 |
| 0x02 | The coordinate system is 1920x1080 |
| 0x03 | The coordinate system is 3840x2160 |
| 0x04 | The coordinate system is 7680x4320 |
| 0x05 to 0x07 | reserved |

[Fig. 53]

| Syntax | No. of bits | Format |
|---|---|---|
| component_list_descriptor(){ | | |
|   descriptor_tag | 8 | uimsbf |
|   descriptor_length | 8 | uimsbf |
|   num_component | 8 | uimsbf |
|   for (i=0;i<num_component;i++){ | | |
|     component_id | 8 | uimsbf |
|     component_type | 4 | uimsbf |
|     general_media_type | 4 | uimsbf |
|   } | | |
| } | | |

[Fig. 54]

| Syntax | Number of bits | Identifier |
|---|---|---|
| URI_linkage_descriptor(){ | | |
|   descriptor_tag | 8 | uimsbf |
|   descriptor_length | 8 | uimsbf |
|   uri_length | 8 | uimsbf |
|   for (i=0;i<uri_length;i++) { | | |
|     uri_char | 8 | bslbf |
|   } | | |
|   for (i=0;i<N;i++) { | | |
|     private_data_byte | 8 | bslbf |
|   } | | |
| } | | |

[Fig. 55]

| Syntax | No. of bits | Format |
|---|---|---|
| targeting_criteria_descriptor(){ | | |
|     descriptor_tag | 8 | uimsbf |
|     descriptor_length | 8 | uimsbf |
|     num_targeting_criteria | 8 | uimsbf |
|     for (i=0; i<num_targeting_criteria; i++) { | | |
|         criterion_id_length | 8 | uimsbf |
|         criterion_id | var | var |
|         criterion_type_code | 3 | uimsbf |
|         num_criterion_values | 5 | uimsbf |
|         for (j=0; j<num_criterion_values; j++) { | | |
|             criterion_value_length | 8 | uimsbf |
|             criterion_value | var | |
|         } | | |
|     } | | |
| } | | |

[Fig. 56]

| Syntax | No. of bits | Format |
|---|---|---|
| text_descriptor(){ | | |
|     descriptor_tag | 8 | uimsbf |
|     descriptor_length | 8 | uimsbf |
|     descriptor_number | 4 | uimsbf |
|     last_descriptor_number | 4 | uimsbf |
|     description_id | 8 | uimsbf |
|     if (descriptor_number == 0x00) { | | |
|         language_code | 24 | bslbf |
|     } | | |
|     text_length | 8 | uimsbf |
|     for (i=0;i<text_length;i++){ | | |
|         text_char | 8 | uimsbf |
|     } | | |
| } | | |

[Fig. 57]

| Syntax | No. of bits | Format |
|---|---|---|
| title_descriptor(){ | | |
|     descriptor_tag | 8 | uimsbf |
|     descriptor_length | 8 | uimsbf |
|     num_title | 8 | uimsbf |
|     for (i=0; i<num_title; i++) { | | |
|         language_code | 24 | bslbf |
|         title_length | 24 | uimsbf |
|         for (i=0;i<text_length;i++){ | | |
|         text_char | 8 or 16 | uimsbf |
|         } | | |
|     } | | |
| } | | |

[Fig. 58]
| Syntax | No. of bits | Format |
|---|---|---|
| genre_descriptor(){ | | |
|     descriptor_tag | 8 | uimsbf |
|     descriptor_length | 8 | uimsbf |
|     num_genre | 8 | uimsbf |
|     for (i=0;i<num_genre;i++){ | | |
|         genre_value | 8 | uimsbf |
| } | | |
[Fig. 59]
| Syntax | No. of bits | Format |
|---|---|---|
| targeting_descriptor(){ | | |
|     descriptor_tag | 8 | uimsbf |
|     descriptor_length | 8 | uimsbf |
|     target_device | 8 | uimsbf |
| } | | |
[Fig. 60]
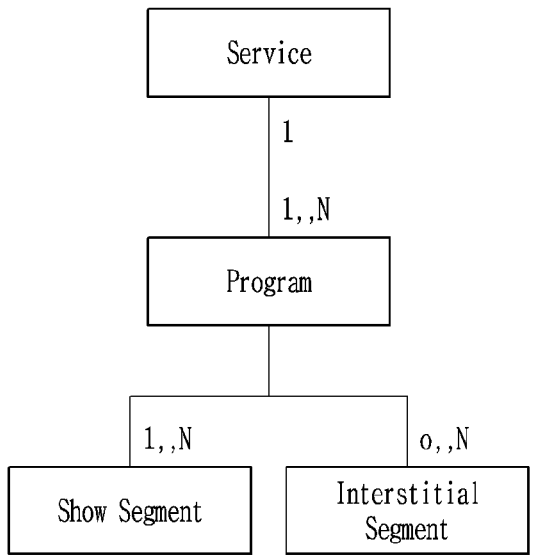

[Fig. 61]

| Syntax | No. Bits | Format |
|---|---|---|
| show_information_section{ | | |
|     table_id | 8 | TBD |
|     section_syntax_indicator | 1 | '0' |
|     private_indicator | 1 | '1' |
|     reserved | 2 | '11' |
|     section_length | 12 | uimsbf |
|     table_id_extension { | | |
|         protocol_version | 8 | uimsbf |
|         subnet_id | 8 | uimsbf |
|     } | | |
|     reserved | 2 | '11' |
|     version_number | 5 | uimsbf |
|     current_next_indicator | 1 | '1' |
|     section_number | 8 | uimsbf |
|     last_section_number | 8 | uimsbf |
|     show_id | 16 | uimsbf |
|     show_information_block() | var | |
| } | | |

[Fig. 62]

| Syntax | No. Bits | Format |
|---|---|---|
| show_information_block() { | | |
|     time_span_length | 16 | uimsbf |
|     title_text_length | 8 | uimsbf |
|     title_text() | var | |
|     num_segments | 8 | uimsbf |
|     for(i=0;i<num_segments;i++){ | | |
|         segment_information_block() | | |
|     } | | |
|     num_show_descriptors | 8 | uimsbf |
|     for(i=0;i<num_show_descriptors;i++){ | | |
|         descriptor() | var | |
|     } | | |
| } | | |

[Fig. 63]
| Syntax | No. Bits | Format |
|---|---|---|
| segment_information_block() { | | |
|     segment_id | 16 | uimsbf |
|     start_time | 32 | uimsbf |
|     time_span_length | 16 | uimsbf |
|     num_segment_descriptors | 8 | uimsbf |
|     i=0;i<num_program_descriptors;i++){ | | |
|         descriptor() | | |
|     } | | |
| } | | |
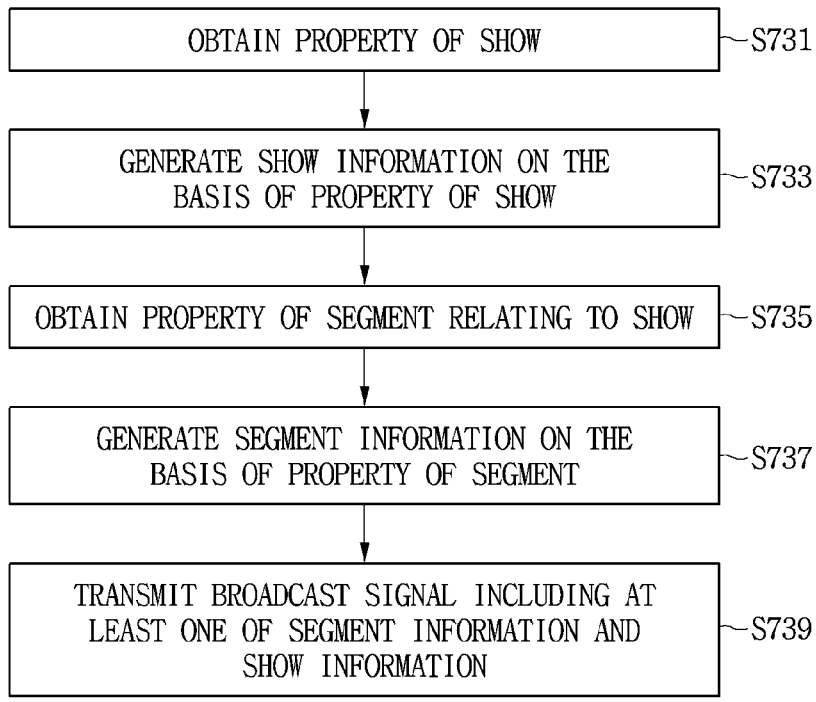
[Fig. 64]

[Fig. 65]

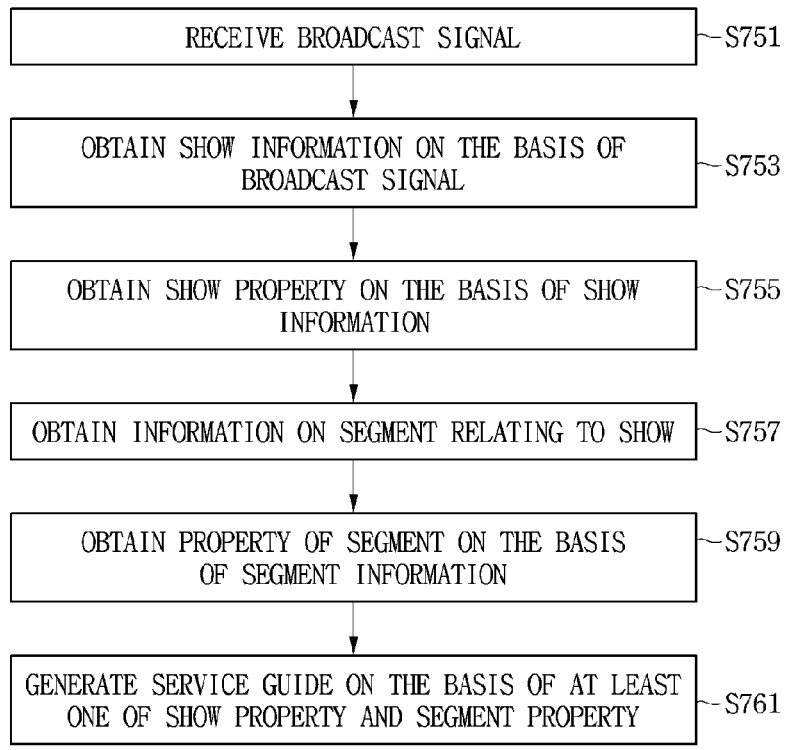

RECEIVE BROADCAST SIGNAL — S751

OBTAIN SHOW INFORMATION ON THE BASIS OF BROADCAST SIGNAL — S753

OBTAIN SHOW PROPERTY ON THE BASIS OF SHOW INFORMATION — S755

OBTAIN INFORMATION ON SEGMENT RELATING TO SHOW — S757

OBTAIN PROPERTY OF SEGMENT ON THE BASIS OF SEGMENT INFORMATION — S759

GENERATE SERVICE GUIDE ON THE BASIS OF AT LEAST ONE OF SHOW PROPERTY AND SEGMENT PROPERTY — S761

[Fig. 66]

| Syntax | No. Bits | Format |
|---|---|---|
| program_information_section{ | | |
|     table_id | 8 | TBD |
|     section_syntax_indicator | 1 | '0' |
|     private_indicator | 1 | '1' |
|     reserved | 2 | '11' |
|     section_length | 12 | uimsbf |
|     table_id_extension { | | |
|         protocol_version | 8 | uimsbf |
|         subnet_id | 8 | uimsbf |
|     } | | |
|     reserved | 2 | '11' |
|     version_number | 5 | uimsbf |
|     current_next_indicator | 1 | '1' |
|     section_number | 8 | uimsbf |
|     last_section_number | 8 | uimsbf |
|     service_id | 16 | uimsbf |
|     program_information_block() | var | |
| } | | |

[Fig. 67]

| Syntax | No. Bits | Format |
|---|---|---|
| program_information_block() { | | |
|    num_program | 8 | uimsbf |
|    for(i=0;i<num_program;i++){ | | |
|      program_id | 16 | uimsbf |
|      time_span_start | 32 | uimsbf |
|      time_span_length | 16 | uimsbf |
|      time_text_length | 8 | uimsbf |
|      time_text() | var | |
|      num_program_descriptors | 8 | uimsbf |
|      for(i=0;i<num_program_descriptors;i++){ | | |
|        descriptor() | | |
|      } | | |
|    } | | |

[Fig. 68]

| Syntax | No. Bits | Format |
|---|---|---|
| program_information_block() { | | |
|    num_program | 8 | uimsbf |
|    for(i=0;i<num_program;i++){ | | |
|      program_id | 16 | uimsbf |
|      time_span_start | 32 | uimsbf |
|      time_span_length | 16 | uimsbf |
|      associated_show_flag | 1 | bslbf |
|      reserved | 7 | '1111111' |
|      if (associated_show_flag==1) | | |
|        show_id | 16 | uimsbf |
|      title_text_length | 8 | uimsbf |
|      title_text() | var | |
|      num_program_descriptors | 8 | uimsbf |
|      for(i=0;i<num_program_descriptors;i++){ | | |
|        descriptor() | | |
|      } | | |
|    } | | |

[Fig. 69]

| Syntax | No. Bits | Format |
|---|---|---|
| program_information_block() { | | |
|   num_program | 8 | uimsbf |
|   for(i=0;i<num_program;i++){ | | |
|     program_id | 16 | uimsbf |
|     time_span_start | 32 | uimsbf |
|     time_span_length | 16 | uimsbf |
|     title_text_length | 8 | uimsbf |
|     title_text() | var | |
|     associated_show_flag | 1 | bslbf |
|     reserved | 7 | '1111111' |
|     if (associated_show_flag==1) | | |
|       show_id | 16 | uimsbf |
|     num_component | 8 | uimsbf |
|     for (k=0; k< num_component; k++) { | | |
|       component_id | 8 | uimsbf |
|       essential_component_indicator | 1 | bslbf |
|       ... | | |
|       num_component_descriptors | 8 | uimsbf |
|       for (i=0;i< num_component_descriptors; i++) { | | |
|         component_descriptor() | var | |
|       } | | |
|     } | | |
|     num_program_descriptors | 8 | uimsbf |
|     for (i=0;i< num_component_descriptors; i++) { | | |
|       descriptor() | | |
|     } | | |
| } | | |

[Fig. 70]

| Syntax | No. Bits | Format |
|---|---|---|
| program_information_block() { | | |
|     num_program | 8 | uimsbf |
|     for(i=0;i<num_program;i++){ | | |
|         program_id | 16 | uimsbf |
|         time_span_start | 32 | uimsbf |
|         time_span_length | 16 | uimsbf |
|         title_text_length | 8 | uimsbf |
|         title_text() | var | |
|         num_segments | 8 | uimsbf |
|         for(i=0;i<num_segments;i++){ | | |
|             segment_information_block() | | |
|         } | | |
|         num_program_descriptors | 8 | uimsbf |
|         for(i=0;i<num_program_descriptors;i++){ | | |
|             descriptor() | | |
|         } | | |
|     } | | |

[Fig. 71]

| Syntax | No. Bits | Format |
|---|---|---|
| program_information_block() { | | |
|     num_program | 8 | uimsbf |
|     for(i=0;i<num_program;i++){ | | |
|         program_id | 16 | uimsbf |
|         time_span_start | 32 | uimsbf |
|         time_span_length | 16 | uimsbf |
|         title_text_length | 8 | uimsbf |
|         title_text() | var | |
|         associated_show_flag | 1 | bslbf |
|         reserved | 7 | '1111111' |
|         if (associated_show_flag==1) | | |
|             show_id | 16 | uimsbf |
|         num_segments | 8 | uimsbf |
|         for(i=0;i<num_segments;i++){ | | |
|             segment_information_block() | | |
|         } | | |
|         num_program_descriptors | 8 | uimsbf |
|         for(i=0;i<num_program_descriptors;i++){ | | |
|             descriptor() | | |
|         } | | |
|     } | | |

[Fig. 72]

| Syntax | No. Bits | Format |
|---|---|---|
| segment_information_section{ | | |
|     table_id | 8 | TBD |
|     section_syntax_indicator | 1 | '0' |
|     private_indicator | 1 | '1' |
|     reserved | 2 | '11' |
|     section_length | 12 | uimsbf |
|     table_id_extension { | | |
|         protocol_version | 8 | uimsbf |
|         subnet_id | 8 | uimsbf |
|     } | | |
|     reserved | 2 | '11' |
|     version_number | 5 | uimsbf |
|     current_next_indicator | 1 | '1' |
|     section_number | 8 | uimsbf |
|     last_section_number | 8 | uimsbf |
|     segment_information_block() | var | bslbf |
| } | | |

[Fig. 73]

| Syntax | No. Bits | Format |
|---|---|---|
| segment_information_block() { | | |
|     segment_id | 8 | uimsbf |
|     segment_type | 3 | uimsbf |
|     associated_program_flag | 1 | bslbf |
|     time_included | 1 | bslbf |
|     reserved | 3 | '111' |
|     if (associated_program_flag==1) | | |
|         program_id | 16 | uimsbf |
|     if (time_included==1) { | | |
|         time_span_start | 32 | uimsbf |
|         time_span_length | 16 | uimsbf |
|     } | | |
|     num_component | 8 | uimsbf |
|     for (k=0; k< num_component; k++) { | | |
|         component_id | 8 | uimsbf |
|         num_component_descriptors | 8 | uimsbf |
|         for (i=0;i< num_component_descriptors; i++) { | | |
|             component_descriptor() | var | |
|         } | | |
|     } | | |
|     num_descriptors | 8 | uimsbf |
|     for (i=0; i<num_descriptors; i++) { | | |
|         descriptor() | var | |
|     } | | |
| } | | |

[Fig. 74]

| Syntax | No. of bits | Format |
|---|---|---|
| targeting_segment_set_descriptor(){ | | |
|   descriptor_tag | 8 | uimsbf |
|   descriptor_length | 8 | uimsbf |
|   time_span_start | 32 | uimsbf |
|   time_span_length | 16 | uimsbf |
|   num_segments | 8 | uimsbf |
|   for (i=0; i<num_segments; i++) { | | |
|     segment_id | 8 | uimsbf |
|     num_targeting_criteria | 8 | uimsbf |
|     for (i=0; i<targeting_criteria; i++) { | | |
|       criterion_id_length | 8 | uimsbf |
|       criterion_id | var | var |
|       criterion_type_code | 3 | uimsbf |
|       num_criterion_values | 5 | uimsbf |
|       for (j=0; j<num_criterion_values; j++) { | | |
|         criterion_value_length | 8 | uimsbf |
|         criterion_value | var | |
|       } | | |
|     } | | |
|   } | | |
| } | | |

[Fig. 75]

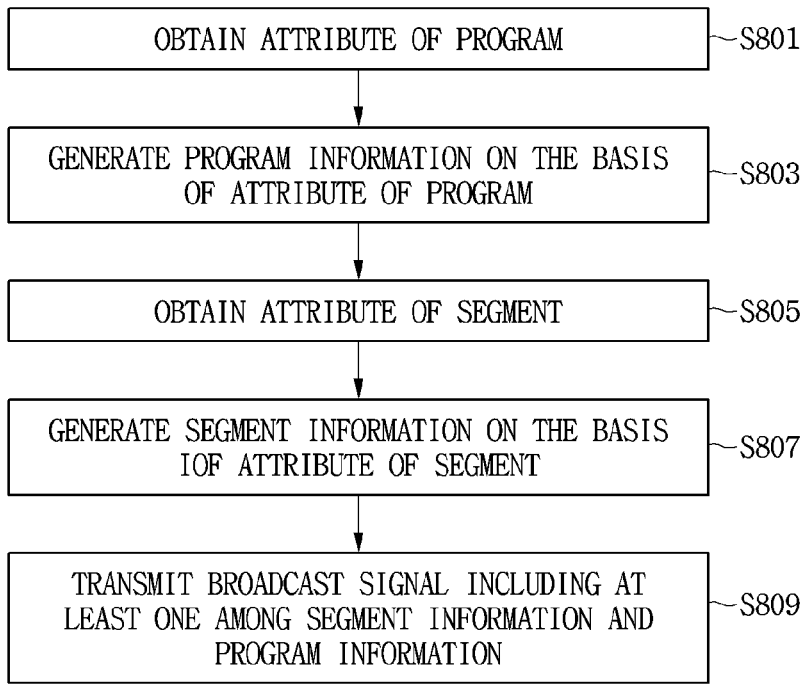

[Fig. 76]

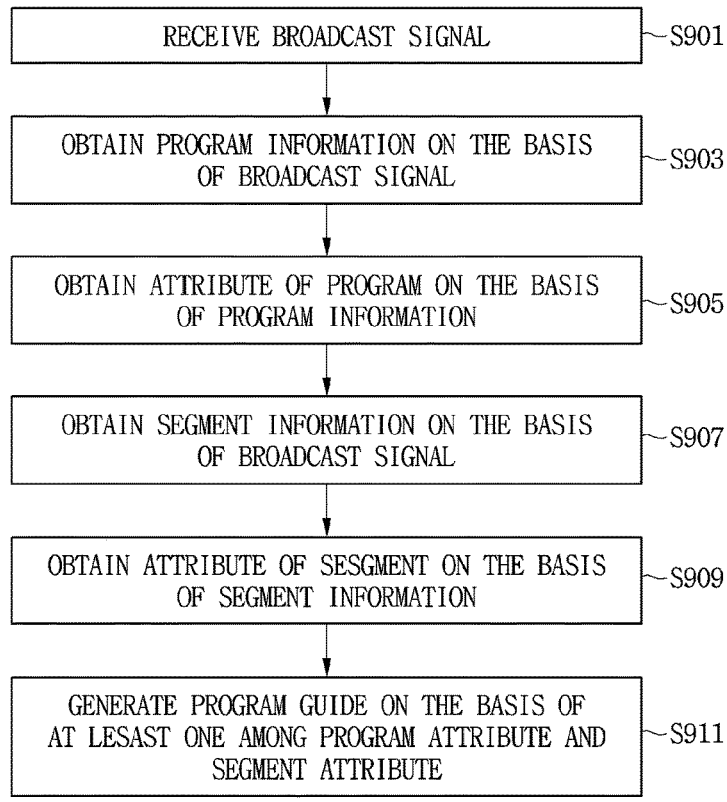

[Fig. 77]

| Continuous Component <> represents a Continuous Component |
|---|
| Attributes |
| ComponentId[1] – unique identifier of component |

(a)

| Audio Component <> represents a Continuous Component of content type audio |
|---|
| Relationships |
| Sub-class relationship with Continuous Component class |

(b)

| Video Component <> represents a Continuous Component of content type Video |
|---|
| Relationships |
| Sub-class relationship with Continuous Component class |

(c)

| CC Component <> represents a Continuous Component of content type closed caption |
|---|
| Relationships |
| Sub-class relationship with Continuous Component class |

| Elementary Audio Component represents an Elementary Component of content type audio | | |
|---|---|---|
| Attributes | | |
| | Codec[1] | |
| | Number of audio channels[1] | |
| | Encoding bit-rate[1] | |
| | Language[0..1] | |
| | Mode[1] Possible values | |
| | | Complete main |
| | | Music |
| | | Dialog |
| | | Effects |
| | | Visually impaired |
| | | Hearing impaired |
| | | Commentary |
| | Other encoding parameters (possibly codec dependent) | |
| Relationships | | |
| | Sub-class relationship with Audio Component class | |

(a)

| Elementary Video Component represents an Elementary Component of content type Video | |
|---|---|
| Attributes | |
| | Codec[1] |
| | Resolution (width x height, in pixels)[1] |
| | Aspect ratio[1] |
| | Interlaced/Progressive[1] |
| | Frame rate, on "still" picture mode[1] |
| | Other encoding parameters (possibly codec dependent) |
| Relationships | |
| | Sub-class relationship with Video Component class |

| Elementary CC Component represents an Elementary Component of content type closed caption | | |
|---|---|---|
| Attributes | | |
| | "Codec" (i.e., encoding format)[1] | |
| | Language[1] | |
| | Type[1] Possible values | |
| | | Normal |
| | | Easy-reader |
| Relationships | | |
| | Sub-class relationship with CC Component class | |

| Composite Audio Component represents a Composite Component of content type audio | |
|---|---|
| Relationships | |
| | "ContainsAudio" relationship with Audio Component class - with the restriction that for each instantiation of the relationship all of the included objects (audio components) represent the same sound scene |
| | Sub-class relationship with Audio Component class |

(a)

| Composite Video Component represents a Composite Component of content type video | | |
|---|---|---|
| Relationships | | |
| | "ContainsVideo" relationship with Video Component class - with the restriction that for each instantiation of the relationship all of the contained objects (video components) represent the same video scene<br>Attributes of Contains Video Relationship | |
| | Role - role of the contained component in the Composite Component<br>Possible values | |
| | | Enhancement layer for scalable video encoding, with level |
| | | 3D video left/right view |
| | | 3D video depth information |
| | | Part of video array, <x,y> of <n,m> (from bottom left to top right, by row) |
| | | Follow-Subject metadata (name of subject, location of subject, size of subject), in the case when the "follow-subject" feature is supported by a stream of frame-by-frame metadata indicating an area of the main video component that is focused on the subject |
| | Sub-class relationship with Video Component class | |

| PickOne Component represents a PickOne Component | |
|---|---|
| Relationships | |
| | "Contains" relationship with Continuous Component class - with the restriction that for each instantiation of the relationship all of the included components are of the same content type and represent the same video scene or audio scene |
| | Sub-class relationship with Continuous Component class |

[Fig. 81]

| Presentable Component <> |||
|---|---|---|
| represents a Presentable Component |||
| Attributes |||
| | Targeting/personalization properties ||
| | Content advisory rating ||
| | Content/Service protection properties ||
| | Target device(s) [0..n] Possible values ||
| | | Primary Device |
| | | Companion Device |
| | | Inset on Primary Screen ( "Picture-in-Picture" ) |

(a)

| Presentable Video Component |
|---|
| represents a Presentable Component of video content type - i.e., contains all objects in the Video Component class that satisfy the definition of a Presentable component |
| Relationships |
| "AssociatedAudio" relationship with Presentable Audio Component class - represents that the associated Presentable Audio Component is suitable for presentation along with the Presentable Video Component |
| "Associated CC" relationship with Presentable CC Component class - represents that the associated Presentable CC Component is suitable for presentation along with the Presentable Video Component |
| Sub-class relationship with Video Component |

(b)

| Presentable Audio Component |
|---|
| represents a Presentable Component of audio content type - i.e., contains all objects in the Audio Component class that satisfy the definition of a Presentable component |
| Relationships |
| Sub-class relationship with Audio Component |

(c)

| Presentable CC Component |
|---|
| represents a Presentable Component of closed caption content type- i.e., contains all objects in the CC Component class that satisfy the definition of a Presentable component |
| Relationships |
| Sub-class relationship with CC Component |

| OnDemand Component |
|---|
| represents a content component that is delivered on demand |
| Attributes |
|     OnDemandComponentId [1] - unique identifier of on demand component |
|     ComponentLocation [1..n] - location where the OnDemand component can be accessed |
|     ComponentName [0..n] - human readable name of component, possibly in multiple languages |
|     PlaybackLength [0..1] - playout time of the component (only meaningful for on demand components such as audio or video clips that have a defined playout time) |
|     AvailabilityStart [0.1] - date and time at which component becomes available |
|     AvailablityDuration [0..1] - length of time component remains available |
|     Targeting/personalization properties |
|     Content/Service protection properties |
|     Content advisory rating [0..n] |

[Fig. 83]

| NRT Content Item |
|---|
| represents an NRT Content Item |
| Attributes |
|     ContentItemId [1] - unique identifier of NRT Content Item |
|     ContentItemName [0..n] - human readable name of NRT Content Item, possibly in multiple languages |
|     Updatable [1] - indication whether or not NRT Content Item should be monitored for updates |
|     Expiration [0..1] - date and time after which the NRT Content Item should be discarded |
|     ContentItemSize [1] - size of the NRT Content Item, in bytes |
|     PlaybackLength [0..1] - playout time of the NRT Content Item (only meaningful for NRT Content Items such as audio or video clips that have a defined playout time) |
|     Targeting/personalization properties |
|     Content/Service protection properties |
|     Content advisory rating [0..n] |
| Relationships |
|     "Contains" relationship with NRT File class |

(a)

| NRT File represents a Non-real Time file |
|---|
| Attributes |
|     ContentLocation - Content-Location e.g., it can be defined in IETF RFC 2616 |
|     ContentType - Content-Type, e.g., it can be defined in IETF RFC 2616 |

| | |
|---|---|
| OnDemand Component<br>represents a content component that is delivered on demand | |
| Attributes | |
| | OnDemandComponentId [1] - unique identifier of on demand component |
| | ComponentLocation [1..n] - location where the OnDemand component can be accessed |
| | ComponentName [0..n] - human readable name of component, possibly in multiple languages |
| | PlaybackLength [0..1] - playout time of the component (only meaningful for on demand components such as audio or video clips that have a defined playout time) |
| | AvailabilityStart [0.1] - date and time at which component becomes available |
| | AvailablityDuration [0..1] - length of time component remains available |
| | Targeting/personalization properties |
| | Content/Service protection properties |
| | Content advisory rating [0..n] |
| | Essential capabilities [0..1] - receiver capabilities needed for meaningful rendition of the OnDemand Component |
| | Non-essential capabilities [0..1] - receiver capabilities useful for optimal rendition of enhancement, but not absolutely necessary for meaningful rendition of the OnDemand Component |

[Fig. 85]

| NRT Content Item | |
|---|---|
| represents an NRT Content Item | |
| Attributes | |
| | ContentItemId [1] - unique identifier of NRT Content Item |
| | ContentItemName [0..n] - human readable name of NRT Content Item, possibly in multiple languages |
| | Updatable [1] - indication whether or not NRT Content Item should be monitored for updates |
| | Expiration [0..1] - date and time after which the NRT Content Item should be discarded |
| | ContentItemSize [1] - size of the NRT Content Item, in bytes |
| | PlaybackLength [0..1] - playout time of the NRT Content Item (only meaningful for NRT Content Items such as audio or video clips that have a defined playout time) |
| | Targeting/personalization properties |
| | Content/Service protection properties |
| | Content advisory rating [0..n] |
| | Essential capabilities [0..1] - receiver capabilities needed for meaningful rendition of the NRT Content Item |
| | Non-essential capabilities [0..1] - receiver capabilities useful for optimal rendition of enhancement, but not absolutely necessary for meaningful rendition of the NRT Content Item |
| Relationships | |
| | "Contains" relationship with NRT File class |

(a)

| NRT File represents a Non-real Time file | |
|---|---|
| Attributes | |
| | ContentLocation - Content-Location e.g., it can be defined in IETF RFC 2616 |
| | ContentType - Content-Type, e.g., it can be defined in IETF RFC 2616 |
| | Essential capabilities [0..1] - receiver capabilities needed for meaningful rendition of the NRT File |
| | Non-essential capabilities [0..1] - receiver capabilities useful for optimal rendition of enhancement, but not absolutely necessary for meaningful rendition of the NRT File |

| Linear Service |||
|---|---|---|
| represents a Linear Service (as described in section 3.2 of this document) |||
| Relationships |||
| "Contains" relationship with Presentable Video Component class ||||
| Attributes of |||
| | Role of video component [1] ||
| | Possible values ||
| | | Primary (default) video |
| | | Alternative camera view |
| | | Other alternative video component |
| | | Sign language (e.g., ASL) inset |
| | | Follow subject video, with name of subject being followed, in the case when the follow-subject feature is supported by a separate video component. |
| "Contains" relationship with Presentable Audio Component class |||
| "Contains" relationship with Presentable CC Component class |||
| "Contains" relationship with Time Base class |||
| "Contains" relationship with App-Based Enhancement class |||
| "Sub-class" relationship with Service class |||

[Fig. 87]

| App ||
|---|---|
| represents a kind of NRT Content Item that can support interactivity ||
| Attributes ||
| | ... |
| Relationships ||
| | Sub-class relationship with NRT Content Item class |

(a)

| App-Based Enhancement ||
|---|---|
| represents an App-Based Enhancement ||
| Attributes ||
| | Essential capabilities [0..1] - receiver capabilities needed for meaningful rendition of enhancement |
| | Non-essential capabilities [0..1] - receiver capabilities useful for optimal rendition of enhancement, but not absolutely necessary for meaningful rendition of enhancement |
| | Target device [0..n] - for adjunct data services only Possible values |
| | | Primary device |
| | | Companion device |
| Relationships ||
| | "Contains" relationship with App class - for the applications in the App-Based Enhancement |
| | "Contains" relationship with NRT Content Item class - for NRT Content Items used by the applications in the App-Based Enhancement |
| | "Contains" relationship with Notification Stream class - for Notifications Stream that delivers notifications to synchronize the actions of the applications with an underlying Linear Time Base. |
| | "Contains" relationship with OnDemand Component class - for On Demand components to be managed by the application(s). |

| Time Base represents metadata used to establish a time line for synchronizing the components of a Linear Service ||
|---|---|
| Attributes ||
| | Time Base ID - identifier of Time Base |
| | Clock Rate - clock rate of the time base |

(a)

| Notification Stream represents Notification Stream used to deliver synchronized notifications of actions to be taken ||
|---|---|
| Attributes ||
| | Notification Stream ID - identifier of Notification Stream |

| App-Based Service represents an App-Based Service ||
|---|---|
| Relationships ||
| | "Contains" relationship with Time Base class |
| | "Contains" relationship with App-Based Enhancement class. |
| | "Sub-class" relationship with Service class |

[Fig. 90]

| Program |
|---|
| represents a Program |
| Attributes |
| ProgramIdentifier [1] - unique identifier of the Program |
| StartTime [1] - wall clock date and time the Program is scheduled to start |
| ProgramDuration [1] - scheduled wall clock time from the start of the Program to the end of the Program |
| TextualTitle [1..n] - human readable title of the Program, possibly in multiple languages - if not present, defaults to TextualTitle of associated Show |
| TextualDescription [0..n] - human readable description of the Program, possibly in multiple languages - if not present, defaults to TextualDescription of associated Show |
| Genre [0..n] - genre(s) of the Program - if not present, defaults to Genre of associated Show |
| GraphicalIcon [0..n] - icon to represent the program (e.g., in ESG), possibly in multiple sizes - if not present, defaults to GraphicalIcon of associated Show |
| ContentAdvisoryRating [0..n] - content advisory rating for the Program, possibly for multiple regions - if not present, defaults to ContentAdvisoryRating of associated Show |
| Targeting/personalization properties - properties to be used to determine targeting, etc., of Program - if not present, defaults to Targeting/personalization properties of associated Show |
| Content/Service protection properties - properties to be used for content protection and/or service protection of Program - if not present, defaults to Content/Service protection properties of associated Show |
| Other properties defined in the "ESG Model" |
| Relationships |
| "ProgramOf" relationship with Linear Service class |
| "ContentItemOf" relationship with App-Based Service class |
| "OnDemandComponentOf" relationship with App Based Service Class |
| "Contains" relationship with Presentable Video Component class Attributes |
|     Role of video component [1] Possible values |
|     Primary (default) video |
|     Alternative camera view |
|     Other alternative video component |
|     Sign language (e.g., ASL) inset |
|     Follow subject video, with name of subject being followed, in the case when the follow-subject feature is supported by a separate video component. |
| "Contains" relationship with Presentable Audio Component class |
| "Contains" relationship with Presentable CC Component class |
| "Contains" relationship with App-Based Enhancement class |
| "Contains" relationship with Time Base class |
| "Based-on" relationship with Show class |
| "Contains" relationship with Segment class |
| Attributes of "Contains" relationship with Segment class |
|     RelativeSegmentStartTime - start time of Segment relative to beginning of Program |

[Fig. 91]

| Show |
|---|
| represents a Show, (i.e., the primary content of a Program from a consumer viewpoint) |
| Attributes |
| ShowIdentifier [1] - unique identifier of the Show [scope of uniqueness TBD] |
| ShowDuration [1] - duration from the start of the Show to the end of the Show, if played without any interruptions or interstitial material |
| TextualTitle [1..n] - human readable title of the Show, possibly in multiple languages |
| TextualDescription [0..n] - human readable description of the Show, possibly in multiple languages |
| Genre [0..n] - the genre(s) of the Show |
| GraphicalIcon [0..n] - icon to represent the Show, possibly in multiple sizes |
| ContentAdvisoryRating [0..n] [details TBD by S34-3 & S33-2] |
| Targeting/personalization properties - properties to be used to determine targeting, etc., of Program |
| Content/Service protection properties - properties to be used for content protection and/or service protection of Program |
| Other properties defined in the "ESG Model" |
| Relationships |
| "Includes" relationship with Show Segment class |

[Fig. 92]

| Segment <> |
|---|
| represents a Segment |
| Attributes |
| SegmentId [1] - unique identifier of segment |
| Duration [1] - temporal length of segment |
| Targeting/personalization properties- targeting properties (to be considered when Segment is to be substituted into a Program) |
| Content advisory rating [0..1] - content advisory rating for segment (to be considered when Segment is to be substituted into a Program) |

(a)

| Show Segment |
|---|
| represents a Segment of a Show |
| Attributes |
| ShowSegmentRelativeStartTime - start time of Show Segment relative to beginning of Show |
| Relationships |
| "Sub-class" relationship with Segment class |

(b)

| Interstitial Segment |
|---|
| Represents a Segment of a Program that is not a Show Segment |
| Relationships |
| "Sub-class" relationship with Segment class |

(c)

[Fig. 93]
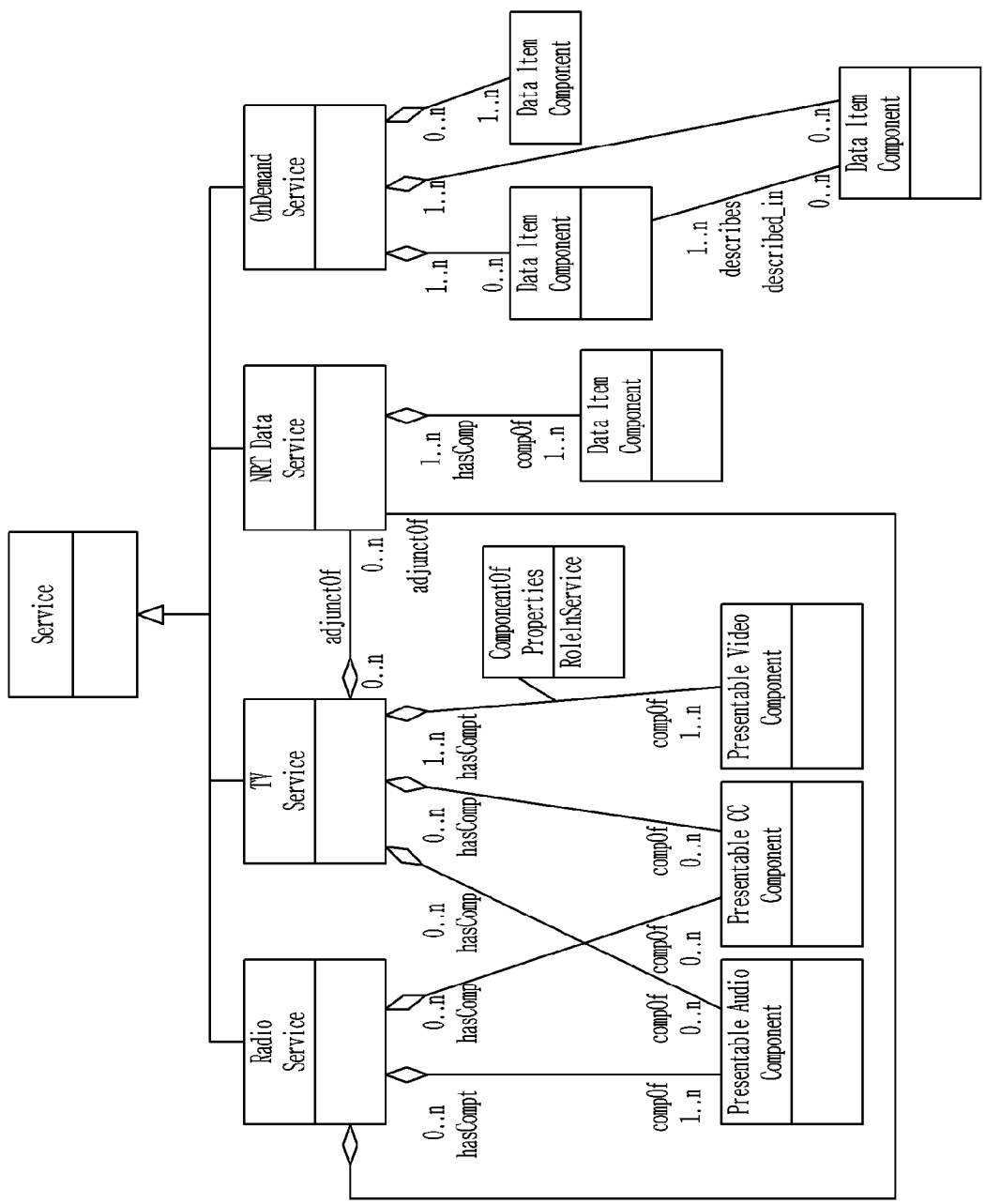

[Fig. 94]
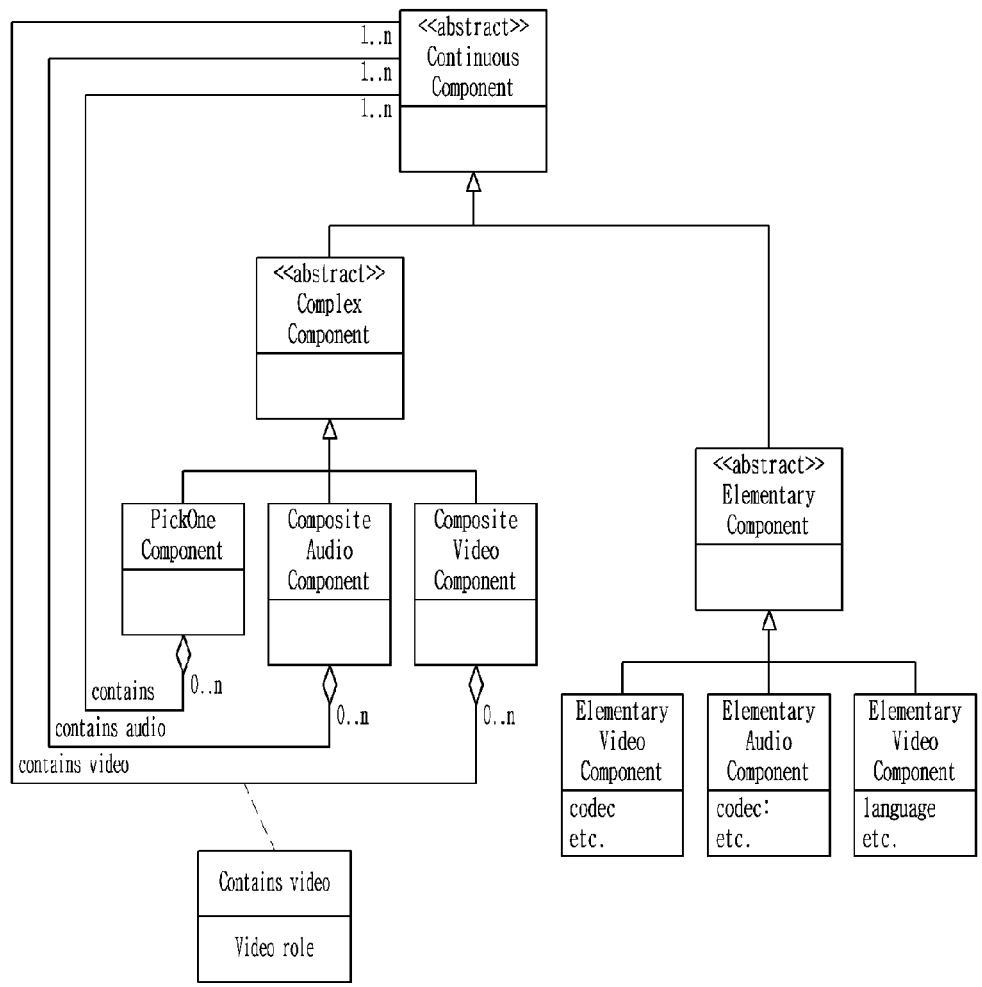
[Fig. 95]
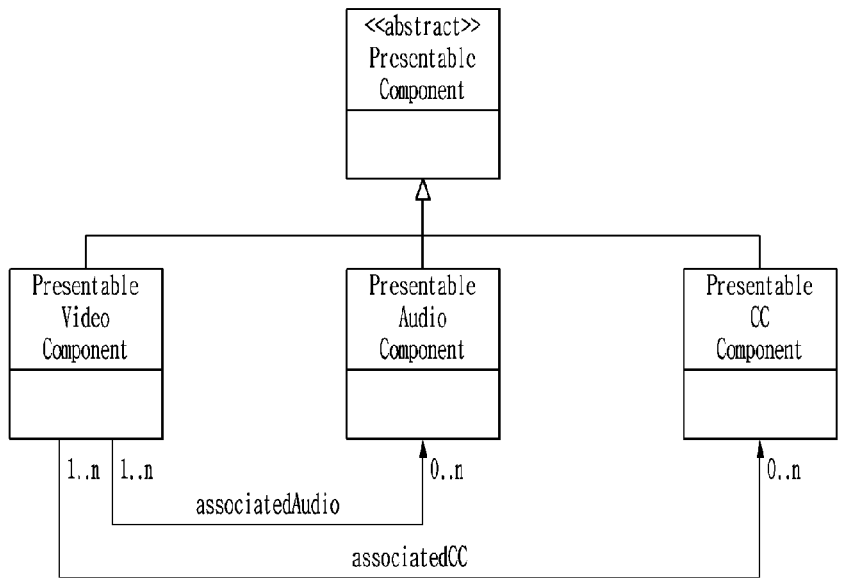

[Fig. 96]
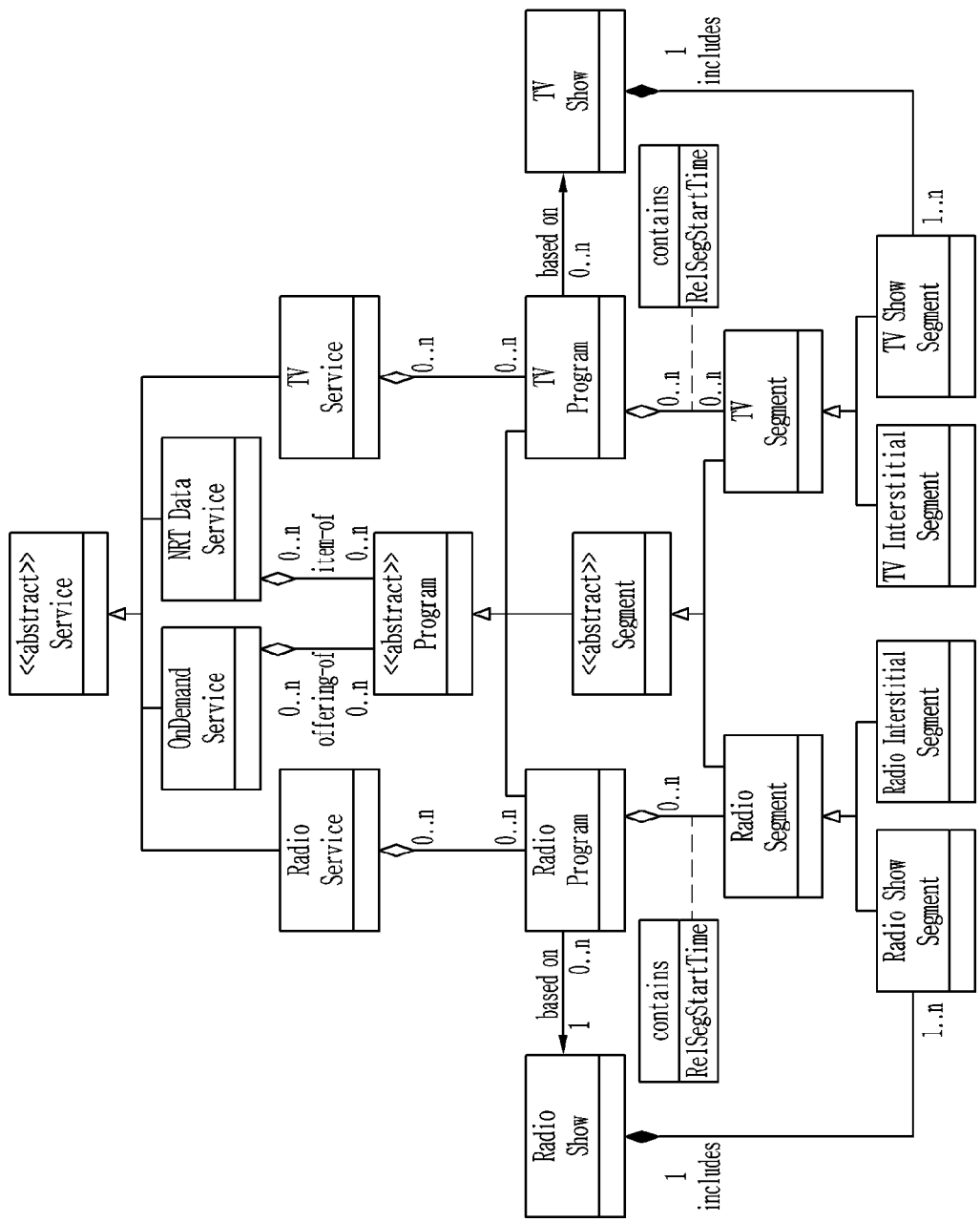

[Fig. 97]
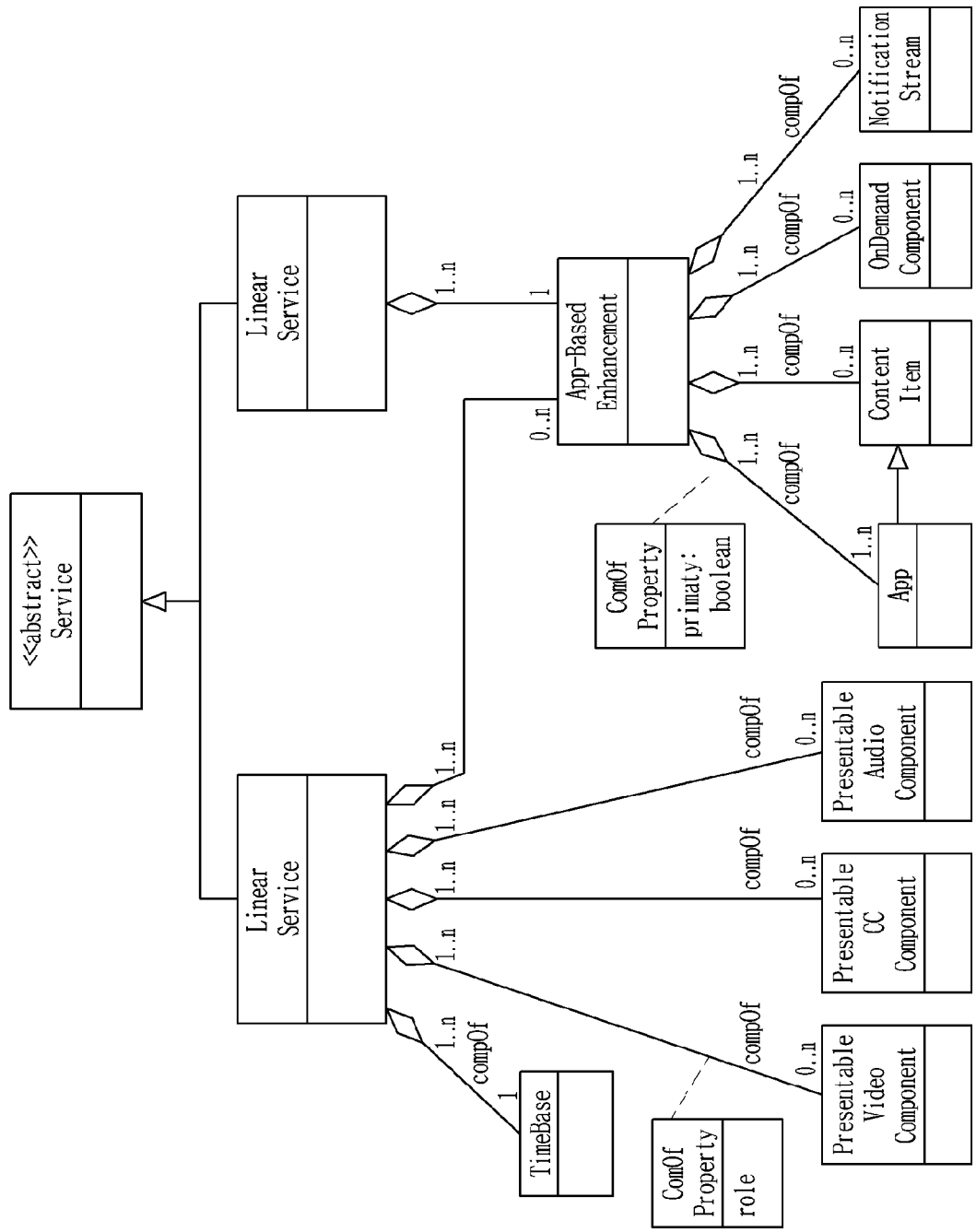

[Fig. 98]
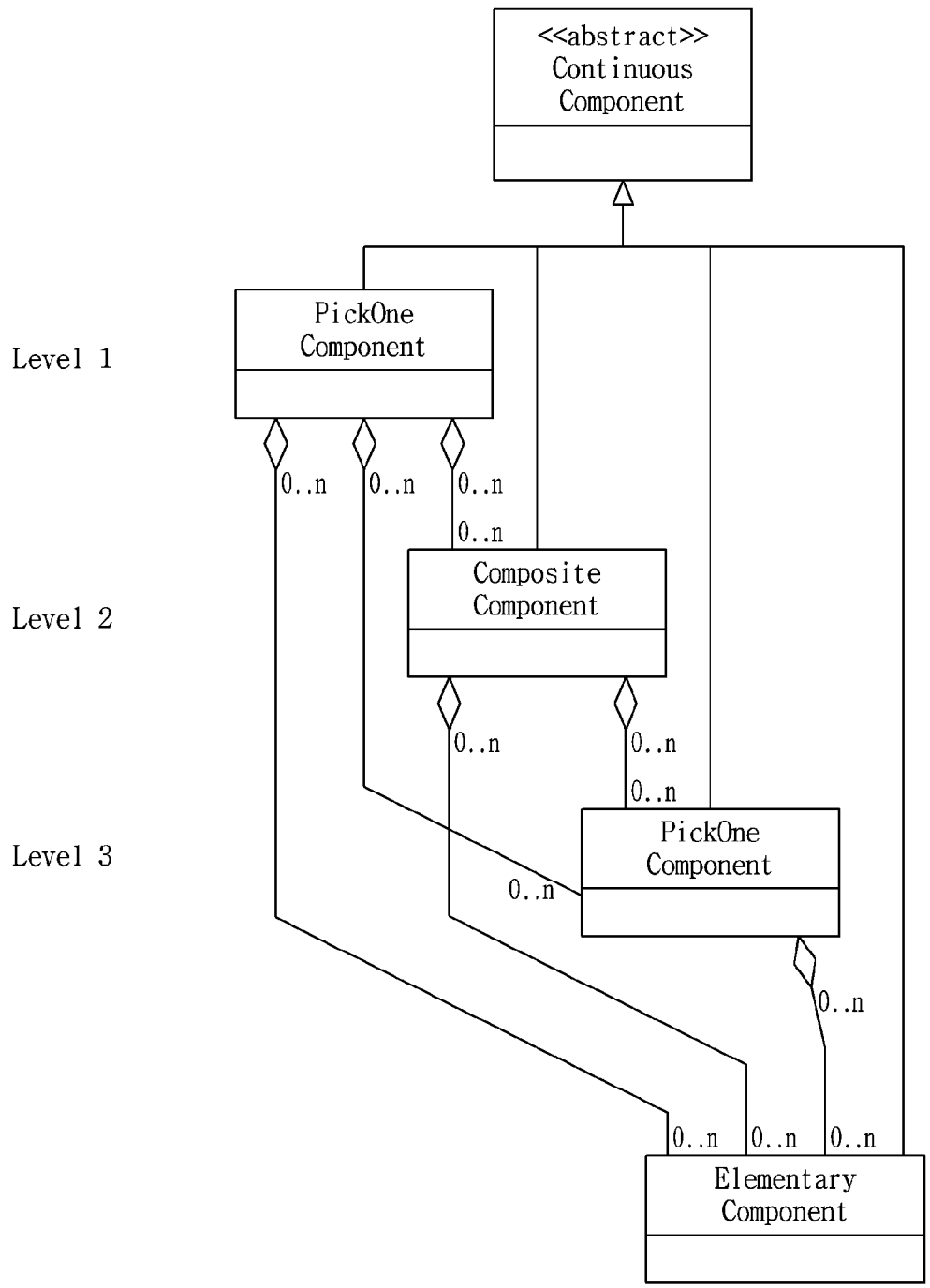

[Fig. 99]
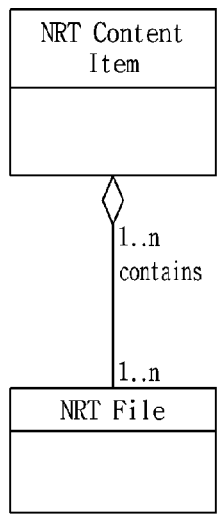
[Fig. 100]
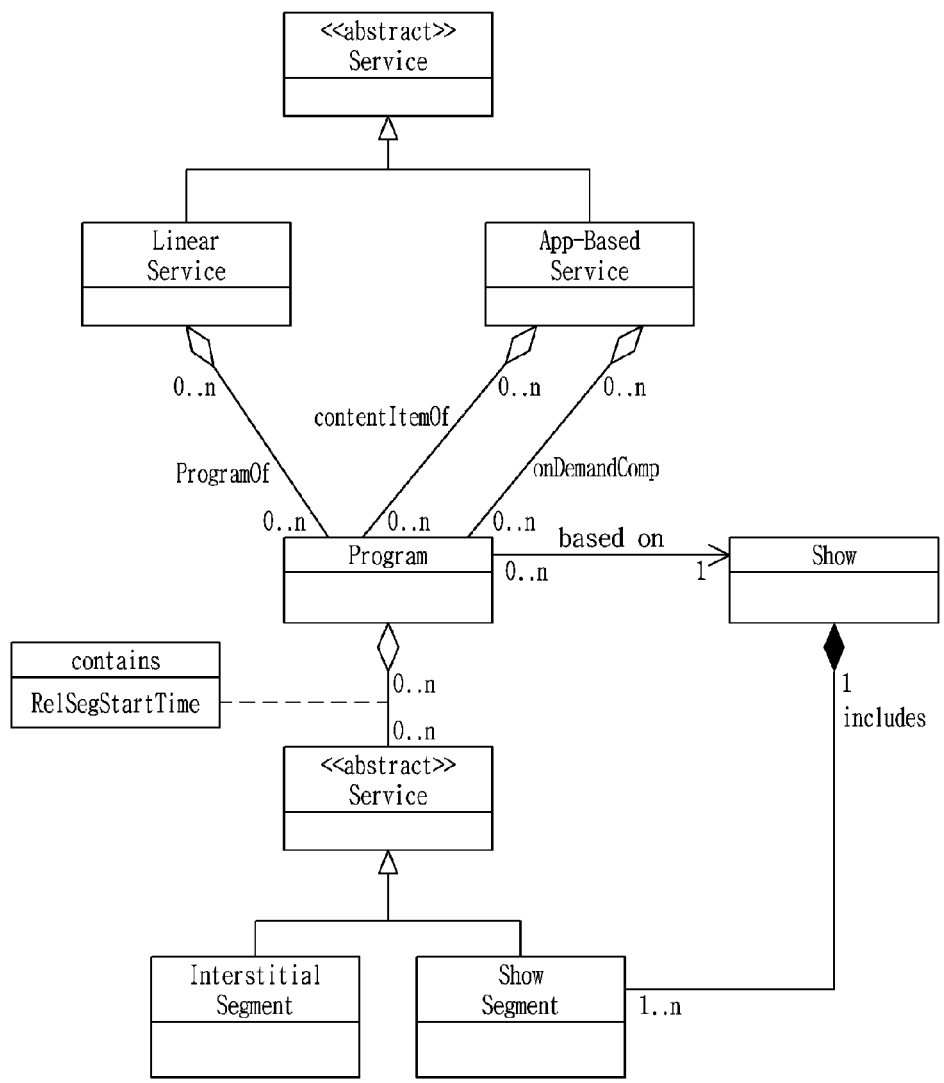

[Fig. 101]
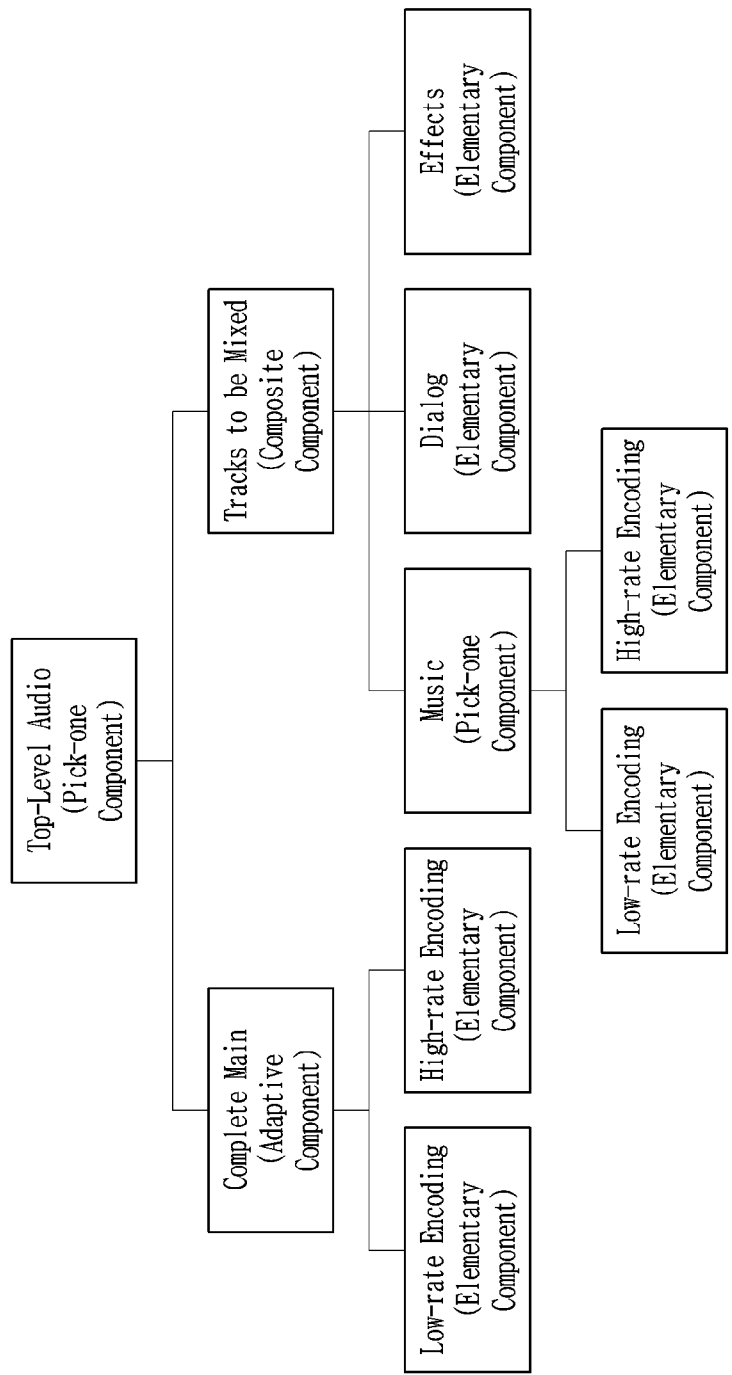

[Fig. 102]
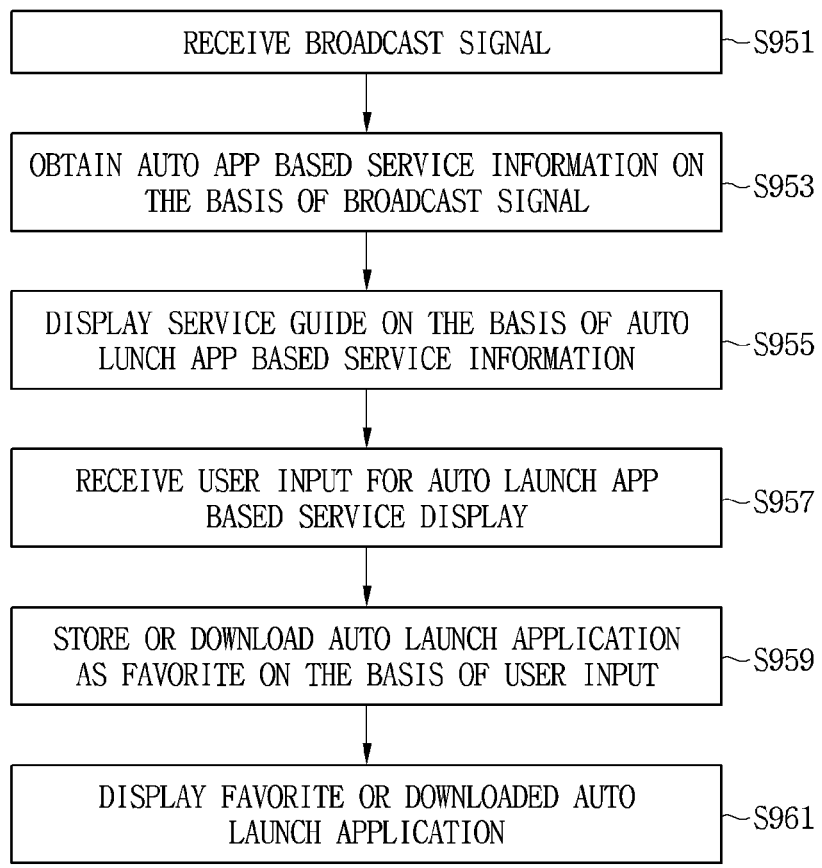

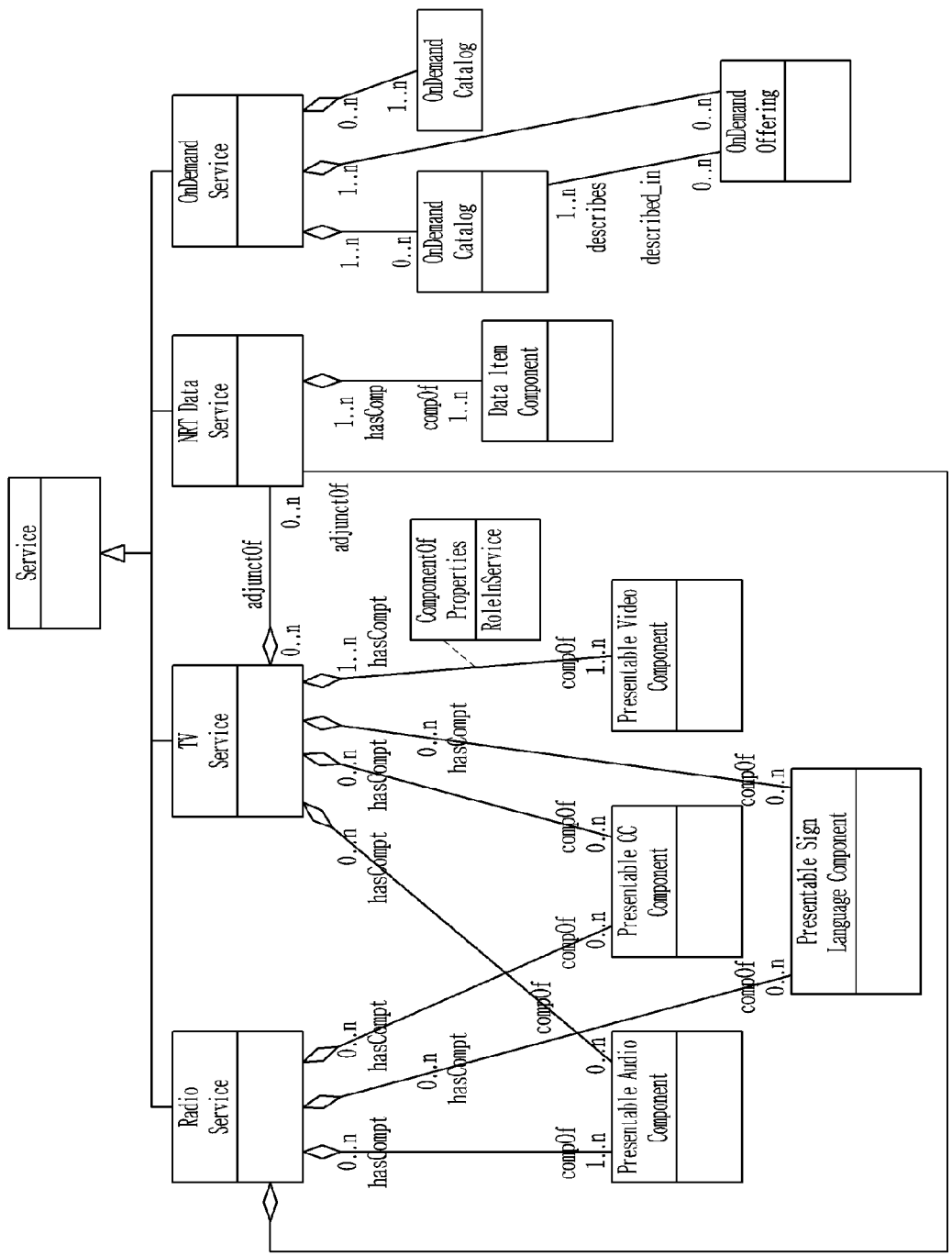
[Fig. 103]

[Fig. 104]
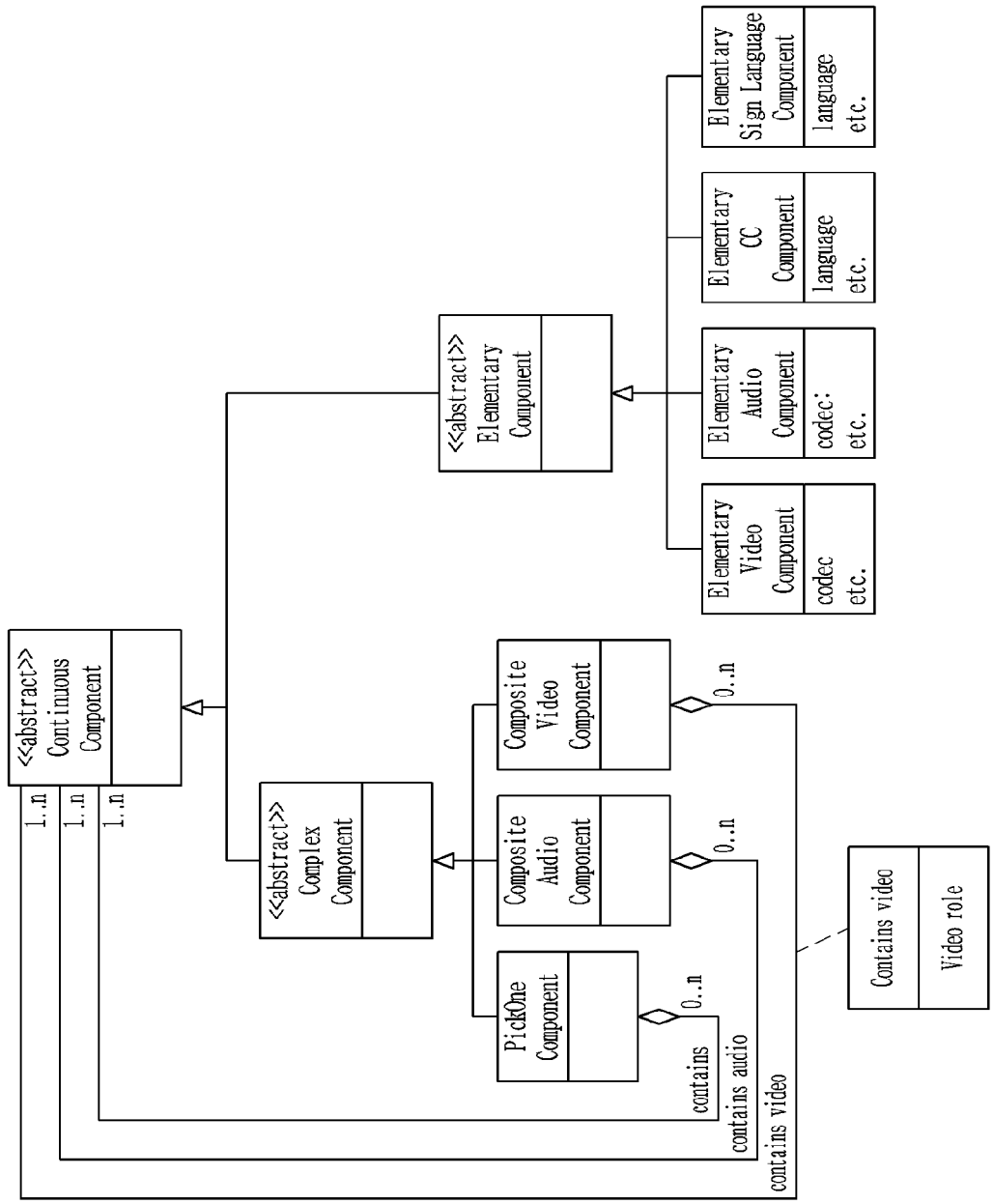

[Fig. 105]
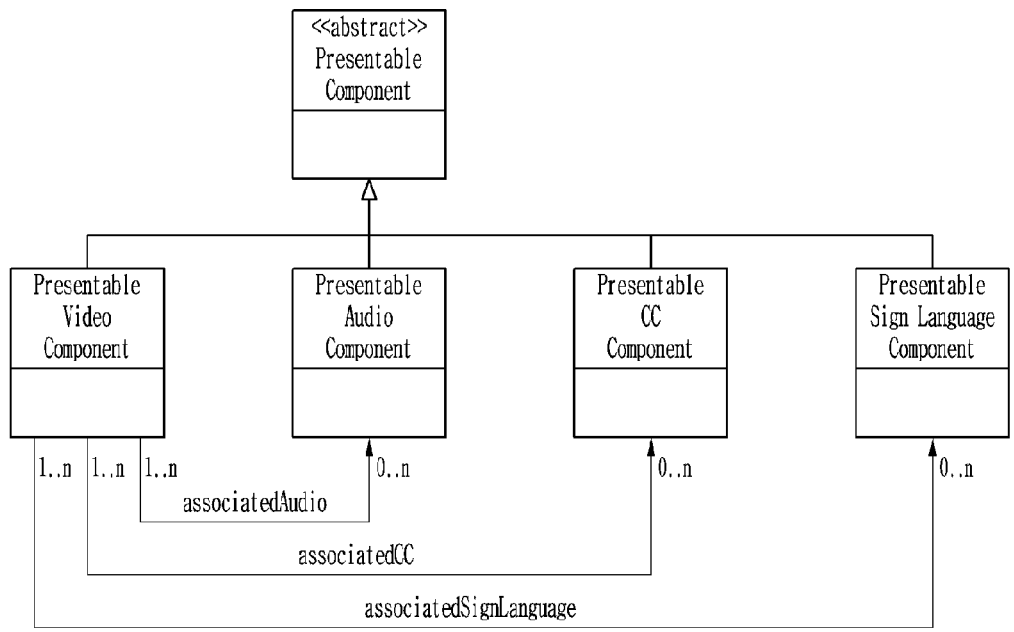
[Fig. 106]
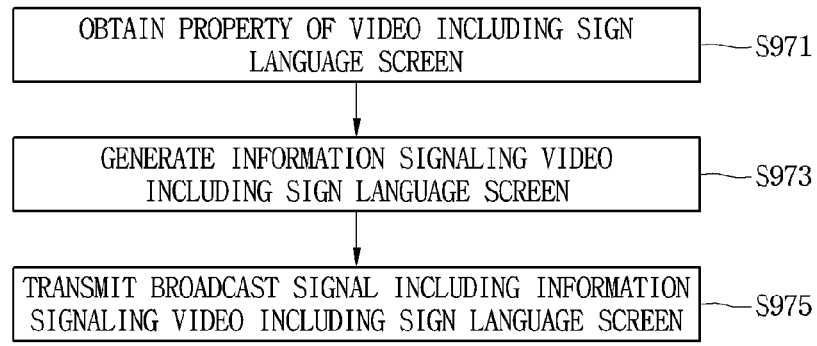
[Fig. 107]
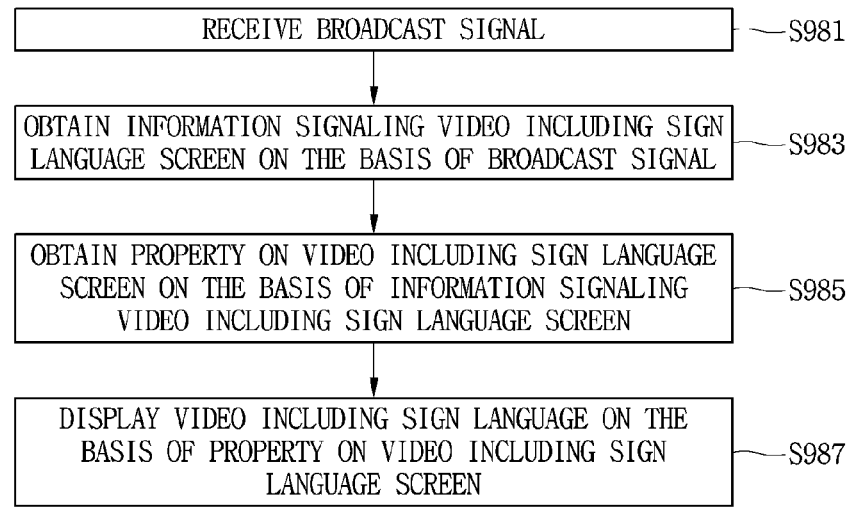

[Fig. 108]
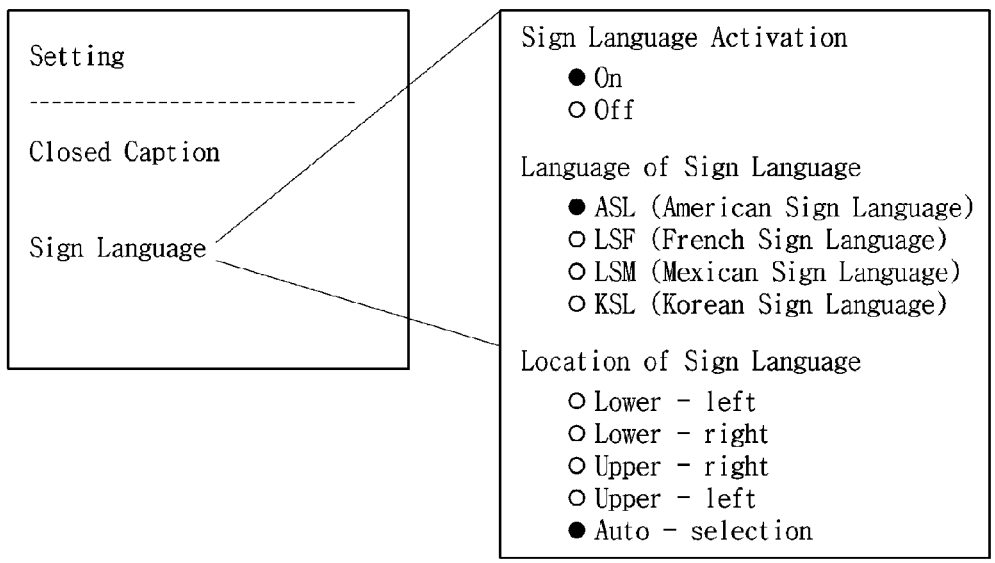
[Fig. 109]
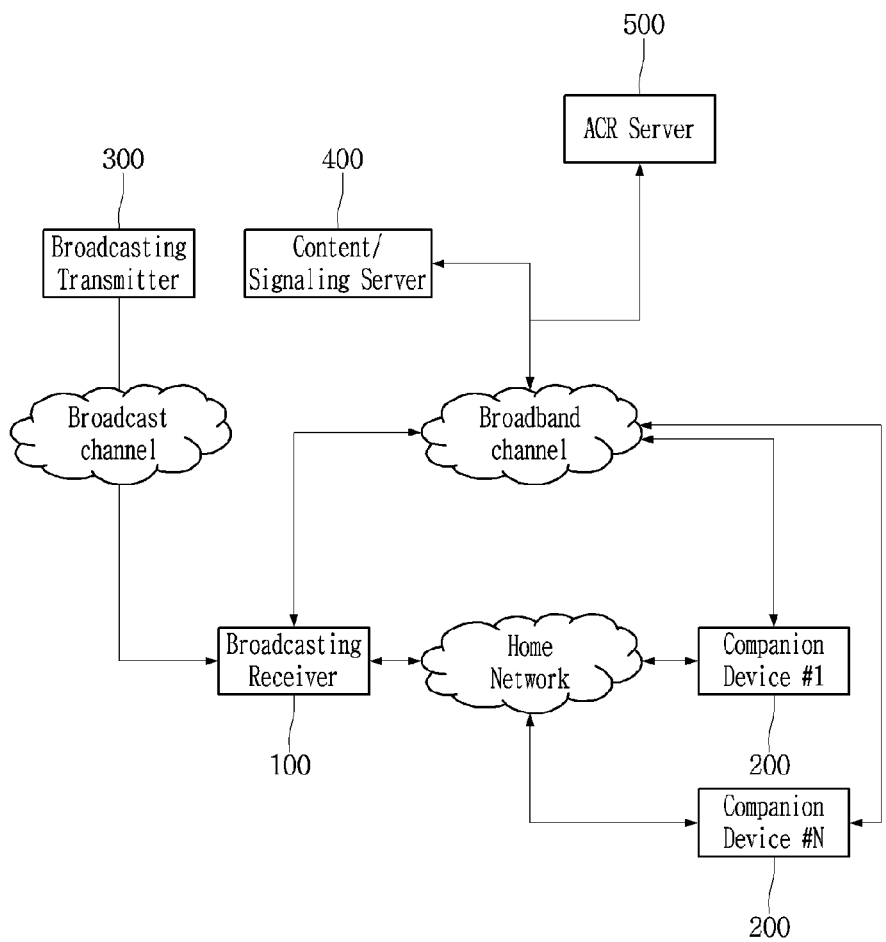

[Fig. 110]

| XML Element/Attribute | Cardinality | Data Type | Description |
|---|---|---|---|
| ServiceInfo | | | |
| @ServiceId | 1 | unsignedShort | Unique identifier for Service |
| @ServiceName | 0..N | string | Human readable name of the service |
| @MajorChanNum | 0..1 | integer 0..15 | Major "channel number" of the service, for service selection |
| @MinorChanNum | 0..1 | integer 0..15 | Minor "channel number" of the service, for service selection |
| @Description | 0..N | string | Textual description of the service |
| @Genre | 0..N | string | Genre(s) of the service |
| @Icon | 0..N | Base64Binary | Icon used to represent the service |
| @Language | 0..1 | string | Primary language used in the service |
| @UsageReportInfo | 0..N | string | Parameters to be used for service usage reporting (e.g., URL, reporting interval, etc.) |
| @Targeting | 0..N | string | Targeting properties for the service |
| @ServiceProtection | 0..1 | string | Service protection properties for the service |
| @AdvisoryRating | 0..N | string | Content advisory rating(s) for the service |
| ComponentItem | 1..N | | Component information of the service |
| @ComponentId | 1 | unsignedShort | Unique identifier for component of Service |
| @ComponentType | 1 | string | Component type |
| @ComponentName | 0..N | string | Human readable name of the component of Service |
| @StartTime | 0..1 | unsignedShort | Start time of the component |
| @Duration | 0..1 | unsignedShort | Duration of the component |
| @TargetScreen | 0..N | string | Targeting window of component (e.g. Secondary screen) |
| @URL | 0..N | any URI | URL of component in the Content Server |
| @ContentAdvisory | 0..N | string | Content advisory rating(s) for the component |
| @Genre | 0..N | string | Genre(s) of the component |

[Fig. 111]

| Link_target_type | Description |
|---|---|
| 0x00 | The URI is a deferred URI. |
| 0x01 | The URI is a generic URI targeting all device classes. |
| 0x02 | The URI is a specific URI targeting devices of the Smartphone class. |
| 0x03 | The URI is a specific URI targeting devices of the Tablet class. |
| 0x04 | The URI is a specific URI targeting devices of the TV class. |
| 0x05 | The URI is a specific URI targeting devices of the PC class. |
| 0x06 to 0xFF | reserved for future use |

[Fig. 112]

| Variable Name | Req/Opt | Data Type | Evented? |
|---|---|---|---|
| Service Property | Required | string | Yes |

[Fig. 113]

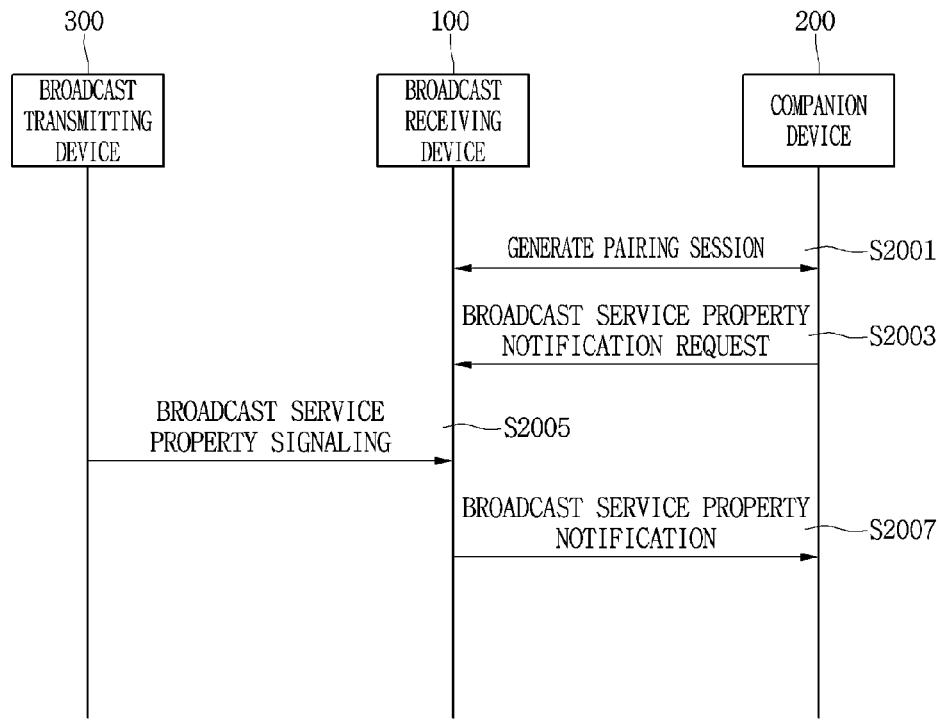

[Fig. 114]

```
<?xml Version="1.0"?>
<propertyset>
  <property>
    <ServiceId>a000001</ServiceId>
  </property>
  <property>
    <ServiceName>MBC Music</ServiceId>
  </property>
  <property>
    <ContentId>mbcradio002</ServiceId>
  </property>
  <property>
    <ContentName>Pop Chart</ServiceId>
  </property>
  <property>
    <MajorChanNum>11</ServiceId>
  </property>
  <property>
    <MinorChanNum>5</ServiceId>
  <property>
  ....
</propertyset>
```

[Fig. 115]

| Variable Name | Req/Opt | Data Type | Evented? |
|---|---|---|---|
| Service Property | Required | string | No |
| ServicePropertyName | Required | string | No |
| ServicePropertyChangeFlag | Required | boolean | Yes |

(a)

| Name | Required/Optional |
|---|---|
| GetServiceProperty | Required |

(b)

| Argument | Direction | Related State Variable |
|---|---|---|
| ServicePropertyName | IN | ServicePropertyName |
| ServiceProperty | OUT | ServiceProperty |

(c)

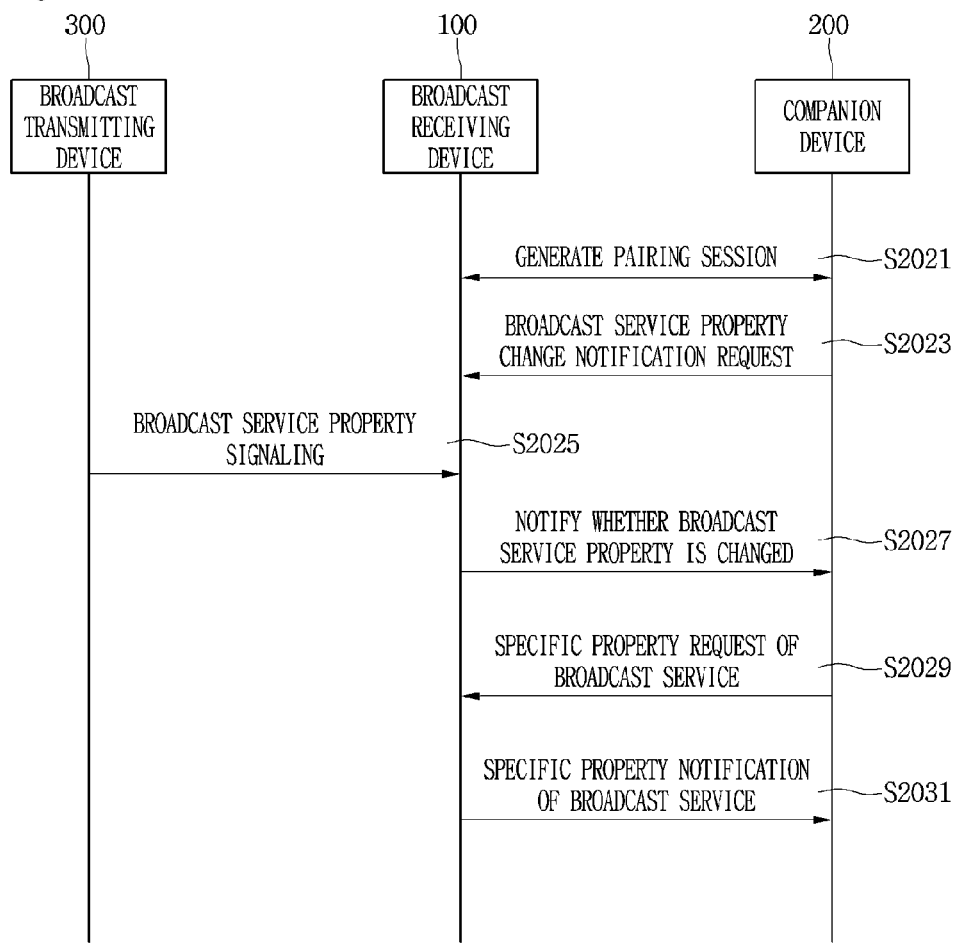

```
<?xml Version="1.0"?>
<propertyset>
  <property>
    <ServicePropertyChangeFlag>true</ServicePropertyChangeFlag>
  </property>
</propertyset>
```

[Fig. 118]

| Variable Name | Req/Opt | Data Type | Evented? |
|---|---|---|---|
| Service Property | Required | string | No |
| ServicePropertyName | Required | string | No |
| ServicePropertyChangeFlag | Required | bin.hex | Yes |

[Fig. 119]

```
<?xml Version="1.0"?>
<propertyset>
  <property>
    <ServicePropertyChangeFlag>90080004</ServicePropertyChangeFlag>
  </property>
</propertyset>
```

[Fig. 120]

| Variable Name | Req/Opt | Data Type | Evented? |
|---|---|---|---|
| Service Property | Required | string | No |
| ServicePropertyName | Required | string | No |
| ServicePropertyChangeFlag | Required | bin.hex | Yes |
| ServicePropertyURL | Optional | string | No |

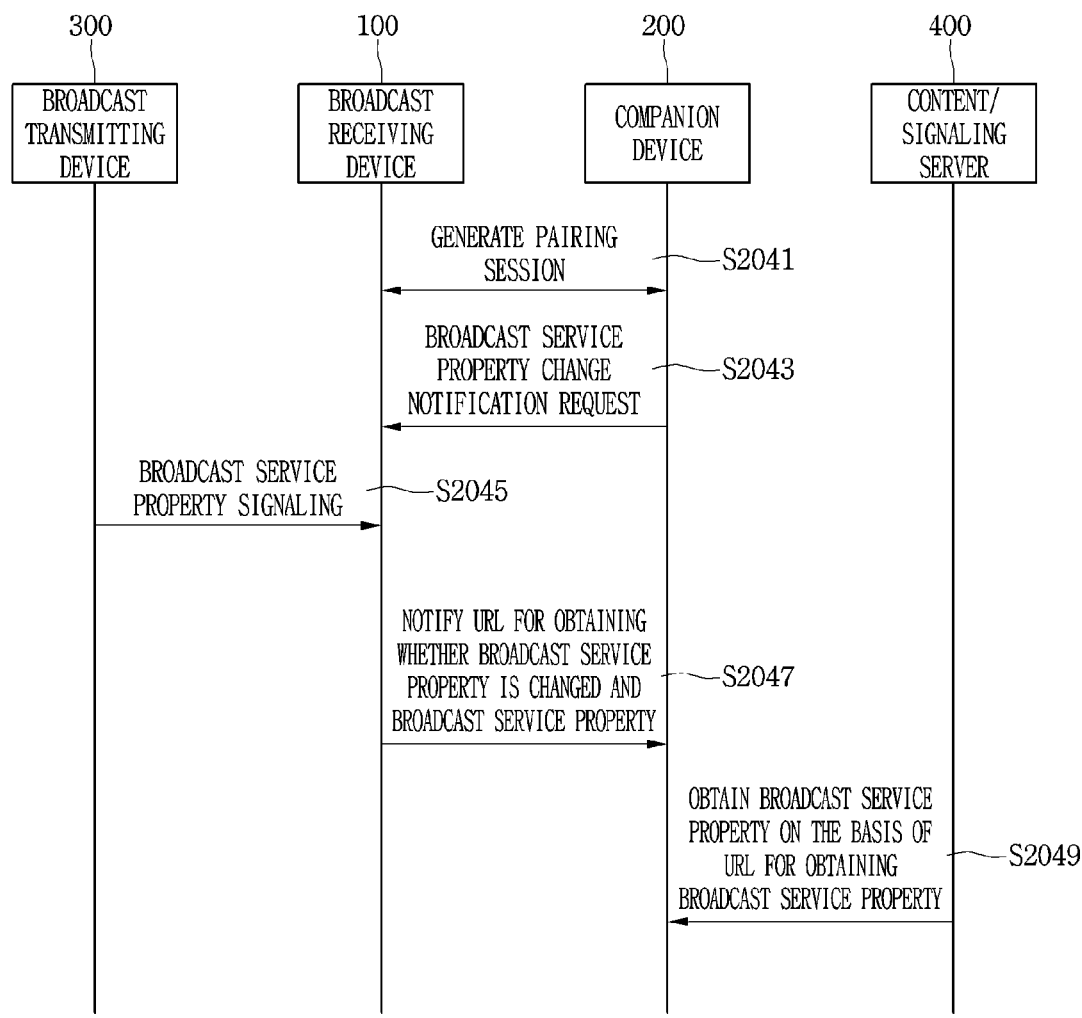
[Fig. 121]

[Fig. 122]

| Variable Name | Req/Opt | Data Type | Evented? |
|---|---|---|---|
| Service Property | Required | string | No |
| ServicePropertyName | Required | string | No |

(a)

| Name | Required/Optional |
|---|---|
| GetServiceProperty | Required |
| SetServiceProperty | Required |

(b)

| Argument | Direction | Related State Variable |
|---|---|---|
| ServicePropertyName | IN | ServicePropertyName |
| ServiceProperty | OUT | ServiceProperty |

(c)

| Argument | Direction | Related State Variable |
|---|---|---|
| ServicePropertyName | IN | ServicePropertyName |

(d)

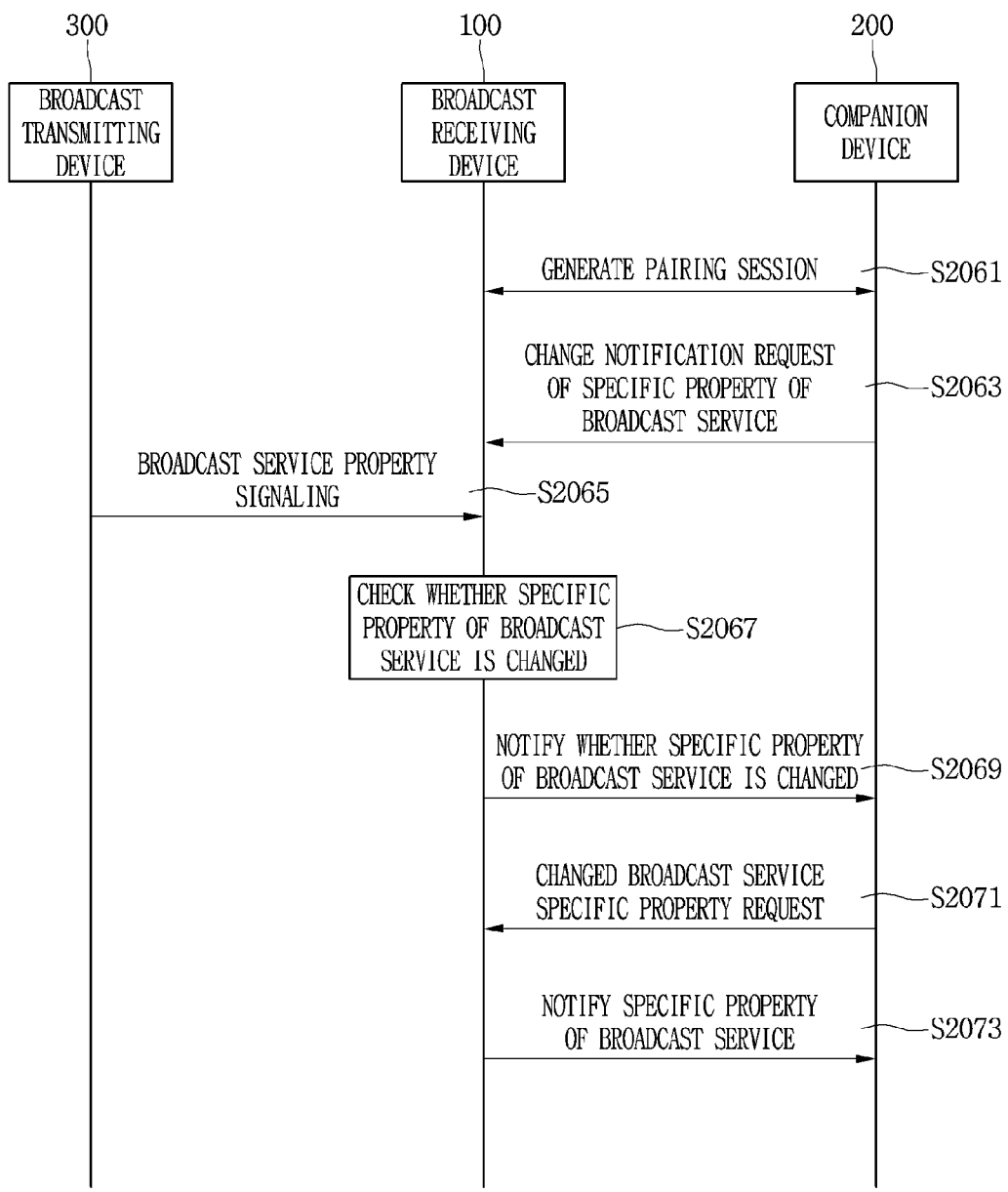

[Fig. 124]
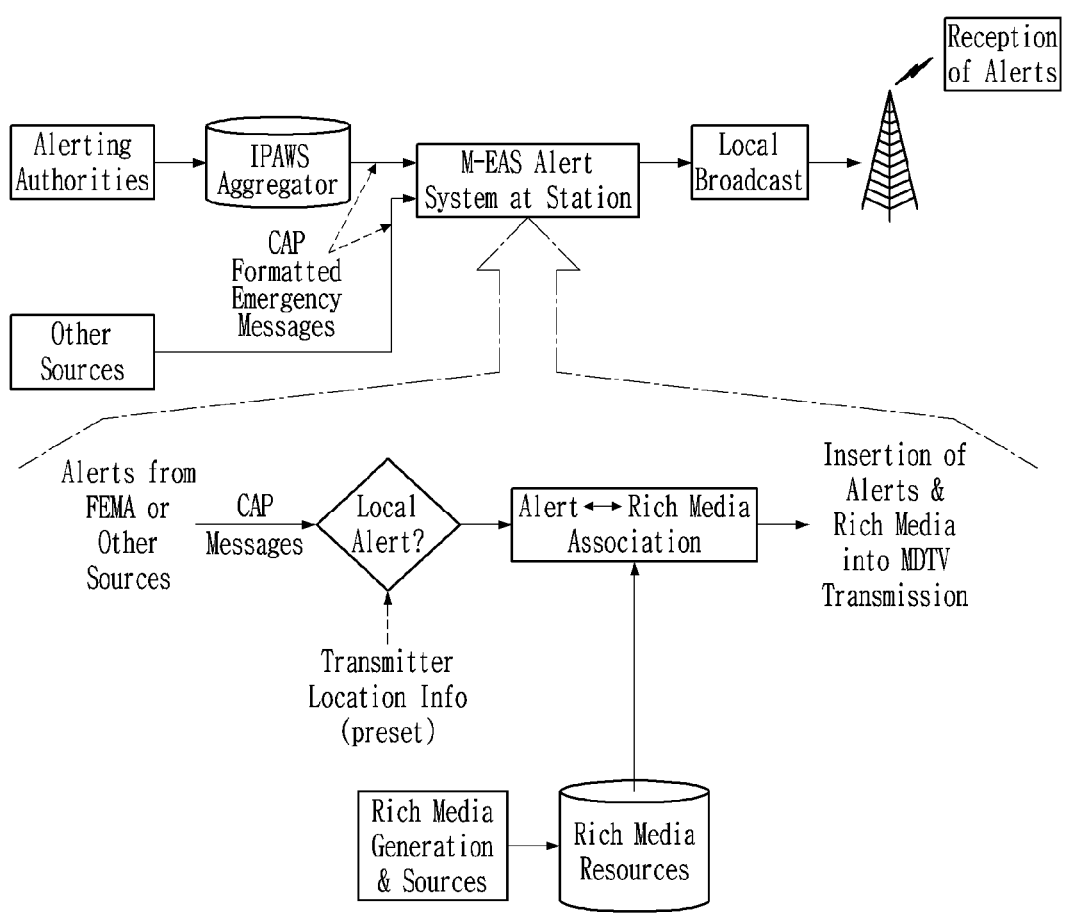

[Fig. 125]
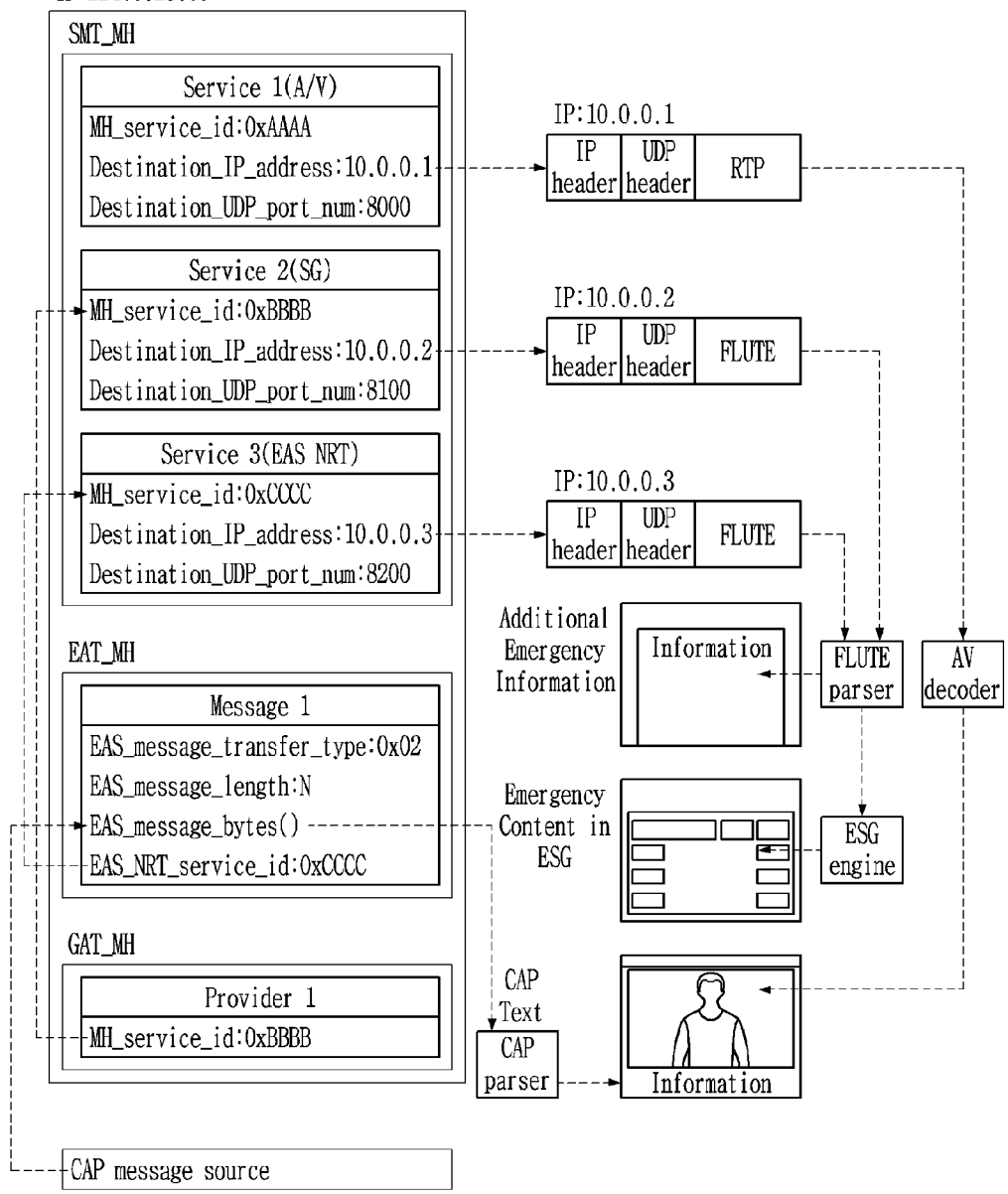

[Fig. 126]

```
<?xml version = "1.0" encoding = "UTF-8"?>
<alert xmlns = "http://www.incident.com/cap/1.0">
  <identifier>KSTO1055887203</identifier>
  <sender>KSTO@NWS.NOAA.GOV</sender>
  <sent>2003-06-17T14:57:00-07:00</sent>
  <status>Actual</status>
  <msgType>Alert</msgType>
  <scope>Public</scope>
  <info>
    <category>Met</category>
    <event>SEVERE THUNDERSTORM</event>
    <urgency>Immediate</urgency>
    <severity>Severe</severity>
    <certainty>Likely</certainty>
    <eventCode>same=SVR</eventCode>
    <expires>2003-06-17T16:00:00-07:00</expires>
    <senderName>NATIONAL WEATHER SERVICE SACRAMENTO CA</senderName>
    <headline>SEVERE THUNDERSTORM WARNING</headline>
    <description> AT 254 PM PDT...NATIONAL WEATHER SERVICE DOPPLER RADAR
INDICATED A SEVERE THUNDERSTORM OVER SOUTH CENTRAL ALPINE COUNTRY...OR ABOUT 18
MILES SOUTHEAST OF KIRKWOOD...MOVING SOUTHWEST AT 5 MPH. HAIL...INTENSE RAIN AND
STRONG DAMAGING WINDS ARE LIKELY WITH THIS STORM.</description>
    <instruction>TAKE COVER IN A SUBSTANTIAL SHELTER UNTIL THE STORM
PASSES.</instruction>
    <contact>BARUFFALDI/JUSKIE</contact>
    <area>
      <areaDesc>EXTREME NORTH CENTRAL TUOLUMNE COUNTY IN CALIFORNIA, EXTREME
NORTHEASTERN CALAVERAS COUNTY IN CALIFONIA, SOUTHWESTERN ALPINE COUNTY IN
CALIFORNIA</areaDesc>
      <polygon>38.47,-120.14 38.34,-119.95 38.52,-119.74 38.62,-119.89 38.47,
-120.14</polygon>
      <geocode>fips6=006109</geocode>
      <geocode>fips6=006009</geocode>
      <geocode>fips6=006003</geocode>
    </area>
  </info>
</alert>
```

[Fig. 127]

| Variable Name | Req/Opt | Data Type | Evented? |
|---|---|---|---|
| EmergencyAlert | Required | string | Yes |
| EmergencyAlertProperty | Required | string | No |

(a)

| Name | Required/Optional |
|---|---|
| GetAllEmergencyAlertMessage | Required |

(b)

| Argument | Direction | Related State Variable |
|---|---|---|
| EmergencyAlertProperty | OUT | EmergencyAlertProperty |

```
<EmergencyAlert>
    <dateTime>20140122T052000</dateTime>
    <messageType>CAP</messageType>
    <version>1.1</version>
</EmergencyAlert>
```

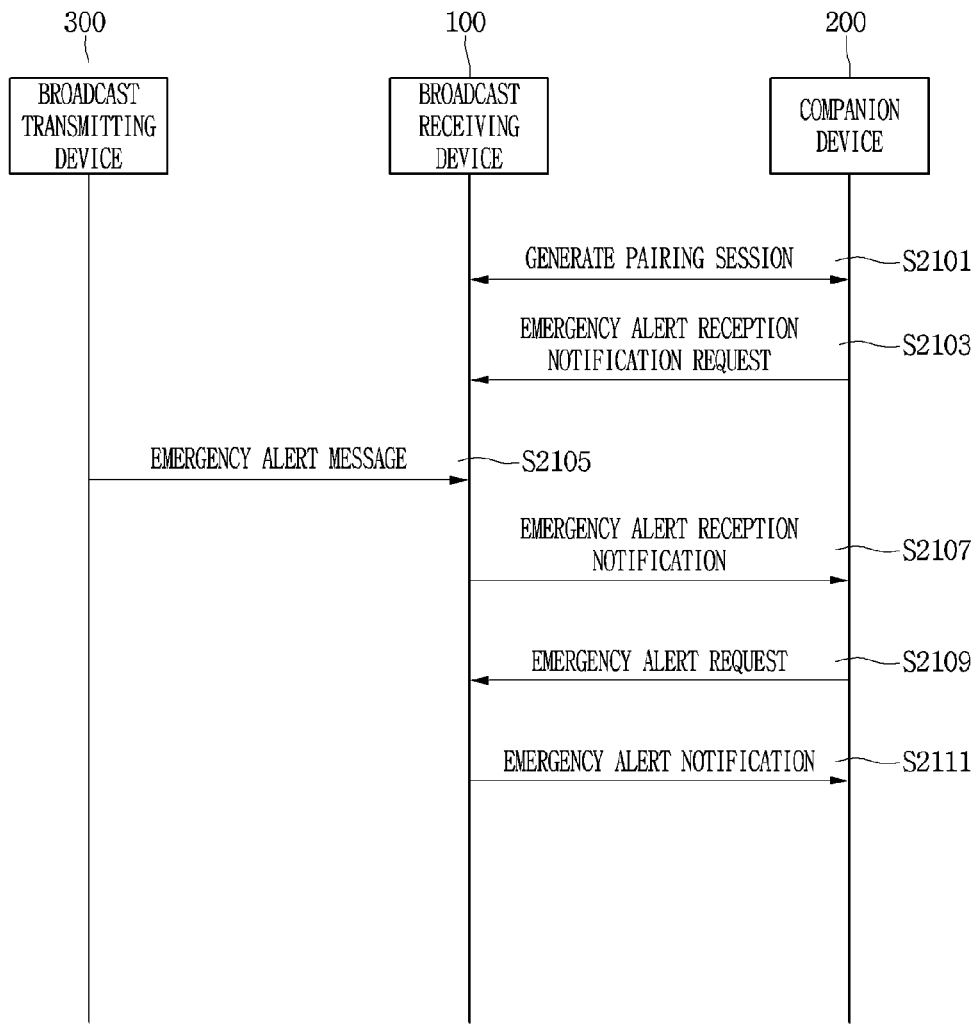

[Fig. 131]

| Urgency | | Severity | | Certainty |
|---|---|---|---|---|
| Immediate - 5 | | Extreme - 5 | | Very likely (>85%) - 5 |
| Expected - 4 | | Severe - 4 | | Likely (>50%) - 4 |
| Future - 3 | | Moderate - 3 | | Possible (<50%) - 3 |
| Past - 2 | | Minor - 2 | | Unlikely (0%) - 2 |
| Unknown - 1 | | Unknown - 1 | | Unknown - 1 |

[Fig. 132]

| Urgency | Severity | Certainty |
|---|---|---|
| Immediate - 9 | Extreme - 5 | Very likely (>85%) - 6 |
| Expected - 8 | Severe - 4 | Likely (>50%) - 5 |
| Future - 7 | Moderate - 3 | Possible (<50%) - 4 |
| Past - 5 | Minor - 2 | Unlikely (0%) - 3 |
| Unknown - 0 | Unknown - 0 | Unknown - 0 |

[Fig. 133]

| Variable Name | Req/Opt | Data Type | Evented? |
|---|---|---|---|
| EmergencyAlert | Required | string | Yes |
| EmergencyAlertProperty | Required | string | No |
| EmergencyAlertField | Required | string | No |

(a)

| Name | Required/Optional |
|---|---|
| GetEmergencyAlertMessage | Required |

(b)

| Argument | Direction | Related State Variable |
|---|---|---|
| EmergencyAlertField | IN | EmergencyAlertField |
| EmergencyAlertProperty | OUT | EmergencyAlertProperty |

(c)

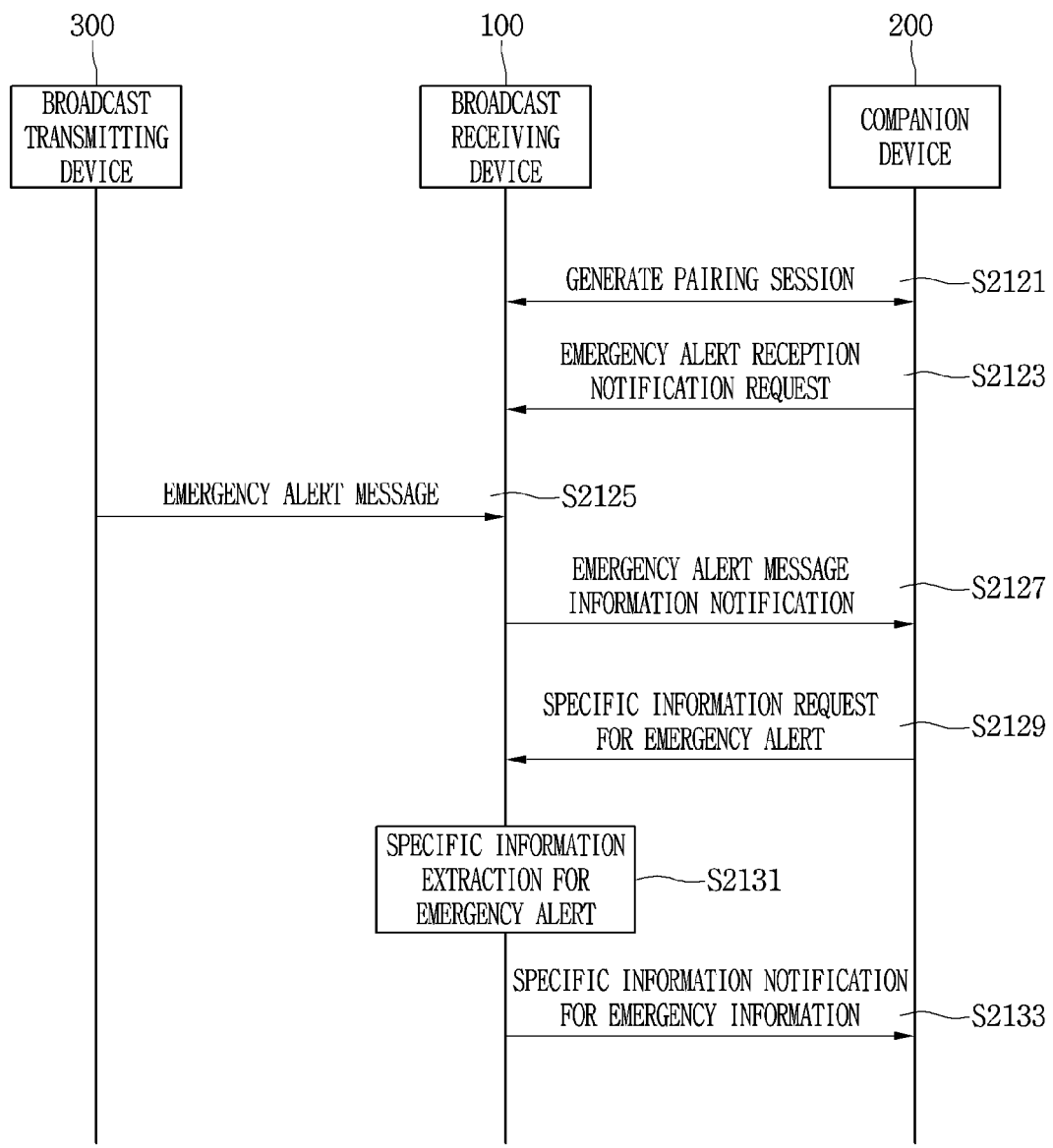
[Fig. 134]

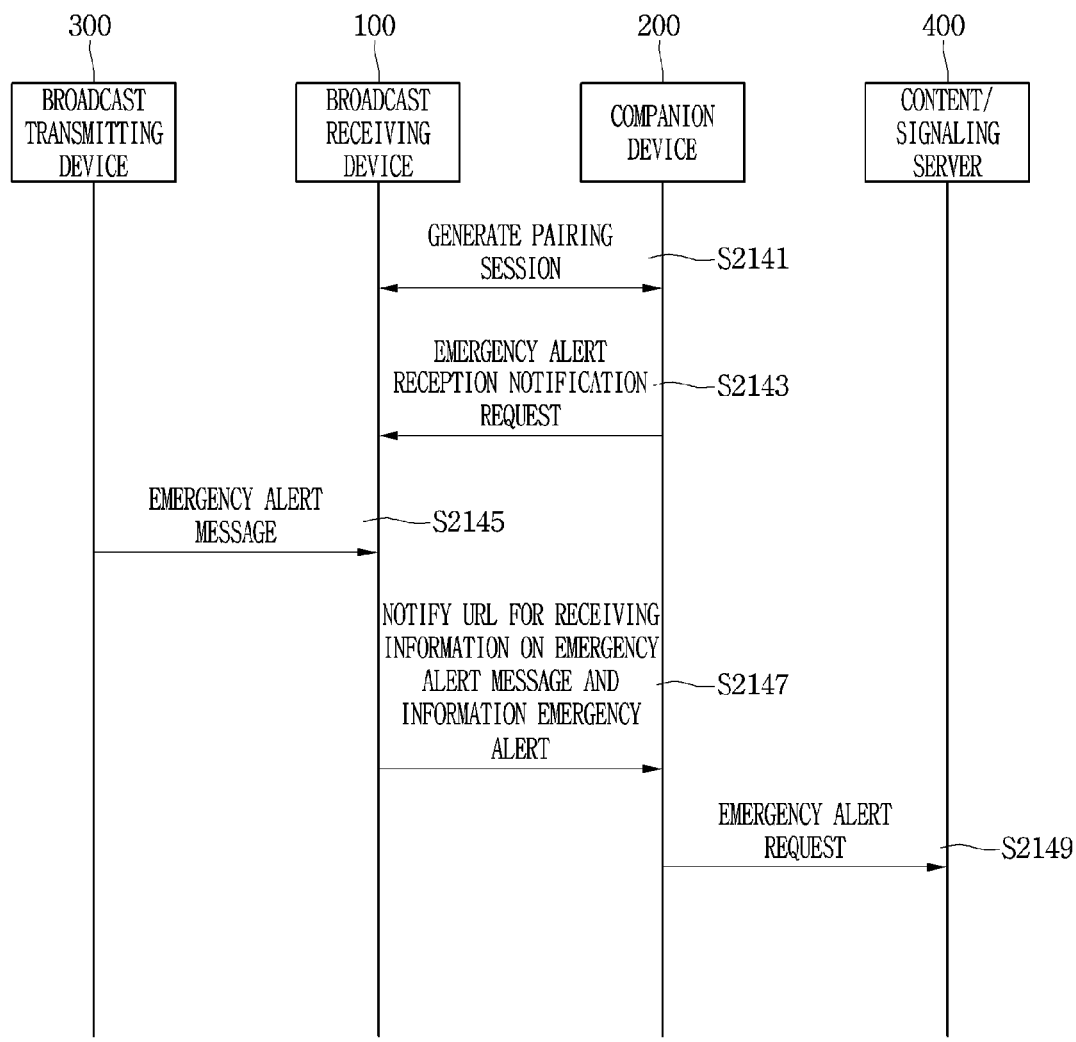
[Fig. 135]

[Fig. 136]

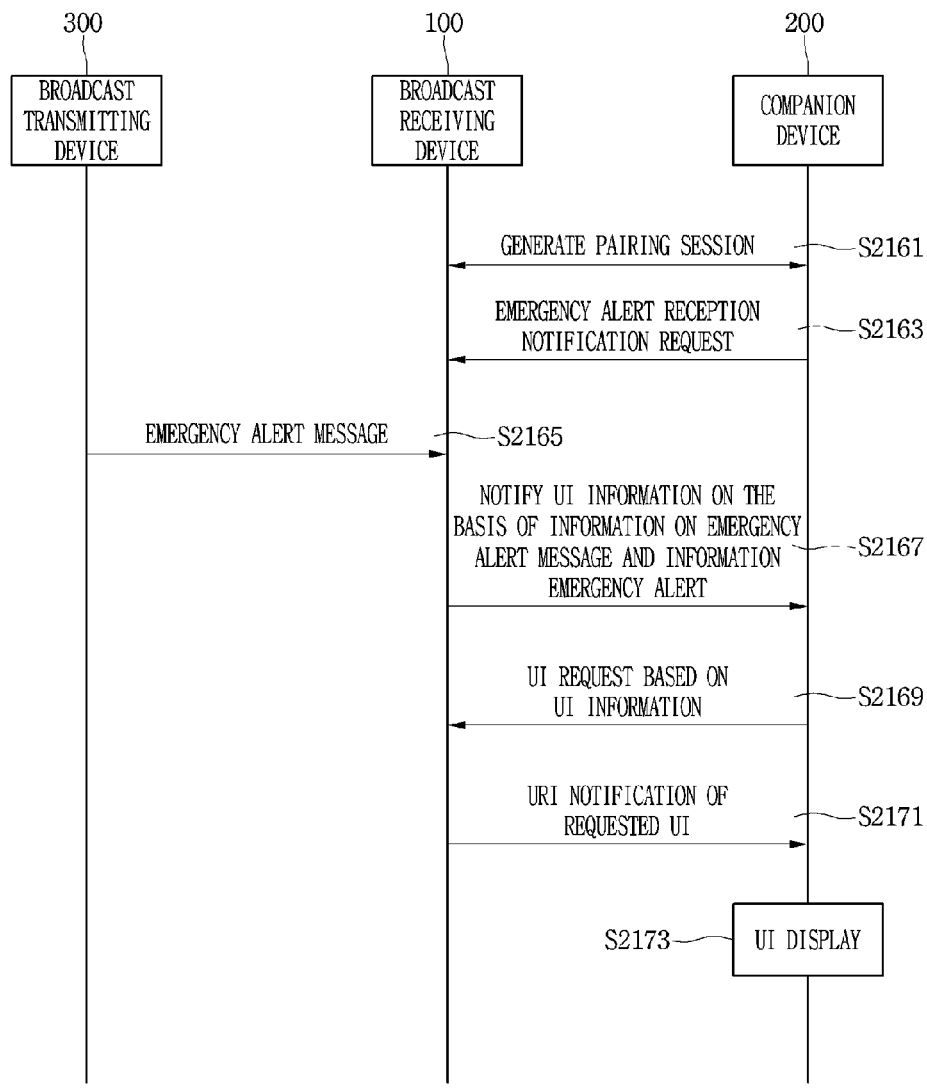

[Fig. 137]

| XML Element/Attribute | | | Cardinality | Data Type | Description |
|---|---|---|---|---|---|
| NRTDataInfo | | | | | |
| | @DataId | | 1 | unsignedShort | Unique identifier for NRT Data |
| | @ConsumptionModel | | 1 | string | Consumption model for NRT Data |
| | @DownloadingStatus | | 0..1 | string | Downloading status of NRT Data: "Downloading", "Completed", or "Error" |
| | ContentItem | | 1..N | | Content Item Information of NRT Data |
| | | @ContentItemId | 1 | unsignedShort | Unique identifier of NRT Content Item |
| | | @ContentItemName | 0..N | string | Human readable name of NRT Content Item |
| | | @ContentItemSize | 1 | unsignedShort | Size of the NRT Content Item, in bytes |
| | | @PlaybackLength | 0..1 | unsignedShort | Playout time of the NRT Content Item |
| | | @URL | 0..N | any URI | URL of NRT Content Item in Content Server |

[Fig. 138]
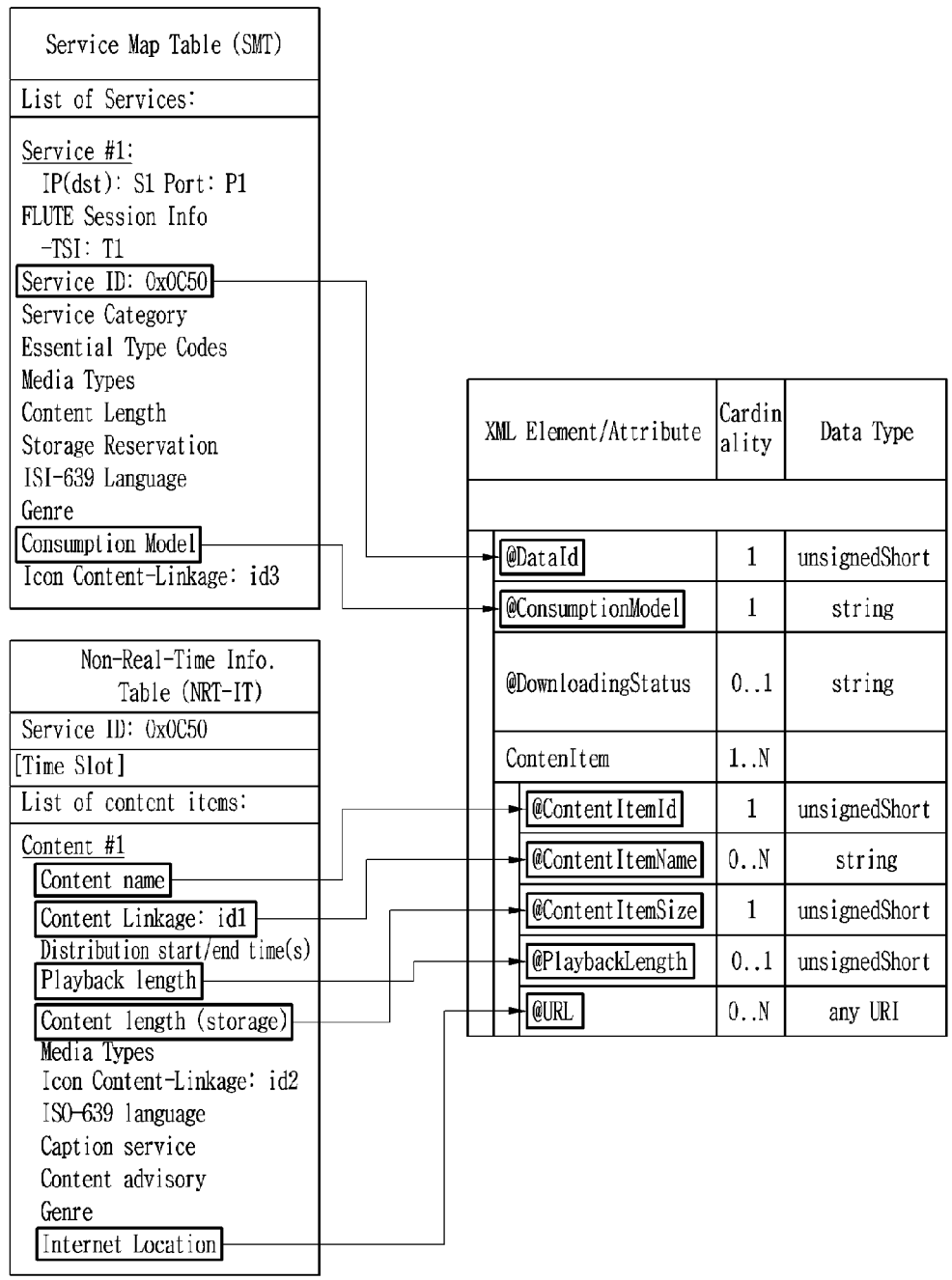

[Fig. 139]

| Variable Name | Req/Opt | Data Type | Evented? |
|---|---|---|---|
| NRTDataProperty | Required | string | Yes |
| NRTDataID | Required | string | No |

(a)

| Name | Required/Optional |
|---|---|
| GetNRTDataProperty | Required |

(b)

| Argument | Direction | Related State Variable |
|---|---|---|
| NRTDataProperty | OUT | NRTDataProperty |
| NRTDataID | IN | NRTDataID |

(c)

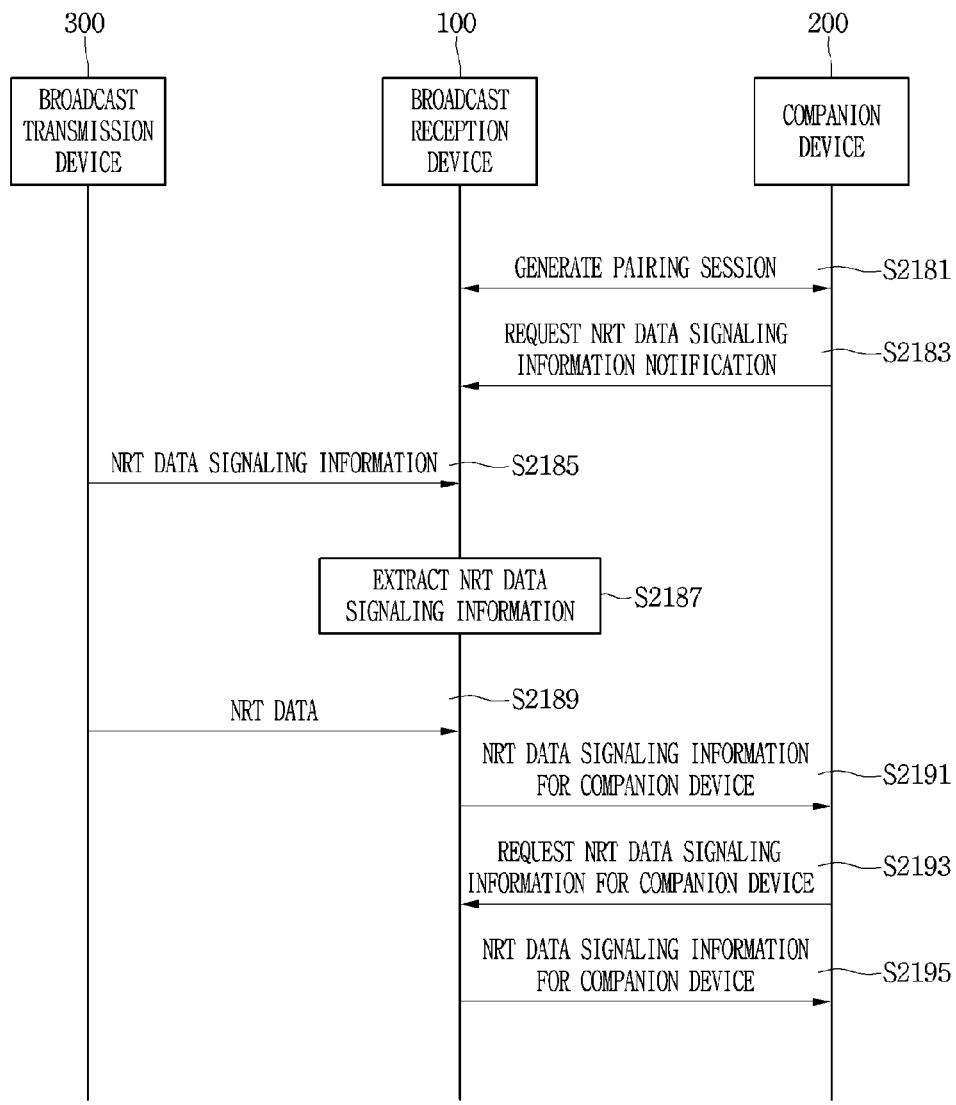
[Fig. 140]

[Fig. 141]

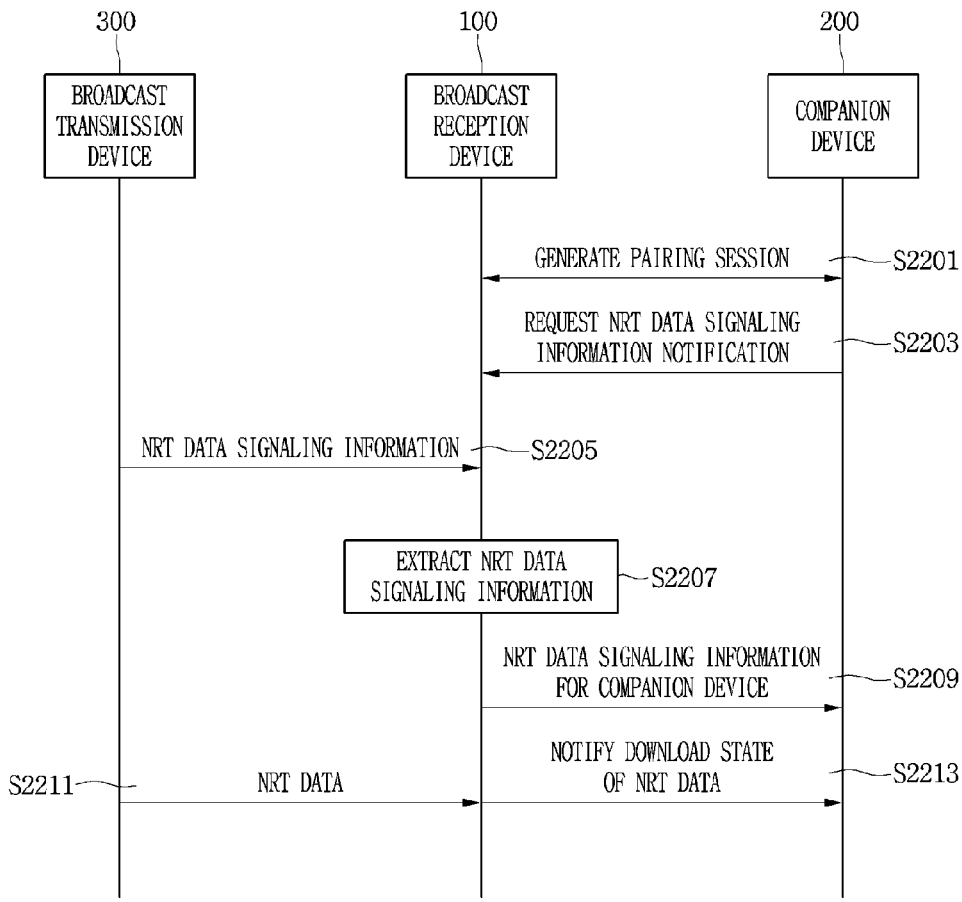

[Fig. 142]

| XML Element/Attribute | Cardinality | Data Type | Description |
|---|---|---|---|
| DeviceCapabilityProperty | | | |
|   ComponentItem | 1..N | | |
|     @ComponentID | 1 | unsignedShort | Unique identifier for component of service |
|     @ComponentType | 1 | string | Type of component (e.g. video, audio, etc.) |
|     Video | 0..1 | | |
|       @VideoCodec | 1 | string | Video Codec in case of video component |
|       @Resolution | 0..1 | string | width x height, in pixels |
|       @AspectRatio | 0..1 | string | Aspect Ratio of component |
|     @AudioCodec | 0..1 | string | Audio Codec in case of audio component |
|     @CCCodec | 0..1 | string | encoding format for Closed Caption |
|     @AppVersion | 0..1 | integer 0-15 | application version in case of application |
|     @CapabilityCode | 0..1 | string | Capability Code for OnDemand component, NRT Content Item, or NRT File |
|     @AvailComponentURL | 1 | boolean | Default = "false" |

[Fig. 143]

| Variable Name | Req/Opt | Data Type | Evented? |
|---|---|---|---|
| DeviceCapabilityProperty | Required | string | Yes |
| ComponentURL | Optional | string | No |

(a)

| Name | Required/Optional |
|---|---|
| GetComponentItem | Required |
| GetComponentURL | Optional |

(b)

| Argument | Direction | Related State Variable |
|---|---|---|
| DeviceCapabilityProperty | OUT | DeviceCapabilityProperty |
| ComponentURL | OUT | ComponentURL |

(c)

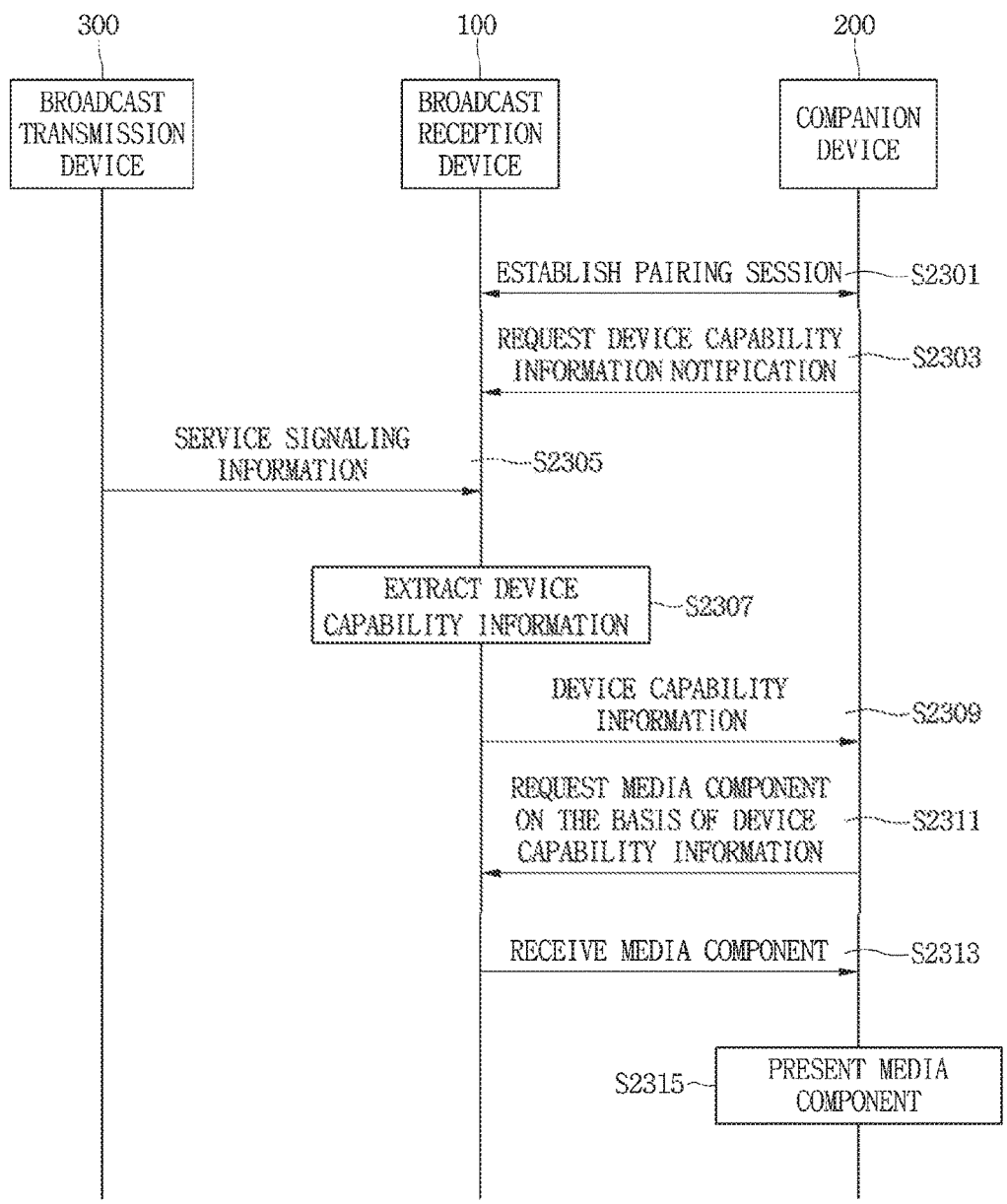
[Figure 144]

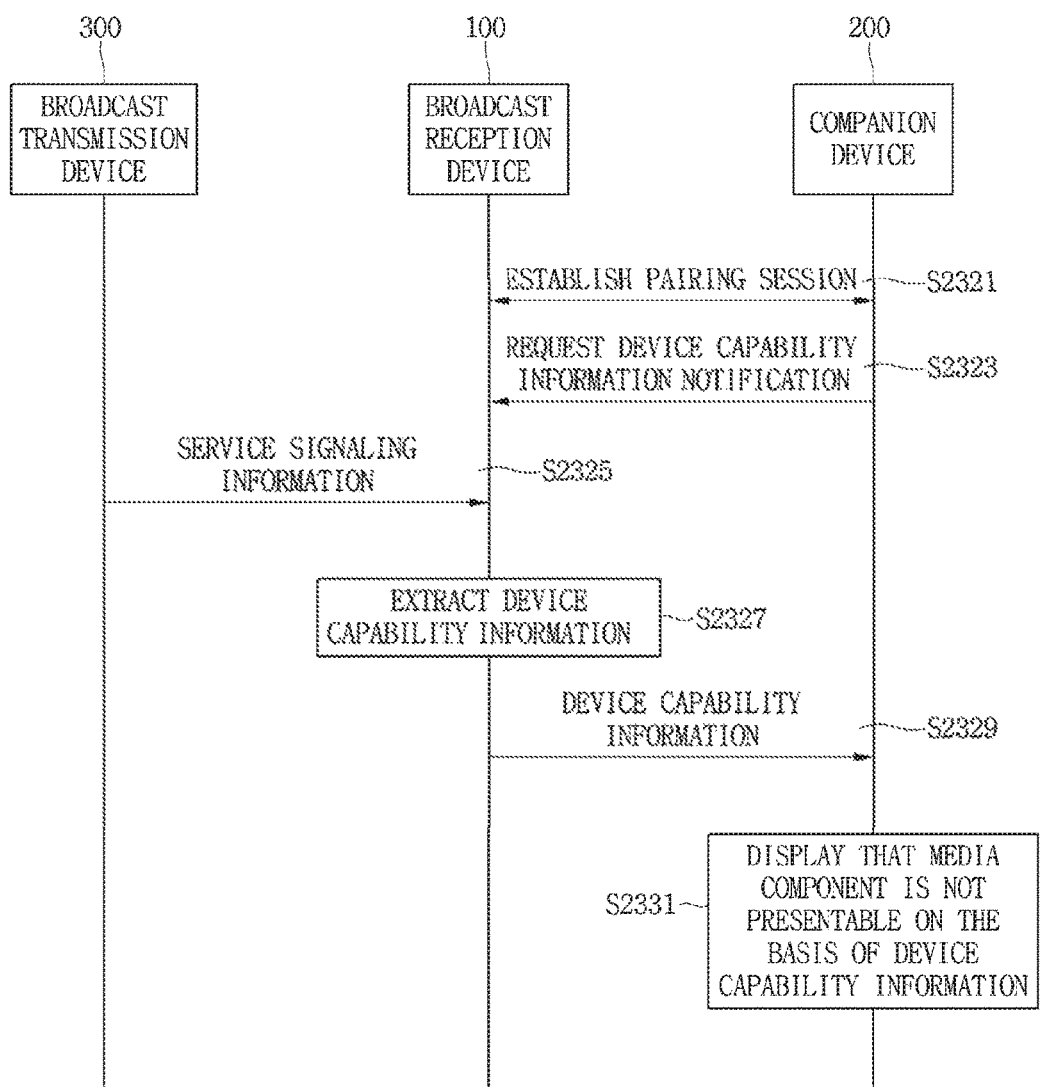
[Figure 145]

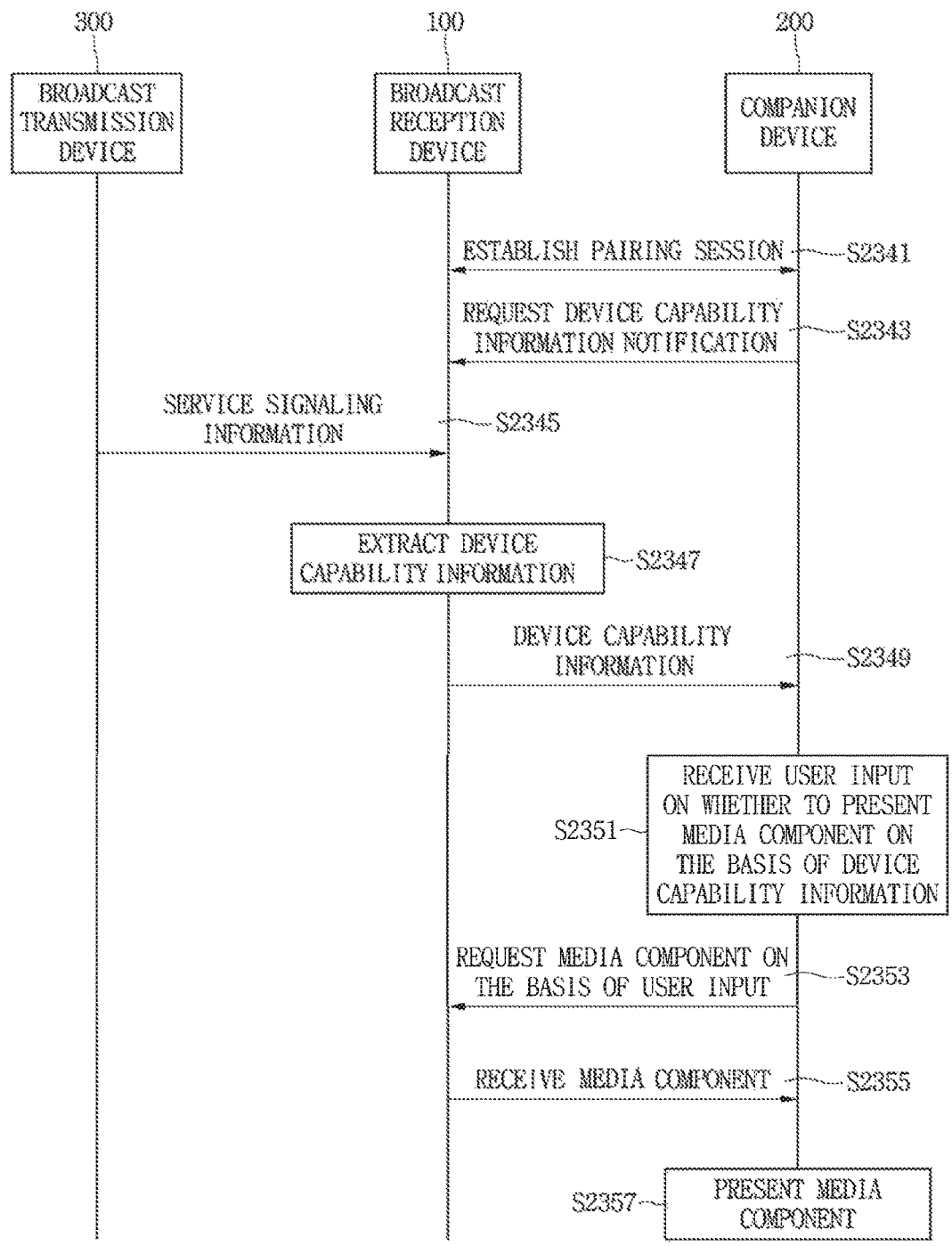
[Figure 146]

[Figure 147]
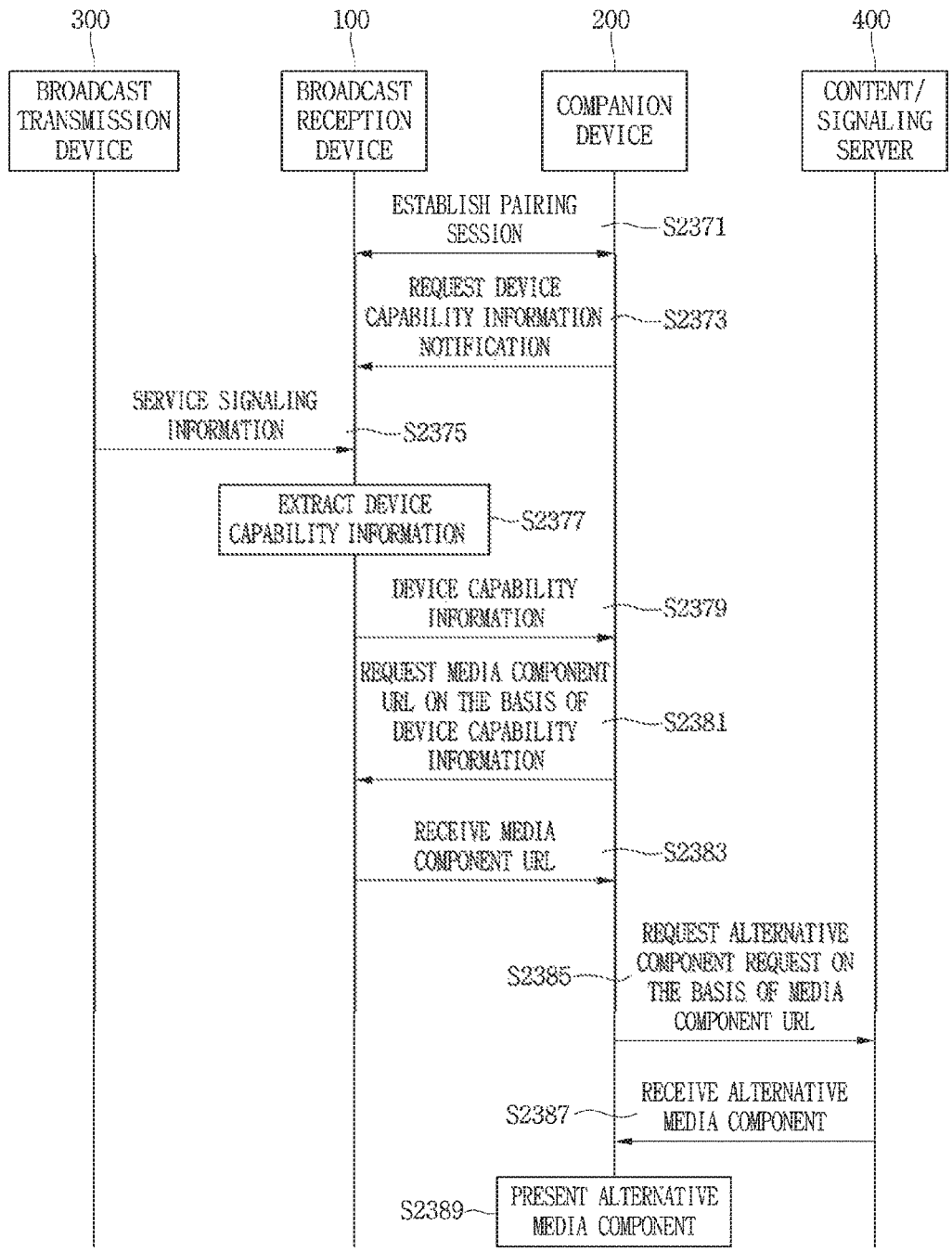

BROADCAST RECEPTION DEVICE AND OPERATING METHOD THEREOF, AND COMPANION DEVICE INTEROPERATING WITH THE BROADCAST RECEPTION DEVICE AND OPERATING METHOD THEREOF

CROSS REFERENCE TO RELATED APPLICATIONS

This application is the National Phase of PCT International Application No. PCT/KR2015/002230, filed on Mar. 9, 2015, which claims priority under 35 U.S.C. 119(e) to U.S. Provisional Application No. 61/950,790, filed on Mar. 10, 2014, all of which are hereby expressly incorporated by reference into the present application.

BACKGROUND OF THE INVENTION

Field of the Invention

The present disclosure relates to a broadcast transmission device and an operating method thereof, and a companion device interoperating with the broadcast reception device and an operating method thereof.

Discussion of the Related Art

With developments of digital broadcast and communication environments, hybrid broadcasts using communication networks (for example, broadband) in addition to existing broadcast networks receive attentions. Additionally, such hybrid broadcasts provide applications or broadcast services interoperating with terminal devices such as smartphones or tablets. As the uses of terminal devices such as smartphones or tablets increase, it is necessary to provide broadcast services efficiently interoperating with the terminal devices.

Especially, broadcast services efficiently providing the properties of broadcast services or information such as an emergency alarm transmitted through broadcasts to terminal devices such as smartphones or tablets are required.

SUMMARY OF THE INVENTION

Embodiments provide a broadcast reception device providing broadcast services efficiently interoperating with terminal devices and an operating method thereof.

Embodiments also provide a broadcast reception device providing broadcast services efficiently transmitting information to terminal devices and an operating method thereof.

Embodiments also provide a terminal device efficiently interoperating with a broadcast reception device and efficiently receiving information from the broadcast reception device.

In one embodiment, provided is a companion device interoperating with a broadcast service that a broadcast reception device receives. The companion device includes: a communication unit establishing a pairing session with the broadcast reception device; and a control unit receiving device capability information from the broadcast reception device and receiving a media component that the broadcast service includes on the basis of the device capability information, wherein the device capability information signals a capability of a device necessary for presenting the media component.

The control unit may receive the media component when a capability of the companion device satisfies the device capability that the device capability information includes.

When a capability of the companion device does not satisfy the device capability that the device capability information includes, the control unit may receive an alternative media component URL from the broadcast reception device and receive an alternative media component from a content/signaling server providing a content relating to the broadcast service on the basis of the alternative media component URL, wherein the alternative media component may have the same content as the media component and a different device capability necessary for presentation.

The control unit may receive an alternative media component by transmitting the capability of the companion device.

The control unit may receive an alternative media component by transmitting a media component identifier for identifying the media component.

When a capability of the companion device does not satisfy the device capability that the device capability information includes, the control unit may receive a user input on whether to present the media component and presents the media component on the basis of the user input.

When the capability of the companion device does not satisfy a device capability necessary for a selective item of a media component presentation, the control unit may receive a user input on whether to present the media component and present the media component on the basis of the user input.

The device capability information may include at least one of information on a video that the media component includes, information a codec of an audio that the media component includes, information on a subtitle format that the media component includes, and version information of an application that the media component includes.

The information on the video that the media component includes may include at least one of a codec necessary for playback of the video, a resolution of the video, and an aspect ration of the video.

In another embodiment, provided is an operating method of a companion interoperating with a broadcast service that a broadcast reception device receives. The method includes: establishing a pairing session with the broadcast reception device; receiving device capability information from the broadcast reception device; and receiving a media component that the broadcast service includes on the basis of the device capability information, wherein the device capability information signals a capability of a device necessary for presenting the media component.

In another embodiment, provide is a broadcast reception device receiving a broadcast service interoperating with a companion device. The broadcast reception device includes: an IP communication unit establishing a pairing session with the companion device; a broadcast communication unit receiving service signaling information signaling the broadcast service on the basis of the broadcast service; and a control unit extracting device capability information from the service signaling information to transmit the extracted device capability information to the companion device, wherein the device capability information signals a capability of a device necessary for presenting the media component that the broadcast service includes.

The control unit may transmit an alternative media component URL representing a URL for receiving an alternative media component to the companion device when the companion device makes a request; and the alternative media component may have the same content as the media component and a different device capability necessary for presentation.

Provided is a broadcast reception device providing broadcast services efficiently interoperating with terminal devices and an operating method thereof.

Provided is a broadcast reception device providing broadcast services efficiently transmitting information to terminal devices and an operating method thereof.

Provide is a terminal device efficiently interoperating with a broadcast reception device and efficiently receiving information from the broadcast reception device.

BRIEF DESCRIPTION OF THE DRAWINGS

FIG. 1 is a view of a protocol stack for supporting a broadcast service according to an embodiment of the present invention.

FIG. 2 is a view illustrating a broadcast transmission frame according to an embodiment of the present invention.

FIG. 3 is a view of a broadcast transmission frame according to another embodiment of the present invention.

FIG. 4 is a view illustrating a structure of a transport packet transmitting a broadcast service according to an embodiment of the present invention.

FIG. 5 is a view illustrating a value that a network protocol field has in a transport packet transmitting a broadcast service according to an embodiment of the present invention.

FIG. 6 is a view illustrating a configuration of a broadcast reception device according to an embodiment of the present invention.

FIG. 7 is a view illustrating a configuration of a broadcast reception device according to another embodiment of the present invention.

FIG. 8 is a view that a broadcast service signaling table and broadcast service transmission path signaling information signal broadcast service and a broadcast service transmission path.

FIG. 9 is a view illustrating a broadcast service signaling table according to an embodiment of the present invention.

FIG. 10 is a view illustrating a value that a service category field has in a broadcast service signaling table according to an embodiment of the present invention.

FIG. 11 is a view of a broadcast service signaling table according to another embodiment of the present invention.

FIG. 12 is a view of a stream identifier descriptor according to another embodiment of the present invention.

FIG. 13 is a view illustrating an operation when a broadcast transmission device transmits a broadcast service signaling table according to an embodiment of the present invention.

FIG. 14 is a view illustrating an operation when a broadcast reception device receives a broadcast service signaling table according to an embodiment of the present invention.

FIG. 15 is a view illustrating broadcast service transmission path signaling information according to an embodiment of the present invention.

FIG. 16 is a view illustrating a value that a delivery network type field has in broadcast service transmission path signaling information according to an embodiment of the present invention.

FIG. 17 is a view that broadcast service transmission path signaling information signals the transmission of a broadcast service through IP stream according to an embodiment of the present invention.

FIG. 18 is a view that broadcast service transmission path signaling information signals the transmission of a broadcast service through an IP stream of another broadcaster according to an embodiment of the present invention.

FIG. 19 is a view that broadcast service transmission path signaling information signals the transmission of a broadcast service through a FLUTE session according to an embodiment of the present invention.

FIG. 20 is a view that broadcast service transmission path signaling information signals the transmission of a broadcast service through a FLUTE protocol of another broadcaster according to an embodiment of the present invention.

FIG. 21 is a view that broadcast service transmission path signaling information signals the transmission of a broadcast service through MPEG-2 TS stream of another broadcaster according to an embodiment of the present invention.

FIG. 22 is a view that broadcast service transmission path signaling information signals the transmission of a broadcast service through a packet based stream of another broadcaster according to an embodiment of the present invention.

FIG. 23 is a view that broadcast service transmission path signaling information signals the transmission of a broadcast service through a packet based stream of an IP based broadcast network according to an embodiment of the present invention.

FIG. 24 is a view that broadcast service transmission path signaling information signals a broadcast service through URL according to an embodiment of the present invention.

FIG. 25 is a view when a broadcast transmission device transmits broadcast service transmission path signaling information according to an embodiment of the present invention.

FIG. 26 is a view when a broadcast reception device receives a broadcast service on the basis of a broadcast service transmission path according to an embodiment of the present invention.

FIG. 27 is a view illustrating media component signaling information signaling a media component according to an embodiment of the present invention.

FIG. 28 is a view illustrating a value that a component type field in media component signaling information according to an embodiment of the present invention.

FIG. 29 is a view illustrating a component data field in media component signaling information according to an embodiment of the present invention.

FIG. 30 is a view illustrating the type and role of a media component according to an embodiment of the present invention.

FIG. 31 is a view illustrating a configuration of a complex component according to an embodiment of the present invention.

FIG. 32 is a view illustrating a complex video component according to an embodiment of the present invention.

FIG. 33 is a view illustrating a complex audio component according to an embodiment of the present invention.

FIG. 34 is a view illustrating a configuration of a broadcast reception device according to another embodiment of the present invention.

FIG. 35 is a view illustrating a configuration of a complex video component according to an embodiment of the present invention.

FIG. 36 is a view illustrating a complex video component according to another embodiment of the present invention.

FIG. 37 is a view illustrating a complex video component according to another embodiment of the present invention.

FIG. 38 is a view illustrating a media component configuration of audio service according to an embodiment of the present invention.

FIG. 39 is a view illustrating a configuration of a broadcast service including both audio and video according to an embodiment of the present invention.

FIG. 40 is a view illustrating a configuration of a user request content service according to an embodiment of the present invention.

FIG. 41 is a view illustrating a configuration of a stand-alone NRT data service according to an embodiment of the present invention.

FIG. 42 is a view illustrating media component information according to an embodiment of the present invention.

FIG. 43 is a view illustrating a value of a component data field in media component signaling information according to another embodiment of the present invention.

FIG. 44 is a view illustrating complex component information according to an embodiment of the present invention.

FIG. 45 is a view illustrating a descriptor including complex component information according to an embodiment of the present invention.

FIG. 46 is a view illustrating related component list information according to an embodiment of the present invention.

FIG. 47 is a view of an NRT information table according to an embodiment of the present invention.

FIG. 48 is a view illustrating an NRT information block according to an embodiment of the present invention.

FIG. 49 is a view of an NRT service descriptor according to an embodiment of the present invention.

FIG. 50 is a view illustrating graphic icon information according to an embodiment of the present invention.

FIG. 51 is a view illustrating a value that an icon transport mode field of graphic icon information has according to an embodiment of the present invention.

FIG. 52 is a view illustrating a value that a coordinate system field of graphic icon information has according to an embodiment of the present invention.

FIG. 53 is a view illustrating media component list information according to an embodiment of the present invention.

FIG. 54 is a view when a media component or a broadcast service is mapped through URI in a broadcast service signaling table according to an embodiment of the present invention.

FIG. 55 is a view illustrating targeting criterion information signaling the targeting criterion of a broadcast service or a media component.

FIG. 56 is a view illustrating text information for describing a broadcast service or a media component.

FIG. 57 is a view illustrating title information of a broadcast service, a program, or a show segment.

FIG. 58 is a view illustrating genre information of a broadcast service, a program, or a show segment.

FIG. 59 is a view illustrating target device information signaling a target device relating to a media component or a content item.

FIG. 60 is a view when a broadcast service is divided into a plurality of segments.

FIG. 61 is a view illustrating show information according to an embodiment of the present invention.

FIG. 62 is a view illustrating a show information block according to an embodiment of the present invention.

FIG. 63 is a view illustrating a segment information block according to an embodiment of the present invention.

FIG. 64 is a view when a broadcast transmission device transmits broadcast signals including at least one of show information and segment information according to an embodiment of the present invention.

FIG. 65 is a view when a broadcast reception device receives broadcast signal including at least one of show information and segment information according to an embodiment of the present invention.

FIG. 66 is a view illustrating program information according to an embodiment of the present invention.

FIG. 67 is a view illustrating a program information block according to an embodiment of the present invention.

FIG. 68 is a view illustrating a program information block according to another embodiment of the present invention.

FIG. 69 is a view illustrating a program information block according to another embodiment of the present invention.

FIG. 70 is a view illustrating a program information block according to another embodiment of the present invention.

FIG. 71 is a view illustrating a program information block according to another embodiment of the present invention.

FIG. 72 is a view illustrating segment information according to an embodiment of the present invention.

FIG. 73 is a view illustrating a segment information block according to an embodiment of the present invention.

FIG. 74 is a view illustrating a targeting segment set information according to an embodiment of the present invention.

FIG. 75 is a view when a broadcast transmission device transmits broadcast signal including at least one of program information and segment information according to an embodiment of the present invention.

FIG. 76 is a view when a broadcast reception device receives broadcast signal including at least one of program information and segment information according to an embodiment of the present invention.

FIG. 77 is a view illustrating a continuous component class, an audio component class, a video component class, and a closed caption component class.

FIG. 78 is a view illustrating an elementary audio component class, an elementary video component class, and an elementary closed caption component class.

FIG. 79 is a view illustrating a composite audio component class and a composite video component class.

FIG. 80 is a view illustrating a PickOne component class.

FIG. 81 is a view illustrating a presentable component class, a presentable video component class, a presentable audio component class, and a presentable subtitle component class.

FIG. 82 is a view illustrating an OnDemand component class.

FIG. 83 is a view illustrating an NRT content item class and an NRT file class.

FIG. 84 is a view illustrating an OnDemand component class according to another embodiment of the present invention.

FIG. 85 is a view illustrating an NRT content item class and an NRT file class according to another embodiment of the present invention.

FIG. 86 is a view illustrating a linear service class.

FIG. 87 is a view illustrating an App class and an App-based enhancement service.

FIG. 88 is a view illustrating a time base class and a notification stream class.

FIG. 89 is a view illustrating an App-based service class.

FIG. 90 is a view illustrating a program class.

FIG. 91 is a view illustrating a show class.

FIG. 92 is a view illustrating a segment class, a show segment class, and an interstitial segment class.

FIG. 93 is a view illustrating an inheritance relationship with a sub-property according to the type of broadcast service according to an embodiment of the present invention.

FIG. 94 is a view illustrating an inheritance relationship between a continuous component and components having a sub-property of the continuous component according to an embodiment of the present invention.

FIG. 95 is a view illustrating an inheritance relationship between a presentable component and components having a sub-property of the presentable component according to an embodiment of the present invention.

FIG. 96 is a view illustrating a relationship between a service, programs in the service, and segments in the programs according to an embodiment of the present invention.

FIG. 97 is a view illustrating an inheritance relationship with sub-attribute according to the type of broadcast service according to another embodiment of the present invention.

FIG. 98 is a view illustrating an inheritance relationship between a continuous component and components having a sub-attribute of the continuous component according to an embodiment of the present invention.

FIG. 99 is a view illustrating an inheritance relationship of an NRT content item class and an NRT file.

FIG. 100 is a view illustrating a relationship between a service, programs in the service, and segments in the programs according to another embodiment of the present invention.

FIG. 101 is a view illustrating a layer hierarchy of a presentable audio component.

FIG. 102 is a flowchart illustrating operations when a broadcast reception device displays an auto-launch app based service through a broadcast service guide and stores it as a favorite or downloads it.

FIG. 103 is a view illustrating an inheritance relationship with sub-attribute according to the type of broadcast service according to another embodiment of the present invention.

FIG. 104 is a view illustrating an inheritance relationship between a continuous component and components having a sub-attribute of the continuous component according to an embodiment of the present invention.

FIG. 105 is a view illustrating an inheritance relationship between a presentable component and components having a sub-attribute of the presentable component according to another embodiment of the present invention.

FIG. 106 is a flowchart illustrating operations of a broadcast transmission device to transmit information signaling a video including a sign language screen according to an embodiment of the present invention.

FIG. 107 is a flowchart illustrating operations of a broadcast reception device to display a video including a sign language screen according to an embodiment of the present invention.

FIG. 108 is a view illustrating an interface of a user input for setting a sign language by a broadcast reception device according to an embodiment of the present invention.

FIG. 109 is a view illustrating a broadcast system providing a broadcast service interoperating with a companion device according to an embodiment of the present invention.

FIG. 110 is a view illustrating the properties of signaled broadcast service according to an embodiment of the present invention.

FIG. 111 is a view illustrating a value that target device information has in the property of a signaled broadcast service signaled according to an embodiment of the present invention.

FIG. 112 is a view illustrating a parameter representing a state of a signaled broadcast service property according to an embodiment of the present invention.

FIG. 113 is a ladder diagram illustrating operations when a broadcast reception device signals a broadcast service property to a companion device according to an embodiment of the present invention.

FIG. 114 is a view illustrating a data format of a broadcast service property that a broadcast reception device signals to a companion device according to an embodiment of the present invention.

FIG. 115 is a view illustrating a parameter representing a state of a broadcast service property that a broadcast reception device signals to a companion device, an action for broadcast service property, and an argument of an action according to another embodiment of the present invention.

FIG. 116 is a ladder diagram illustrating operations when a broadcast reception device signals a broadcast service property to a companion device according to another embodiment of the present invention.

FIG. 117 is a view illustrating a data format of whether a broadcast service property is changed that a broadcast reception device signals to a companion device according to another embodiment of the present invention.

FIG. 118 is a view illustrating parameters representing a state of a broadcast service property that a broadcast reception device signals to a companion device according to another embodiment of the present invention.

FIG. 119 is a view illustrating a data format of whether a broadcast service property is changed that a broadcast reception device signals to a companion device according to another embodiment of the present invention.

FIG. 120 is a view illustrating parameters representing a state of a broadcast service property that a broadcast reception device signals to a companion device according to another embodiment of the present invention.

FIG. 121 is a ladder diagram illustrating operations when a broadcast reception device signals a broadcast service property to a companion device according to another embodiment of the present invention.

FIG. 122 is a view illustrating a parameter representing a state of a broadcast service property that a broadcast reception device signals to a companion device, an action for broadcast service property, and an argument of an action according to another embodiment of the present invention.

FIG. 123 is a ladder diagram illustrating operations when a broadcast reception device signals a broadcast service property to a companion device according to another embodiment of the present invention.

FIG. 124 is a view illustrating operations when an emergency alert is generated and transmitted through a broadcast network according to an embodiment of the present invention.

FIG. 125 is a view when a broadcast reception device extracts and displays emergency information signaled through a broadcast network according to an embodiment of the present invention.

FIG. 126 is a view illustrating an emergency alert message format according to an embodiment of the present invention.

FIG. 127 is a view illustrating a parameter representing a state of an emergency alert that a broadcast reception device signals, an action for emergency alert, and an action argument according to another embodiment of the present invention.

FIG. 128 is a view illustrating information including on an emergency alert signaled by a broadcast reception device according to an embodiment of the present invention.

FIG. 129 is a ladder diagram illustrating operations when a broadcast reception device signals an emergency alert to a companion device according to an embodiment of the present invention.

FIG. 130 is a view illustrating the criteria of a broadcast reception device to determine the priority of an emergency alert according to an embodiment of the present invention.

FIG. 131 is a view illustrating the criteria of a broadcast reception device to determine the priority of an emergency alert according to another embodiment of the present invention.

FIG. 132 is a view illustrating the criteria of a broadcast reception device to determine the priority of an emergency alert according to another embodiment of the present invention.

FIG. 133 is a view illustrating a parameter representing a state of an emergency alert that a broadcast reception device signals, an action for emergency alert, and an action argument according to another embodiment of the present invention.

FIG. 134 is a ladder diagram illustrating operations when a broadcast reception device signals an emergency alert to a companion device according to another embodiment of the present invention.

FIG. 135 is a ladder diagram illustrating operations when a broadcast reception device signals an emergency alert to a companion device according to another embodiment of the present invention.

FIG. 136 is a ladder diagram illustrating operations when a broadcast reception device signals an emergency alert to a companion device according to another embodiment of the present invention.

FIG. 137 is a view illustrating NRT data signaling information for a companion device according to an embodiment of the present invention.

FIG. 138 is a view when a broadcast reception device generates NRT data signaling information for a companion device on the basis of NRT data signaling information for the broadcast reception device according to an embodiment of the present invention.

FIG. 139 is a view illustrating a variable for NRT data, an action for NRT data acquisition, and an action factor according to an embodiment of the present invention.

FIG. 140 is a view when a broadcast reception device signals NRT data to a companion device according to an embodiment of the present invention.

FIG. 141 is a view when a broadcast reception device signals NRT data to a companion device according to another embodiment of the present invention.

FIG. 142 is a view illustrating device capability information that a broadcast reception device signals to a companion device according to an embodiment of the present invention.

FIG. 143 is a view illustrating a parameter for device capability information, an action for device capability information acquisition, and the factor of an action.

FIG. 144 is a view illustrating that a broadcast reception device signals device information to a companion device according to an embodiment of the present invention.

FIG. 145 is a view illustrating that a broadcast reception device signals device information to a companion device according to another embodiment of the present invention.

FIG. 146 is a view illustrating that a broadcast reception device signals device information to a companion device according to another embodiment of the present invention.

FIG. 147 is a view illustrating that a broadcast reception device signals device information to a companion device according to another embodiment of the present invention.

DETAILED DESCRIPTION OF THE EMBODIMENTS

Hereinafter, embodiments of the present invention will be described in more detail with reference to the accompanying drawings, in order to allow those skilled in the art to easily realize the present invention. The present invention may be realized in different forms, and is not limited to the embodiments described herein. Moreover, detailed descriptions related to well-known functions or configurations will be ruled out in order not to unnecessarily obscure subject matters of the present invention. Like reference numerals refer to like elements throughout.

In additional, when a part "includes" some components, this means that the part does not exclude other components unless stated specifically and further includes other components.

FIG. 1 is a view of a protocol stack for supporting a broadcast service according to an embodiment of the present invention.

The broadcast service may provide adjunct services, for example, audio/video (A/V) data and HTML5 application, interactive service, ACR service, second screen service, and personalization service.

Such a broadcast service may be transmitted through a physical layer (i.e., broadcast signal) such as terrestrial wave and a cable satellite. Additionally, a broadcast service according to an embodiment of the present invention may be transmitted through an internet communication network (e.g., broadband).

When the broadcast service is transmitted through a physical layer, i.e., a broadcast signal such as terrestrial wave and a cable satellite, a broadcast reception device may extract an encapsulated MPEG-2 Transport Stream (TS) and an encapsulated IP datagram by demodulating the broadcast signal. The broadcast reception device may extract a user datagram protocol (UDP) datagram from the IP datagram. At this point, the signaling information may be in XML format. The broadcast reception device may extract signaling information from the UDP datagram. Additionally, the broadcast reception device may extract an Asynchronous Layered Coding/Layered Coding Transport (ALC/LCT) packet from the UDP datagram. The broadcast reception device may extract a File Delivery over Unidirectional Transport (FLUTE) packet from the ALC/LCT packet. At this point, the FLUTE packet may include Non-Real Time (NRT) data and Electronic Service Guide (ESG) data. Additionally, the broadcast reception device may extract a Real-time Transport Protocol (RTCP) packet and an RTP Control Protocol (RTCP) packet from the UDP datagram. The broadcast reception device may extract A/V data and enhanced data from the RTP/RTCP packet. At this point, at least one of NRT data, A/V data, and enhanced data may be in ISO Base Media File Format (ISO BMFF). Additionally, the broadcast reception device may extract signaling information such as NRT data, A/V data, and PSI/PSIP from an MPEG-2 TS packet or IP datagram.

When the broadcast service is transmitted through an internet communication network (e.g., broadband), the broadcast reception device may receive an IP packet from the internet communication network. The broadcast reception device may extract a TCP packet from the IP packet. The broadcast reception device may extract an HTTP packet from the TCP packet. The broadcast reception device may extract A/V data, enhanced data, and signaling information from the HTTP packet. At this point, at least one of A/V and enhanced data may be in ISO BMFF format. Additionally, the signaling information may in XML format.

A detailed transmission frame and transport packet transmitting broadcast service will be described with reference to FIGS. 2 to 5.

FIG. 2 is a view illustrating a broadcast transmission frame according to an embodiment of the present invention.

According to the embodiment of FIG. 2, the broadcast transmission frame includes a P1 part, an L1 part, a common PLP part, an interleaved PLP part (e.g., a scheduled & interleaved PLP's part), and an auxiliary data part.

According to the embodiment of FIG. 2, the broadcast transmission device transmits information on transport signal detection through the P1 part of the transmission frame. Additionally, the broadcast transmission device may transmit turning information on broadcast signal tuning through the P1 part.

According to the embodiment of FIG. 2, the broadcast transmission device transmits a configuration of the broadcast transmission frame and characteristics of each PLP through the L1 part. At this point, the broadcast reception device 100 decodes the L1 part on the basis of the P1 part to obtain the configuration of the broadcast transmission frame and the characteristics of each PLP.

According to the embodiment of FIG. 2, the broadcast transmission device may transmit information commonly applied to PLPs through the common PLP part. According to a specific embodiment of the present invention, the broadcast transmission frame may not include the common PLP part.

According to the embodiment of FIG. 2, the broadcast transmission device transmits a plurality of components included in broadcast service through an interleaved PLP part. At this point, the interleaved PLP part includes a plurality of PLPs.

Moreover, according to the embodiment of FIG. 2, the broadcast transmission device may signal to which PLP components configuring each broadcast service are transmitted through an L1 part or a common PLP part. However, the broadcast reception device 100 decodes all of a plurality of PLPs of an interleaved PLP part in order to obtain specific broadcast service information on broadcast service scan.

Unlike the embodiment of FIG. 2, the broadcast transmission device may transmit a broadcast transmission frame including a broadcast service transmitted through a broadcast transmission frame and an additional part that includes information on a component included in the broadcast service. At this point, the broadcast reception device 100 may instantly obtain information on the broadcast service and the components therein through the additional part. This will be described with reference to FIG. 3.

FIG. 3 is a view of a broadcast transmission frame according to another embodiment of the present invention.

According to the embodiment of FIG. 3, the broadcast transmission frame includes a P1 part, an L1 part, a fast information channel (FIC) part, an interleaved PLP part (e.g., a scheduled & interleaved PLP's part), and an auxiliary data part.

Except the FIC part, other parts are identical to those of FIG. 2.

The broadcast transmission device transmits fast information through the FIC part. The fast information may include configuration information of a broadcast stream transmitted through a transmission frame, simple broadcast service information, and component information. The broadcast reception device 100 may scan broadcast service on the basis of the FIC part. In more detail, the broadcast reception device 100 may extract information on broadcast service from the FIC part.

FIG. 4 is a view illustrating a structure of a transport packet transmitting a broadcast service according to an embodiment of the present invention.

In the embodiment of FIG. 4, a transport packet transmitting a broadcast service includes a Network Protocol field, an Error Indicator field, a Stuffing Indicator field, a Pointer field, a Stuffing bytes field, and payload data.

The Network Protocol field represents the type of a network protocol.

According to a specific embodiment of the present invention, a value of the Network Protocol field may represent the IPv4 protocol or a frame packet type. In more detail, as shown in the embodiment of FIG. 5, when a value of the Network Protocol field is 000, it may represent the IPv4 protocol. In more detail, as shown in the embodiment of FIG. 5, when a value of the Network Protocol field is 111, it may represent a frame packet type protocol. At this point, framed packet type may be a protocol defined by ATSC A/153. In more detail, framed packet type may represent a network packet protocol not including a field representing information on the length. According to a specific embodiment of the present invention, the Network Protocol may be a 3-bit field.

The Error Indicator field represents that an error is detected from a corresponding transport packet. In more detail, if a value of the Error Indicator field is 0, it represents that no error is detected from a corresponding packet and if a value of the Error Indicator field is 1, it represents that an error is detected from a corresponding packet According to a specific embodiment of the present invention, the Error Indicator field may be a 1-bit field.

The Stuffing Indicator field represents whether stuffing bytes are included in a corresponding transport packet. At this point, the stuffing bytes represent data included in a payload to maintain the length of a fixed packet. According to a specific embodiment of the present invention, when a value of the Stuffing Indicator field is 1, a transport packet includes a stuffing byte and when a value of the Stuffing Indicator field is 0, a transport packet includes no stuffing byte According to a specific embodiment of the present invention, the Stuffing Indicator field may be a 1-bit field.

The Pointer field represents a start point of a new network packet in a payload part of a corresponding transport packet. According to a specific embodiment of the present invention, when a value of the Pointer field is 0x7FF, it may represent that there is no start point of a new network packet. Additionally, According to a specific embodiment of the present invention, when a value of the Pointer field is not 0x7FF, it may represent an offset value from the last part of a transport packet header to the start point of a new network packet. According to a specific embodiment of the present invention, the Pointer field may be an 11-bit field.

The Stuffing Bytes field represents a stuffing byte filling between the header and the payload data to maintain a fixed packet length.

A configuration of a broadcast reception device for receiving broadcast service will be described with reference to FIG. 5.

FIG. 6 is a view illustrating a configuration of a broadcast reception device 100 according to an embodiment of the present invention.

The broadcast reception device 100 of FIG. 6 includes a broadcast receiving unit 110, an internet protocol (IP) communication unit 130, and a control unit 150.

The broadcast receiving unit 110 includes a channel synchronizer 111, a channel equalizer 113, and a channel decoder 115.

The channel synchronizer 111 synchronizes a symbol frequency with a timing in order for decoding in a baseband where a broadcast signal is received.

The channel equalizer 113 corrects the distortion of a synchronized broadcast signal. In more detail, the channel equalizer 113 corrects the distortion of a synchronized signal due to multipath and Doppler effects.

The channel decoder 115 decodes a distortion corrected broadcast signal. In more detail, the channel decoder 115 extracts a transmission frame from the distortion corrected broadcast signal. At this point, the channel decoder 115 may perform forward error correction (FEC).

The IP communication unit 130 receives and transmits data through internet network.

The control unit 150 includes a signaling decoder 151, a transport packet interface 153, a broadband packet interface 155, a baseband operation control unit 157, a common protocol stack 159, a service map database 161, a service signaling channel processing buffer and parser 163, an A/V processor 165, a service guide processor 167, an application processor 169, and a service guide database 171.

The signaling decoder 151 decodes signaling information of a broadcast signal.

The transport packet interface 153 extracts a transport packet from a broadcast signal. At this point, the transport packet interface 153 may extract data such as signaling information or IP datagram from the extracted transport packet.

The broadcast packet interface 155 extracts an IP packet from data received from an internet network. At this point, the broadcast packet interface 155 may extract signaling data or IP datagram from the IP packet.

The baseband operation control unit 157 controls an operation relating to receiving broadcast information from a baseband.

The common protocol stack 159 extracts audio or video from a transport packet.

The A/V processor 165 processes audio or video.

The service signaling channel processing buffer and parser 163 parses and buffers signaling information that signals broadcast service. In more detail, the service signaling channel processing buffer and parser 163 parses and buffers signaling information that signals broadcast service from the IP datagram.

The service map database 161 stores a broadcast service list including information on broadcast services.

The service guide processor 167 processes terrestrial broadcast service guide data guiding programs of terrestrial broadcast service.

The application processor 169 extracts and processes application related information from a broadcast signal.

The service guide database 171 stores program information of a broadcast service.

FIG. 7 is a view illustrating a configuration of a broadcast reception device 100' according to another embodiment of the present invention.

In an embodiment of FIG. 7, the broadcast reception device 100' of FIG. 7 includes a broadcast receiving unit 110', an internet protocol (IP) communication unit 130', and a control unit 150'.

The broadcast receiving unit 110' may include one or more processors, one or more circuits, and one or more hardware modules, which perform each of a plurality of functions that the broadcast receiving unit 110' performs. In more detail, the broadcast receiving unit 110' may be a System On Chip (SOC) in which several semiconductor parts are integrated into one. At this point, the SOC may be semiconductor in which various multimedia components such as graphics, audio, video, and modem and a semiconductor such as a processor and D-RAM are integrated into one. The broadcast receiving unit 110' may include a physical layer module 119 and a physical layer IP frame (I/F) module 117. The physical layer module 119 receives and processes a broadcast related signal through a broadcast channel of a broadcast network. The physical layer I/F module 117 converts a data packet such as an IP datagram obtained from the physical layer module 119 into a specific frame. For example, the physical layer module 119 may convert an IP datagram into an RS Frame or GSE.

The IP communication unit 130' may include one or more processors, one or more circuits, and one or more hardware modules, which perform each of a plurality of functions that the IP communication unit 130' performs. In more detail, the IP communication unit 130' may be a System On Chip (SOC) in which several semiconductor parts are integrated into one. At this point, the SOC may be semiconductor in which various multimedia components such as graphics, audio, video, and modem and a semiconductor such as a processor and D-RAM are integrated into one. The IP communication unit 130' may include an internet access control module 131. The internet access control module 131 may control an operation of the broadcast reception device 100' to obtain at least one of service, content, and signaling data through an internet communication network (for example, broadband).

The control unit 150' may include one or more processors, one or more circuits, and one or more hardware modules, which perform each of a plurality of functions that the control unit 150' performs. In more detail, the control unit 150' may be a System On Chip (SOC) in which several semiconductor parts are integrated into one. At this point, the SOC may be semiconductor in which various multimedia components such as graphics, audio, video, and modem and a semiconductor such as a processor and D-RAM are integrated into one. The control unit 150' may include at least one of a signaling decoder 151, a service map database 161, a service signaling channel parser 163, an application signaling parser 166, an alert signaling parser 168, a targeting signaling parser 170, a targeting processor 173, an A/V processor 165, an alerting processor 162, an application processor 169, a scheduled streaming decoder 181, a file decoder 182, a user request streaming decoder 183, a file database 184, a component synchronization unit 185, a service/content acquisition control unit 187, a redistribution module 189, a device manager 193, and a data sharing unit 191.

The service/content acquisition control unit 187 controls operations of a receiver to obtain services or contents through a broadcast network or an internet communication network and signaling data relating to services or contents.

The signaling decoder 151 decodes signaling information.

The service signaling parser 163 parses service signaling information.

The application signaling parser 166 extracts and parses service related signaling information. At this point, the service related signaling information may be service scan related signaling information. Additionally, the service related signaling information may be signaling information relating to contents provided through a service.

The alert signaling parser 168 extracts and parses alerting related signaling information.

The targeting signaling parser 170 extracts and parses information for personalizing services or contents or information for signaling targeting information.

The targeting processor 173 processes information for personalizing services or contents.

The alerting processor 162 processes alerting related signaling information.

The application processor 169 controls application related information and the execution of an application. In more detail, the application processor 169 processes a state of a downloaded application and a display parameter.

The A/V processor 165 processes an A/V rendering related operation on the basis of decoded audio or video and application data.

The scheduled streaming decoder 181 decodes a scheduled streaming that is a content streamed according to a schedule defined by a contents provider such as broadcaster.

The file decoder 182 decodes a downloaded file. Especially, the file decoder 182 decodes a file downloaded through an internet communication network.

The user request streaming decoder 183 decodes a content (for example, On Demand Content) provided by a user request.

The file database 184 stores files. In more detail, the file database 184 may store a file downloaded through an internet communication network.

The component synchronization unit 185 synchronizes contents or services. In more detail, the component synchronization unit 185 synchronizes a content decoded by at least one of the scheduled streaming decoder 181, the file decoder 182, and the user request streaming decoder 183.

The service/content acquisition control unit 187 controls operations of a receiver to obtain services, contents or signaling information relating to services or contents.

When services or contents are not received through a broadcast network, the redistribution module 189 performs operations to support obtaining at least one of services, contents, service related information, and content related information. In more detail, the redistribution module 189 may request at least one of services, contents, service related information, and content related information from the external management device 300. At this point, the external management device 300 may be a content server.

The device manager 193 manages an interoperable external device. In more detail, the device manager 193 may perform at least one of the addition, deletion, and update of an external device. Additionally, an external device may perform connection and data exchange with the broadcast reception device 100.

The data sharing unit 191 performs a data transmission operation between the broadcast reception device 100' and an external device and processes exchange related information. In more detail, the data sharing unit 191 may transmit AV data or signaling information to an external device. Additionally, the data sharing unit 191 may receive AV data or signaling information from an external device.

FIG. 8 is a view that a broadcast service signaling table and broadcast service transmission path signaling information signal broadcast service and a broadcast service transmission path.

The broadcast service signaling table may signal broadcast service information. In more detail, the broadcast service signaling table may signal a media component that broadcast service includes. Additionally, the broadcast service signaling table may signal broadcast service and a transmission path of a media component that the broadcast service includes. For this, the broadcast service signaling table may include broadcast service transmission path signaling information. In the embodiment of FIG. 8, the broadcast service signaling table includes information on a plurality of broadcast services. At this point, the broadcast service signaling table includes media component signaling information signaling a plurality of media components respectively included in a plurality of broadcast services. Especially, the broadcast service signaling table includes broadcast service transmission path signaling information signaling transmission paths of a plurality of media components. For example, it is shown that the broadcast reception device 100 may transmit Video 1 in Service 0 through PLP 0 according to the signaling table. Additionally, it is shown that the broadcast reception device 100 may transmit Audio 1 in Service N through internet network according to the signaling table. At this point, the PLP is a series of logical data delivery paths identifiable on a physical layer. The PLP may be also referred to as a data pipe.

A broadcast service signaling table will be described with reference to FIGS. 9 to 14.

FIG. 9 is a view illustrating a broadcast service signaling table according to an embodiment of the present invention.

The broadcast service signaling table may include at least one of broadcast service identification information, information representing the current state of a broadcast service, the name of a broadcast service, information representing whether a protection algorithm for broadcast service is applied, category information of a broadcast service, and media component signaling information signaling a media component that a broadcast service includes. The media component signaling information signaling a media component that the broadcast service includes may include information representing whether each media component is essential to a corresponding broadcast service. Additionally, the media component signaling information signaling a media component that the broadcast service includes may include information relating to each component.

In more detail, as shown in the embodiment of FIG. 9, the broadcast service signaling table may include at least one of a table_id_field, section_syntax_indicator field, a private_indicator field, a section_length field, a table_id_extension field, a version_number field, a current_next_indicator field, a section_number field, a last_section_number field, a num_services field, a service_id field, a service_status field, an SP_indicator field, a short_service_name_length field, a short_service_name field, a channel_number field, a service_category field, a num_components field, an essential_component_indicator field, a num_component_level_descriptor field, a component_level_descriptor field, a num_service_level_descriptors field, and a service_level_descriptor field.

The table_id field represents an identifier of a broadcast service signaling information table. At this point, a value of the table_id field may be one of reserved id values defined in ATSC A/65. According to a specific embodiment of the present invention, the table_id field may be an 8-bit field.

The section_syntax_indicator field represents whether the broadcast service signaling information table is a private section table in a long format of MEPG-2 TS standard. According to a specific embodiment of the present invention, the section_syntax_indicator field may be a 1-bit field.

The private_indicator field represents whether a current table corresponds to a private section. According to a specific embodiment of the present invention, the private_indicator field may be a 1-bit field.

The section_length field represents the length of a section after the section_length field. According to a specific embodiment of the present invention, the section_length field may be a 12-bit field.

The table_id_extension field represents a value for identifying a broadcast service signaling information table in combination with the table_id field. Especially, the table_id field may include an SMT_protocol version field representing a protocol version of a service signaling information table. According to a specific embodiment of the present invention, the SMT_protocol version field may be an 8-bit field.

The version_number field represents a version of a service signaling table. The broadcast reception device 100 may determine the availability of a service signaling information table on the basis of a value of the version number field. In more detail, when a value of the version_number field is identical to a version of a previously received service signaling table, the information of the service signaling table may not be used. According to a specific embodiment of the present invention, the version_number field may be a 5-bit field.

The current_next_indicator field represents whether information of a broadcast service signaling table is currently available. In more detail, when a value of the current_next_indicator field is 1, it may represent that the information of the broadcast service signaling table is available. Moreover, when a value of the current_next_indicator field is 1, it may represent that the information of the broadcast service signaling table is available next time. According to a specific embodiment of the present invention, the current_next_indicator field may be a 1-bit field.

The section_number field represents a current section_number. According to a specific embodiment of the present invention, the section_number field may be an 8-bit field.

The last section_number field represents the last section_number. When the size of a broadcast service signaling table is large, it may be divided into a plurality of sections and then transmitted. At this point, the broadcast reception device 100 determines whether all sections necessary for a broadcast service signaling table are received on the basis of the section_number field and the last section_number field. According to a specific embodiment of the present invention, the last section_number field may be an 8-bit field.

The service_id field represents a service identifier for identifying a broadcast service. According to a specific embodiment of the present invention, the service_id field may be a 16-bit field.

The service_status field represents the current state of a broadcast service. In more detail, it may represent whether the broadcast service is available currently. According to a specific embodiment of the present invention, when a value of the service_status field is 1, it may represent that the broadcast service is available currently. According to a specific embodiment of the present invention, the broadcast reception device 100 may determine whether to display a corresponding broadcast service in a broadcast service list and a broadcast service guide on the basis of a value of the service_status field. For example, when a corresponding broadcast service is unavailable, the broadcast reception device 100 may not display the corresponding broadcast service in a broadcast service list and a broadcast service guide. According to another specific embodiment of the present invention, the broadcast reception device 100 may limit an access to a corresponding broadcast service on the basis of a value of the service_status field. For example, when a corresponding broadcast service is unavailable, the broadcast reception device 100 may limit an access to a corresponding broadcast service through a channel up/down key. According to a specific embodiment of the present invention, the service_status field may be a 2-bit field.

The SP_indicator field may represent whether service protection is applied to at least one component in a corresponding broadcast service. For example, when a value of SP_indicator is 1, it may represent that service protection is applied to at least one component in a corresponding broadcast service. According to a specific embodiment of the present invention, the SP_indicator field may be a 1-bit field.

The short_service_name_length field represents the size of the short_service_name field.

The short_service_name field represents the name of a broadcast service. In more detail, the short_service_name field may be displayed by summarizing the name of a broadcast service.

The channel_number field displays a virtual channel_number of a corresponding broadcast service.

The service_category field represents a category of a broadcast service. In more detail, the service_category field may represent at least one of TV service, radio service, broadcast service guide, RI service, and emergency alerting. For example, as shown in the embodiment of FIG. 9, in the case that a value of the service_category field is 0x01, it represents TV service. In the case that a value of the service_category field is 0x02, it represents radio service. In the case that a value of the service_category field is 0x03, it represents RI service. In the case that a value of the service_category field is 0x08, it represents service guide. In the case that a value of the service_category field is 0x09, it represents emergency alerting. According to a specific embodiment of the present invention, the service_category field may be a 6-bit field.

The num_component field represents the number of media components that a corresponding broadcast service includes. According to a specific embodiment of the present invention, the num_component field may be a 5-bit field.

The essential_component_indicator field represents whether a corresponding media component is an essential media component essential to a corresponding broadcast service presentation. According to a specific embodiment of the present invention, the essential_component_indicator field may be a 1-bit field.

The num_component_level_descriptor field represents the number of component level descriptor fields. According to a specific embodiment of the present invention, the num_component_level_descriptor field may be a 4-bit field.

The component_level_descriptor field includes an additional property for a corresponding component.

The num_service_level_descriptors field represents the number of service_level_descriptor fields. According to a specific embodiment of the present invention, the num_service_level_descriptors field may be a 4-bit field.

The service_level_descriptor field includes an additional property for a corresponding service.

The service signaling table may further include information on ensemble. When the same Forward Error Correction (FEC) is applied to at least one service and transmitted, the ensemble represents a collection of the at least one service. This will be described in more detail with reference to FIG. 11.

FIG. 11 is a view of a broadcast service signaling table according to another embodiment of the present invention.

In more detail, as shown in the embodiment of FIG. 11, the broadcast service signaling table may further include a num_ensemble_level_descriptors field and an ensemble_level_descriptor field.

The num_ensemble_level_descriptors field represents the number of ensemble_level_descriptor fields. According to a specific embodiment of the present invention, the num_ensemble_level_descriptors field may be a 4-bit field.

The ensemble_level_descriptor field includes an additional property for a corresponding ensemble.

Additionally, the service signaling table may further include stream identifier information for identifying a media component. This will be described in more detail with reference to FIG. 41.

FIG. 12 is a view of a stream identifier descriptor according to another embodiment of the present invention.

The stream identifier information includes at least one of a descriptor_tag field, a descriptor length field, and a component_tag field.

The descriptor_tag field represents a descriptor including stream identifier information. According to a specific embodiment of the present invention, the descriptor_tag field may be an 8-bit field.

The descriptor_length_field represents the length of stream identifier information after a corresponding field. According to a specific embodiment of the present invention, the descriptor_length_field may be an 8-bit field.

The component_tag field represents a media component identifier for identifying a media component. At this point, the media component identifier may have a different unique value than a media component identifier of another media component on a corresponding signaling information table. According to a specific embodiment of the present invention, the component_tag field may be an 8-bit field.

An operation for transmitting/receiving a broadcast service signaling table will be described with reference to FIGS. 13 and 17.

The above broadcast service table is described as in a bitstream format but according to a specific embodiment of the present invention, a broadcast service table may be in an XML format.

FIG. 13 is a view illustrating an operation when a broadcast transmission device transmits a broadcast service signaling table according to an embodiment of the present invention.

The broadcast transmission device may include a transmitting unit for transmitting a broadcast signals and a control unit for controlling operations of the broadcast transmitting unit. A transmitting unit may include one or more processors, one or more circuits, and one or more hardware modules, which perform each of a plurality of functions that the transmitting unit performs. In more detail, the transmitting unit may be a System On Chip (SOC) in which several semiconductor parts are integrated into one. At this point, the SOC may be semiconductor in which various multimedia components such as graphics, audio, video, and modem and a semiconductor such as a processor and D-RAM are integrated into one. A control unit may include one or more processors, one or more circuits, and one or more hardware modules, which perform each of a plurality of functions that the control unit performs. In more detail, the control unit may be a System On Chip (SOC) in which several semiconductor parts are integrated into one. At this point, the SOC may be semiconductor in which various multimedia components such as graphics, audio, video, and modem and a semiconductor such as a processor and D-RAM are integrated into one.

The broadcast transmission device obtains broadcast service information through the control unit in operation S101. At this point, the broadcast service information is information for describing broadcast service. In more detail, the broadcast service information may include at least one of broadcast service identification information, information representing the current state of a broadcast service, the name of a broadcast service, a channel number of a broadcast service, information representing whether a protection algorithm for broadcast service is applied, category information of a broadcast service, and media component signaling information signaling a media component that a broadcast service includes. The media component signaling information signaling a media component that the broadcast service includes may include information representing whether each media component is essential to a corresponding broadcast service. Additionally, the media component signaling information signaling a media component that the broadcast service includes may include information relating to each component.

The broadcast transmission device generates a broadcast service signaling table on the basis of broadcast service information through a control unit in operation S103. At this point, the broadcast service signaling table may include the above-mentioned broadcast service information.

The broadcast transmission device transmits a broadcast signal including a service signaling table through a transmitting unit in operation S105.

FIG. 14 is a view illustrating an operation when a broadcast reception device receives a broadcast service signaling table according to an embodiment of the present invention.

The broadcast reception device 100 receives a broadcast signal through the broadcast receiving unit 110 in operation S301.

The broadcast reception device 100 obtains a broadcast service signaling table through the control unit 150 on the basis of the broadcast signal in operation S303. In more detail, the broadcast reception device 100 may obtain a broadcast service signaling table from the broadcast signal. At this point, as mentioned above, the broadcast service signaling table may include at least one of broadcast service identification information, information representing the current state of a broadcast service, the name of a broadcast service, information representing whether a protection algorithm for broadcast service is applied, category information of a broadcast service, and media component signaling information signaling a media component. The media component signaling information signaling a media component that the broadcast service includes may include information representing whether each media component is essential to a corresponding broadcast service. Additionally, the media component signaling information signaling a media component that the broadcast service includes may include information relating to each component. However, according to a specific embodiment of the present invention, the broadcast reception device 100 may obtain a broadcast service signaling table via an IP network.

The broadcast reception device 100 obtains broadcast service information on the basis of the broadcast service signaling table through the control unit 150 in operation S305. At this point, as mentioned above, the broadcast service information may include at least one of broadcast service identification information, information representing the current state of a broadcast service, the name of a broadcast service, a channel number of a broadcast service, information representing whether a protection algorithm for broadcast service is applied, category information of a broadcast service, and media component signaling information signaling a media component that a broadcast service includes. The media component signaling information signaling a media component that the broadcast service includes may include information representing whether each media component is essential to a corresponding broadcast service. Additionally, the media component signaling information signaling a media component that the broadcast service includes may include information relating to each component.

The broadcast reception device 100 generates a broadcast service list for storing information on a broadcast service on the basis of the broadcast service information through the control unit 150 in operation S307. At this point, the broadcast service list may include broadcast service information that the broadcast reception device 100 obtains. According to a specific embodiment of the present invention, the broadcast reception device 100 may receive a broadcast service on the basis of broadcast service information or a broadcast service list.

FIG. 15 is a view illustrating broadcast service transmission path signaling information according to an embodiment of the present invention.

The broadcast service transmission path signaling information may include information representing the type of a network transmitting a broadcast service and specific transmission information according to a broadcast transmission type. The type of a network transmitting a broadcast service may be one of a network transmitting a broadcast service through an IP stream that the same broadcaster transmits, a network transmitting a broadcast service through an IP stream that a different broadcaster transmit, a network transmitting a broadcast service through a FLUTE session of the same broadcaster, a network transmitting a broadcast service through a FLUTE session of a different broadcaster, a network transmitting a broadcast service through MPEG-2 TS of different broadcasters, a network transmitting a broadcast service through a packet based stream of a different broadcaster, a network transmitting a broadcast service through a packet based stream transmitted from an IP based broadcast network, and a network for obtaining a broadcast service through URL.

According to a specific embodiment of the present invention, as shown in FIG. 15, the broadcast service transmission path signaling information may include a descriptor_tag field, a description_length field, a delivery_network_type field, and a data_path field.

The descriptor_tag field represents that a corresponding descriptor includes transmission path signaling information. According to a specific embodiment of the present invention, the descriptor_tag field may be an 8-bit field.

The descriptor_length_field represents the length of broadcast service transmission path signaling information after a corresponding field. According to a specific embodiment of the present invention, the descriptor_length_field may be an 8-bit field.

The delivery_network_type field represents the type of a transmission network transmitting a broadcast service. According to a specific embodiment of the present invention, a value of the delivery_network_type field may represent one of a network transmitting a broadcast service through an IP stream that the same broadcaster transmits, a network transmitting a broadcast service through an IP stream that a different broadcaster transmit, a network transmitting a broadcast service through a FLUTE session of the same broadcaster, a network transmitting a broadcast service through a FLUTE session of a different broadcaster, a network transmitting a broadcast service through MPEG-2 TS of a different broadcaster, a network transmitting a broadcast service through a packet based stream of a different broadcaster, a network transmitting a broadcast service through a packet based stream transmitted from an IP based broadcast network, and a network obtaining a broadcast service through URL. For example, as shown in the embodiment of FIG. 16, when a value of the delivery_network_type field is 0x00, it may represent a network transmitting a broadcast service through an IP stream transmitted from the same broadcaster. Moreover, when a value of the delivery_network_type field is 0x01, it may represent a network transmitting a broadcast service through an IP stream transmitted from a different broadcaster. Moreover, when a value of the delivery_network_type field is 0x02, it may represent a network transmitting a broadcast service through a FLUTE session of the same broadcaster. Additionally, when a value of the delivery_network_type field is 0x03, it may represent a network transmitting a broadcast service through a FLUTE session of a different broadcaster. Furthermore, when a value of the delivery_network_type field is 0x04, it may represent a network transmitting a broadcast service through an MPEG-2 TS of a different broadcaster. In addition, when a value of the delivery_network_type field is 0x05, it may represent a network transmitting a broadcast service through a packet based stream of a different broadcaster. Moreover, when a value of the delivery_network_type field is 0x06, it may represent a network transmitting a broadcast service through a packet based stream transmitted from an IP based broadcast network. Furthermore, when a value of the delivery_network_type field is 0x07, it may represent a network obtaining a broadcast service through URL.

The data_path field includes specific transmission information according to the type of a transmission network transmitting a broadcast service. This data_path will be described in more detail with reference to FIGS. 17 to 25.

FIG. 17 is a view when broadcast service transmission path signaling information signals the transmission of a broadcast service through IP stream according to an embodiment of the present invention.

When a network transmitting a broadcast service is a network transmitting a broadcast service through an IP stream that the same broadcaster transmits, broadcast service transmission path signaling information may include at least one of information representing an IP version, information on whether it contains a source IP address, an source IP address, information on whether it contains a destination IP address, a destination IP address, information representing the number of UDP ports of an IP datagram flow transmitting a broadcast service, and information an UDP port number information.

According to a specific embodiment of the present invention, as shown in the embodiment of FIG. 17, the broadcast service transmission path signaling information may include at leas one among an IP_versioni_flag field, a source_IP_address_flag field, a destination_IP_address_flag field, a source_IP_address field, a port_num_count field, and a destination_UDP_port_number field.

The IP_versioni_flag field represents an IP address format of an IP datagram including a broadcast service. In more detail, when a value of the IP_version_flag field is 1, it represents that an IP datagram including a broadcast service is IPV4 format and when a value of the IP_version_flag field is 0, it represents that an IP datagram including a broadcast service is IPv6 format. According to a specific embodiment of the present invention, the IP_version_flag field may be a 1-bit field.

The source_IP_address_flag field represents whether an IP datagram including a broadcast service includes a source_IP_address. In more detail, when a value of the source_IP_address_flag field is 1, it represents that an IP datagram including a broadcast service includes a source_IP_address and when a value of the source_IP_address_flag field is 0, it represents that an IP datagram including a broadcast service does not include a source_IP_address. According to a specific embodiment of the present invention, the source_IP_address_flag field may be a 1-bit field.

The destination_IP_address_flag field represents that an IP datagram including a broadcast service includes a destination IP address. In more detail, when a value of the destination_IP_address_flag field is 1, it represents that an IP datagram including a broadcast service includes a destination IP address and when a value of the destination_IP_address_flag field is 0, it represents that an IP datagram including a broadcast service does not include a destination IP address. According to a specific embodiment of the present invention, the destination_IP_address_flag field may be a 1-bit field.

The source_IP_address field represents the source_IP_address of an IP datagram including a broadcast service. According to a specific embodiment of the present invention, the source_IP_address field may be a 32 or 128-bit field according to the IP version.

The destination_IP_address field represents the destination_IP_address of an IP datagram including a broadcast service. According to a specific embodiment of the present invention, the destination_IP_address field may be a 32 or 128-bit field according to the IP version.

The port_num_count field represents the number of ports of an IP datagram flow including a broadcast. According to a specific embodiment of the present invention, the port_num_count field may be an 8-bit field.

The destination UDP port number field represents the UDP port number of an IP datagram including a broadcast service. According to a specific embodiment of the present invention, the destination UDP port number field may be a 16-bit field.

FIG. 18 is a view when broadcast service transmission path signaling information signals the transmission of a broadcast service through an IP stream of a different broadcaster according to an embodiment of the present invention.

When a network transmitting a broadcast service is a network transmitting a broadcast service through an IP stream that a different broadcaster transmits, unlike a network transmitting a broadcast service through an IP stream that the same broadcaster transmits, the broadcast service transmission path signaling information may further include an identifier for identifying a transport stream transmitting an IP datagram.

According to an embodiment of the present invention, as shown in the embodiment of FIG. 18, the broadcast service transmission path signaling information may include a transport_stream_id field.

The transport_stream_id field identifies a transport stream transmitting an IP datagram including a broadcast service.

According to a specific embodiment of the present invention, the transport_stream_id field may be a 16-bit field.

FIG. 19 is a view when broadcast service transmission path signaling information signals the transmission of a broadcast service through a FLUTE session according to an embodiment of the present invention.

When a network transmitting a broadcast service is a network transmitting a broadcast service through a FLUTE session that the same broadcaster transmits, broadcast service transmission path signaling information may include at least one of information representing an IP version, information on whether it contains an IP address, a source IP address, a destination IP address, UDP port number information, and a Transport Session Identifier for identifying a FLUTE session transmitting a FLUTE packet including a broadcast service.

According to a specific embodiment of the present invention, as shown in the embodiment of FIG. 19, the broadcast service transmission path signaling information may include at leas one among an IP_versioni_flag field, a source_IP_address_flag field, a source_IP_address field, a destination_UDP_port_number field, and a flute_tsi field.

The IP_versioni_flag field represents an IP address format of an IP datagram transmitting a FLUTE packet including a broadcast service. In more detail, when a value of the IP_version_flag field is 1, it represents that an IP datagram including a broadcast service is IPV4 format and when a value of the IP_version_flag field is 0, it represents that an IP datagram including a broadcast service is IPv6 format. According to a specific embodiment of the present invention, the IP_version_flag field may be a 1-bit field.

The source_IP_address_flag field represents whether an IP datagram transmitting a FLUTE packet including a broadcast service includes a source_IP_address. In more detail, when a value of the source_IP_address_flag field is 1, it represents that an IP datagram including a broadcast service includes a source_IP_address and when a value of the source_IP_address_flag field is 0, it represents that an IP datagram including a broadcast service does not include a source_IP_address. According to a specific embodiment of the present invention, the source_IP_address_flag field may be a 1-bit field.

The source_IP_address field represents the source_IP_address of an IP datagram transmitting a FLUTE packet including a broadcast service. According to a specific embodiment of the present invention, the source_IP_address field may be a 32 or 128-bit field according to the IP_version.

The destination_IP_address field represents the destination_IP_address of an IP datagram transmitting a FLUTE packet including a broadcast service. According to a specific embodiment of the present invention, the destination_IP_address field may be a 32 or 128-bit field according to the IP_version.

The destination UDP port number field represents the UDP port number of an IP datagram transmitting a FLUTE packet including a broadcast service. According to a specific embodiment of the present invention, the destination UDP port number field may be a 16-bit field.

The flute_tsi field represents a Transport Session Identifier for identifying a FLUTE session transmitting a FLUTE packet including a broadcast service.

FIG. 20 is a view when broadcast service transmission path signaling information signals the transmission of a broadcast service through a FLUTE protocol of a different broadcaster according to an embodiment of the present invention.

When a network transmitting a broadcast service is a network transmitting a broadcast service through a FLUTE session of a different broadcaster, unlike a network transmitting a broadcast service through a FLUTE session of the same broadcaster, the broadcast service transmission path signaling information may further include an identifier for identifying a transport stream transmitting a FLUTE packet.

According to an embodiment of the present invention, as shown in the embodiment of FIG. 20, the broadcast service transmission path signaling information may include a transport_stream_id field.

The transport_stream_id field identifies a transport stream transmitting a FLUTE packet including a broadcast service. According to a specific embodiment of the present invention, the transport_stream_id field may be a 16-bit field.

FIG. 21 is a view when broadcast service transmission path signaling information signals the transmission of a broadcast service through MPEG-2 TS stream of a different broadcaster according to an embodiment of the present invention.

When a network transmitting a broadcast service is a network transmitting a broadcast service through MPEG-2 TS of a different broadcaster, it may include an identifier for identifying a transport stream transmitting MPEG-2 TS including a broadcast and an identifier of an MPEG-2 TS packet including a broadcast service.

According to a specific embodiment of the present invention, as shown in FIG. 21, the broadcast service transmission path signaling information may include at least one of a transport_stream_id field and a pid field.

The transport_stream_id field represents an identifier for identifying a transport stream transmitting MPEG-2 TS. According to a specific embodiment of the present invention, the transport_stream_id field may be a 16-bit field.

The pid field represents an identifier of an MPEG2-TS packet including a broadcast service. According to a specific embodiment of the present invention, the pid field may be a 13-bit field.

FIG. 22 is a view when broadcast service transmission path signaling information signals the transmission of a broadcast service through a packet based stream of a different broadcaster according to an embodiment of the present invention.

When a network transmitting a broadcast service is a network transmitting a broadcast service through a packet based stream of a different broadcaster, broadcast service transmission path signaling information may include an identifier for identifying a packet based stream including a broadcast service and an identifier of a packet including a broadcast service.

According to a specific embodiment of the present invention, as shown in FIG. 22, the broadcast service transmission path signaling information may include at least one of a transport_stream_id field and a packet_id field.

The transport_stream_id field represents an identifier of a packet based stream including a broadcast service. According to a specific embodiment of the present invention, the transport_stream_id field may be a 16-bit field.

The packet_id field represents an identifier of a packet including a broadcast service. According to a specific embodiment of the present invention, the packet_id field may be a 16-bit field.

FIG. 23 is a view when broadcast service transmission path signaling information signals the transmission of a broadcast service through a packet based stream of an IP based broadcast network according to an embodiment of the present invention.

When a network transmitting a broadcast service is a network transmitting a broadcast service through a packet based stream transmitted from an IP based broadcast network, broadcast service transmission path signaling information may include at least one of information representing an IP version, information representing whether it contains a source IP address, a source IP address, a destination IP address, UDP port number information, and an identifier for identifying a packet including a broadcast service.

According to a specific embodiment of the present invention, as shown in the embodiment of FIG. 23, the broadcast service transmission path signaling information may include at leas one among an IP_versioni_flag field, a source_IP_address_flag field, a source_IP_address field, a destination_UDP_port_number field, and a packet_id field.

The IP_versioni_flag field represents an IP address format of an IP datagram transmitting a packet including a broadcast service. In more detail, when a value of the IP_version_flag field is 1, it represents that an IP datagram including a broadcast service is IPV4 format and when a value of the IP_version_flag field is 0, it represents that an IP datagram including a broadcast service is IPv6 format. According to a specific embodiment of the present invention, the IP_version_flag field may be a 1-bit field.

The source_IP_address_flag field represents whether an IP datagram transmitting a packet including a broadcast service includes a source_IP_address. In more detail, when a value of the source_IP_address_flag field is 1, it represents that an IP datagram including a broadcast service includes a source_IP_address and when a value of the source_IP_address_flag field is 0, it represents that an IP datagram including a broadcast service does not include a source_IP_address. According to a specific embodiment of the present invention, the source_IP_address_flag field may be a 1-bit field.

The source_IP_address field represents the source_IP_address of an IP datagram transmitting a packet including a broadcast service. According to a specific embodiment of the present invention, the source_IP_address field may be a 32 or 128-bit field according to the IP_version.

The destination_IP_address field represents the destination_IP_address of an IP datagram transmitting a packet including a broadcast service. According to a specific embodiment of the present invention, the destination_IP_address field may be a 32 or 128-bit field according to the IP_version.

The destination_UDP_port_number field represents the UDP port number of an IP datagram transmitting a packet including a broadcast service. According to a specific embodiment of the present invention, the destination_UDP_port_number field may be a 16-bit field.

The packet_id field represents an identifier for identifying a packet including a broadcast service. According to a specific embodiment of the present invention, the packet_id field may be a 16-bit field.

FIG. 24 is a view when broadcast service transmission path signaling information signals a broadcast service through URL according to an embodiment of the present invention.

When a network transmitting a broadcast service is a network obtaining a broadcast service through URL, broadcast service transmission path signaling information may include information representing the length of URL for receiving a broadcast service and a URL for receiving a broadcast service.

According to a specific embodiment of the present invention, as shown in FIG. 24, the broadcast service transmission path signaling information may include at least one of an URL_length field and an URI_char field.

The URL_length field represents the length of a URL for receiving a broadcast service. According to a specific embodiment of the present invention, the URL_length field may be an 8-bit field.

The URL char field represents a URL for receiving a broadcast service. According to a specific embodiment of the present invention, the URL char field may be an 8-bit field.

FIG. 25 is a view when a broadcast transmission device transmits broadcast service transmission path signaling information according to an embodiment of the present invention.

The broadcast transmission device obtains a transmission path of a broadcast service through a control unit in operation S501.

The broadcast transmission device generates broadcast service transmission path signaling information through a control unit in operation S503. The broadcast transmission device may generate the broadcast service transmission path signaling information described with reference to FIGS. 14 to 23.

The broadcast transmission device transmits a broadcast signal including broadcast service transmission path signaling information through a transmitting unit in operation S505.

FIG. 26 is a view when a broadcast transmission device transmits broadcast service transmission path signaling information according to an embodiment of the present invention.

The broadcast reception device 100 receives a broadcast signal through the broadcast receiving unit 110 in operation S701.

The broadcast reception device 100 obtains broadcast service transmission path signaling information through the control unit 150 on the basis of the broadcast signal in operation S703.

The broadcast reception device 100 receives a broadcast service on the basis of the broadcast service transmission path signaling information through the control unit 150 in operation S705. In more detail, the broadcast reception device 100 may receive a media component of a broadcast service on the basis of the broadcast service transmission path signaling information through the control unit 150. As described with reference to FIGS. 16 to 25, the broadcast reception device 100 may receive a broadcast service through at least one of a network transmitting a broadcast service through an IP stream that the same broadcaster transmits, a network transmitting a broadcast service through an IP stream that a different broadcaster transmit, a network transmitting a broadcast service through a FLUTE session of the same broadcaster, a network transmitting a broadcast service through a FLUTE session of different broadcasters, a network transmitting a broadcast service through MPEG-2 TS of a different broadcaster, a network transmitting a broadcast service through a packet based stream of a different broadcaster, a network transmitting a broadcast service through a packet based stream transmitted from an IP based broadcast network, and a network obtaining a broadcast service through URL. Especially, according to a specific embodiment of the present invention, the broadcast reception device 100 may receive a plurality of media components of a broadcast service through a plurality of networks. For example, the broadcast reception device 1100 may receive a video component of a broadcast service via a packet based stream through the broadcast receiving unit 1110 and may receive an audio component of a broadcast service via an IP based broadcast network through the IP communication unit 130.

As described above, the broadcast service signaling table may include media component signaling information signaling a media component. Especially, when a broadcast service is transmitted in the ISO Base Media File Format (ISO BMFF), the broadcast service signaling table may include media component signaling information. This will be described in more detail with reference to FIGS. 27 to 30.

FIG. 27 is a view illustrating media component signaling information signaling a media component according to an embodiment of the present invention.

The media component signaling information may include information representing an encoding type of a media component, information on whether a media component is encrypted, information representing the number of STKM streams including a key decrypting an encrypted media component, an identifier for identifying an STKM stream including a key for decrypting an encrypted media component, the length of a transmission parameter of a media component, a transmission parameter of a media component, and an encoding parameter according to an encoding type of a component. At this point, the transmission parameter may include at least one of a buffer model and the size of a maximum transmitting unit (MTU).

According to a specific embodiment of the present invention, as shown in the embodiment of FIG. 27, media component signaling information may include at least one of a descriptor_tag field, a descriptor_length_field, a component_type field, a component_encryption_flag field, a num_STKM_streams field, an STKM_stream_id field, a transport_parameter text length field, a transport_parameter text field, and a component_data field.

The descriptor_tag field represents that a corresponding descriptor includes media component signaling information. According to a specific embodiment of the present invention, the descriptor_tag field may be an 8-bit field.

The descriptor_length_field represents the length of broadcast service transmission path signaling information after a corresponding field. According to a specific embodiment of the present invention, the descriptor_length_field may be an 8-bit field.

The component_type field represents an encoding type of a corresponding component. According to an embodiment of the present invention, as shown in the embodiment of FIG. 28, a value that the component_type field has may represent at least one of an H.264/AVC, SVC enhancement layer stream component, an HE AAC v2 audio stream component, a FLUTE file delivery session, an STKM stream component, an LTKM stream component, an OMA-RME DIMS stream component, and an NTP time base stream component. When a media component is transmitted through ISO BMFF, the broadcast reception device 100 needs to prepare an appropriate operation for receiving a media component. Accordingly, it is necessary to signal the fact that a media component is transmitted through ISO BMFF. In more detail, as shown in the embodiment of FIG. 28, the component_type field may represent that a media component is transmitted through ISO BMFF. In more detail, when a value of the component_type field is 35, it may represent that a media component is an H.264/AVC component. In more detail, when a value of the component type field is 36, it may represent that a media component is an SVC enhancement layer stream component. In more detail, when a value of the component_type field is 37, it may represent that a media component is an HE AAC v2 audio stream component. In more detail, when a value of the component_type field is 38, it may represent that a media component is transmitted through a FLUTE file transmission session. In more detail, when a value of the component_type field is 39, it may represent that a media component is an STKM stream component. In more detail, when a value of the component_type field is 40, it may represent that a media component is an LTKM stream component. In more detail, when a value of the component_type field is 41, it may represent that a media component is an OMA-RME DIMS stream component. In more detail, when a value of the component_type field is 42, it may represent that a media component is an NTP time base stream component. In more detail, when a value of the component_type field is 43, it may represent that a media component is transmitted through an ISO BMFF. According to a specific embodiment of the present invention, the component_type field may be a 7-bit field.

The component_encryption_flag field is a field representing whether a media component is encrypted. According to a specific embodiment of the present invention, the component_encryption_flag field may be a 1-bit field.

The num_STKM_streams field represents the number of STKM streams including a key for decrypting an encrypted media component. According to a specific embodiment of the present invention, the num_STKM_streams field may be an 8-bit field.

The STKM_stream_id field represents an identifier for identifying an STKM stream including a key for decrypting an encrypted media component. According to a specific embodiment of the present invention, the STKM_stream_id field may be an 8-bit field.

The transport_parameter text length field represents the length of the transport_parameter text field. According to a specific embodiment of the present invention, the transport parameter text length field may be an 8-bit field.

The transport_parameter text field represents a transmission parameter of a media component. At this point, the transmission parameter may include at least one of a buffer model and the size of a maximum transmitting unit (MTU).

The component_data field represents an encoding parameter of a component. A parameter that an encoding parameter includes may vary according to an encoding type of a component. In more detail, a parameter that an encoding parameter includes may vary according to a value of the component_type field.

When a media component is transmitted through ISO BMFF, the component_data field may include at least one of version information of ISO BMFF and profile information.

In more detail, as shown in the embodiment of FIG. 30, the component_data field may include at least one of a version field and a profile field.

The version field represents version information of ISO BMFF. According to a specific embodiment of the present invention, the version field may be an 8-bit field.

The profile field represents profile information of ISO BMFF. According to a specific embodiment of the present invention, the profile field may be an 8-bit field.

The above-described media components are all handled and signaled identically regardless of their contents. However, recently, an adaptive streaming service transmitting different qualities of a media component according to a communication environment receives great attentions. Accordingly, a user may select one of various qualities of media components including the same content according to a communication environment and may then view the selected one. Furthermore, a multi view service displaying a plurality of media components on one screen simultaneously is provided. Accordingly, a user may view a plurality of images or data broadcasts through one screen. For example, a user may view a game of another stadium while viewing a baseball game through an additional Picture In Picture (PIP) screen. In such a way, as a broadcast service including a plurality of media components is diversified and increased, a broadcast transmission device and a broadcast reception device may need to divide the types of a component and process them and also need to systematically define the relationship between each media component. This will be described with reference to FIGS. 30 to 108.

FIG. 30 is a view illustrating the type and role of a media component according to an embodiment of the present invention.

The media component may be divided into a content component, a simple audio component, a simple video component, a continuous component, an elementary component, a composite component, a composite audio component, a composite video component, an adaptive component, an adaptive audio component, an adaptive video component, and a complex component. An adaptive component may be represented as a PickOne component.

The content component is a component including metadata relating to one kind of media. In more detail, the content component may be one of a video track, an audio track, a closed caption, a video enhanced layer, a webpage, and a bi-directional application.

The simple audio component is a component including audio. In more detail, the simple audio component is the encoding of one voice sequence encoded according to specific encoding parameters.

The simple audio component is a component including video. In more detail, the simple video component is the encoding of one video sequence encoded according to specific encoding parameters.

The continuous component is a component played on a continuous stream.

The elementary component is a continuous component including one encoding. The elementary component may be an audio component. In more detail, the elementary component may be one encoding for voice sequence. Additionally, the elementary component may be a video component. In more detail, the elementary component may be one encoding for video sequence. The elementary component may be one closed caption track.

The composite component is a collection of continuous components necessary for playing one scene. In more detail, the composite component is a collection of continuous components that have the same media type, represent the same scene, and need to be played together in a predetermined combination. Accordingly, the composite component is a collection of media components combined to represent one scene. In more detail, the composite component may be music, dialogs, and special effect necessary for one complete audio. Additionally, the composite component may be the right image and the left image of a 3D image necessary for playing the 3D image.

The composite audio component is a collection of audio components necessary for playing voice sequence. In more detail, the composite audio component may be a collection of audio components to be mixed.

The composite video component is a collection of video components necessary for playing image sequence. In more detail, the composite video component may be a collection of 3D components combined for 3D video playback. Additionally, the composite video component may be base video encoding accompanying at least one enhanced encoding.

The adaptive component is a collection of continuous components representing one scene, which are replaced with each other. As described above, the adaptive component may be referred to as PickOne and this represents that one of a plurality of several replaceable continuous components is selected and played. In more detail, the adaptive component is a collection of continuous components that have the same media type and represent the same scene and one of the continuous components is selected for playback. In more detail, the adaptive component is a collection of media components obtained by encoding the same content with different qualities. For example, the adaptive component may be a collection of audio components obtained by encoding the same voice sequence with different bitrates. Additionally, the adaptive component is a collection of video components obtained by encoding the same image sequence with different bitrates. Additionally, the adaptive component may be a general closed caption track and an easy reader closed caption for the same dialog.

The adaptive audio component is a collection of audio components, one of which is selected for playing voice sequence. In more detail, the adaptive audio component may be a collection of audio components obtained by encoding the same sound sequence with different bitrates.

The adaptive video component is a collection of video components, one of which is selected for playing image sequence. In more detail, the adaptive video component may be a collection of video components obtained by encoding the same video sequence with different encoding parameters.

The complex component represents one of the composite component or the adaptive component. The complex component will be described in more detail with reference to FIGS. 31 to 33.

FIG. 31 is a view illustrating a configuration of a complex component according to an embodiment of the present invention.

The complex component is not required to include only an elementary component. According to a specific embodiment of the present invention, the complex component may include a complex component. Accordingly, a broadcast service may not be played only with one elementary component in a complex component. Additionally, the complex component may be a composite component or an adaptive component. In more detail, as shown in the embodiment of FIG. 31, the composite component may include at least one elementary component. Additionally, the composite component may include at least one complex component. Additionally, the composite component may include both an elementary component and a complex component. One adaptive component may include at least one elementary component.

A component of a broadcast service may be described using the term "top-level component". A top-level audio component represents a unique voice sequence. A top-level video component represents a unique image sequence. According to a specific embodiment of the present invention, such a top-level component may be an elementary component. According to another specific embodiment of the present invention, such a top-level component may be a composite component.

For example, as shown in the embodiment of FIG. 33, the top-level video component may be a composite component including the left image and right image components of a 3D image. At this point, the left image component of the 3D image may be an adaptive component including a plurality of elementary components encoded with different bitrates. Additionally, the right image component of the 3D image may be an adaptive component including a plurality of elementary components encoded with different bitrates.

According to another specific embodiment of the present invention, as shown in the embodiment of FIG. 62, the top-level audio component may be an adaptive component including an adaptive component including a complete main audio and a composite component having mixed music, dialogs, and special effects. At this point, the adaptive component including a complete main audio may include a plurality of elementary components encoded with different bitrates. Additionally, the composite component including mixed music, dialogs, and special effects may include an adaptive component including music, an adaptive component including dialogs, and an adaptive component including special effects. That is, the adaptive component including music may include a plurality of elementary components encoded with different bitrates.

Distinguishing a media component in such a way may simplify the relationship between a plurality of media components. For example, when it is specified that each video program includes one complex video component, the relationship with each audio elementary component or a video elementary component does not need to be specified.

There may be a plurality of complex component models for one media. For example, a 3D component encoded with a plurality of bitrates may be modeled with a sub media component for a left image and a sub media component for a right image. Each sub media component may be modeled as an adaptive component including a plurality of components encoded with different bitrates. Additionally, the same 3D component may be modeled as an adaptive component including a plurality of sub media components encoded with different bitrates and each of the sub media components may be modeled as a composite component including left and right images. The number of sub media components with different bitrates in the left and right images may vary.

FIG. 34 is a view illustrating a configuration of a complex video component according to an embodiment of the present invention.

The embodiment of FIG. 34 is obtained by editing the specific expression in the embodiment of FIG. 30 and is applicable like the embodiment of FIG. 31. Especially, the definitions and roles of continuous components, elementary components, composite components and complex components are the same. The adaptive component of FIG. 30 is expressed as a PickOne component as described above. The definition and role of the PickOne component in the embodiment of FIG. 34 are identical to those of the adaptive component in the embodiment of FIG. 30. Accordingly, a composite component represents that a plurality of continuous components are combined and one content is played. Additionally, a PickOne component represents a component that is one selected from a plurality of selectable media components and played. However, in the embodiment of FIG. 34, a presentable component is defined unlike the embodiment of FIG. 30. The presentable component represents a continuous component that is substantially played in the broadcast reception device 100. Additionally, the presentable component may be an elementary component. Additionally, the presentable component may be a complex component. In a specific embodiment, a media component itself may be a presentable component and may be included in a complex component as a sub-media component of a complex component. For example, a service may include a basic 2D video component and a complex 3D component. At this point, a 2D video component is a presentable component that is playable as a 2D image without a 3D video component. Additionally, as one view of a 3D image, the 2D video component may be played as a 3D image together with another 3D video component.

Additionally, in another specific embodiment, a presentable audio component may be a PickOne component including a main component, music, dialog, and sound effect. At this point, a main component and a music component may be a PickOne component including a plurality of elementary components encoded with different bitrates. Additionally, a media component representing dialog and sound effect may be an elementary component.

FIG. 35 is a view illustrating a configuration of a complex video component according to an embodiment of the present invention.

A presentable component may be a composite component. Like the embodiment of FIG. 35, scalable video encoding may include a plurality of media components as a composite component. The scalable video encoding may include a base layer component that is an elementary component, a first enhancement layer component, and a second enhancement layer component. At this point, the base layer component is a presentable component that is playable without the first enhancement layer component and the second enhancement layer component. Additionally, the base layer component may be played as a high quality image together with at least one of the first enhancement layer component and the second enhancement layer component. At this point, the first enhancement layer component and the second enhancement layer component are components unplayable without the base layer component and are supposed to be played together with the base layer component. Therefore, the first enhancement layer component and the second enhancement layer component cannot be called a presentable component. At this point, the broadcast reception device 100 may combine the base layer component with the first enhancement layer component and the second enhancement layer component to play an image on the basis of the capabilities of the broadcast reception device 100. In more detail, when the capabilities of the broadcast reception device 100 are low, the broadcast reception device 100 may play a relatively low quality image by using the base layer component. Or, when the capabilities of the broadcast reception device 100 are relatively high, the broadcast reception device 100 may combine the base layer component with the first enhancement layer component and the second enhancement layer component to play a relatively high quality image. Or, when the capabilities of the broadcast reception device 100 are very high, the broadcast reception device 100 may combine the base layer component with the first enhancement layer component and the second enhancement layer component to play a very high quality image.

FIG. 36 is a view illustrating a complex video component according to another embodiment of the present invention.

A presentable component may be a PickOne component. According to the embodiment of FIG. 36, a PickOne component may include 2D encoding and 3D encoding in side-by-side format. At this point, the 3D encoding is divided into a left view and a right view. The left view and the right view are encoded each to be half the view width and disposed side-by-side to generate a picture. The broadcast reception device 100 may select one of the 2D encoding and the 3D encoding according to the capabilities of the broadcast reception device 100 and may then play the selected one. In more detail, when the broadcast reception device 100 does not support a 3D image, it may select and play the 2D encoding. Additionally, when the broadcast reception device 100 supports a 3D image, it may select and play the 3D encoding.

In such a way, each service may be described through a presentable component therein. Additionally, when the presentable component is a complex component, it may be described through components including the complex component. In a specific embodiment, each presentable audio component may represent the voice of a specific scene and each presentable video component may represent the picture of a specific scene captured at a specific angle. In the case of a simple combination, the presentable component may be an elementary component. As described above, each presentable component may be a complex component. This will be described with reference to FIG. 37.

FIG. 37 is a view illustrating a complex video component according to another embodiment of the present invention.

A presentable component may be a composite component and a component that a composite component includes may be a PickOne component. In the embodiment of FIG. 37, a presentable video component includes a 3D image left view video component and a 3D image right view video component. The left view video component and the right view video component are PickOne components. Accordingly, the left view video component and the right view video component include a plurality of elementary components encoded with different bitrates.

When the type and role of a media component are defined as in the embodiment of FIG. 63, the relationship and structure of a media component that a service includes may be described efficiently and simply. Accordingly, by using this, a broadcast transmission device may signal services efficiently and simply and also by using this, the broadcast reception device 100 may obtain service signaling information efficiently and simply.

Various broadcast service models are described with reference to FIGS. 38 to 41.

FIG. 38 is a view illustrating a media component configuration of an audio service according to an embodiment of the present invention.

The audio service may include one or more audio components. Additionally, the audio service may include a closed caption component. Additionally, the audio component may include adjunct data service. At this point, an adjunct service may be a Non-Real-Time (NRT) service. Additionally, according to a specific embodiment of the present invention, an audio service may be transmitted through continuous stream according to a predetermined schedule. According to a specific embodiment of the present invention, audio service may be referred to as radio service.

FIG. 39 is a view illustrating a configuration of a broadcast service including both audio and video according to an embodiment of the present invention.

The broadcast service including both audio and video may include one or more main video components. At this point, the broadcast service including both audio and video may include an adjunct video component. At this point, the broadcast service including both audio and video may include an audio component. Moreover, the broadcast service including both audio and video may include a closed caption component. Furthermore, the broadcast service including both audio and video may include an adjunct service data component. According to a specific embodiment of the present invention, a service including both audio and video may be referred to as TV service.

FIG. 40 is a view illustrating a configuration of a user request content service according to an embodiment of the present invention.

A Contents On Demand (CoD) service may include an application providing a user interface. Additionally, the CoD service may include a content item provided in response to a user request. Additionally, the CoD service may include a catalog of a content item. At this point, the catalog may be embedded in an application.

FIG. 41 is a view illustrating a configuration of a stand-alone data service according to an embodiment of the present invention.

A stand-alone data service may include one or more content items configuring a service. In a specific embodiment, a stand-alone NRT data service may be referred to as an App service.

A plurality of broadcast services may share a media component. In more detail, each of media components that the above-described audio service, broadcast service including both audio and video, and stand-alone data service include may relate to one or more other components. At this point, one or more other components may include a service encoded by another method representing the same base content.

Additionally, a broadcast service may include as a property at least one of a service identifier, a service form, a description of a service, a service name, a channel number, a graphic icon, a list of components in a service, a property for broadcast service protection, a property on targeting/personalization, a contents advisory rating, a language of a service, a list of adjunct NRT data services relating to service, and a property on broadcast service user report. At this point, a service name may be displayed in a plurality of languages. Additionally, a graphic icon may be used to represent a service. Additionally, a service language may represent a primary language used in service. Additionally, the service form may include at least one of a scheduled audio service transmitted according to a planned schedule, a service including scheduled audio and video transmitted according to a planned schedule, a user request service transmitted in response to a user request, and a scripted NRT data service. Additionally, the channel number may include a major channel number and a minor channel number in detail. Additionally, the channel number may be displayed as a virtual channel number. Moreover, a plurality of broadcast services may use the same graphic icon. Additionally, the service identifier may have a unique value in a broadcast area where a broadcast service is broadcasted. Additionally, the service identifier may include identifiers of two categories, for example, a local identifier and a regional identifier. The local identifier may be used for services broadcasted only in one broadcast area. Accordingly, a plurality of broadcast services broadcasted in a plurality of different broadcast areas may have the same regional identifier. The local identifier may be used for broadcast service identification when the same broadcast is available in a plurality of broadcast areas.

In order to signal the properties of such a broadcast service, the above-described broadcast signaling table may be used.

Each continuous component may have a plurality of properties. At this point, the plurality of languages may be divided into a plurality of types. In a specific embodiment, a plurality of properties that a continuous component has may include a basic continuous component property, an elementary component property, a complex component property, and a presentable component property.

The basic continuous component property is applied to all continuous components. The basic continuous component property may include at least one of a unique content identifier, a content structure, and a content type. At this point, the content structure may represent one of a basic component and a PickOne component. Additionally, the content type may represent one of audio, video, and a closed caption.

The elementary component property is applied to an elementary component. The elementary component property may include the basic feature of component encoding. For example, the elementary component property may include a video resolution. Additionally, the elementary component property may include the number of audio channels.

The complex component property is applied to a complex component. The complex component property may include at least one of media components that a complex component includes and the role of the media components. In more detail, the role of the media components may represent that an audio component is a dialog track. Additionally, the role of media components may represent that a video component is the left view of a 3D image.

Each service may include one or more media components. Additionally, each media component may include at least one as a property among a component identifier for identifying a media component, the type of a component, description for a component, a targeting/personalization property, a service protection property, a target device, contents advisory rating, and related component information. At this point, a value of a component identifier may be unique between components of a broadcast service. The target device may represent one among a primary device and a companion device. Additionally, the service signaling table may include media component information signaling a property of such a media component. In more detail, the service signaling table may include media component information as component level information. This will be described with reference to FIG. 42.

FIG. 42 is a view illustrating media component information according to an embodiment of the present invention.

The media component information may include information representing the type of a media component, information on whether information on a target device is included, target device information representing a target device, text information describing a media component, a component encoding parameter according to the type of a media component, and information on a complex component in the case of a complex component that a media content includes.

The media component information may include a descriptor_tag field, a descriptor_length_field, a component_type field, a target device flag field, a target_device field, a text length field, a text char field, a component_data type field, a component_data field, and a complex_component_data field.

The descriptor_tag field represents that media component information is included. According to a specific embodiment of the present invention, the descriptor_tag field may be an 8-bit field.

The descriptor_length_field represents the length after the descriptor_length_field. According to a specific embodiment of the present invention, the descriptor_length_field may be an 8-bit field.

The component_type field represents the type of a media component. According to a specific embodiment of the present invention, a value of the component_type field may represent one among the above-described elementary component, composite component, and adaptive component. In more detail, when a value of the component_type field is 0x00, a corresponding media component represents an elementary component. When a value of the component_type field is 0x01, a corresponding media component represents a composite component. When a value of the component_type field is 0x02, a corresponding media component represents an adaptive component. According to a specific embodiment of the present invention, the component_type field may be a 4-bit field.

The target_device_flag field represents whether the target_device field is included. According to a specific embodiment of the present invention, the target_device_flag may be a 1-bit field.

The target_device field represents a target device where a corresponding component is executed. According to a specific embodiment of the present invention, a value that the target_device field has may represent whether a corresponding component is executed only in a primary device, only in a companion device, or in both primary device and a companion device. In more detail, when a value of the target_device field is 0x01, it represents that a corresponding component is executed only in a primary device. When a value of the target_device field is 0x02, it represents that a corresponding component is executed only in a companion device. When a value of the target_device field is 0x03, it represents that a corresponding component is executed in both a primary device and a companion device. According to a specific embodiment of the present invention, the target_device field may be a 3-bit field.

The text_length field represents the length of the text_char field. According to a specific embodiment of the present invention, the text_length field may be an 8-bit field.

The text_char field is a text for describing a media component.

The component_data type field represents an encoding type of a corresponding component. In more detail, the component_data type field may have the same value as that in the embodiment of FIG. 43. In more detail, when a value of the component_type field is 35, it may represent that a media component is an H.264/AVC component. In more detail, when a value of the component_data type field is 36, it may represent that a media component is an SVC enhancement layer stream component. In more detail, when a value of the component_data type field is 37, it may represent that a media component is an HE AAC v2 audio stream component. In more detail, when a value of the component_data type field is 38, it may represent that a media component is transmitted through a FLUTE file transmission session. In more detail, when a value of the component_data type field is 39, it may represent that a media component is an STKM stream component. In more detail, when a value of the component_data type field is 40, it may represent that a media component is an LTKM stream component. In more detail, when a value of the component_data type field is 41, it may represent that a media component is an OMA-RME DIMS stream component. In more detail, when a value of the component_data type field is 42, it may represent that a media component is an NTP time base stream component. In more detail, when a value of the component_data type field is 70, it may represent that a media component is an HEVC video stream component. In more detail, when a value of the component_data type field is 71, it may represent that a media component is transmitted through an ISO BMFF. According to a specific embodiment of the present invention, the component_type field may be an 8-bit field.

The component_data field represents an encoding parameter of a component. A parameter that an encoding parameter includes may vary according to an encoding type of a component. In more detail, a parameter that an encoding parameter includes may vary according to a value of the component_type field.

When the type of a media component is a complex type, for example, a composite component or an adaptive component, the complex_component_data field represents information on a complex component. This will be described in more detail with reference to FIGS. 44 and 45. Additionally, component information is described through a bit stream format, but component information may be in another format such as an XML file format.

FIG. 44 is a view illustrating complex component information according to an embodiment of the present invention.

The complex component information may include at least one of information representing a set form of component, information on whether information on a target device is included, target device information representing a target device, the number of sub media components that a corresponding complex component includes, information on the type of a media that a sub media component includes and a role of a sub media component when a corresponding complex component is a composite component.

In more detail, as shown in FIG. 44, the complex component information may include at least one of an aggregation_type field, a num_sub_component field, a sub_component_id field, a general_media_type field, and a sub_component_role field.

The aggregation type field represents the type of a set that a corresponding component belongs. In more detail, a value of the aggregation type field represents either a composite component or an adaptive component. According to a specific embodiment of the present invention, the aggregation type field may be a 3-bit field.

The target_device_flag field represents whether the target_device field is included. According to a specific embodiment of the present invention, the target_device_flag may be a 1-bit field.

The target_device field represents a target device where a corresponding component is executed. According to a specific embodiment of the present invention, a value that the target_device field has may represent whether a corresponding component is executed only in a primary device, only in a companion device, or in both primary device and a companion device. In more detail, when a value of the target_device field is 0x01, it represents that a corresponding component is executed only in a primary device. When a value of the target_device field is 0x02, it represents that a corresponding component is executed only in a companion device. When a value of the target_device field is 0x03, it represents that a corresponding component is executed in both a primary device and a companion device. According to a specific embodiment of the present invention, the target_device field may be a 3-bit field.

The num_sub_component field represents the number of sub media components that a corresponding complex component includes. According to a specific embodiment of the present invention, the num_sub_component field may be an 8-bit field.

The sub_component_id field represents a sub media component identifier for identifying a sub media component. According to a specific embodiment of the present invention, the sub_component_id field may be an 8-bit field.

When a corresponding complex component is a composite component, the general_media_type field represents the type of a media that a sub media component includes. In more detail, a value of the general_media_type field may represent one among video, audio, text, application, and message. In more detail, when a value of the general_media_type field is 0x00, it represents that a media that a sub media component includes video. When a value of the general_media_type field is 0x01, it represents that a media that a sub media component includes audio. When a value of the general_media_type field is 0x02, it represents that a media that a sub media component includes text. When a value of the general_media_type field is 0x03, it represents that a media that a sub media component includes application. When a value of the general_media_type field is 0x04, it represents that a media that a sub media component includes message. According to a specific embodiment of the present invention, the general_media_type field may be a 4-bit field.

The sub_component_role field represents the role of each sub media component. In more detail, a value of the sub_component_role field may represent that a sub media component is an enhancement layer for scalable video encoding. According to another specific embodiment of the present invention, a value of the sub_component_role field may represent that a sub media component is one among the right image, left image, and depth information of a 3D image. According to another specific embodiment of the present invention, a value of the sub_component_role field may represent that a sub media component is a video at a specific position of a screen divided into a plurality of areas. According to the type of a media that a sub media component includes, information that the sub_component_role field represents may vary. According to a specific embodiment of the present invention, the sub_component_role field may be an 8-bit field.

Such complex component information may be included in a complex component descriptor as shown in the embodiment of FIG. 45. Additionally, complex component information is described through a bit stream format, but the complex component information may be in another format such as an XML file format.

As described above, media components may have a predetermined relationship to each other. For example, one closed caption component may relate to one or more audio components. Additionally, in order to signal a relationship between such media components, the service signaling table may include related component list information. In more detail, the service signaling table may include related component list information as component level information. The related component list information will be described in more detail with reference to FIG. 46.

FIG. 46 is a view illustrating related component list information according to an embodiment of the present invention.

The related component list information may include at least one of a component identifier for identifying a component, information representing the type of a media component, information representing the encoding format of a media component, and information representing the type of media that a media component includes.

In more detail, as shown in the embodiment of FIG. 47, the related component list information may include at least one of a descriptor_tag field, a descriptor_length_field, a num_associated_component field, a component_id field, a component_type field, a component_data type field, and a general_media_type field.

The descriptor_tag field represents that related component list information is included. According to a specific embodiment of the present invention, the descriptor_tag field may be an 8-bit field.

The descriptor_length_field represents the length after the descriptor_length_field. According to a specific embodiment of the present invention, the descriptor_length_field may be an 8-bit field.

The num_associated_component field represents the number of media components relating to a corresponding media component. According to a specific embodiment of the present invention, the num_associated_component field may be an 8-bit field.

The component_id field represents an identifier for identifying a related media component. According to a specific embodiment of the present invention, the component_id field may be an 8-bit field.

The component_type field represents the type of a media component. According to a specific embodiment of the present invention, a value of the component_type field may represent one among the above-described elementary component, composite component, and adaptive component. In more detail, when a value of the component_type field is 0x00, a related media component represents an elementary component. When a value of the component_type field is 0x01, a related media component represents a composite component. When a value of the component_type field is 0x02, a related media component represents an adaptive component. According to a specific embodiment of the present invention, the component_type field may be a 4-bit field.

The component_data type field represents an encoding type of a corresponding component. In more detail, the component_data type field may have the same values as those in FIG. 43. According to a specific embodiment of the present invention, the component_type field may be an 8-bit field.

The general_media_type field represents the type of a media that a related media component includes. In more detail, a value of the general_media_type field may represent one among video, audio, text, application, and message. In more detail, when a value of the general_media_type field is 0x00, it represents that a media that a related media component includes video. When a value of the general_media_type field is 0x01, it represents that a media that a related media component includes audio. When a value of the general_media_type field is 0x02, it represents that a media that a related media component includes text. When a value of the general_media_type field is 0x03, it represents that a media that a related media component includes application. When a value of the general_media_type field is 0x04, it represents that a media that a related media component includes message. According to a specific embodiment of the present invention, the general_media_type field may be an 8-bit field.

An audio component may include at least one as a property among a component identifier for identifying a media component, the type of a component, description for a component, a targeting/personalization property, a service protection property, a target device, and related component information. At this point, a value of a component identifier may be unique between components of a broadcast service. The target device may represent one among a primary device, a companion device, and both a primary device and a companion device.

When the audio component is an elementary component, it may include a property for encoding format including codec, the number of channels, a bitrate, and a compression parameter. Additionally, when the audio component is an elementary component, it may include language information of audio as a property. The mode of the audio component may be included as a property. At this point, the mode of the audio component may be one among complete main audio, dialog, effect sound, and audio for the visually impaired, audio for the hearing-impaired, commentary, and voice over.

When the audio component is a complex component, it may include at least one as a property among information representing the type of aggregation, a list of included media components, and the role of an included component in the case of a composite component. The form of a set may be one of a composite component and an adaptive component, that is, a PickOne component.

When the audio component is a top level component, it may include at least one as a property among contents advisory rating and information on a related closed caption component.

When an audio component is a presentable component, it may have as a property at least one of targeting/personalization, Content advisory rating, content/service protection, a target screen, and a related closed caption component. At this point, the target screen property may represent at least one of a primary screen, a companion screen, and a screen partially inserted into the primary screen, for example, Picture In Picture (PIP).

The closed caption component may include at least one as a property among a component identifier, the type of a component, a targeting/personalization property, a service protection property, a target device, and an audio component identifier relating to a closed caption component. At this point, a value of a component identifier may be unique between components of a broadcast service. The target device may represent one among a primary device, a companion device, and both a primary device and a companion device.

When the closed caption component is an elementary component, the closed caption component may include its language kind and form, as a property. In more detail, the form of a closed caption component may be one among a general closed caption or an Easy-reader closed caption.

When the closed caption component is an adaptive component, it may include a media component therein, as a property.

When the closed caption component is a top level component, it may include contents advisory rating as a property.

When a closed caption component is a presentable component, it may have as a property at least one of targeting/personalization, Content advisory rating, content/service protection, and a target screen. At this point, the target screen property may represent at least one of a primary screen, a companion screen, and a screen partially inserted into the primary screen, for example, Picture In Picture (PIP).

The video component may include at least one as a property among a component identifier for identifying a media component, the type of a component, a targeting/personalization property, a service protection property, the role of a video component, a target screen, and an NRT data service relating to a video component. At this point, a value of a component identifier may be unique between components of a broadcast service. The role of a video component may be one among an alternative camera view, an alternative video component, a sign language screen, and a follow subject video. The target device may represent one among a primary device, a companion device, both a primary device and a companion device, and a Picture In Picture (PIP) screen. When the NRT data service relating to a video component is not included, all additional NRT data services are connected to a video component.

When the video component is an elementary component, it may include at least one as a property among codec, an encoding format including a compression parameter or the like, a resolution including horizontal and vertical pixel values, an aspect ratio, a scanning method representing whether it is interlace or progressive, a frame rate, and a still picture mode. Additionally, the video component may include an encoding parameter as a property. At this point, the type of a specific encoding parameter may vary depending on codec of a video component.

When the video component is a complex component, it may include an aggregation form and a media component list that the complex component includes, as a property.

When the video component is a composite component among complex components, it may include the role of each media component that the composite component includes, as a property. At this point, the role of a media component may represent an enhancement layer for scalable video encoding. According to another specific embodiment of the present invention, the role of a media component may represent one among the right image, left image, and depth information of a 3D image. According to another specific embodiment of the present invention, the role of a media component may represent a video at a specific position of a screen divided into a plurality of areas. According to another specific embodiment of the present invention, the role of a media component may be Follow-Subject metadata that is a screen displayed according to a specific subject. Such Follow-Subject metadata may include at least one of a subjects' name, a subject's position, and a subject's size. When a Follow-Subject function is supported by metadata in frame unit of stream, the Follow-Subject metadata may represent an area of a main video component where a subject is focused.

When the video component is a top level component among complex components, it may include at least one as a property among contents advisory rating and a related audio component.

When a video component is a presentable component, it may have as a property at least one of targeting/personalization, Content advisory rating, content/service protection, a target screen, and a related audio presentable component, and related closed caption presentable component. At this point, the target screen property may represent at least one of a primary screen, a companion screen, and a screen partially inserted into the primary screen, for example, Picture In Picture (PIP).

The NRT data service may be a stand-alone service not depending on another service. Additionally, the NRT data service may be an adjunct NRT data service depending on another service. At this point, the adjunct NRT data service may be part of radio service. Moreover, the adjunct NRT data service may be part of TV service. The NRT data service may have a common property for all services, for example, a service identifier. Furthermore, the NRT data service and the NRT service may have a common property.

A consumption model may represent at least one of Push, Portal, Push Scripted, Portal Scripted, Triggered, and Segment Delivery.

In Push, NRT data service provides service on the basis of a request. The broadcast reception device 100 provides to a user an option for automatically updating an NRT data service relating to service. In more detail, the broadcast reception device 100 receives from a user an input for auto update of an NRT data service relating to service. When an input for auto update of an NRT data service relating to service is received from a user, the broadcast reception device 100 caches a content relating to service and the latest version of an auto update file in order for user. When an input for push service is received from a user, the broadcast reception device 100 displays a pre-loaded content.

Portal provides an experience as if a user accessed NRT data service through a web browser. At this point, files used for NRT data service need to support text/graphic rendering.

Push Scripted is similar to Push. However, there is a difference in that Push Scripted provides a Declarative Object providing a user interface of a specific broadcaster for service.

Portal Scripted is similar to Portal. However, there is a difference in that Portal Scripted provides a Declarative Object providing a user interface of a specific broadcaster for service.

Triggered is a consumption model used in bi-directional adjunct NRT data service. In an example of typical Triggered, in order to improve user experience, a Declarative Object in which adjunct NRT data service for A/V virtual channel is synchronized is delivered.

Segment delivery provides the delivery of a segment and an application for supporting the insertion of a targeted content of a program. A segment divides a program into a plurality of time spans. A targeting segment provides a content based on the characteristics of a user and the characteristics of the broadcast reception device 100 as a specific segment. In more detail, the broadcast reception device 100 may play a content based on the characteristics of a user and the characteristics of the broadcast reception device 100 as a specific segment. In more detail, a segment delivery consumption model is not displayed to a user (for example, behind scene) and is used to insert a targeting content into the middle of a radio program or a TV program. For example, the broadcast reception device 100 displays a targeting advertisement based on the characteristics of a user during the middle of a radio program or a TV program. Such NRT data service is not provided by a user's selection. Such NRT data service may be opened by an inserted targeting application, a collection of segments targeted for insertion, and an application and may deliver at least one of consumed other files as a content item. At this pint, it is selected that which segment and what time the inserted targeting application is inserted. Additionally, the targeting application may notify such insertion to the broadcast reception device 100. Additionally, the targeting application may perform a report function. Additionally, other files opened and consumed by an application may be encrypted to be interpreted by only a corresponding application.

The broadcast reception device 100 may perform the following operations in order for segment delivery. The broadcast reception device 100 may download and cache an application in advance in order not to download the application repeatedly each time a user selects radio service or TV service including adjunct NRT data service. Additionally, the broadcast reception device 100 may pre-download a targeted segment and may cache an expiration date. Through this, the broadcast reception device 100 may provide a targeted segment to a user immediately. Additionally, the broadcast reception device 100 may execute an application. Additionally, when an application notifies that a specific segment is inserted, the broadcast reception device 100 may insert the specific segment.

A target device may represent one of a primary device and a companion device, or both a primary device and a companion device.

A content item of data service may have as a property at least one of a content item identifier, the name of a content item, a file set including content items, a display for representing whether the update of a content item is to be monitored, an available window representing a download available time, an expiration data representing a time at which a content item is discarded, a content item size, the playback length of a content item, a targeting/personalizing property, service/content protection, and content advisory rating.

Additionally, each additional NRT service may include a target screen as a property. At this point, the target screen may represent one among a primary device, a companion device, and both a primary device and a companion device.

Such an NRT data property may be signaled through an NRT information table. This will be described with reference to FIG. 47.

FIG. 47 is a view of an NRT information table according to an embodiment of the present invention.

The NRT information table may include an NRT service identifier and an NRT information block.

According to a specific embodiment of the present invention, as shown in the embodiment of FIG. 47, the NRT information table may include at least one of a table_id field, section_syntax_indicator field, private_indicator field, section_length field, table_id_extension field, version_number field, current_next_indicator field, section_number field, last_section_number field, service_id field, and NRT information block field.

The table_id field represents the identifier of an NRT information table. At this point, a value of the table_id field may be one of reserved id values defined in ATSC A/65. According to a specific embodiment of the present invention, the table_id field may be an 8-bit field.

The section_syntax_indicator field represents whether an NRT information table is a private section table in the long format of MEPG-2 TS standard. According to a specific embodiment of the present invention, the section_syntax_indicator field may be a 1-bit field.

The private_indicator field represents whether a current table corresponds to a private section. According to a specific embodiment of the present invention, the private_indicator field may be a 1-bit field.

The section_length field represents the length of a section after the section_length field. According to a specific embodiment of the present invention, the section_length field may be a 12-bit field.

The table_id_extension field represents a value for identifying an NRT information table in combination with the table_id field. Especially, the table_id field may include a protocol_version field representing a protocol version of an NRT information table. According to a specific embodiment of the present invention, the protocol_version field may be an 8-bit field. Especially, the table_id_extension field may include a subnet_id field identifying a subnet that an NRT information table transmits. According to a specific embodiment of the present invention, the subnet_id field may be an 8-bit field.

The version_number field represents a version of an NRT information table. The broadcast reception device 100 may determine the availability of an NRT information table on the basis of a value of the version_number field. In more detail, when a value of the version_number field is identical to a version of a previously received service signaling table, the information of the NRT information table may not be used. According to a specific embodiment of the present invention, the version_number field may be a 5-bit field.

The current_next_indicator field represents whether information of an NRT information table is currently available. In more detail, when a value of the current_next_indicator field is 1, it may represent that an NRT information table is available. Moreover, when a value of the current_next_indicator field is 1, it may represent that information of an NRT information table is available next time. According to a specific embodiment of the present invention, the current_next_indicator field may be a 1-bit field.

The section_number field represents a current section_number. According to a specific embodiment of the present invention, the section_number field may be an 8-bit field.

The last_section_number field represents the last_section_number. When the size of an NRT information table is large, the NRT information table may be divided into a plurality of sections and then transmitted. At this point, the broadcast reception device 100 determines whether all sections necessary for an NRT information table are received on the basis of the section_number field and the last_section_number field. According to a specific embodiment of the present invention, the last_section_number field may be an 8-bit field.

The service_id field represents a service identifier for identifying an NRT service. According to a specific embodiment of the present invention, the service_id field may be a 16-bit field.

The NRT information block field represents an NRT information block. This will be described in more detail with reference to FIG. 48.

FIG. 48 is a view illustrating an NRT information block according to an embodiment of the present invention.

The NRT information block may include at least one of descriptors including information representing the start time of a time span that the NRT information block signals, information representing the length of a time span that the NRT information block signals, the number of content items that the NRT information block signals, content identification information identifying a corresponding content item, information on whether a corresponding content item is updated periodically, information on whether content protection is applied to files that a corresponding content item includes, information representing whether a corresponding content item is a master content item executed when service is selected, information on whether the NRT information block includes the length of a playback time of a corresponding content, the length of a playback time of a corresponding content, information on whether the NRT information block includes the playback delay time of a corresponding content, the playback delay time of a corresponding content, information on whether the NRT information block includes the expiration time of a corresponding content item, the expiration time of a content item, information on whether the NRT information block includes the size of a corresponding content item, the size of a corresponding content item, information on whether the NRT information block includes information on a target device of NRT service, information on a target device of NRT service, information on whether a corresponding content item is received through a broadcast network, information on whether a corresponding content item is received through an internet network, the name of a corresponding content item, and specific information on a corresponding content.

In more detail, as shown in the embodiment of FIG. 49, the NRT information block may include at least one of a time_span_start field, time_span_length field, a num_content_items_in_section field, a content_id, an updates_available field, a content_security_conditions_indicator field, a master_item field, a playback_length_included field, a palybace_Delay_included field, an expiration_included field, a content_size_included field, an available_in_broadcast field, a target_included field, a playback_length_in_seconds field, a playback_delay field, an expiration_field, a content_size field, a target_field, a content_name_text field, and a content_descriptor field.

In more detail, as shown in the embodiment of FIG. 49, the NRT information block may include at least one of a time_span_start field, time_span_length field, a num_content_items_in_section field, a content_id, an updates_available field, a content_security_conditions_indicator field, a master_item field, a playback_length_included field, a palybace_Delay_included field, an expiration_included field, a content_size_included field, an available_in_broadcast field, a target_included field, a playback_length_in_seconds field, a playback_delay field, an expiration_field, a content_size field, a target field, a content_name_text field, and a content_descriptor field.

The time_span_start field represents the start time of a time span that the NRT information block signals. According to a specific embodiment of the present invention, the time_span_start field may be a 32-bit field.

The time_span_length field represents the length of a time span that the NRT information block signals. According to a specific embodiment of the present invention, the time_span_length field may be a 16-bit field.

The NRT_content_items_in_section field represents the number of content items that the NRT information block signals. According to a specific embodiment of the present invention, the NRT_content_items_in_section field may be an 8-bit field.

The content id field represents information for identifying a corresponding content item. According to a specific embodiment of the present invention, the content id field may be a 32-bit field.

The updates_available field represents whether a corresponding content item is updated. According to a specific embodiment of the present invention, the updates_available field may be a 1-bit field.

The content_security_conditions_indicator field represents whether a content protection is applied to at least one of files that a corresponding content item includes. According to a specific embodiment of the present invention, the content_security_conditions_indicator field may be a 1-bit field.

The master_item field represents whether a corresponding content item is a master content item. In more detail, the master_item field represents whether a corresponding content item is a content item that needs to be executed when a corresponding NRT service is selected. According to a specific embodiment of the present invention, the master_item field may be a 1-bit field.

The playback_length_included field represents whether the NRT information block includes the length of a playback time of a corresponding content item. According to a specific embodiment of the present invention, the playback_length_included field may be a 1-bit field.

The playback_Delay_included field represents whether the NRT information block includes delay playback time information of a corresponding content item. According to a specific embodiment of the present invention, the playback_Delay included field may be a 1-bit field.

The expiration_included field represents whether the NRT information block includes the expiration time of a corresponding content item. According to a specific embodiment of the present invention, the expiration_included field may be a 1-bit field.

The content_size_included field represents whether the NRT information block includes the size of a corresponding content item. According to a specific embodiment of the present invention, the content_size_included field may be a 1-bit field.

The available_in_broadcast field represents whether a corresponding content item is obtained through a broadcast network. According to a specific embodiment of the present invention, the available_in_broadcast field may be a 1-bit field.

The available_in_internet field represents whether a corresponding content item is obtained through an internet network. According to a specific embodiment of the present invention, the available_in_internet field may be a 1-bit field.

The target_included field represents whether the NRT information block includes information on a target device. According to a specific embodiment of the present invention, the target_included may be a 1-bit field.

The playback_length_in_seconds field represents the length of a playback time of a corresponding content item. According to a specific embodiment of the present invention, the playback_length_in_seconds field may represent a length in seconds. Additionally, according to a specific embodiment of the present invention, the playback_length_in_seconds field may be a 24-bit field.

The playback_delay field represents the playback_delay time of a corresponding content item. According to a specific embodiment of the present invention, the playback_delay field may be a 24-bit field.

The expiration field represents the expiration time of a corresponding content item. According to a specific embodiment of the present invention, the expiration field may be a 32-bit field.

The content size field represents the size of a corresponding content item. According to a specific embodiment of the present invention, the content size field may be a 40-bit field.

The target field represents target device information of a corresponding content item. According to a specific embodiment of the present invention, when a value of the target field is 0x01, it represents that a target device is only a primary device. According to a specific embodiment of the present invention, when a value of the target field is 0x02, it represents that a target device is one or more companion devices. Additionally, according to a specific embodiment of the present invention, when a value of the target field is 0x03, it represents that a target device is both a primary device and one or more companion devices.

The content_name_length field represents the length of the content_name_text field. According to a specific embodiment of the present invention, the content_name_length field may be an 8-bit field.

The content_name_text field represents the name of a corresponding content item.

The content descriptor field represents one or more NRT service descriptors including specific information on a content item. This will be described in more detail with reference to FIG. 49. FIG. 49 is a view of an NRT service descriptor according to an embodiment of the present invention.

The NRT service descriptor may include at least one of information representing a consumption model of NRT service, information on whether to update NRT service automatically, information on whether information representing a minimum storage space necessary for NRT service is included, information on whether information representing the default size of a content item is included, information on a target device, information representing a minimum storage space for NRT service, and information on the default size of a content item.

According to a specific embodiment of the present invention, the NRT service descriptor may include at least one of a consumption_model field, auto-update field, a storage_reservation_present field, a decault_content_size_present field, a target_include field, a storage reservation field, and a default content size field.

The consumption model field represents a consumption model of NRT service. According to an embodiment of the present invention, when a value of the consumption_model field is 0x00, it represents that a consumption model of NRT service is Push. According to an embodiment of the present invention, when a value of the consumption_model field is 0x01, it represents that a consumption model of NRT service is Portal. According to an embodiment of the present invention, when a value of the consumption_model field is 0x02, it represents that a consumption model of NRT service is Scripted Push. According to an embodiment of the present invention, when a value of the consumption_model field is 0x03, it represents that a consumption model of NRT service is Scripted Portal. According to an embodiment of the present invention, when a value of the consumption_model field is 0x04, it represents that a consumption model of NRT service is Triggered. According to an embodiment of the present invention, when a value of the consumption_model field is 0x05, it represents that a consumption model of NRT service is Segment Delivery. According to a specific embodiment of the present invention, the consumption_model field may be a 6-bit field.

The auto-update field represents that auto-update service is provided. According to a specific embodiment of the present invention, the auto-update field may be a 1-bit field.

The storage_reservation_present field represents whether information on the size of a minimum storage space necessary for executing NRT service is included. According to a specific embodiment of the present invention, the storage_reservation_present field may be a 1-bit field.

The decault_content_size_present field represents whether information representing the default size of a content item is included. According to a specific embodiment of the present invention, the decault_content_size_present field may be a 1-bit field.

The target include field represents whether information on a target device is included. According to a specific embodiment of the present invention, the target_include may be a 1-bit field.

The storage reservation field represents the size of a minimum storage space necessary for executing NRT service. According to a specific embodiment of the present invention, the storage reservation field may be a 24-bit field.

The default content size field represents the default size of a content item. According to a specific embodiment of the present invention, the default content size field may be a 40-bit field.

The above described NRT information block and NRT service descriptor are described in a bit stream format. However, the NRT information block and the NRT service descriptor are not limited to a bit stream format and thus may be in another format. For example, the NRT information block and the NRT service descriptor may be in an XML file format.

Additionally, in order to signal the graphic icon of a broadcast service, a program or a show segment including the primary content of a program among a plurality of time spans, a broadcast service signaling table, program information, or segment information may include the graphic icon information. Especially, the broadcast service signaling table may include graphic icon service as service level information. Additionally, the program information may include graphic icon information as program level information. Additionally, the segment information may include graphic icon information as segment level information.

FIG. 50 is a view illustrating graphic icon information according to an embodiment of the present invention.

The graphic icon information may include at least one of an icon identifier, an icon transmission mode representing an icon transmission method, information representing whether the position of an icon is specified, coordinate system information representing coordinates that are the base of an icon position, horizontal coordinates information representing the horizontal coordinates of an icon, vertical coordinates information representing the vertical coordinates of an icon, information representing the image form of an icon, URL information representing the position where an icon image is stored, and icon data itself.

In more detail, as shown in the embodiment of FIG. 50, the graphic icon information may include at least one of a descriptor_tag field, a descriptor_length_field, a descriptor_number field, a last_descriptor_number field, an icon_id field, an icon_transport_mode field, a position_flag field, a coordinate_system field, an icon_horizontal_origin field, an icon_vertical_origin field, an icon_type_length field, an icon_type_chars field, an icon_data_length field, an icon_data_byte field, a url_length field, a url field, and an icon_content_linkage field.

The descriptor_tag field represents that icon information is included. According to a specific embodiment of the present invention, the descriptor_tag field may be an 8-bit field.

The descriptor_length_field represents the length of icon information after this field. According to a specific embodiment of the present invention, the descriptor_length_field may be an 8-bit field.

The descriptor_number field represents the order of the current descriptor when icon information is divided into a plurality of descriptors and transmitted. According to a specific embodiment of the present invention, in the case of a descriptor transmitted first, a value of the descriptor_number field may be 0x00. According to a specific embodiment of the present invention, a value of the descriptor_number field may be increased by one. According to a specific embodiment of the present invention, the descriptor_number field may be a 4-bit field.

The last_descriptor number field represents the number of the last descriptor. According to a specific embodiment of the present invention, the last_descriptor number field may be a 4-bit field.

The icon_id field represents an icon identifier for identifying an icon. According to a specific embodiment of the present invention, the icon_id field may be an 8-bit field.

The icon_transport_mode field represents an icon transmission method. In more detail, a value of the icon_transport_mode field may represent one among when an icon image is transmitted through graphic icon information itself, when an icon image is linked through URL, and an icon image is transmitted through a FLUTE session. According to a specific embodiment of the present invention, as shown in the embodiment of FIG. 51, when a value of the icon_transport_mode field is 0x00, it represents that an icon image is transmitted through graphic icon information itself. When a value of the icon_transport_mode field is 0x01, it represents that an icon image is linked through URL. When a value of the icon_transport_mode field is 0x02, it represents that an icon image is transmitted through a FLUTE session. According to a specific embodiment of the present invention, the icon_transport_mode field may be a 2-bit field.

The position_flag field represents whether the position of an icon is specified. According to a specific embodiment of the present invention, the position_flag field may be a 1-bit field.

The coordinate system field represents coordinates that is the base of an icon position. In more detail, when a value of the coordinate system field may represent at least one of when a coordinate system is configured with 720×576 coordinates, when a coordinate system is configured with 1280×720 coordinates, when a coordinate system is configured with 1920×1080 coordinates, when a coordinate system is configured with 3840×2160 coordinates, and when a coordinate system is configured with 7680×4320 coordinates. According to a specific embodiment of the present invention, as shown in the embodiment of FIG. 52, when a value of the coordinate system field is 0x00, it represents that a coordinate system is configured with 720×576 coordinates. When a value of the coordinate system field is 0x01, it represents that a coordinate system is configured with 1280×720 coordinates. When a value of the coordinate system field is 0x02, it represents that a coordinate system is configured with 1920×1080 coordinates. When a value of the coordinate system field is 0x03, it represents that a coordinate system is configured with 3840×2160 coordinates. When a value of the coordinate system field is 0x04, it represents that a coordinate system is configured with 7680×4320 coordinates. According to a specific embodiment of the present invention, the coordinate system field may be a 3-bit field.

The icon_horizontal_origin field represents the horizontal coordinates of an icon. In more detail, a value of coordinates may be increased in a direction from a left column to a right column. According to a specific embodiment of the present invention, the icon_horizontal_origin may be a 13-bit field.

The icon_vertical_origin field represents the vertical coordinates of an icon. In more detail, a value of coordinates may be increased in a direction from an upper row to a lower row. According to a specific embodiment of the present invention, the icon vertical origin may be a 13-bit field.

The icon_type_length field represents the length of the icon type field. According to a specific embodiment of the present invention, the icon_type_length field may be an 8-bit field.

The icon_type_chars field represents the image form of an icon. In more detail, a value of the icon_type_chars field may be in a Multipurpose Internet Mail Extensions (MIME) image form defined in RFC 2045.

The icon_data_length field represents the length of the icon_data_byte field when an icon image is transmitted through graphic icon information. According to a specific embodiment of the present invention, the icon_data_length field may be an 8-bit field.

The icon_data_byte field represents data of an icon image that graphic icon information transmits.

The url_length field represents the length of the url field when an icon image is linked through URL. The url_length field may be an 8-bit field.

The url field represents a URL that an icon links.

The icon_content_linkage field represents a FLUTE FDT contents linkage transmitting an icon image when the icon image is transmitted through a FLUTE session.

Graphic icon information is described through the embodiment in which the graphic icon information is in a bit stream format, but the graphic icon information may be in another format such as an XML file format.

Additionally, as described above, broadcast services may include one or more media components. The service signaling table may include media component list information signaling media components that a broadcast service includes. Especially, the broadcast service signaling table may include media component list information as service level information.

This will be described in more detail with reference to FIG. 53.

FIG. 53 is a view illustrating media component list information according to an embodiment of the present invention.

The media component list information may include at least one of a component identifier for identifying a component, component type information representing the type of a media component, and media type information representing the type of media that a media component includes.

According to a specific embodiment of the present invention, as shown in FIG. 53, the media component list information may include a descriptor_tag field, a descriptor_length_field, a num_component field, a component_id field, a component_type field, and a general_media_type field.

The descriptor_tag field represents that component list information is included. According to a specific embodiment of the present invention, the descriptor_tag field may be an 8-bit field.

The descriptor_length_field represents the length after the descriptor_length_field. According to a specific embodiment of the present invention, the descriptor_length_field may be an 8-bit field.

The num_component field represents the number of media components that a corresponding broadcast service includes. According to a specific embodiment of the present invention, the num_component field may be an 8-bit field.

The component_id field represents an identifier for identifying a corresponding media component. According to a specific embodiment of the present invention, the component_id field may be an 8-bit field.

The component_type field represents the type of a media component. According to a specific embodiment of the present invention, a value of the component_type field may represent one among the above-described elementary component, composite component, and adaptive component. In more detail, when a value of the component_type field is 0x00, a corresponding media component represents an elementary component. When a value of the component_type field is 0x01, a corresponding media component represents a composite component. When a value of the component_type field is 0x02, a corresponding media component represents an adaptive component. According to a specific embodiment of the present invention, the component_type field may be a 4-bit field.

The general_media_type field represents the type of a media that a media component includes. A value of the general_media_type field may represent one among video, audio, text, application, and message. In more detail, when a value of the general_media_type field is 0x00, it represents that a media that a media component includes video. When a value of the general_media_type field is 0x01, it represents that a media that a media component includes audio. When a value of the general_media_type field is 0x02, it represents that a media that a media component includes text. When a value of the general_media_type field is 0x03, it represents that a media that a media component includes application. When a value of the general_media_type field is 0x04, it represents that a media that a media component includes message. According to a specific embodiment of the present invention, the general_media_type field may be a 4-bit field.

Additionally, component list information is described through a bit stream format, but may be in another format such as an XML file format.

According to a specific embodiment of the present invention, one media component may be shared by a plurality of broadcast services of the same broadcast stream. Additionally, a plurality of broadcast services in a different broadcast stream may share one media component. Accordingly, a method of a plurality of broadcast services to efficiently share one media component is required. For this, a broadcast transmission device may allow each media component or broadcast service to be associated with a unique resource identifier (URI).

This will be described in more detail with reference to FIG. 54.

FIG. 54 is a view when a media component or a broadcast service is mapped through URI in a broadcast service signaling table according to an embodiment of the present invention. A broadcast service or a media component may be signaled through URI in the broadcast service signaling. At this point, information signaling broadcast service or media component through URI may be referred to as URI linkage information. The URI linkage information may include at least one of URI or private data independently defined by each broadcaster or region.

According to a specific embodiment of the present invention, as shown in FIG. 54, the URI linkage information may include a descriptor_tag field, a descriptor_length_field, an uri_length field, an uri_char field, and a private data byte field.

The descriptor_tag field represents that URI linkage information is included. According to a specific embodiment of the present invention, the URI linkage information may be an 8-bit field.

The descriptor_length_field represents the length of the URI linkage information after the descriptor_length_field. According to a specific embodiment of the present invention, the descriptor_length_field may be an 8-bit field.

The uri_length field represents the length of the uri_char field. According to a specific embodiment of the present invention, the uri_length field may be an 8-bit field.

The uri_char field represents each character in URI character string. According to a specific embodiment of the present invention, the uri_char field may be an 8-bit field.

The private_data_byte field represents private data independently defined by each broadcaster or region. According to a specific embodiment of the present invention, the private_data_byte field may be an 8-bit field.

The broadcast reception device 100 may identify a media component or a broadcast service through URI of URI linkage information. When the URI of the URI linkage information identifies a media component, a broadcast service signaling table may include URI linkage information as component level information. When the URI of the URI linkage information identifies a broadcast service, a broadcast service signaling table may include URI linkage information as service level information.

The format of URI link information is described through bit stream in the embodiment of FIG. 54 but is not limited thereto. Especially, URI link information may be in an XML file format.

A broadcast transmission device may transmit a broadcast service or a media component, which targets on users having a specific condition. Additionally, the broadcast reception device 100 may transmit information on a user of the broadcast reception device 100 and may receive a broadcast service or a media component proper for a user of the broadcast reception device 100. For example, the broadcast reception device 100 may transmit information of a region where the broadcast reception device 100 is placed and may receive a broadcast service for a corresponding region. For this, required is a method of signaling information on a targeting criterion and a personalization property that a broadcast service or a media component targets. This will be described with reference to FIG. 55.

FIG. 55 is a view illustrating targeting criterion information signaling the targeting criterion of a broadcast service or a media component.

The broadcast service signaling table may include targeting criterion information signaling the target criterion of a broadcast service or a media component.

The targeting criterion information may include at least one of targeting identifier information for identifying a target criterion, targeting form information representing the form of targeting, and targeting criterion value information representing a specific targeting criterion.

According to a specific embodiment of the present invention, as shown in the embodiment of FIG. 55, the targeting criterion information may include at least one of a descriptor_tag field, a descriptor_length_field, a num_targeting_criteria field, a criterion_id_length field, a criterion_id field, a criterion_type_code field, a num_criterion_values field, a criterion_value_length field, and criterion_value field.

The descriptor_tag field represents targeting criterion information. According to a specific embodiment of the present invention, the descriptor_tag field may be an 8-bit field.

The descriptor_length_field represents the length of targeting criterion information after the descriptor_tag field. The descriptor_length_field may be an 8-bit field.

The num_targeting_criteria field represents the number of targeting criterion information. According to an embodiment of the present invention, a targeting criterion that a broadcast service or a media component has may be in plurality. According to a specific embodiment of the present invention, the num_targeting_criteria field may be an 8-bit field.

The criterion_id_length field represents the length of the criterion_id field.

According to a specific embodiment of the present invention, the criterion_id_length field may be an 8-bit field.

The criterion_id field represents a targeting criterion identifier for identifying a targeting criterion. According to a specific embodiment of the present invention, the criterion id field may be an 8-bit field.

The criterion_type_code field represents the form of a targeting criterion. According to a specific embodiment of the present invention, the criterion_type_code may be a 3-bit field.

The num_criterion_values field represents the number of targeting criterion values. According to an embodiment of the present invention, a broadcast service or a media component may have a plurality of targeting criterion values corresponding to a targeting criterion form. According to a specific embodiment of the present invention, the num_criterion_values field may be a 5-bit field.

The criterion_value_length field represents the length of the criterion_value field. According to a specific embodiment of the present invention, the criterion_value_length field may be an 8-bit field.

The criterion_value field represents a targeting criterion_value.

According to a specific embodiment of the present invention, when targeting criterion information signals targeting criterion of a media component, the broadcast service signaling table may include targeting criterion information as component level information. According to a specific embodiment of the present invention, when targeting criterion information signals the targeting criterion of a broadcast service, the broadcast service signaling table may include targeting criterion information as service level information.

Targeting criterion information is described through a bit stream format in the embodiment of FIG. 55 but is not limited thereto. Especially, the targeting criterion information may be in an XML file format.

The broadcast service signaling table may include text information for describing a broadcast service or a media component. This will be described in more detail with reference to FIG. 56.

FIG. 56 is a view illustrating text information for describing a broadcast service or a media component.

In more detail, the text information may include at least one of information representing the kind of text language, an identifier for identifying text information, and text information for describing a text including a broadcast service or a media component.

According to a specific embodiment of the present invention, as shown in the embodiment of FIG. 56, the text information may include a descriptor_number field, a last_descriptor_number field, a description_id field, a language_code field, a text_length field and a text_char field.

The descriptor_number field represents the order of a descriptor. When one descriptor does not include all text information, text information is divided and included in a plurality of descriptors. At this point, the descriptor_number field represents a number of a corresponding descriptor among a plurality of descriptors. According to a specific embodiment of the present invention, the descriptor_number field may be a 4-bit field.

The last_descriptor_number field represents a number of the last descriptor including text information. According to a specific embodiment of the present invention, the last_descriptor_number field may be a 4-bit field.

The description_id field represents an identifier for identifying text information. In more detail, the broadcast reception device 100 may identify text information for a specific broadcast service or media component from text information for another media component or broadcast service, on the basis of a value of the description_id field. According to a specific embodiment of the present invention, the description_id field may be an 8-bit field.

The language_code field represents a language used in text information. According to a specific embodiment of the present invention, the language_code field may be a 24-bit field.

The text_length field represents the length of the text_char field. According to a specific embodiment of the present invention, the text_length field may be an 8-bit field.

The text_char field represents a character of text information. According to a specific embodiment of the present invention, the text_char field may be an 8-bit field.

According to a specific embodiment of the present invention, when text information signals a text for describing a media component, the broadcast service signaling table may include text information as component level information. According to a specific embodiment of the present invention, when text information signals text information for describing a broadcast service, the broadcast service signaling table may include text information as service level information.

The text information format is described through a bit stream format in the embodiment of FIG. 56 but is not limited thereto. Especially, the text information may be in an XML file format.

Additionally, in order to signal the title of a broadcast service, a program or a show segment including the primary content of a program among a plurality of time spans, a broadcast service signaling table, program information, or segment information may include title information. Especially, the broadcast service signaling table may include title information as service level information. Additionally, the program information may include title information as program level information. Additionally, the segment information may include title information as segment level information. Especially, the title information may include titles in a plurality of languages to support multiple languages.

FIG. 57 is a view illustrating title information of a broadcast service, a program, or a show segment.

The title information may include at least one of information representing the number of languages, information representing the language of a title, information representing the length of a title, and characters in a title.

According to a specific embodiment of the present invention, as shown in the embodiment of FIG. 57, the title information may include at least one of a num_title field, a language_code field, a title_length field, and a text_char field.

The num_title field represents the number of titles. In more detail, the title information may include the title of a broadcast service, a program, or a show segment, which are displayed according to a plurality of languages. Accordingly, the num_title field may represent the number of languages displaying a title. According to a specific embodiment of the present invention, the num_title field may be an 8-bit field.

The language_code field represents the type of language displaying a title. According to a specific embodiment of the present invention, the language_code field may be a 24-bit field.

The title_length field represents the number of characters in a title. According to a specific embodiment of the present invention, the title_length field may be an 8-bit field.

The text_char field represents characters in a title. According to a specific embodiment of the present invention, the text_char field may be an 8-bit or 16-bit field.

Although title information in a bit stream format is described, it is not limited to the bit stream format and may be in another format. In a specific embodiment, the title information may be in an XML file format.

Additionally, in order to signal the genre of a broadcast service, a program or a show segment including the primary content of a program among a plurality of time spans, a broadcast service signaling table, program information, or segment information may include genre information. Especially, the broadcast service signaling table may include genre information as service level information. Additionally, the program information may include genre information as program level information. Additionally, the segment information may include genre information as segment level information. This will be described in more detail with reference to FIG. 58.

FIG. 58 is a view illustrating genre information of a broadcast service, a program, or a show segment.

In more detail, the genre information may include information representing the number of genres and information representing the genre of a broadcast service, a program, or a show segment.

In more detail, as shown in the embodiment of FIG. 58, the genre information may include at least one of a num_genre field and a genre_value field.

The num_genre field represents the number of genres. According to a specific embodiment of the present invention, the num_genre field may be an 8-bit field. One broadcast service, program, and show segment may correspond to a plurality of genres. Accordingly, the genre information may include a plurality of genre information on one broadcast service, program, and show segment. Accordingly, the genre information may include the num_genre field.

The genre_value field represents the genre of a broadcast service, a program, or a show segment. According to a specific embodiment of the present invention, the genre_value field may be an 8-bit field.

Although genre information in a bit stream format is described, it is not limited to the bit stream format and may be in another format. In a specific embodiment, the genre information may be in an XML file format.

Additionally, a broadcast service, a media component, or a content item may be for a specific device. In detail, a broadcast service, a media component, or a content item may be for a primary device. Additionally, a broadcast service, a media component, or a content item may be for a plurality of companion devices. Accordingly, in order to signal a target device relating to a broadcast service, a media component, or a content item, a broadcast service program table, a program table, or an NRT information table may include target device information. This will be described with reference to FIG. 59.

FIG. 59 is a view illustrating target device information signaling a target device relating to a media component or a content item.

The target device information may include information representing a target device of a broadcast service, a media component, or a content item.

In a specific embodiment, the target device information may include a target_device field as shown in FIG. 59. The target_device field represents a target device of a broadcast service, a media component, or a content item. According to a specific embodiment of the present invention, the target_device may be an 8-bit field.

Although target device information in a bit stream format is described, it is not limited to the bit stream format and may be in another format. In a specific embodiment, the target device information may be in an XML file format.

A broadcast service and a media component that a broadcast service includes are described above. A program and a segment will be described in more detail with reference to FIGS. 60 to 64.

FIG. 60 is a view when a broadcast service is divided into a plurality of segments.

A program may include a show representing a primary content of a related program. Many parts which are considered as a property of a program may be substantially referred to a property of a show. For example, texts, actors, or genre describing a program included in a program property relate to the properties of a show. Properties other than the properties of a show in a program property are the properties of a program itself. For example, the identifier of a service including a program or the start time of a program is the property of the program itself. Even when a program includes the same show, the property of a program itself may vary.

A show may include at least one of identifier information for identifying the show, the text title of the show, a text describing the show, a genre, a graphic icon, a list of segments relating to the show, an advisory viewing rating, a targeting/personalizing property, and a content/service protection property. The property of such a show may be signaled through show information. At this point, the list of segments relating to a show may be a list of segments including a show. This will be described with reference to FIG. 61.

FIG. 61 is a view illustrating show information according to an embodiment of the present invention.

The show information may include a show information block including identifier information for identifying a show and specific information on a show.

In more detail, as shown in the embodiment of FIG. 61, the show information may include a table_id field, a section_syntax_indicator field, a private_indicator field, a section_length field, a table_id_extentsion field, a version_number field, a current_next_indicator field, a section_number field, a last_section_number field, a show id field, and a show_information_block field.

The table_id field represents that show information is included. According to a specific embodiment of the present invention, the table_id_field may be an 8-bit field.

The section_syntax_indicator field represents whether show information is a private section table in the long formant of MEPG-2 TS standard. According to a specific embodiment of the present invention, the section_syntax_indicator field may be a 1-bit field.

The private_indicator field represents whether a current table corresponds to a private section. According to a specific embodiment of the present invention, the private_indicator field may be a 1-bit field.

The section_length field represents the length of a section after the section_length field. According to a specific embodiment of the present invention, the section_length field may be a 12-bit field.

The table_id_extension field represents a value for identifying show information in combination with the table_id_field. In more detail, the table_id_extension field may include at least one of the protocol_version field and the subnet_id field. The protocol_version field represents a protocol_version of program information. In more detail, the protocol_version field may be an 8-bit field in which the upper four bits represent a major version_number and the lower four bits represent a minor version_number. When show information is transmitted through broadcast stream, the subnet_id field may represent a subnet identifier for identifying an IP subnet for transmitting program information. According to another specific embodiment of the present invention, a value of the subnet_id field may be 0. When program information is transmitted through an internet network, the subnet_id field has the same value as the subnet_id field of program information transmitted through broadcast stream. According to a specific embodiment of the present invention, the subnet_id field may be an 8-bit field.

The version_number field represents a version of show information. The broadcast reception device 100 may determine the availability of show information on the basis of a value of the version_number field. In more detail, when a value of the version_number field is identical to a version of previously received service show information, the show information may not be used. According to a specific embodiment of the present invention, the version_number field may be a 5-bit field.

The current_next_indicator field represents whether show information is currently available. In more detail, when a value of the current_next_indicator field is 1, it may represent that show information is available. Moreover, when a value of the current_next_indicator field is 1, it may represent that show information is available next time. According to a specific embodiment of the present invention, the current_next_indicator field may be a 1-bit field.

The section_number field represents a current section_number. According to a specific embodiment of the present invention, the section_number field may be an 8-bit field.

The last_section_number field represents the last_section_number. When the size of a show information table is large, the show information table may be divided into a plurality of sections and then transmitted. At this point, the broadcast reception device 100 determines whether all sections necessary for show information are received on the basis of the section_number field and the last_section_number field. According to a specific embodiment of the present invention, the last_section_number field may be an 8-bit field.

The show_id field represents a show identifier for identifying a show that show information signals. According to a specific embodiment of the present invention, the show_id field may be a 16-bit field.

The show_information_block field represents a show_information_block including information on the property of a segment. This will be described in more detail with reference to FIG. 62.

FIG. 62 is a view illustrating a show_information_block according to an embodiment of the present invention.

The show_information_block may include at least one of descriptors including the length of a show, a text for describing a show, the number of segments relating to a show, a segment information block signaling a segment relating to a show, and specific information on the property of a show. At this point, a show related segment may be a segment including a show.

In more detail, as shown in the embodiment of FIG. 62, the show information block may include at least one of a time_span_length field, a title text_length field, a title_text( ) field, a num_segment field, a segment_information_block( ) field, a num_show_descriptors field, and a descriptors field.

The time_span_length field represents the length of a show. The show may be included in a plurality of segments. At this point, the start times of a plurality segments may vary but the length of a show may be identical. The reason is that even when contents of a show segment are included in different programs, they are the same. According to a specific embodiment of the present invention, the time_span_length field may be a 16-bit field.

The title text_length field may include a title_text( ) field, a num_segment field, a segment_information_block( ) field, a num_show_descriptors field, and a descriptors field.

FIG. 63 is a view illustrating a segment information block according to an embodiment of the present invention.

The segment information block may include at least one of descriptors including a segment identifier for identifying a segment, information representing the start time of a segment, information representing the length of a segment, and specific information on a segment. In a specific embodiment, a segment identifier may be based on a program identifier for identifying a program including a segment and a domain name. In a specific embodiment, a segment identifier may be a combination of a program identifier for identifying a program including a segment and a domain name. In more detail, the start time of a segment may be a relative time from the start of a program including a segment.

According to a specific embodiment of the present invention, as shown in the embodiment of FIG. 63, the segment information block may include at least one of a segment_id field, a start time field, a time_span_length field, a num_segment_descriptors field, and a descriptor field.

The segment_id field represents a segment identifier for identifying a segment. According to a specific embodiment of the present invention, the segment_id field may be a 16-bit field.

The start time field represents the start time of a segment. Even when a segment includes the same show, the start time for each segment may vary. Accordingly, each segment information may include information representing the start time of a segment. According to a specific embodiment of the present invention, the start time field may be a 32-bit field.

The time_span_length field represents the length of a segment. According to a specific embodiment of the present invention, the time_span_length field may be a 16-bit field.

The num_segment_descriptors field represents the number of descriptors that a segment information block includes. According to a specific embodiment of the present invention, the num_segment_descriptors field may be an 8-bit field.

The descriptor field includes specific information on a segment.

Although show information, a show_information_block, and a segment information block in a bit stream format are described, they are not limited to the bit stream format and may be in another format. In more detail, show information, a show information block, and a segment information block may be in an XML file format.

FIG. 64 is a view when a broadcast transmission device transmits broadcast signals including at least one of show information and segment information according to an embodiment of the present invention.

The broadcast transmission device obtains the property of a show that a broadcast service includes through a control unit in operation S731. As described above, the property of a show may include at least one of identifier information for identifying the show, the text title of the show, a text describing the show, a genre, a graphic icon, a list of segments relating to the show, an advisory viewing rating, a targeting/personalizing property, and a content/service protection property. The property of such a show may be signaled through show information. At this point, the list of segments relating to a show may be a list of segments including a show.

The broadcast transmission device generates program information signaling a program on the basis of the property of a show through a control unit in operation S733. The show information may include at least one of the show information and the show_information_block described through FIGS. 61 and 62.

The broadcast transmission device obtains the property of a segment relating to a show through a control unit in operation S735. The property of a segment may include at least one of a unique identifier for identifying a segment, a list of media components played during a time span of a corresponding segment, the start time and the duration of a segment, a segment type, and a targeting/personalization property, and a contents advisory rating.

The broadcast transmission device generates a segment information block on the basis of the property of a segment through a control unit in operation S737. The segment information block may be the above-mentioned segment information block in FIG. 63.

The broadcast transmission device transmits a broadcast signal including at least one of a segment information block and program information through a transmitting unit in operation S739.

FIG. 65 is a view when a broadcast reception device receives broadcast signal including at least one of show information and segment information according to an embodiment of the present invention.

The broadcast reception device 100 receives a broadcast signal through the broadcast receiving unit 110 in operation S751.

The broadcast reception device 100 obtains program information on the basis of a broadcast signal through the control unit 150 in operation S753. In more detail, the broadcast reception device 100 may obtain show information from the broadcast signal. At this point, the show information may include at least one of the show information and the show_information_block described through FIGS. 61 and 62.

The broadcast reception device 100 obtains the property of a show on the basis of the show information through the control unit 150 in operation S755. As described above, the property of a show may include at least one of identifier information for identifying the show, the text title of the show, a text describing the show, a genre, a graphic icon, a list of segments relating to the show, an advisory viewing rating, a targeting/personalizing property, and a content/service protection property. The property of such a show may be signaled through show information. At this point, the list of segments relating to a show may be a list of segments including a show.

The broadcast reception device 100 obtains a segment information block relating to a show on the basis of a broadcast signal through the control unit 150 in operation S757. In more detail, the broadcast reception device 100 may obtain a segment information block relating to a show from the show_information_block. The segment information block may include the above-mentioned segment information block in FIG. 63.

The broadcast reception device 100 obtains the property of a segment on the basis of the segment information block through the control unit 150 in operation S759. The segment information block may be the above-mentioned segment information block in FIG. 63.

The broadcast reception device 100 generates a service guide displaying the property of a show on the basis of at least one of the property of a show and a segment property relating to a show in operation S761. According to a specific embodiment of the present invention, a service guide may display the property of a show and segments relating to a show together. For example, the service guide may display the properties of a plurality of segments including the same show. At this point, the property of a segment may include at least one of the start time of a segment and the property of a program including a segment. At this point, the property of a program may include at least one of the start time of a program and information of a service including a program.

A radio program, a TV program, and a data program may include at least one of a unique identifier, a list of media components in a program, the start time and length of a program, a show identifier for identifying a related show, a text for describing a title and a program, the genre of a program, a graphic icon, a contents advisory rating, a targeting/personalization property, a contents protection property, a list of related data services, and list of related segments. Properties included in an audio program, a TV program, and a data program may be signaled through program information. This will be described with reference to FIGS. 76 to 71.

FIG. 76 is a view illustrating program information according to an embodiment of the present invention.

As shown in the embodiment of FIG. 76, the program information may include at least one of a table_id field, a section_syntax_indicator field, a private_indicator field, a section_length field, a table_id_extentsion field, a version_number field, a current_next_indicator field, a section_number field, a last_section_number field, a service_id field, and a program information block field.

The table_id field represents program information. According to a specific embodiment of the present invention, the table_id field may be an 8-bit field.

The section_syntax_indicator field represents whether program information is a private section table in the long format of MEPG-2 TS standard. According to a specific embodiment of the present invention, the section_syntax_indicator field may be a 1-bit field.

The private_indicator field represents whether a current table corresponds to a private section. According to a specific embodiment of the present invention, the private_indicator field may be a 1-bit field.

The section_length field represents the length of a section after the section_length field. According to a specific embodiment of the present invention, the section_length field may be a 12-bit field.

The table_id_extension field represents a value for identifying program information in combination with the table_id_field. In more detail, the table_id_extension field may include at least one of the protocol_version field and the subnet_id field. The protocol_version field represents a protocol_version of program information. In more detail, the protocol_version field may be an 8-bit field in which the upper four bits represent a major version_number and the lower four bits represent a minor version_number. When program information is transmitted through broadcast stream, the subnet_id field may represent a subnet identifier for identifying an IP subnet for transmitting program information. According to another specific embodiment of the present invention, a value of the subnet_id field may be 0. When program information is transmitted through an internet network, the subnet_id field has the same value as the subnet_id field of program information transmitted through broadcast stream. According to a specific embodiment of the present invention, the subnet_id field may be an 8-bit field.

The version_number field represents a version of program information. The broadcast reception device 100 may determine the availability of program information on the basis of a value of the version number field. In more detail, when a value of the version_number field is identical to a version of previously received service program information, the program information may not be used. According to a specific embodiment of the present invention, the version_number field may be a 5-bit field.

The current_next_indicator field represents whether program information is currently available. In more detail, when a value of the current_next_indicator field is 1, it may represent that program information is available. Moreover, when a value of the current_next_indicator field is 1, it may represent that the program information is available the next time. According to a specific embodiment of the present invention, the current_next_indicator field may be a 1-bit field.

The section_number field represents a current section_number. According to a specific embodiment of the present invention, the section_number field may be an 8-bit field.

The last_section_number field represents the last_section_number. When the size of a program information table is large, the program information may be divided into a plurality of sections and then transmitted. At this point, the broadcast reception device 100 determines whether all sections necessary for program information are received on the basis of the section_number field and the last_section_number field. According to a specific embodiment of the present invention, the last_section_number field may be an 8-bit field.

The service_id field represents a service identifier for identifying a broadcast service relating to program information. In more detail, the service_id field may represent a service identifier for identifying a broadcast service including a program that program information signals. According to a specific embodiment of the present invention, the service_id field may be an 8-bit field.

The program_information_block field represents a program information block including information on the property of a program. This will be described in more detail with reference to FIG. 67.

FIG. 67 is a view illustrating a program_information_block according to an embodiment of the present invention.

The program_information_block may include the number of programs that the program_information_block signals, a program identifier for identifying a signaling program, a start time of a program, the length of a program, a text for describing a program, and a descriptor for signaling a text for describing a program and a property of a program.

According to a specific embodiment of the present invention, as shown in the embodiment of FIG. 67, the program_information_block may include at least one of a num_program field, a program_id field, a time_span_start field, a time_span_length field, a title text_length field, a title text field, a num_program descriptors field, and a descriptor field.

The num_program field represents the number of programs that a program information block signals. According to a specific embodiment of the present invention, the num_program field may be an 8-bit field.

The program_id field represents a program identifier for identifying a corresponding program. According to a specific embodiment of the present invention, the program_id field may be an 8-bit field.

The time_span_start field represents a start time of a corresponding program. In more detail, the time_span_start field may represent a UTC time that elapsed from 00:00 Jan. 6, 1980. According to a specific embodiment of the present invention, the time_span_start field may be a 32-bit field.

The time_span_length field represents the length of a corresponding program. In more detail, a corresponding program may represent the length of a time that a corresponding program is broadcasted in minutes on the basis of a value of the time_span_start field. When a value of the time_span_length field is set once, it does not change in the future. According to a specific embodiment of the present invention, the time_span_length field may be a 16-bit field.

The title text_length field represents the length of the title text field. According to a specific embodiment of the present invention, the title text field may be an 8-bit field.

The title text field represents each character that the title of a corresponding program includes. According to a specific embodiment of the present invention, each character may be in a UTF-8 encoding format. According to a specific embodiment of the present invention, the title text field may be an 8-bit field.

The num_program descriptors field represents the number of descriptors that a program_information_block includes. According to a specific embodiment of the present invention, the num_program descriptors field may be an 8-bit field.

The descriptor field represents a descriptor including information relating to a property of a program. For example, a descriptor that the descriptor field has may include information on a media component list. Additionally, a descriptor that the descriptor field has may include information on a contents advisory rating. Additionally, a descriptor that the descriptor field has may include information on a targeting property. Additionally, a descriptor that the descriptor field has may include information on a text for describing a program. Accordingly, the descriptor field may include at least one of the component_list_descriptor field, the targeting_descriptor field, and the text_descriptor field. However, the program_information_block shown in FIG. 67 may not signal a show relating to a program. In more detail, the program_information_block in the embodiment of FIG. 67 may not signal a show in a program. A method for resolving the above issue will be described with reference to FIG. 68.

FIG. 68 is a view illustrating a program_information_block according to another embodiment of the present invention.

A program_information_block according to another embodiment of the present invention may further include at least one of information on whether information on a show relating to a program that the program_information_block signals is included and a show identifier for identifying a show relating to a program that the program information block signals.

According to a specific embodiment, the program_information_block may include at least one of an associated_show_flag field and a show_id field as shown in FIG. 68.

The associated_show_flag field represents whether information on a show relating to a program that a program_information_block signals is included. According to an embodiment of the present invention, if there is a related show, the broadcast reception device 100 may receive show information. Accordingly, when associated_show_flag is 1, the broadcast reception device 100 may receive show information. At this point, the show information may be the show information or the show_information_block described with reference to FIGS. 70 and 72. According to a specific embodiment of the present invention, the associated_show_flag field may be a 1-bit field.

The show_id field represents a show identifier for identifying a show relating to a show that a program_information_block signals. According to a specific embodiment of the present invention, the show_id field may be a 16-bit field.

However, the program_information_block shown in FIG. 68 may not signal the property of a media component through component level information. Accordingly, a plurality of media components having various properties may not be signaled efficiently. A method for resolving the above issue will be described with reference to FIG. 98.

FIG. 69 is a view illustrating a program_information_block according to another embodiment of the present invention.

The program_information_block may include the number of media components that a corresponding program includes, a component identifier for identifying a corresponding media component, information for representing whether a corresponding media component is a media component necessary for corresponding program playback, and a component descriptor including an additional property of a media component.

According to a specific embodiment of the present invention, as shown in the embodiment of FIG. 69, the program_information_block may include at least one of a num_component field, a component_id field, an essential_component_indicator field, a num_component_descriptors field, and a component_descriptor field.

The num_component field represents the number of media components that a corresponding program includes. According to a specific embodiment of the present invention, the num_component field may be an 8-bit field.

The component id field represents a component identifier for identifying a corresponding media component. According to a specific embodiment of the present invention, the component_id field may be an 8-bit field.

The essential_component_indicator field represents whether a corresponding media component is an essential media component essential to a corresponding broadcast service presentation. According to a specific embodiment of the present invention, the essential_component_indicator field may be a 1-bit field.

The num_component_descriptors field represents the number of component_descriptor fields. According to a specific embodiment of the present invention, the num_component_descriptors field may be an 8-bit field.

The component_descriptor field represents a component_descriptor including an additional property on a corresponding component.

However, in this case, information on a segment that a program includes may not be obtained. A method of resolving this will be described with reference to FIGS. 70 and 71.

FIGS. 70 and 71 are views illustrating a program_information_block according to another embodiment of the present invention.

The program_information_block may include information of a segment that a program signaled by the program_information_block includes. In more detail, the program information block may include a segment information block including the number of segments that a program signaled by the program_information_block includes and a specific property of a segment.

The program_information_block may include at least one of a num_segment_field and a segment_information_block field as shown in FIGS. 70 and 71.

The num_segment_field represents the number of segments that a program signaled by a program_information_block includes. According to a specific embodiment of the present invention, the num_segments_field may be an 8-bit field.

The segment_information_block field may include the segment information block described through the embodiment of FIG. 92 or a segment information block to be described with reference to FIGS. 72 and 73.

In the embodiment of FIG. 70, the broadcast reception device 100 may not obtain information of a show relating to a program that a program_information_block signals. In the embodiment of FIG. 72, like the embodiment of FIG. 39, information of a show relating to a program that a program_information_block signals is included so that the broadcast reception device 100 may obtain information of a show relating to a program.

The program information and the program_information_block in a bit stream format are described through FIGS. 65 to 71 but the present invention is not limited to the bit stream format. Especially, the program information and the program information block may be in an XML file format.

As described above, a broadcast service may include a plurality of programs. At this point, a program may include a plurality of segments. A segment is a time interval configuring a program. A segment may include a show segment broadcasting the primary content of a show and an interstitial segment broadcasting a content not relating to the primary content of the program between the primary contents of the program. At this point, the interstitial segment may include ads or public service announcement. The show segment and the interstitial segment of a radio service or a TV service may have a scheduled start time and duration.

The segment may include at least one as one property among a unique identifier for identifying a segment, a list of media components played during a time interval of a corresponding segment, a start time and the duration of a segment, a segment type, and a targeting/personalization property, and a contents advisory rating. As described above, the segment type may be one among a show segment and an interstitial segment. At this point, the start time of a segment may represent a relative time on the basis of the start time of a show. For example, the start time of a segment may be specified on the basis of the start time of a show, for example, 10 minutes before a show start time. An anchored segment represents a segment relating to a specific program and having a specified start time. On the other hand, an unanchored segment represents a segment not relating to a specific program and not having a specified start time. For example, since the broadcast reception device 100 receives a targeted advertisement but a corresponding advertisement segment is used in various programs and services several times, when a start time for a corresponding is not clearly specified, the targeted advertisement may be referred to as an unanchored segment. It is necessary to efficiently signal such a segment. Signaling a segment will be described with reference to FIGS. 72 to 76.

FIG. 72 is a view illustrating segment information program information according to an embodiment of the present invention.

The segment information may include a segment block including a specific segment property.

According to a specific embodiment of the present invention, as shown in the embodiment of FIG. 72, the segment information may include at least one of a table_id field, a section_syntax_indicator field, a private_indicator field, a section_length field, a table_id_extentsion field, a version_number field, a current_next_indicator field, a section_number field, a last_section_number field, and a segment_information_block field.

The table_id field represents segment information is included. According to a specific embodiment of the present invention, the table_id field may be an 8-bit field.

The section_syntax_indicator field represents whether broadcast service segment information is a private section table in a long format of MEPG-2 TS standard. According to a specific embodiment of the present invention, the section_syntax_indicator field may be a 1-bit field.

The private_indicator field represents whether a current table corresponds to a private section. According to a specific embodiment of the present invention, the private_indicator field may be a 1-bit field.

The section_length field represents the length of a section after the section_length field. According to a specific embodiment of the present invention, the section_length field may be a 12-bit field.

The table_id_extension field represents a value for identifying segment information in combination with the table_id_field. In more detail, the table_id_extension field may include at least one of the protocol_version field and the subnet_id field. The protocol_version field represents a protocol_version of segment information. In more detail, the protocol_version field may be an 8-bit field in which the upper four bits represent a major version_number and the lower four bits represent a minor version_number. When segment information is transmitted through broadcast stream, the subnet_id field may represent a subnet identifier for identifying an IP subnet for transmitting segment information. According to another specific embodiment of the present invention, a value of the subnet_id field may be 0. When segment information is transmitted through an internet network, the subnet_id field has the same value as the subnet_id field of segment information transmitted through broadcast stream. According to a specific embodiment of the present invention, the subnet_id field may be an 8-bit field.

The version_number field represents a version of segment information. The broadcast reception device 100 may determine the availability of segment information on the basis of a value of the version number field. In more detail, when a value of the version_number field is identical to a version of previously received service segment information, the segment information may not be used. According to a specific embodiment of the present invention, the version_number field may be a 5-bit field.

The current_next_indicator field represents whether segment information is currently available. In more detail, when a value of the current_next_indicator field is 1, it may represent that segment information is available. Moreover, when a value of the current_next_indicator field is 1, it may represent that segment information is available the next time. According to a specific embodiment of the present invention, the current_next_indicator field may be a 1-bit field.

The section_number field represents a current section_number. According to a specific embodiment of the present invention, the section_number field may be an 8-bit field.

The last_section_number field represents the last_section_number. When the size of a segment information table is large, the segment information may be divided into a plurality of sections and then transmitted. At this point, the broadcast reception device 100 determines whether all sections necessary for segment information are received on the basis of the section_number field and the last_section_number field. According to a specific embodiment of the present invention, the last_section_number field may be an 8-bit field.

The service_id field represents a service identifier for identifying a broadcast service relating to segment information. In more detail, the service_id field may represent a service identifier for identifying a broadcast service including a segment that segment information signals. According to a specific embodiment of the present invention, the service_id field may be an 8-bit field.

The program_information_block field represents a segment information block including information on the property of a segment. This will be described in more detail with reference to FIG. 73.

FIG. 73 is a view illustrating a segment_information_block according to an embodiment of the present invention.

The segment_information_block in segment information may include at least one of a segment identifier for identifying a signaling segment, a segment type, information representing whether there is a program relating to a segment, information representing whether a start time and the duration of a segment is specified, a program identifier for identifying a program relating to a segment, a start time of a segment, the number of media components in a segment, a media component identifier for identifying a corresponding media component, the number of descriptors including a property for a corresponding media component, a descriptor including a property for a corresponding media component, the number of descriptors including a property for a corresponding segment, and a descriptor including a corresponding segment.

According to a specific embodiment of the present invention, as shown in the embodiment of FIG. 102, the segment information may include at least one of a segment_id field, a segment_type field, an associated_program_flag field, a time_included field, a progmam_id_field, a time_span_start field, a time_span_length field, a num_component field, a component_id field, a num_component_descriptors field, a component_descriptors field, a num_descriptor field, and a descriptor field.

The segment_id field represents a segment identifier for identifying a corresponding segment. According to a specific embodiment of the present invention, the segment_id field may be an 8-bit field.

The segment_type field represents the type of a corresponding segment. In more detail, it may represent a show segment or an interstitial segment. According to a specific embodiment of the present invention, when a value of the segment_type field is 0x02, it represents a show segment and when a value of the segment_type field is a value between 0x03 to 0x07, it represents an interstitial segment According to a specific embodiment of the present invention, the segment_type field may be a 3-bit field.

The associated_program_flag field represents whether there is a program relating to a corresponding segment. In more detail, when a value of the associated_program_flag field is 1, it represents that there is a program relating to a corresponding segment and when a value of the associated_program_flag field is 0, it represents that there is no program relating to a corresponding segment. According to a specific embodiment of the present invention, the associated_program_flag field may be a 1-bit field.

The time_included field represents whether a start time and duration of a corresponding segment is specified. In more detail, when a value of the time_included field is 1, it represents that a start time and duration of a corresponding segment is specified and when a value of the time_included field is 0, it represents that a start time and duration of a corresponding segment is not specified. According to a specific embodiment of the present invention, the time_included field may be a 1-bit field.

The program_id field represents a program identifier for identifying a program relating to a corresponding program. According to a specific embodiment of the present invention, the program_id field may be a 16-bit field.

The time_span_start field represents a start time of a corresponding segment. In more detail, the time_span_start field may represent a UTC time that elapsed from 00:00 Jan. 6, 1980. According to a specific embodiment of the present invention, the time_span_start field may be a 32-bit field.

The time_span_length field represents the length of a corresponding segment. In more detail, a corresponding segment may represent the length of a time that a corresponding program is broadcasted in minutes on the basis of a value of the time_span_start field. When a value of the time_span_length field is set once, it does not change in the future. According to a specific embodiment of the present invention, the time_span_length field may be a 16-bit field.

The num_component field represents the number of media components that a corresponding segment includes. According to a specific embodiment of the present invention, the num_component field may be an 8-bit field.

The component_id field represents a component identifier for identifying a corresponding media component. According to a specific embodiment of the present invention, the component_id field may be an 8-bit field.

The num_component_descriptors field represents the number of component_descriptor fields. According to a specific embodiment of the present invention, the num_component_descriptors field may be an 8-bit field.

The component_descriptor field represents a component_descriptor including an additional property on a corresponding component.

The num_descriptor field represents the number of descriptor fields. According to a specific embodiment of the present invention, the num_descriptors field may be an 8-bit field.

The descriptor field represents a descriptor including an additional property. For example, the descriptor may include at least one of a contents advisory rating and a targeting property. Accordingly, the descriptor field may be the targeting_descriptor field.

When a program is divided into a plurality of segments, even when a viewer watches the same program, another segment may be provided according to the characteristics of each viewer. Especially, segments according the characteristics of each viewer may be provided to an interstitial segment instead of the show segment. Through this, broadcasters may provide the feature broadcast of the same content and also may provide a target advertisement to viewers according to the characteristics of each viewer. For this, it is necessary to provide a targeting segment set signaling the targeting information and property of each segment. This will be described with reference to FIG. 74.

FIG. 74 is a view illustrating a targeting segment set information according to an embodiment of the present invention.

The targeting segment set may signal targeting information on a plurality of segments. Especially, the targeting segment set information may signal targeting information on a plurality of segments having the same duration. According to a specific embodiment of the present invention, the targeting segment set information may signal targeting information on a plurality of segments relating to the same program. According to another specific embodiment of the present invention, targeting segment information may signal targeting information on a plurality of segments having the same start time.

The targeting segment set information may include at least one of a start time of a corresponding segment, the duration of a segment, the number of segments that a targeting segment set includes, a segment identifier for identifying a corresponding segment, the number of targeting criteria that targeting segment set information includes, targeting identification information for identifying a target criterion, targeting form information representing the form of targeting, and targeting criterion value information representing a specific targeting criterion.

According to a specific embodiment of the present invention, as shown in the embodiment of FIG. 74, the targeting segment set information may include at least one of a descriptor_tag field, a descritpro_length field, a time_span_start field, a time_span_length field, a num_segment_field, a segment_id field, a num_targeting_criteria field, a criterion_id_length field, a criterion_id field, a criterion_type_code field, a num_criterion_values field, a criterion_value_length field, and a criterion_value field.

The descriptor_tag field represents targeting segment set information. According to a specific embodiment of the present invention, the descriptor_tag field may be an 8-bit field.

The descriptor_length_field represents the length of targeting segment information after the descriptor_tag field. The descriptor_length_field may be an 8-bit field.

The time_span_start field represents a start time of a corresponding segment. In more detail, the time_span_start field may represent a UTC time that elapsed from 00:00 Jan. 6, 1980. According to a specific embodiment of the present invention, the time_span_start field may be a 32-bit field.

The time_span_length field represents the length of a corresponding segment. In more detail, a corresponding segment may represent the length of a time that a corresponding program is broadcasted in minutes on the basis of a value of the time_span_start field. When a value of the time_span_length field is set once, it does not change in the future. According to a specific embodiment of the present invention, the time_span_length field may be a 16-bit field.

The num_segments_field represents the number of segments that targeting segment set information signals. According to a specific embodiment of the present invention, the num_segments_field may be an 8-bit field.

The num_targeting_criteria field represents the number of targeting segment set information. According to an embodiment of the present invention, a targeting criterion that a broadcast service or a media component has may be in plurality. According to a specific embodiment of the present invention, the num_targeting_criteria field may be an 8-bit field.

The criterion_id_length field represents the length of the criterion id field. According to a specific embodiment of the present invention, the criterion_id_length field may be an 8-bit field.

The criterion_id field represents a targeting criterion identifier for identifying a targeting criterion. According to a specific embodiment of the present invention, the criterion_id field may be an 8-bit field.

The criterion_type_code field represents the form of a targeting criterion. According to a specific embodiment of the present invention, the criterion_type_code may be a 3-bit field.

The num_criterion_values field represents the number of targeting criterion values. According to an embodiment of the present invention, a segment may have a plurality of targeting criterion values corresponding to a targeting criterion form. According to a specific embodiment of the present invention, the num_criterion_values field may be a 5-bit field.

The criterion_value_length field represents the length of the criterion_value field. According to a specific embodiment of the present invention, the criterion_value_length field may be an 8-bit field.

The criterion_value field represents a targeting criterion_value.

In consideration of a broadcast receiving situation or the capability of the broadcast reception device 100, if a specific segment cannot be received, the broadcast reception device 100 may receive or play another segment on the basis of targeting segment set information. For example, if the broadcast reception device 100 does not support the playback of a 3D image, it may receive or play a segment including a 2D image on the basis of a targeting segment set instead of a segment. According to another specific embodiment of the present invention, the broadcast reception device 100 may selectively receive or play only content suitable for a user on the basis of targeting segment set information. For example, if a viewer is youth, the broadcast reception device 100 may receive or play a trailer of a youth movie instead of a trailer of an adult movie.

The case in which segment information, a segment_information_block, segment targeting set information are in a bit stream format is described above with reference to FIGS. 72 to 74. However, the formats of segment information, a segment information block, and segment targeting set information are not limited to the bit stream format. Especially, segment information, a segment_information_block, and segment targeting set information may be in an XML file format. Additionally, according to a specific embodiment of the present invention, the above-described program information may include segment information, a segment_information_block, and segment targeting set information.

Operations of a broadcast transmission device and the broadcast reception device 100 transmitting/receiving the properties of a program and a segment will be described with reference to FIGS. 75 and 76.

FIG. 75 is a view when a broadcast transmission device transmits broadcast signal including at least one of program information and segment information according to an embodiment of the present invention.

The broadcast transmission device obtains the property of a program that a broadcast service includes through a control unit in operation S101. As described above, the property of a program may include at least one of a unique identifier, a list of media components in a program, a start time and a length of a program, a text for describing a title and a program, a graphic icon, a contents advisory rating, a targeting/personalization property, and a contents protection property.

The broadcast transmission device generates program information signaling a program on the basis of the property of a program through a control unit in operation S803. The program information may include at least one of the program information and the program information block described through FIGS. 75 and 76.

The broadcast transmission device obtains the property of a segment that a program includes through a control unit in operation S805. As described above, the property of a segment may include at least one as one property among a unique identifier for identifying a segment, a list of media components played during a time interval of a corresponding segment, a start time and the duration of a segment, a segment type, and a targeting/personalization property, and a contents advisory rating.

The broadcast transmission device generates segment information on the basis of the property of a program through a control unit in operation S807. The segment information may include at least one of the above-mentioned segment information, segment information block, and segment targeting set information of FIGS. 72 to 76.

The broadcast transmission device transmits a broadcast signal including at least one of segment information and program information through a transmitting unit in operation S809.

FIG. 76 is a view when a broadcast reception device receives broadcast signal including at least one of program information and segment information according to an embodiment of the present invention.

The broadcast reception device 100 receives a broadcast signal through the broadcast receiving unit 110 in operation S901.

The broadcast reception device 100 obtains program information on the basis of a broadcast signal through the control unit 150 in operation S903. In more detail, the broadcast reception device 100 may obtain broadcast information from the broadcast signal. At this point, the program information may include at least one of the program information and the program information block described through FIGS. 78 and 79.

The broadcast reception device 100 obtains the property of a program on the basis of the program information through the control unit 150 in operation S905. As described above, the property of a program may include at least one of a unique identifier, a list of media components in a program, a start time and a length of a program, a text for describing a title and a program, a graphic icon, a contents advisory rating, a targeting/personalization property, and a contents protection property.

The broadcast reception device 100 obtains segment information on the basis of a broadcast signal through the control unit 150 in operation S907. In more detail, the broadcast reception device 100 may obtain segment information from the broadcast signal. The segment information may include at least one of the above-mentioned segment information, segment information block, and segment targeting set information of FIGS. 72 to 74.

The broadcast reception device 100 obtains the property of a segment on the basis of the segment information through the control unit 150 in operation S909. The segment information may include at least one of the above-mentioned segment information, segment information block, and segment targeting set information of FIGS. 72 to 74.

The broadcast reception device 100 generates a service guide for displaying the property of a program on the basis of at least one of the program property and the segment property in operation S911. According to an embodiment of the present invention, a service guide may also display the property of a segment that a program includes. In more detail, a service guide may display the property of a show segment in a program together. For example, a service guide may display the start time and length of a show segment in a program and another program information including the same show segment in addition to a program property.

As described above, a broadcast service according to an embodiment of the present invention divides the property of a media component and again divides a program representing a time span of the broadcast service into segments, so as to effectively signal the format of the broadcast service that become more complex and various. This will be described in more detail with reference to FIGS. 77 to 100.

A broadcast service according to an embodiment of the present invention may be described as an object model including a kind of class, an inheritance relationship between classes, a containment relationship between classes, and an another association between classes.

FIG. 77 is a view illustrating a continuous component class, an audio component class, a video component class, and a closed caption component class.

A continuous component class represents a continuous component. A continuous component class may include a component identifier componentID for identifying a component as a property.

An audio component class represents a continuous component whose content type is audio. The audio component class may have a "Sub-class relationship with Continuous Component class".

A video component class represents a continuous component whose content type is video. The video component class may have a Sub-class relationship with Continuous Component class.

A closed caption component class represents a continuous component whose content type is a closed caption. The closed caption component class may have a Sub-class relationship with Continuous Component class.

FIG. 78 is a view illustrating an elementary audio component class, an elementary video component class, and an elementary closed caption component class.

An elementary audio component class represents an elementary component whose content type is audio. The elementary audio component class may include at least one of codec, the number of audio channels, encoding bitrate, other encoding parameters, and the language and mode of an audio component, as attribute. In more detail, another encoding parameter may be determined according to codec. Additionally, the mode may represent the mode of a corresponding audio and also may represent at least one of "complete main", "music", "dialog", "effects", "visual impaired", and "hearing impaired", and "commentary". The audio component class may have a "Sub-class relationship with Audio Component class".

An elementary video component class represents an elementary component whose content type is video. The elementary video component class may include at least one of "codec", "resolution", "aspect ratio", "scanning method", "frame rate", "still picture mode", and "another encoding parameter", as attribute. The resolution may be represented by width×height pixel units. Additionally, the scanning method may be one of an interlaced method and a progressive method. Additionally, other encoding parameters may be determined according to codec. The elementary video component class may have a "Sub-class relationship with Video Component class".

An elementary closed caption class represents an elementary component whose content type is a closed caption. The elementary closed caption class may include at least one of "codec", "language", and "type". At this point, codec may represent the format of closed caption text. The language represents a language configuring a closed caption. The type may be a general closed caption and an easy-reader closed caption for low vision person. An elementary closed caption component class may have a "Sub-class relationship with Closed Caption Component class".

A complex component class represents a complex component. As described above, the complex component may be a composite component or a PickOne component. Accordingly, a class for the composite component and the PickOne component will be described with reference to FIG. 79 and FIG. 80.

FIG. 79 is a view illustrating a composite audio component class and a composite video component class.

A composite audio component class represents a composite component whose content type is audio. The composite audio component class may include one of "ContainsAudio" and "Sub-class relationship with Audio Component class" as relationship. At this point "ContainsAudio" represents an audio component class included in a composite audio class. At this point, all objects included in "ContainsAudio" are limited as representing one sound scene.

A composite video component class represents a composite component whose content type is video. The composite video component class may include one of "ContainsVideo" and "Sub-class relationship with Video Component class" as relationship. At this point, the ContainsVideo represents a sub-class relationship with a video component class of a composite video component class. At this point, all objects in the ContainsVideo are limited as representing one video scene. Additionally, the property of the ContainsVideo may include "role". At this point, the role may represent an enhanced layer of variable video. Additionally, the role may represent the left view or right view of a 3D image. Additionally, the role may represent the depth information of a 3D image. Additionally, the role may represent part of a video array divided into a plurality of screens. At this point, the role may represent the xth in the yth line from the left if there is an n×m matrix. Additionally, the role may represent Follow-subject metadata.

FIG. 80 is a view illustrating a PickOne component class.

A PickOne component class represents a PickOne component. The PickOne component class may include one of "contains" and "Sub-class relationship with Continuous Component Class" as relationship. At this point, "contains" represents a relationship with a continuous component class of a PickOne component class. At this point, all components in "contains" are the same content type and is limited as representing all the same image scene or audio scene.

FIG. 81 is a view illustrating a presentable component class, a presentable video component class, a presentable audio component class, and a presentable closed caption component class.

A presentable component class represents a presentable component. A presentable component class may include as a property at least one of a targeting/personalization property, a content advisory rating, a content/service protection property, and a target device. At this point, the target device may be at least one of a primary screen, a companion screen, and a screen partially inserted into the primary screen.

A presentable video component class represents a presentable video component. The presentable video component class may include at least one of "AssociatedAudio", "Associated CC" and "Sub-class relationship with Video Component Class" as relationship. "AssociatedAudio" may represent a presentable audio component that is appropriate to be played with a presentable video component.

The presentable audio component class represents a presentable audio component. The presentable audio component class may have a Sub-class relationship with Audio Component class as relationship.

FIG. 82 is a view illustrating an OnDemand component class.

An OnDemand component represents a content component transmitted by a user request. The OnDemand component may include as an attribute at least one of OnDemand-ComponentId representing the unique identifier of an OnDemand component, ComponentLocation representing a location where an OnDemand component can be accessed, ComponentName representing the name of a component, possibly in multiple languages, PlaybackLength representing the total playback time of a component, AvailabilityStart representing a start time at which a component becomes available, AvailabilityDuration representing the length of a time that a component remains available, Targeting/personalization properties representing a device that a component targets or user's characteristics, Content/Service protection properties representing whether content or service is protected, and Content advisory rating representing a content advisory ration.

FIG. 83 is a view illustrating an NRT content item class and an NRT file class.

An NRT content item component class represents a content item of NRT data service. The NRT content item component class may include as a property at least one of the name of a content item for identifying a content item (ContentItemID), the name of a content item (ContentItemName), a display for representing whether the update of a content item is to be monitored, (Updateable), a download available window representing a download available time (Avaiblewindow), an expiration time representing a time at which a content item is discarded, a content item size (ContentItemSize), the playback length of a content item (PlaybackLength), a targeting/personalization property (TargetInfo), the protection property of a content item (ProtectionInfo), and the contents advisory rating of a content item (ContentAdvRating). Additionally, the NRT content item class may include an NRT file class as relationship.

The NRT file class represents a non-real time file. In more detail, the NRT file may represent a file used for NRT service. The NRT file class may include as an attribute at least one of ContentLocation representing the location of content and ContentType representing the type of content. At this point, ContentLocation and ContentType may be defined in IETF RFC 2616.

Classes for service will be described with reference to FIGS. 113 and 114.

A service class represents a service. The service class may include as a property at least one of a service identifier (ServiceId), a service name (ServiceName), a channel number (ChanNum), description of a service (Description), a graphic icon representing a service (Icon), a list of media components in a service, a property for broadcast service protection (Content/service protection properties for the service), a property for targeting/personalization (targeting properties for the service), a viewing advisory rating (contentAdvRating), service language (Language), and a property on broadcast service user report (UsageReportInfo). At this point, the channel number may be divided into a major number (MajorChanNum) and a minor number (MinorChanNum).

A radio service class represents a radio service scheduled to be broadcasted at a predetermined time. The radio service class may include at least one of "Containment Relationship with Presentable Video Component Class", "Containment Relationship with Presentable CC Component Class", and "Adjunct relationship with NRT Data Service Class" as relationship.

A TV service class represents a TV service scheduled to be broadcasted at a predetermined time. The TV service class may include at least one of "Containment Relationship with Presentable Video Component Class", "Containment Relationship with Presentable Audio Component Class", "Containment Relationship with Presentable CC Component Class", and "Adjunct relationship with NRT Data Service Class" as relationship. "Containment Relationship with Presentable Video Component Class" includes the role of a video component as a property. In more detail, the role of a video component may represent at least one of a primary video, an alternative camera view, another alternative video component, a sign language screen, and Follow Subject Video/metadata. Especially, the Follow Subject Video/metadata may include the name of a subject that follows. Such Follow Subject Video/metadata may be video stream. Or, a follow subject video may be rectangles of each frame for zoom-in of a subject of a video stream.

An OnDemand service class represents an OnDemand content service. The OnDemand service class may include "Containment relationship with OnDemand UI App Class", "Containment relationship with OnDemand Offering Class", and "containment relationship with OnDemand Catalog class" as relationship. "Containment relationship with OnDemand UI App Class" is to provide a user interface for OnDemand service. In a specific embodiment, the user interface of a user request service may be provided in a plurality of languages. An OnDemand offering may represent products of services provided by OnDemand. "Containment relationship with OnDemand Offering Class" is for a content item provided from an OnDemand service. "containment relationship with OnDemand Catalog class" is for an OnDemand offering catalog of an OnDemand service. In a specific embodiment, the OnDemand offering catalog may be provided in a plurality of languages.

An NRT data service class represents an NRT data service. The NRT data service class may include at least one of "Consumption Mode", "Essential capabilities", "Non-essential capabilities", "Target Device", and "containment relationship with data item component class" as a property. "Essential capabilities" represents a capability necessary to allow the broadcast reception device 100 to receive a service. "Non-essential capabilities" represents a capability necessary to allow the broadcast reception device 100 to receive a service's selection item. "Target Device" may represent at least one of a primary device or a companion device.

According to another specific embodiment, a service class may be classified into linear service and App-based service. This will be described with reference to FIGS. 113 to 116.

FIG. 84 is a view illustrating an OnDemand component class according to another embodiment of the present invention.

The OnDemand component class may include "Essential capabilities" and "Non-essential capabilities" as attributes. "Essential capabilities" represent a capability necessary for the broadcast reception device 100 to present an OnDemand component. "Non-essential capabilities" represent a capability necessary for the broadcast reception device 100 to present a selection item of an OnDemand component. The broadcast reception device 100 may determine whether to present an OnDemand component on the basis of "Essential capabilities". For example, when not supporting a device capability included in "Essential capabilities", the broadcast reception device 100 may not present an OnDemand component. Additionally, in a specific embodiment, when not supporting at least one of "Essential capabilities" and "Non-essential capabilities", the broadcast reception device 100 may display that it does not support at least one of "Essential capabilities" and "Non-essential capabilities".

FIG. 85 is a view illustrating an NRT content item class and an NRT file class according to another embodiment of the present invention.

The NRT content item class may include "Essential capabilities" and "Non-essential capabilities" as attributes. "Essential capabilities" represent a capability necessary for the broadcast reception device 100 to present an NRT content item. "Non-essential capabilities" represent a capability necessary for the broadcast reception device 100 to present a selection item of an NRT content item. The broadcast reception device 100 may determine whether to present an NRT content item on the basis of "Essential capabilities". For example, when not supporting a device capability included in "Essential capabilities", the broadcast reception device 100 may not present an NRT content item. Additionally, in a specific embodiment, when not supporting at least one of "Essential capabilities" and "Non-essential capabilities" of an NRT content item, the broadcast reception device 100 may display that it does not support at least one of "Essential capabilities" and "Non-essential capabilities" of an NRT content item.

The NRT file class may include "Essential capabilities" and "Non-essential capabilities" as attributes. "Essential capabilities" represent a capability necessary for the broadcast reception device 100 to present an NRT file. "Non-essential capabilities" represent a capability necessary for the broadcast reception device 100 to present a selection item of an NRT file. The broadcast reception device 100 may determine whether to present an NRT file on the basis of at least one of "Essential capabilities" and "Non-essential capabilities". For example, when not supporting a device capability included in "Essential capabilities", the broadcast reception device 100 may not present an NRT file. Additionally, in a specific embodiment, when not supporting at least one of "Essential capabilities" and "Non-essential capabilities" of an NRT file, the broadcast reception device 100 may display that it does not support at least one of "Essential capabilities" and "Non-essential capabilities" of an NRT file.

FIG. 86 is a view illustrating a linear service class.

Linear service represents a service in which primary content includes a continuous component. At this point, continuous components may be consumed according to a time base and schedule that a broadcaster defines. However, even when continuous components are consumed according to a time base and schedule that a broadcaster defines, a user may use various kinds of time shift methods on the continuous components. The TV service class may include as relationship at least one of Contains Relationship with Presentable Video Component Class, Contains Relationship with Presentable Audio Component Class, Contains Relationship with Presentable CC Component Class, Contains relationship with App-Based Enhancement class, and Sub-class relationship with Service class. Especially, the Contains Relationship with Presentable Video Component Class may include a role of video component representing the role of a video component as an attribute. At this point, the role of video component may represent one of a Primary video, an alternative camera view, an alternative video component, a sign language screen, and a follow subject video. At this point, the primary video may be expressed as a default video. Additionally, the follow subject video may include the name of a following subject. The follow subject video may be supported by a separated video component.

FIG. 87 is a view illustrating an App class and an App-based enhancement service.

The App class represents one type of a content item supporting interactivity. Sub-class relationship with NRT Content Item Class is included as relationship.

An App-based enhancement service class represents an App-based enhancement service. The App-based enhancement service may include as an attribute at least one of Essential capabilities representing a device capacity needed for performing enhancement service, Non-essential capabilities useful for performing enhancement service but no absolutely necessary, and a target device representing a device that enhancement service targets. The target device may represent at least one of a primary device and a companion device. At least one of Contains relationship with App Class, Contains relationship with NRT Content Item class, Contains relationship with Notification Stream class, and Contains relationship with OnDemand Component class may be included as relationship The Contains relationship with NRT Content Item class relates to an NRT content item used by App-based enhancement service. The Contains relationship with Notification Stream class relates to a notification stream delivering notifications to synchronize an action of application according to a linear time base. The Contains relationship with OnDemand Component class relates to an OnDemand component managed by application. A time base class that is the synchronization reference of components in service and a notification stream class will be described with reference to FIG. 88.

FIG. 88 is a view illustrating a time base class and a notification stream class.

The time base class is metadata used for generating a timeline to synchronize components of a linear service. At this point, the time line may represent a continuous reference time that is the synchronization reference. The time base class may include at least one of a time base identifier for identifying a time base and a clock rate representing the clock rate of a time base as an attribute.

The notification stream class represents a notification stream for transmitting a notification for an action to be performed. The notification stream class may include a notification stream identifier representing the identifier of a notification stream as an attribute.

FIG. 89 is a view illustrating an App-based service class.

The App-based service class represents an App-based service. At least one of Contains relationship with Time Base Class, Contains relationship with App-Based Enhancement class, and Sub-class relationship with Service class may be included as relationship.

Components of an NRT content item may have a similar structure to a program. However, the NRT content item is transmitted in a file format instead of a stream format. Additionally, the program may have an adjunct data service. In more detail, the adjunct data service may be an interactive service relating to the program. A program class representing a program, a show class representing a show that is a primary content included in a program, and a segment class representing a segment that is a temporal segment of a program will be described in more detail with reference to FIGS. 90 to 92.

FIG. 90 is a view illustrating a program class.

A program class represents a program. The program class may include at least one of a program identifier (ProgamIdentifier), the start time of a program (StartTime), the duration of a program (ProgramDuration), the title of a program (TextualTitle), a text describing a program (TextualTitle), the genre of a program (Genre), a graphic icon representing a program (GraphicalIcon), a content advisory rating (ContentAdvisoryRating), a targeting/personalization property (Targeting/personalization properties), and a content/service protection property representing the content/service protection of a program (Content/Service protection properties) as a property. The start time of a program may include a date and a time at which a program starts. The duration of a program is a duration from the start time to the end time of a program. The title of a program may be displayed in a plurality of languages. Additionally, when there is no title of a program, the image display device 100 may display the title of a related show as the title of a program. Additionally, when there is no genre of a program, the image display device 100 may display the genre of a related show as the genre of a program. Additionally, a graphic icon may be displayed in a plurality of sizes. When there is no graphic icon of a program, the image display device 100 may display the graphic icon of a related show as the graphic icon of a program. A viewing advisory rating may vary by region and may have different values by region. Additionally, if there is no viewing advisory rating, the broadcast reception device 100 may display the viewing advisory rating of a show relating to a program as a viewing advisory rating. If there is no targeting/personalizing property, the broadcast reception device 100 may display the targeting/personalizing property of a related show. If there is no content/service protection property, the broadcast reception device 100 may display the content/service protection property of a related show.

The program class may include, as relationship, at least one of ProgramOf relationship with Linear Service Class, ContentItemOf relationship with App-Based Service Class, Contains relationship with Presentable Video Component class, Contains with Presentable Video Component class, Contains relationship with Presentable Audio Component class, Contains relationship with Presentable CC Component class, Contains relationship with App-Based Enhancement class, Contains relationship with Time Base Class, Based-on relationship with Show class, and Contains relationship with Segment Class. At this point, the Contains relationship with Presentable Video Component class may include a role of video component representing the role of a video component as an attribute. At this point, the role of video component may represent one of a Primary video, an alternative camera view, an alternative video component, a sign language screen, and a follow subject video. At this point, the primary video may be expressed as a default video. Additionally, the follow subject video may include the name of a following subject. The follow subject video may be supported by a separated video component. Additionally, the Contains relationship with Segment Class may include RelativeSegmentStartTime representing the relative start time of a segment using the start of a program as a reference.

A radio program class represents a radio program. The radio service class may include at least one of "Containment relationship with Presentable Audio Component class", "Containment relationship with Presentable CC Component class", "Adjunct relationship with NRT Data Service class", and "Containment relationship with Radio Segment Class)" as relationship. Additionally, the radio program class may include the start time of a radio segment as a property. At this point, the start time of a radio segment may be a relative time from the start time of a program.

The TV program class may represent a TV program. The presentable video component class may have "Containment relationship with Presentable Video Component Class" as relationship. "Containment relationship with Presentable Video Component Class" may include at least one of the role of a video component, a containment relationship with presentable audio component class, a containment relationship with presentable closed caption component class, an adjunct relationship with NRT data service class, the base with TV show class, and a containment relationship with TV segment class as a property. The role of a video component may represent at least one of a primary video, an alternative camera view, another alternative video component, a sign language inset, and a Follow Subject Video including the name of a followed subject. The follow subject video may be supported by a separated video component. A containment relationship with TV segment class may include a segment start time (RelativeSegmentStartTime). At this point, the segment start time may be a relative time from the start of a program.

FIG. 91 is a view illustrating a show class.

A show class represents a show. At this point, the show may represent a primary content of a program as described above. Especially, the show may represent a primary content from a view's perspective view. The show class may include at least one of "ShowIdentifier", "ShowDuration", "TextualDescription", "Genre", "GraphicalIcon", "ContentAdvisoryRating", "Targeting/personalization properties", and "Content/Service protection properties" as attribute. The show class may have an "includes" relationship with show segments"

The TV show class may represent a primary content of a TV program. The TV show class may have "Containment relationship with Presentable TV Show Segment class" as relationship.

FIG. 92 is a view illustrating a segment class, a show segment class, and an interstitial segment class.

A segment class represents a segment. The segment class may include at least one of "SegmentId", "Duration", "Targeting/personalization properties", and "Content advisory rating".

The show segment class represents a segment of a show. The show segment class may have ShowSegmentRelativeStartTime representing a relative start time using the start time of a show as a reference, as an attribute. The show segment class may have a "Sub-class" relationship with segment class.

The interstitial segment class represents a segment that is not a show segment among segments of a program. The interstitial segment class may have a "Sub-class" relationship with segment class.

A radio segment class represents a segment of a radio program.

A TV segment class represents a segment of a TV program.

A radio show segment class represents a segment of a radio show. A radio show segment class may include "ShowSegmentRelativeStartTime" as a property. In more detail, the start time of a show segment may be a relative time on the basis of a radio program.

A TV show segment class represents a show segment including a content that is a TV program. A TV show segment class may include "S ShowSegmentRelativeStartTime" as a property. In more detail, the start time of a show segment may be a relative time on the basis of a TV program.

A Radio Interstitial Segment represents a segment instead of a show segment of a radio program.

A TV Interstitial Segment represents a segment instead of a show segment of a TV program.

An OnDemand UI App class represents an application providing a user interface for OnDemand service.

An OnDemand Offering class represents offering of OnDemand service.

An OnDemand Catalog class represents description on offerings of OnDemand service. At this point, offering may represent a service product provided by OnDemand. An OnDemand request catalog class may include "relationship with OnDemand offering class".

FIG. 93 is a view illustrating an inheritance relationship with sub-attribute according to the type of broadcast service according to an embodiment of the present invention.

FIG. 93 is a view illustrating an adjunct service relationship between the above-mentioned different types of services, different types of components included in each service, and each service. The radio service may include one or more presentable audio components. Additionally, the radio component may include one or more closed caption components. Additionally, the radio component may include one or more enhanced NRT data services. The TV service may include one or more presentable video components. Additionally, the TV service may include one or more presentable audio components. Additionally, the TV service may include one or more presentable closed caption components. Additionally, the TV service may include one or more enhanced NRT data services. The NRT data service may include one or more presentable data item components. Additionally, the NRT data service may be stand-alone data service. Additionally, the NRT data service may be an adjunct NRT data service of radio service or TV service. Additionally, the NRT data service may be an adjunct NRT data service of radio service or TV service. The OnDemand service may include one or more OnDemand offerings. Additionally, the OnDemand service may include one or more catalogs describing offering. Additionally, the OnDemand service may be a UI application service providing a user interface of a service. At this point, the user interface may be customized by a service provider. Additionally, the user interface may be customized by a user.

FIG. 94 is a view illustrating an inheritance relationship between a continuous component and components having a sub-property of the continuous component according to an embodiment of the present invention.

As shown in the embodiment of FIG. 94, a continuous component may be an elementary component or a complex component. The elementary component may be an elementary video component, an elementary audio component, or an elementary closed caption component. Additionally, the complex component may be a PickOne component or a composite component. The purpose of defining "relationship" between components is that distinguishing a component audio from a composite video is very important. This is because in the case of a composite video component, it needs to be displayed differently according to the role of a member component of the composite component. Accordingly, a complex component may include a plurality of "relationships" representing the property of a role of a composite audio component or a composite video component.

FIG. 95 is a view illustrating an inheritance relationship between a presentable component and components having a sub-property of the presentable component according to an embodiment of the present invention.

The presentable component, as described above, may be one of a presentable video component, a presentable audio component, and a presentable closed caption component. The presentable video component of TV service may have one or more related presentable audio components. Additionally, the presentable video component of TV service may have one or more related presentable closed caption components. At this point, the related presentable audio component and presentable closed caption component may be played together with the presentable video component. Since a TV service is a service including a video component, the presentable audio component and the presentable closed caption component of the TV service needs to be related to the presentable video component.

FIG. 96 is a view illustrating a relationship between a service, programs in the service, and segments in the programs according to an embodiment of the present invention.

A radio service may include one or more radio programs. A radio program may be included in one or more radio services. A radio program may be offering of an NRT data service contents item or an OnDemand service. A radio program may include one or more radio segments. At this point, a radio segment may be a radio interstitial segment. A radio segment may be included in one or more radio programs. Each radio segment may be a radio show segment or a radio interstitial segment. A radio program may include one "radio show". At this point, "radio show" is not regarded as interstitial content by a service provider. A radio show may include one or more radio show segments. Such a relationship of a radio service, a radio program, a radio segment, and a radio show may be similarly applied to a relationship of a TV service, TV program, a TV segment, and a TV show.

FIG. 97 is a view illustrating an inheritance relationship with sub-attribute according to the type of broadcast service according to another embodiment of the present invention.

The service may include at least one of a linear service and an App-based service. The linear service may deliver TV service. Additionally, the linear service may deliver service to a device incapable of video decoding or having no display. In more detail, the linear service may deliver a service including only audio. The linear service may include one time base providing a reference time that is a synchronization reference. Or, the linear service may include one or more presentable video components. Or, the linear service may include one or more presentable video components. Or, the linear service may include one or more presentable audio components. Or, the linear service may include one or more App-based enhancement services. At this point, a presentable video component, as described above, may have a role representing the role of a presentable video component as a property.

The App-based enhancement service may include one or more Apps. Additionally, the app-based enhancement service may include one or more content items. Additionally, the App-based enhancement service may include one or more OnDemand components. Additionally, the app-based enhancement service may include one or more notification streams. At this point, an app may have a primary property representing a primary application necessary for App-based enhancement service. At this point, in the case that an app is a primary application, when a service including an app is selected, it may be activated immediately. According to another specific embodiment, an app may be activated by a notification included in a notification stream. According to another specific embodiment, an app may be activated by a previously activated another app. Additionally, an app that an app-based enhancement service includes may execute a content item of an app-based enhancement service.

The app-based service may include one or more app-based enhancement services. The app-based enhancement service that an app based service includes may include one primary app. Additionally, the app-based service may selectively include a time base for providing a synchronization reference time. Additionally, an app may be in a format of a content item or a data item. At this point, the content item may be referred to as a set of files constituting one app.

FIG. 98 is a view illustrating an inheritance relationship between a continuous component and components having a sub-attribute of the continuous component according to an embodiment of the present invention.

All continuous components may have a layer structure divided into a plurality of levels. In a specific embodiment, continuous components may have a layer structure divided into three levels. The continuous component may be one of a PickOne component, a composite component, and an elementary component. The PickOne component may include one or more composite components. The PickOne component may include one or more PickOne components. The PickOne component may include one or more elementary components. At least two components are included on the definition of a PickOne component. Additionally, the PickOne component may correspond to the top level in a layer structure.

The composite component may include one or more components. Additionally, the composite component may include one or more elementary components. At least two components are included on the definition of a composite component. The composite component may be included in the PickOne component of the top level.

A PickOne component not in the top level may include more than two elementary components. At this point, the elementary component may be one of an elementary video component, an elementary audio component, and an elementary closed caption component. A PickOne component not in the top level may be included in one or more PickOne components. A PickOne component not in the top level may be included in one or more composite components.

FIG. 99 is a view illustrating an inheritance relationship of an NRT content item class and an NRT file.

The NRT content item may include one or more NRT files. Additionally, one NRT file may be include in one or more NRT content items. The NRT content item may be a presentable NRT file based component. For example, the NRT content item may be a set of NRT files not combined with other files and consumed. Additionally, the NRT content item may be an elementary NRT file based component. For example, the NRT content item may be an atomic unit. In more detail, the NRT content item may be the smallest file unit. The NRT content item may include at least one of a continuous component and a non-continuous component. Especially, the NRT content item may include a combination of a continuous component and a non-continuous component.

FIG. 100 is a view illustrating a relationship between a service, programs in the service, and segments in the programs according to another embodiment of the present invention.

A linear service may include one or more programs. At this point, the program, as described above, is in a temporal segment format of a linear content. The program may be included in one or more linear services.

The linear service may include one or more App-based enhancement services. The app-based service may include one or more app-based enhancement services. The App-based enhancement service may include one or more programs. At this point, the program is in the format of an NRT content item. Or, the program may be in a format of an OnDemand component.

The program may include one or more segments. A segment may be included in one or more programs. Each segment may be a show segment or an interstitial segment. The program may share many properties with a linear service. The reason is that the program is a time slice of a linear service, an NRT content having the same structure as a temporal segment of a linear service, or an OnDemand request component having the same structure as a temporal segment of a linear service.

The program is based on one show by definition. The reason is that the show is a portion that a service providers does not consider as an interstitial material.

The show may include one or more show segments.

FIG. 101 is a view illustrating a level hierarchy of a presentable audio component.

A continuous component may be divided by three level hierarchies. The top level is a PickOne component. A middle level may include a composite component. A bottom level may include a PickOne component. All continuous components may include such three levels. However, a continuous component may be a simple elementary component not including a bottom level. In a specific embodiment, as shown in FIG. 101, a presentable audio component may be a PickOne component. At this point, the PickOne component may include a component having music, dialog, and sound effect, which are mixed with complete main music of a complete main audio component. At this point, a complete main audio component may be a PickOne component including a plurality of replaceable elementary components encoded with different bitrates. A component having music, dialog, and sound effect, which are mixed with complete main music, may be a composite component in which each of music, dialog, and sound effect is one component. At this point, a component including dialog and a component including sound effect may be an elementary component. A music component may be a PickOne component including a plurality of replaceable elementary components encoded with different bitrates.

A broadcast via a typical broadcast network is a linear service in which one broadcast is broadcasted continuously. As a broadcast via a typical broadcast network becomes a hybrid broadcast, a broadcast service may be divided into a typical linear service and an app-based service.

As described above, the linear service is a service in which a continuous component is presented according to a predetermined schedule. At this point, the linear service may be based on a time determined by a broadcast station. Additionally, the linear service may include an app triggered to be synchronized with a broadcast service.

In more detail, the linear service may include one or more video components.

Additionally, the linear service may include one or more audio components. Additionally, the linear service may include one or more closed caption components.

Furthermore, the linear service may include a time base component that is the basis for the synchronization with at least one of a component and an adjunct service.

Additionally, the linear service may include one or more triggered app based enhancements as a component. Each adjunct service may include one or more applications. At this point, an application may be synchronized with activation notification and may then be activated. An app based adjunct service component may include a series of activation notifications. Additionally, the app based adjunct service component may include one or more content items. Additionally, the App-based enhancement service component may include one or more OnDemand components. At described above, in the case that an app is a primary application, when a service including an app is selected, it may be activated immediately. According to another specific embodiment, an app may be activated by a notification included in a notification stream. According to another specific embodiment, an app may be activated by a previously activated another app. Additionally, an app that an app-based enhancement service includes may execute a content item of an app-based enhancement service.

Additionally, the linear service may include one or more auto-launch app-based enhancements as a component. Each adjunct service may include an application auto-launched when service is selected. The auto-launch app-based enhancements include an auto-launched application as a component. Additionally, one or more content items may be included as a component. Additionally, the app-based enhancement service may include one or more notification streams as a component. Additionally, the auto launch app-based enhancement service may include one more content items as a component.

The linear service may include may include both auto-launch app-based enhancements and triggered app based enhancements as a component. In a specific embodiment, auto-launch app-based enhancements are inserted as a target advertisement and triggered app based enhancements provide interactive viewing experience to a user.

An app based service is that a specified application is launched when service is selected. The app-based service may include one app-based enhancement services. At this point, an app based service including an app-based enhancement service may include one specified primary app. The app may be in a format of a content item or a data item. At this point, the content item may be referred to as a set of files constituting one app. At this point, a service may include an auto-launched application as a property. Additionally, the app based service may include one or more content items as a property.

Components of a service may be shared between a plurality of different components. Additionally, an application of an app based service may initiate the playback of OnDemand content.

In relation to the linear service, a program and a segment are described again. The program is a temporal section of the linear service. At this point, the program has a scheduled start time and duration. Additionally, the program may be defined by a broadcast station so as to be consumed by one program unit.

Additionally, the program may refer to an OnDemand content having the same structure as a content item or a program of a linear service. At this point, the OnDemand content does not have a scheduled start time unlike a program of a linear service. Additionally, the OnDemand does not include a time base defined by a broadcast station.

Each program relates to "show". At this point, the show includes the primary content of a program. As described above, ma properties of a program are properties of a show. For example, properties such as a text describing a program, actors, and a release data in the program are properties of a show. Program properties other than show properties are properties of a program itself. The properties of a program itself may vary even when the program including the same show. For example, a start time in a program and a service including a program may vary for each program.

A program includes one or more temporal sections including a show. Additionally, a program may include one or more temporal sections including an interstitial content. Such a temporal section is called a segment. In more detail, a temporal section may be divided into a show segment and an interstitial segment.

A segment may have a predetermined start time and length as part of a program. Such a segment is called an anchored segment. Additionally, there is a non-anchored segment that is dynamically inserted into a program. In more detail, a non-anchored segment is a segment in which a specific program to be inserted or a specific time to be inserted is not defined. For example, a targeting advertisement in which a program and time to be inserted are not defined and received by the broadcast reception device 100 may be a non-anchored segment.

The broadcast reception device 100 may display an application relating to a program by the control unit 150 through a service guide. Additionally, the broadcast reception device 100 may add an application relating to a program to a favorite list or download it on the basis of a user input. In more detail, when an auto-launch app based service is provided with a packaged app, the broadcast reception device 100 may display it through a service guide displaying a broadcast program. This will be described with reference to FIG. 102.

FIG. 102 is a flowchart illustrating operations when a broadcast reception device displays an auto-launch app based service through a broadcast service guide and stores it as a favorite or downloads it.

The broadcast reception device 100 receives a broadcast signal through the broadcast receiving unit 110 in operation S951.

The broadcast reception device 100 obtains auto-launch app based service information through the control unit 150 on the basis of the broadcast signal in operation S953. In a specific embodiment, the broadcast reception device 100 may obtain the auto-launch app based service information from the broadcast signal. For example, the broadcast reception device 100 may obtain the auto-launch app based service information from the above-described service information or program information.

The broadcast reception device 100 displays a service guide through the control unit 150 on the basis of the auto-launch app based service information in operation S955. In a specific embodiment, the broadcast reception device 100 may display the auto-launch app based service information in addition to the program information. Especially, the broadcast reception device 100 may display both the auto-launch app based service information and the program information relating to auto-launch app based service.

The broadcast reception device 100 receives a user input for auto-launch app based service through the control unit 150 in operation S957. In more detail, the broadcast reception device 100 may receive a user input for selecting auto-launch app based service. In more detail, the broadcast reception device 100 may receive a user input for storing an auto-launch application as a favorite. In another specific embodiment, the broadcast reception device 100 may receive a user input for downloading an auto-launch application.

The broadcast reception device 100 stores an auto-launch application as a favorite or downloads it through the control unit 150 on the basis of a user input in operation S959. In more detail, the broadcast reception device 100 may store an auto-launch application of a selected auto-launch app based service as a favorite or may download it.

The broadcast reception device 100 displays an auto-launch application stored as a favorite or a downloaded auto-launch application through the control unit 150 in operation S961. In more detail, the broadcast reception device 100 may display an auto-launch application stored as a favorite or a downloaded auto-launch application. In a specific embodiment, the broadcast reception device 100 may display an auto-launch application stored as a favorite or a downloaded auto-launch application through an icon. Additionally, the broadcast reception device 100 may receive a user input for an auto-launch application stored as a favorite or a downloaded auto-launch application and may then download or launch an auto-launch application. Through this, the broadcast reception device 100 may allow a broadcast service guide to serve as an application store of a smartphone.

In conventional broadcasting, a sign language screen for hearing-impaired person is directly inserted to a broadcast video. Accordingly, users that have no hearing impairment and thus do not need to see a sign language screen are forced to view the sign language inconveniently. Additionally, the sign language screen is fixed constantly so that this may block a scene that general users want to see intensively. Broadcasters may need to perform an encoding process for inserting a sign language screen into general content in order to transmit the sign language screen. In order to solve this inconvenience, required are a broadcast transmission device and an operating method thereof, and a broadcast reception device and an operating method thereof. This will be described with reference to FIGS. 103 to 108.

A broadcast transmission device may transmit a sign language screen through an additional video different from a video including a general content. The broadcast reception device 100 may overlay an additional video including a sign language screen on a video not including a general content and a sign language screen. Additionally, the broadcast reception device 100 may receive information representing a location at which a sign language screen is displayed and may display an additional video including a sign language screen on the basis of the information representing the location. Or, the broadcast reception device 100 may display an additional video including a sign language screen on the basis of a user input for a location at which a sign language is to be displayed. Additionally, there are various kinds of sign languages used in many countries in addition to general languages. Accordingly, a broadcast transmission device may transmit a plurality of videos respectively including a plurality of sign language screens for one general content. At this point, the broadcast reception device 100 may display one of a plurality of videos respectively including a plurality of sign language screens. At this point, the broadcast reception device 100 may display one of a plurality of videos respectively including a plurality of sign language screens on the basis of a user input. A method of signaling the transmission of such a sign language screen is required.

In a specific embodiment, a video signaling a sign language screen may be signaled as an additional component. Especially, a sign language screen may be signaled efficiently through the above-mentioned object model.

Especially, a sign language component may include information representing a location at which a sign component is to be displayed. Additionally, a sign language component may include information representing the type of a sign language.

A continuous component transmitting a sign language screen may be referred to as a sign language component. At this point, a sign language component class may include as an attribute at least one of a codec representing encoding codec of a sign language screen, a resolution representing the resolution of a sign language screen, coordinates representing a location at which a sign language screen is displayed, an aspect ratio of a sign language screen representing the aspect ratio of a sign language screen, a scanning method representing a scanning method of an image, a frame rate representing the frame rate of a sign language screen, a still picture mode, other encoding parameters, and the type of a sign language. The resolution may be expressed by pixel units of width×height. The coordinates may be displayed by using a pixel at which a sign language screen is displayed.

For example, if the coordinates are (10,10), this represents a pixel corresponding to the horizontal 10 and the vertical 10. Additionally, the coordinates may be displayed with the ratio of a screen resolution at which a sign language screen is displayed. For example, if the coordinates are (10,10) and the screen resolution is 1920×1080, the coordinates may represent a pixel corresponding to the horizontal 192 and the vertical 108. Additionally, the scanning method may be one of an interlaced method and a progressive method. Additionally, other encoding parameters may be determined according to codec. Additionally, the type of a sign language may represent one of American Sign Language (ASL), Panamanian Sign Language (LSP), Mexican Sign Language (LSM), and Korean Sign Language (KSL).

At this point, the presentable video component class may have AssociatedSignLanguage relationship with Presentable SignLanguage Component class as relationship. AssociatedSignLanguage relationship with Presentable SignLanguage Component class may represent that displaying a presentable video component and a presentable sign language component simultaneously is suitable. In more detail, the presentable sign language component may overlay on a presentable video component.

The presentable sign language component class represents a presentable component including a sign language content.

Additionally, the above-mentioned TV service class may include Containment Relationship with Presentable Sign Language Component Class as relationship.

Additionally, the above-mentioned TV program class may include Containment relationship with Presentable Sign Language Component Class as relationship.

FIG. 103 is a view illustrating an inheritance relationship with sub-attribute according to the type of broadcast service according to another embodiment of the present invention. As described above, a service may include one or more sign language components. In more detail, a plurality of sign language components may be different types of sign languages representing the same content. The broadcast reception device 100 may display one of a plurality of sign language components according to a user input by receiving the user input. Accordingly, the TV service may include one or more sign language components. Additionally, a radio service may include one or more sign language components. Accordingly, a TV service class may include one or more sign language component classes. Additionally, a radio service class may include one or more sign language component classes.

FIG. 104 is a view illustrating an inheritance relationship between a continuous component and components having a sub-attribute of the continuous component according to an embodiment of the present invention.

As described above, the continuous component may be a complex component or an elementary component. The elementary component may be an elementary sign language component.

FIG. 105 is a view illustrating an inheritance relationship between a presentable component and components having a sub-attribute of the presentable component according to another embodiment of the present invention.

A presentable component may be a presentable sign language component. The presentable video component of each TV service may have one or more presentable sign language components. At this point, the presentable sign language component should be associated with a presentable video component.

In another specific embodiment, a broadcast transmission device may signal a video including a sign language screen by using the property of an elementary video component. In more detail, the elementary video component may include a mode property representing the type of video. At this point, the mode may represent one of a normal representing a general video instead of a sign language screen and a sign language. At this point, when the video component is a sign language, it may include information representing the type of the sign language and coordinate information representing a location at which the sign language screen is to be displayed, as a property. The coordinates may be displayed by using a pixel at which a sign language screen is displayed. For example, if the coordinates are (10,10), this represents a pixel corresponding to the horizontal 10 and the vertical 10. Additionally, the coordinates may be displayed with the ratio of a screen resolution at which a sign language screen is displayed. For example, if the coordinates are (10,10) and the screen resolution is 1920×1080, the coordinates may represent a pixel corresponding to the horizontal 192 and the vertical 108.

In another specific embodiment, a broadcast transmission device may modify information representing the role of a video that is a property that a service, a program, or a composite video component includes and may then signal a video including a sign language screen. In more detail, information representing the role of a video that a service, a program, or a composite video component includes may represent a sign language. At this point, a service, a program, or a composite video component may include information representing the type of the sign language and coordinate information representing a location at which the sign language screen is to be displayed, as a property. The coordinates may be displayed by using a pixel at which a sign language screen is displayed. For example, if the coordinates are (10,10), this represents a pixel corresponding to the horizontal 10 and the vertical 10. Additionally, the coordinates may be displayed with the ratio of a screen resolution at which a sign language screen is displayed. For example, if the coordinates are (10,10) and the screen resolution is 1920×1080, the coordinates may represent a pixel corresponding to the horizontal 192 and the vertical 108. In a specific object model, a role attribute that a service class, a program class, or a composite video component class includes may represent a sign language.

In another specific embodiment, a broadcast transmission device may signal a video including a sign language screen through information representing accessibility to content. In more detail, a broadcast transmission device may signal a video including a sign language screen by using information representing the accessibility to content as the property of at least one of a presentable component, a content item component, a service, a program, a show, a segment, an app, an app-based enhancement service, and an app-based service. Additionally, a broadcast transmission device may allow a targeting property representing a user or a broadcast reception device that a service targets to include information representing the accessibility to content and may then transmit it. In a specific embodiment, the information representing the accessibility to content may include the property of a video including a sign language screen. At this point, a video including a sign language screen component may include information representing the type of the sign language and coordinate information representing a location at which the sign language screen is to be displayed, as a property. The coordinates may be displayed by using a pixel at which a sign language screen is displayed. For example, if the coordinates are (10,10), this represents a pixel corresponding to the horizontal 10 and the vertical 10. Additionally, the coordinates may be displayed with the ratio of a screen resolution at which a sign language screen is displayed. For example, if the coordinates are (10,10) and the screen resolution is 1920×1080, the coordinates may represent a pixel corresponding to the horizontal 192 and the vertical 108. In a specific object model, at least one of a presentable component class, a content item component class, a service class, a program class, a show class, a segment class, an app class, an app-based enhancement service class, and an app-based service class may include information representing the accessibility as an attribute. Additionally, a targeting attribute of a service class may include accessibility representing the accessibility to content as an attribute.

FIG. 106 is a flowchart illustrating operations of a broadcast transmission device to transmit information signaling a video including a sign language screen according to an embodiment of the present invention.

The broadcast transmission device obtains the property of a video including a sign language screen through a control unit in operation S971. The property of a video including a sign language screen, as described above, may include at least one of coordinates representing a location at which the video including the sign language screen is displayed and information representing the type of a sign language.

The broadcast transmission device generates information signaling a video including a sign language screen through the control unit in operation S973. As described above, the broadcast transmission device may signal a video including a sign language screen through at least one of an additional component, the property of an elementary video component, information representing the role of a video that is the property that a service, a program, or a composite video component includes, and information representing the accessibility to content.

The broadcast transmission device transmits a broadcast signal signaling a video including a sign language screen through a transmission unit in operation S975.

FIG. 107 is a flowchart illustrating operations of a broadcast reception device to display a video including a sign language screen according to an embodiment of the present invention.

The broadcast reception device 100 receives a broadcast signal through the broadcast reception unit 110 in operation S981.

The broadcast reception device 100 obtains information signaling a video including a sign language screen on the basis of broadcast signals through the control unit 150 in operation S983. As described above, the information signaling a video including a sign language screen may be signaled through at least one of an additional component, the property of an elementary video component, information representing the role of a video that is the property that a service, a program, or a composite video component includes, and information representing the accessibility to content.

The broadcast reception device 100 obtains the property on a video including a sign language screen on the basis of information signaling the video including the sign language screen through the control unit 150 in operation S985. The property of a video including a sign language screen, as described above, may include at least one of coordinates representing a location at which the video including the sign language screen is displayed and information representing the type of a sign language.

The broadcast reception device 100 displays a video including a sign language screen on the basis of the property on a video including a sign language screen through the control unit 150 in operation S987. In more detail, the broadcast reception device 100 may display a video including a sign language screen on the basis of the coordinates representing a location at which a video including sign language screen is displayed. Additionally, the broadcast reception device 100 may overlay a video including a sign language screen on a video not including a sign language screen and may then display it. Additionally, in a specific embodiment, the broadcast reception device 100 may display a video including a sign language screen on the basis of a user input. This will be described with reference to FIG. 108.

FIG. 108 is a view illustrating an interface of a user input for setting a sign language by a broadcast reception device according to an embodiment of the present invention.

The broadcast reception device 100 may display a video including a sign language screen on the basis of a user input. At this point, the user input may be a user input on whether to display a video displaying a sign language screen. Additionally, the user input may be a user input on a location at which a video including a sign language screen is displayed. Additionally, the user input may be a user input for the type of a sign language of a sign language screen. When a broadcast service or a program includes a plurality of videos including a sign language screen, the broadcast reception device 100 may receive a user input for selecting one of a plurality of videos including a sign language screen. At this point, the broadcast reception device 100 may display a video including a sign language screen selected according to a user input for selecting one of a plurality of videos including a sign language screen. In a specific embodiment, the broadcast reception device 100 may receive such a user input through a setting menu for setting an operation of the broadcast reception device 100 as shown in the embodiment of FIG. 108.

According to embodiments of the present invention, it is described that a broadcast transmission device transmits broadcast service together with service signaling information and the broadcast reception device 100 receives broadcast service on the basis of service signaling information. Then, providing, by the broadcast reception device 100, information to a companion device interworking with broadcast service and an operation of a companion device will be described.

FIG. 109 is a view illustrating a broadcast system providing a broadcast service interoperating with a companion device according to an embodiment of the present invention.

The broadcast system includes a broadcast reception device 100, a companion device 200, a broadcast transmission device 300, and a content/signaling server 400, and an ACR server 500.

The broadcast transmission device 300 refers to a broadcast server transmitting broadcast services. At this point, the broadcast reception device 100 receives a broadcast service from the broadcast transmission device 300 through a broadcast channel. Additionally, the broadcast reception device 100 may receive information signaling a broadcast service from the broadcast transmission device 300 through a broadcast network. Additionally, the broadcast reception device 100 may receive additional information for broadcast service, for example, a trigger, a Trigger Parameter Table (TPT), a Trigger Declarative Object (TDO), from the broadcast transmission device 300 through a broadcast network.

The content/signaling server 400 generates and manages a content on broadcast service. At this point, the broadcast reception device 100 may receive at least one of additional information on broadcast service and signaling information of broadcast service from the content/signaling server 400 through a communication network (for example, broadcast channel).

The ACR server 300 manages ACR related data on broadcast service. At this point, the broadcast reception device 100 may receive at least one of a trigger and an application on broadcast service from the ACR server 300 through a communication network (for example, broadcast channel).

The companion device 200 executes a broadcast service related additional function as interoperating with the broadcast reception device 100 through a home network. In more detail, the companion device 200 may obtain at least one of applications and files relating to broadcast service. Additionally, the companion device 200 may execute applications and files relating to broadcast service. At this point, the companion device 200 may uses a mobile communication network such as 3GPP or an HTTP proxy server instead of a home network. Additionally, according to a specific embodiment, when broadcast service related applications or files are transmitted through File Delivery over Unidirectional Transport (FLUTE), the companion device 200 may receive at least one of the broadcast service related applications or files from the broadcast reception device 100. Additionally, the companion device 200 may be referred to as a second screen device. Additionally, the companion device 200 may include at least one of smartphones, tablets, and laptops. In more detail, the companion device 200 may be a terminal device having a communication function such as network instead of a broadcast reception function through a broadcast network. Additionally, the companion device 200 may be one or more. The companion device 200 may include a control unit controlling overall operations of the companion device 200 and a communication unit performing a communication with an external device. The control unit may include one or more processors, one or more circuits, and one or more hardware modules, which perform each of a plurality of functions that the control unit performs. In more detail, the control unit may be a System On Chip (SOC) in which several semiconductor parts are integrated into one. At this point, the SOC may be semiconductor in which various multimedia components such as graphics, audio, video, and modem and a semiconductor such as a processor and D-RAM are integrated into one. Additionally, a communication unit may include one or more processors, one or more circuits, and one or more hardware modules, which perform each of a plurality of functions that the communication unit performs. In more detail, the communication unit may be a System On Chip (SOC) in which several semiconductor parts are integrated into one. At this point, the SOC may be semiconductor in which various multimedia components such as graphics, audio, video, and modem and a semiconductor such as a processor and D-RAM are integrated into one.

Additionally, the broadcast reception device 100 may be referred to as a primary device.

Additionally, according to a specific embodiment, at least two of the broadcast transmission device 300, the content/signaling server 400, and the ACR server 500 are integrated into one server and used.

As described above, the broadcast reception device 100 may receive signaling information of broadcast service from the broadcast transmission device 300. Additionally, the broadcast reception device 100 may receive signaling information of broadcast service from the content/signaling server 400. At this point, the signaling information of broadcast service may include the properties of broadcast service. This will be described in more detail with reference to FIG. 110.

FIG. 110 is a view illustrating the properties of signaled broadcast service according to an embodiment of the present invention.

The signaling information of broadcast service that the broadcast reception device 100 receives may include the properties of broadcast service. At this point, the properties of broadcast service may include at least one of a broadcast service identifier for identifying a broadcast service, the name of a broadcast service, the channel number of a broadcast service, a description of a broadcast service, the genre of a broadcast service, an icon representing a broadcast service, the primary language of a broadcast service, usage report information relating to a broadcast service, a targeting property representing information of a device providing a broadcast service, a property for broadcast service protection, a content advisory rating, and information on a media component in a broadcast service. The targeting property may represent at least one of a primary device or the companion device 200, as a device providing service. The channel number of a broadcast service may include a major channel number and a minor channel number. The information on a media component may include at least one of an identifier for identifying a media component, the type of a media component, the name of a media component, the start time of a media component, the duration of a media component, information representing a screen that a media components targets, URL for receiving a media component, the advisory rating of a media component, and the genre of a media component. At this point, the screen that a media component targets may represent the companion device 200. In more detail, a screen that a media component targets may represent at least one of no companion device, all devices, smartphones, tablet PCs, TVs, and PCs. A tablet PC may represent a mobile device having no communication function through a mobile communication network such as 3G and LTE and including a display.

The property of a broadcast service may be signaled in XML format as shown in FIG. 110. However, the signaling format for the property of a broadcast service is not limited thereto and the property of a broadcast service may be signaled in another format such as bit stream.

In more detail, the information signaling the property of a broadcast service may include as an element at least one of ServiceID, ServiceName, MajorChanNum, MinorChanNum, Description, Genre, Icon, Language, UsageReportingInfo, Targeting, ServiceProtection, AdvisoryRating, and ComponentItem. ServiceID represents a broadcast service identifier for identifying service. At this point, there may be only one ServiceID. Additionally, according to a specific embodiment, ServiceID may have an unsigned short data type. In more detail, the broadcast reception device 100 and the companion device 200 may identify broadcast service on the basis of ServiceID.

ServiceName represents the name of a broadcast service. ServiceName may be provided in zero, or one or more. According to a specific embodiment, ServiceName may have a string data type. In more detail, the broadcast reception device 100 and the companion device 200 may display the name of a broadcast service on the basis of ServiceName.

MajorChanNum and MinorChanNum respectively represent the major number and minor number of the channel number of a broadcast service. According to a specific embodiment, MajorChanNum and MinorChanNum may be provided in zero or one. Additionally, MajorChanNum and MinorChanNum may have an integer value among 0 to 15. MajorChanNum and MinorChanNum may be used to easily select a user's broadcast service. In more detail, the broadcast reception device 100 and the companion device 200 may display the channel number of a broadcast service on the basis of MajorChanNum and MinorChanNum.

Description represents a description of a broadcast service. Description may be provided in zero, or one or more. Description may have a string data type. A user may guess the content of a broadcast through Description. In more detail, the broadcast reception device 100 and the companion device 200 may display a description of a broadcast service on the basis of Description.

Genre represents the genre of a broadcast service. Genre may be provided in zero, or one or more. According to a specific embodiment, Genre may have a string data type. A user may know the genre of a broadcast service through Genre. In more detail, the broadcast reception device 100 and the companion device 200 may display the genre of a broadcast service on the basis of Genre.

Icon represents a broadcast service. Icon may be provided in zero, or one or more. Icon may have a base 64 binary data type. A user may easily know the content of a broadcast service through an icon representing a broadcast service. In more detail, the broadcast reception device 100 and the companion device 200 may display an icon representing a broadcast service on the basis of Icon.

Language represents the main Language of a broadcast service. Language may be provided in zero or one. Language may have a string data type. In more detail, the broadcast reception device 100 and the companion device 200 may display the primary language of a broadcast service on the basis of Language.

UsageReportingInfo represents usage report information relating to a broadcast service. UsageReportingInfo may be provided in zero, or one or more. UsageReportingInfo may have a string data type. In more detail, UsageReportingInfo may be used as a parameter for usage information report. For example, UsageReportingInfo may include at least one of a URL for usage information report and a report period. Through such usage information report, a broadcast service provider may obtain usage information of a broadcast service and billing information on a broadcast service. In more detail, the broadcast reception device 100 and the companion device 200 may report usage information of a broadcast service on the basis of UsageReportingInfo.

Targeting represents the targeting property of a broadcast service. Targeting may be provided in zero, or one or more. In more detail, Targeting may have a string data type. In more detail, Targeting may represent whether a corresponding broadcast service is for a primary device such as the broadcast reception device 100 or the companion device 200. In more detail, the broadcast reception device 100 and the companion device 200 may determine whether to display a broadcast service on the basis of Targeting.

ServiceProtection represents the property on protection of a broadcast service. ServiceProtection may be provided in zero or one. In more detail, ServiceProtection may have a string data type.

AdvisoryRating represents the advisory rating of a broadcast service. AdvisoryRating may be provided in zero, or one or more. AdvisoryRating may have a string data type. The broadcast reception device 100 and the companion device 200 may block a broadcast service on the basis of an advisory rating and personalization information.

ComponentItem represents information on a media component in a broadcast service. In more detail, ComponentItem may include at least one of componentId, ComponentType, ComponentName, StartTime, Duration, TargetScreen, URL, ContentAdvisory, and Genre.

ComponentId represents an identifier for identifying a corresponding media component. In more detail, ComponentId may be provided in one. In more detail, ComponentId may have an unsigned data type. In more detail, the broadcast reception device 100 and the companion device 200 may identify a media component on the basis of ComponentId.

CmponentType represents the type of a corresponding media component. In more detail, CmponentTypemay be provided in one. CmponentType may have a string data type. In more detail, the broadcast reception device 100 and the companion device 200 may display the type of a media component on the basis of CmponentType.

ComponentName represents the name of a corresponding media component. In more detail, ComponentName may be provided in zero, or one or more. ComponentName may have a string data type. In more detail, the broadcast reception device 100 and the companion device 200 may display the name of a media component on the basis of ComponentName.

StartTime represents the start time of a corresponding media component. In more detail, StartTime may be provided in zero or one. In more detail, StartTime may have an unsigned short data type. In more detail, the broadcast reception device 100 and the companion device 200 may determine the start time of a media component on the basis of StartTime.

Duration represents the Duration of a corresponding media component. In more detail, Duration may be provided in zero or one. In more detail, Duration may have an unsigned short data type. In more detail, the broadcast reception device 100 and the companion device 200 may determine the duration of a media component on the basis of Duration.

TargetScreen represents a screen that a corresponding media component targets. In more detail, TargetScreen may be provided in zero, or one or more. In more detail, TargetScreen may have a string data type. In more detail, the broadcast reception device 100 and the companion device 200 may determine whether to play a corresponding media component on the basis of TargetScreen. In a specific embodiment, TartgetScreen may represent that there is no companion device corresponding to a media component or a media component targets all devices. Additionally, TargetScreen may represent that a media component targets at least one of a smartphone, a tablet PC, a TV, and a PC. In more detail, as shown in an embodiment of FIG. 111, when a value of TargetScreen is 0x00, TargetScreen may represent that there is no companion device corresponding to a media component. When a value of TargetScreen is 0x01, TargetScreen may represent that a media component targets a class of all devices. When a value of TargetScreen is 0x02, TargetScreen may represent that a media component targets a smartphone class. When a value of TargetScreen is 0x03, TargetScreen may represent that a media component targets a tablet PC class. When a value of TargetScreen is 0x04, TargetScreen may represent that a media component targets a TV class. When a value of TargetScreen is 0x05, TargetScreen may represent that a media component targets a PC class.

URL represents an address for receiving a media component. In more detail, URL may be provided in zero, or one or more. In more detail, URL may have a URI data type. In more detail, URL may represent the address of the content/signaling server 400. In more detail, the broadcast reception device 100 and the companion device 200 may receive a media component on the basis of URL.

ContentAdvisory represents the advisory rating of a corresponding media component. When a value of ContentAdvisory conflicts a value of AdvisoryRating, the value of ContentAdvisory may have priority. In more detail, ContentAdvisory may be provided in zero, or one or more. In more detail, ContentAdvisory may have a string data type. In more detail, the broadcast reception device 100 and the companion device 200 may determine whether to play a media component on the basis of ContentAdvisory.

Genre represents the genre of a media component. In more detail, Genre may be provided in one or more. Genre may have a string data type. When Genre conflicts the above-mentioned genre of a service, Genre representing the genre of a media component may have priority. In more detail, the broadcast reception device 100 and the companion device 200 may display the genre of a media component on the basis of Genre.

As described above, the broadcast reception device 100 and the companion device 200 may interoperate with the broadcast reception device 200 through at least one of a home network, a mobile communication network such as 3GPP, and an HTTP proxy server. At this point, a communication between the broadcast reception device 100 and the companion device 200 may be made through various methods. In more detail, a communication between the broadcast reception device 100 and the companion device 100 may be made through Universal Plug and Play (UPnP).

UPnP classifies a device into a control point (CP) and controlled devices (CDs). The CP controls the CDs through an UPnP protocol. According to a specific embodiment, the broadcast reception device 100 corresponds to one of the CDs. Additionally, the companion device 200 may correspond to the CP. UPnP defines discovery, description, control, and eventing protocols. The discovery protocol is a protocol through which a CP searches for a CD. The description protocol is a protocol through which a CP obtains information of a CD. The control protocol is a protocol through which a CP invokes a predetermined operation of a CD. The eventing protocol is a protocol through which a CD delivers unsynchronized notifications to a CP. The broadcast reception device 100 and the companion device 200 may interoperate with each other through at least one of the discovery, description, and control, and eventing protocols of the UPnP protocol. For example, the broadcast reception device 100 may find the companion device 200 through the discovery protocol. Specific operations of the broadcast reception device 100 and the companion device 200 will be described with reference to FIGS. 112 to 122.

FIG. 112 is a view illustrating a parameter representing a state of a signaled broadcast service property according to an embodiment of the present invention.

The broadcast reception device 100 may transmit one parameter representing the property of a broadcast service to a companion device 200. One parameter representing the property of a broadcast service may include the property of a current broadcast service. In more detail, as shown in the embodiment of FIG. 112, a parameter such as ServiceProperty may be transmitted. According to a specific embodiment, ServiceProperty may be an essential parameter and may have a string data type. Additionally, according to a specific embodiment, ServiceProperty may not have a related action. When a subscription for ServiceProperty is requested, the broadcast reception device 100 may transmit ServiceProperty to the companion device 200. A specific process of the broadcast reception device 100 to transmit the property of a broadcast service is described with reference to FIG. 113.

FIG. 113 is a ladder diagram illustrating operations when a broadcast reception device signals a broadcast service property to a companion device according to an embodiment of the present invention.

The broadcast reception device 100 and the companion device 200 generate a pairing session in operation 52001. In more detail, the broadcast reception device 100 may generate a pairing session with the companion device 200 through an IP communication unit 130. In more detail, the companion device 200 may generate a pairing session with the broadcast reception device 100 through a communication unit. In more detail, the broadcast reception device 100 and the companion device 200 may generate a pairing session for bidirectional communication. In more detail, the broadcast reception device 100 and the companion device 200 may generate a pairing session by using the UPnP protocol. According to a specific embodiment, the broadcast reception device 100 may find the companion device 200 through the discovery protocol of UPnP. For example, a discovery message that the broadcast reception device 100 searches for a companion device to interoperate through a well known IP address may be multicasted. At this point, the companion device 200 receiving a multicasted message may request a description from the broadcast reception device 100. The broadcast reception device 100 may provide the description to the companion device 200 on the basis of the description request of the companion device 200. The companion device 200 may access the broadcast reception device 200 on the basis of the description. According to another embodiment, the companion device 200 may find the broadcast reception device 100 through the discovery protocol of UPnP. For example, a message that the companion device 200 searches for the broadcast reception device 100 to interoperate through a well known IP address may be multicasted. At this point, the broadcast reception device 100 may reply with a display message on the basis of the multicasted message. Accordingly, the companion device 200 receiving the discovery message may request a description from the broadcast reception device 100. The broadcast reception device 100 may provide the description to the companion device 200 on the basis of the description request of the companion device 200. The companion device 200 may access the broadcast reception device 200 on the basis of the description.

The companion device 200 requests a property notification of a broadcast service from the broadcast reception device 100 in operation S2003. In more detail, the companion device 200 may request a property notification of a broadcast service from the broadcast reception device 100 through a control unit. In more detail, the companion device 200 may request a property notification of a broadcast service from the broadcast reception device 100 through the UPnP protocol. According to a specific embodiment, the companion device 200 may request an event subscription for the property of a broadcast service from the broadcast reception device 100 on the basis of an eventing protocol.

The broadcast reception device 100 receives information signaling a broadcast service property on the basis of a broadcast service in operation S2005. In more detail, the broadcast reception device 100 may receive information signaling a broadcast service property from the broadcast transmission device 300 through the broadcast reception unit 110.

The broadcast reception device 100 notifies the broadcast service property to the companion device 200 on the basis of the information signaling the property of a broadcast service in operation S2007. In more detail, the broadcast reception device 100 notifies the broadcast service property to the companion device 200 through the control unit 150 on the basis of the information signaling the property of a broadcast service. In more detail, the broadcast reception device 100 may determine whether the property of a broadcast service is changed compared to before. When the property of a broadcast service is changed compared to before, the broadcast reception device 100 may notify the property of a broadcast service to the companion device 200. According to a specific embodiment, the broadcast reception device 100 may notify the property of a broadcast service to the companion device 200 through a parameter representing a state of the broadcast service property. According to a specific embodiment, the parameter representing a state of the broadcast service property may be ServiceProperty of FIG. 112. A data format of the parameter representing a state of the broadcast service property will be described in more detail with reference to FIG. 114.

FIG. 114 is a view illustrating a data format of a broadcast service property that a broadcast reception device signals to a companion device according to an embodiment of the present invention.

The data format of a broadcast service property may be XML format as shown in FIG. 114. However, the data format of a broadcast service property is not limited thereto. In the embodiment of FIG. 114, the data format of a broadcast service property includes all the properties of a broadcast service described with reference to FIG. 110. Accordingly, even if only part of the broadcast service properties is changed, the broadcast reception device 100 needs to transmit the entire broadcast service properties and the companion device 200 needs to receive the entire broadcast service properties. In such a case, the data amount exchanged between the broadcast reception device 100 and the companion device 200 increases. Additionally, the companion device 200 needs to check which broadcast service property is changed again. Accordingly, a method of the broadcast reception device 100 to efficiently signal a broadcast service property to the companion device 200 is required. This will be described with reference to FIGS. 115 to 117.

FIG. 115 is a view illustrating a parameter representing a state of a broadcast service property that a broadcast reception device signals to a companion device, an action for broadcast service property, and an action argument according to another embodiment of the present invention.

According to another embodiment of the present invention, the parameter representing the property of a broadcast service may include at least one of a parameter representing a broadcast service property, a parameter representing the name of a broadcast service property, and a parameter representing whether a broadcast service property is changed. In more detail, when the companion device 200 requests a specific property of a broadcast service, the broadcast reception device 100 may transmit the property of a broadcast service on the basis of the request of the companion device 200. In more detail, the broadcast reception device 100 may transmit the specific property of the broadcast service that the companion device 200 requests. For example, the broadcast reception device 100 may notify the companion device 200 whether the property of a broadcast service is changed through a parameter representing whether the property of the broadcast service is changed. At this point, the companion device 200 may request the property of a broadcast service through a parameter representing the name of a broadcast service property. The broadcast reception device 100 may notify the broadcast service property to the companion device 200 through a parameter representing the broadcast service property.

According to a specific embodiment, the parameter representing the property of a broadcast service may include at least one of ServiceProperty, ServicePropertyName, and ServicePropertyChangeFlag. ServiceProperty represents the property of a broadcast service. According to a specific embodiment, ServiceProperty may be an essential parameter and may have a string data type. ServicePropertyName represents the name of a broadcast service property. ServicePropertyName is an essential parameter and may have a string data type. ServicePropertyChangeFlag represents whether a broadcast service property is changed. According to a specific embodiment, ServicePropertyChangeFlag may be an essential parameter and may have a Boolean data type. Additionally, when the companion device 200 request a subscription for ServicePropertyChangeFlag, the broadcast reception device 100 may transmit ServicePropertyChangeFlag to the companion device 200.

The companion device 200 may use a GetServiceProperty action to request the property of a broadcast service through a parameter representing the name of a broadcast service property. GetServiceProperty is an essential action. At this point, GetServiceProperty may have ServiceProgpertyName as an argument for input. Additionally, GetServiceProperty may have ServiceProperty as an argument for output. According to a specific embodiment, when the companion device 200 sets the property of a broadcast service to be obtained to SevicePropertyName and transmits a GetServiceProperty action to the broadcast reception device 100, the companion device 200 may receive the property of a broadcast service corresponding to ServicePropertyName as ServiceProperty. Specific operations of the broadcast reception device 100 and the companion device 200 will be described with reference to FIG. 116.

FIG. 116 is a ladder diagram illustrating operations when a broadcast reception device signals a broadcast service property to a companion device according to another embodiment of the present invention.

The broadcast reception device 100 and the companion device 200 generate a pairing session in operation S2021. In more detail, the broadcast reception device 100 may generate a pairing session with the companion device 200 through an IP communication unit 130. In more detail, the companion device 200 may generate a pairing session with the broadcast reception device 100 through a communication unit. As described above, the broadcast reception device 100 and the companion device 200 may generate a pairing session for bidirectional communication. In more detail, operations of the broadcast reception device 100 and the companion device 200 may be identical to those in the embodiment of FIG. 113.

The companion device 200 requests a property change notification of a broadcast service from the broadcast reception device 100 in operation S2023. In more detail, the companion device 200 may request a property change notification of a broadcast service from the broadcast reception device 100 through a control unit. In more detail, operations of the companion device 200 may be identical to those in the embodiment of FIG. 113.

The broadcast reception device 100 receives information signaling a broadcast service property on the basis of a broadcast service in operation S2025. In more detail, the broadcast reception device 100 may receive information signaling a broadcast service property from the broadcast transmission device 300 through the broadcast reception unit 110.

The broadcast reception device 100 notifies the companion device 200 whether the broadcast service property is changed on the basis of the information signaling the property of a broadcast service in operation S2027. In more detail, the broadcast reception device 100 notifies the companion device 200 whether the broadcast service property is changed through the control unit 150 on the basis of the information signaling the property of a broadcast service. In more detail, the broadcast reception device 100 may determine whether the property of a broadcast service is changed compared to before. When the property of a broadcast service is changed compared to before, the broadcast reception device 100 may notify the property change of a broadcast service to the companion device 200. In more detail, the broadcast reception device 100 may determine whether the property of a broadcast service is changed on the basis of the version of information signaling the property of a broadcast is changed compared to before. Additionally, according to a specific embodiment, the broadcast reception device 100 may notify the companion device 200 whether the property of a broadcast service is changed through a parameter representing whether the broadcast service property is changed. According to a specific embodiment, the parameter representing whether the broadcast service property is changed may be ServicePropertyChangedFlag of FIG. 115. At this point, a data format representing whether the broadcast service property is changed will be described in more detail with reference to FIG. 117.

FIG. 117 is a view illustrating a data format of whether a broadcast service property is changed that a broadcast reception device signals to a companion device according to another embodiment of the present invention.

The data format of whether a broadcast service property is changed may be XML format. However, the data format of whether a broadcast service property is not limited thereto. According to a specific embodiment, the broadcast reception device 100 may notify the companion device 200 only whether the property of a broadcast service is changed. As shown in the embodiment of FIG. 117, the broadcast reception device 100 may display whether the property of a broadcast service is changed to the companion device 200 through a Boolean parameter having a TRUE value or a FALSE value. For example, when the property of a broadcast service is changed, the broadcast reception device 100 may transmit to the companion device 200 data in which a parameter representing whether the property of a broadcast service has a TRUE value. However, in such an embodiment, the companion device 200 may not know which property in a broadcast service is changed and may only know that at least one of broadcast service properties is changed. Accordingly, even when a broadcast service property that the companion device 200 does not require is changed, the companion device 200 requests the property of a broadcast service. Accordingly, such an embodiment may cause unnecessary operations and unnecessary data exchanges of the broadcast reception device 100 and the companion device 200. To resolve this issue, the broadcast reception device 100 may need to notify a changed broadcast service property to the companion device 200. This will be described with reference to FIGS. 118 and 121.

FIG. 118 is a view illustrating parameters representing a state of a broadcast service property that a broadcast reception device signals to a companion device according to another embodiment of the present invention.

When the property of a broadcast service is changed, the broadcast reception device 100 may notify the companion device 200 the changed property and whether the broadcast service property is changed together. For this, the parameter representing whether a broadcast service property is changed may include information representing the changed property of a broadcast service. For this, the parameter representing whether a broadcast service property is changed may have a binary hex type. Accordingly, other parameters, actions, and action arguments are the same and according to an embodiment of FIG. 115, ServicePropertyChangedFlag that is a parameter representing whether the property of a broadcast service is changed may be a binary hex type. When a subscription for ServicePropertyChangedFlag is requested, the broadcast reception device 100 may transmit ServicePropertyChangedFlag to the companion device 200. A data format of whether the property of a broadcast service is changed that the broadcast reception device 100 signals to the companion device 200 will be described with reference to FIG. 119.

FIG. 119 is a view illustrating a data format of whether a broadcast service property is changed that a broadcast reception device signals to a companion device according to another embodiment of the present invention.

The data format of whether a broadcast service property is changed may be XML format. However, the data format of whether a broadcast service property is not limited thereto. The broadcast reception device 100 allocates a specific bit to each broadcast service property and when the property of a broadcast is changed, displays a corresponding bit with 1. In the embodiment of FIG. 119, a hexadecimal number 90080004 is a binary number 1001 0000 0000 1000 0000 0000 0100. At this point, the first four bits represent the primary language, genre, advisory rating, and targeting property of a broadcast, respectively. In this case, the companion device 200 may recognize that the primary language and targeting property of a broadcast are changed.

Again, referring to FIG. 116, the case that the broadcast reception device 100 signals a broadcast service property to the companion device 2200 will be described according to another embodiment of the present invention.

The companion device 200 requests a specific property of a broadcast service from the broadcast reception device 100 in operation S2029. The specific property of a broadcast service may be one or more properties among a plurality of broadcast service properties in information signaling the property of a broadcast. The companion device 200 may request a specific property of a broadcast service from the broadcast reception device 100 through a control unit. In more detail, when the broadcast reception device 100 transmits a property change notification of a broadcast service, the companion device 200 may request the specific property of the broadcast service from the broadcast reception device 100. At this point, the specific property of the broadcast service may be the property of a broadcast service necessary for the companion device 200 to provide broadcast service related additional services. Additionally, as shown in FIGS. 120 and 121, when the broadcast reception device 100 signals changed part among broadcast service properties, the companion device 100 may request the specific property of the broadcast service on the basis of the changed property type of the broadcast service. In more detail, when a specific property of a broadcast service is changed, the companion device 200 may request the specific property of the broadcast service. The specific property of the broadcast service may be a property necessary for the companion device 200 to provide broadcast service related additional services. For example, in the case that the companion device 200 determines whether to present a broadcast service on the basis of the targeting property of the broadcast service, when the targeting property of the broadcast service is changed, the companion device 200 may request the targeting property of the broadcast service.

The broadcast reception device 100 notifies the specific property of the broadcast service to the companion device 200 in operation S2031. In more detail, the broadcast reception device 100 may notify the specific property of the broadcast service to the companion device 200 through the control unit 150. In more detail, the broadcast reception device 100 may notify the specific property of the broadcast service on the basis of a request of the companion device 200. For example, the broadcast reception device 100 may transmit the specific property of the broadcast service that the companion device 200 requests to the companion device 200.

However, such an embodiment may require a continuous communication between the broadcast reception device 100 and the companion device 200. Especially, when the broadcast reception device 100 interoperates with a plurality of companion devices 200, a continuous communication may cause the overload to an operation of the broadcast reception device 100. This issue may be resolved if the companion device 100 receives the property of a broadcast service from the content/signaling server 400. This will be described with reference to FIGS. 120 and 121.

FIG. 120 is a view illustrating parameters representing a state of a broadcast service property that a broadcast reception device signals to a companion device according to another embodiment of the present invention.

When the property of a broadcast service is changed, the broadcast reception device 100 may notify the companion device 200 of a URL address for receiving whether the broadcast service property is changed and the property of the broadcast service. For this, a parameter representing a state of a broadcast service property that the broadcast reception device 100 signals to the companion device 200 may include information representing a URL address for the property of the broadcast service. According to a specific embodiment, a parameter representing a state of a signaled broadcast service property may include ServicePropertyChangeFlag representing a URL address for receiving the property of a broadcast service. According to a specific embodiment, ServicePropertyChangeFlag may be an optional parameter and may have a string data type. Specific operations of the broadcast reception device 100 and the companion device 200 will be described with reference to FIG. 121.

FIG. 121 is a ladder diagram illustrating operations when a broadcast reception device signals a broadcast service property to a companion device according to another embodiment of the present invention.

The broadcast reception device 100 and the companion device 200 generate a pairing session in operation S2041. In more detail, the broadcast reception device 100 may generate a pairing session with the companion device 200 through an IP communication unit 130. In more detail, the companion device 200 may generate a pairing session with the broadcast reception device 100 through a communication unit. As described above, the broadcast reception device 100 and the companion device 200 may generate a pairing session for bidirectional communication. In more detail, operations of the broadcast reception device 100 and the companion device 200 may be identical to those in the embodiment of FIG. 116.

The companion device 200 requests a property change notification of a broadcast service from the broadcast reception device 100 in operation S2043. In more detail, the companion device 200 may request a property notification of a broadcast service from the broadcast reception device 100 through a control unit. In more detail, operations of the companion device 200 may be identical to those in the embodiment of FIG. 116.

The broadcast reception device 100 receives information signaling a broadcast service property on the basis of a broadcast service in operation S2045. In more detail, the broadcast reception device 100 may receive information signaling a broadcast service property from the broadcast transmission device 300 through the broadcast reception unit 110.

The broadcast reception device 100 notifies the companion device 200 of a URL for obtaining whether the broadcast service property is changed and the property of a broadcast service on the basis of the information signaling the property of the broadcast service in operation S2047. In more detail, the broadcast reception device 100 notifies the companion device 200 of a URL for obtaining whether the broadcast service property is changed and the property of a broadcast service through the control unit 150 on the basis of the information signaling the property of a broadcast service. In more detail, the broadcast reception device 100 may determine whether the property of a broadcast service is changed compared to before. In more detail, the broadcast reception device 100 may determine whether the property of a broadcast service is changed on the basis of the version of information signaling the property of a broadcast is changed compared to before. Additionally, when the property of a broadcast service is changed compared to before, the broadcast reception device 100 may notify the companion device 200 of a URL address for obtaining the broadcast service property change and the broadcast service property. According to a specific embodiment, the broadcast reception device 100 may notify the companion device 200 whether the property of a broadcast service is changed through a parameter representing whether the broadcast service property is changed. According to a specific embodiment, the parameter representing whether the broadcast service property is changed may be ServicePropertyChangeFlag of FIG. 120. Additionally, the broadcast reception device 100 may notify the companion device 200 whether the property of a broadcast service is changed through a parameter representing a URL for obtaining the property of the broadcast service. According to a specific embodiment, the parameter representing a URL for obtaining the property of the broadcast service may be ServicePropertyURL of FIG. 120.

The companion device 200 obtains the property of a broadcast service on the basis of a URL for obtaining the property of the broadcast service in operation S2049. In more detail, the companion device 200 obtains the property of a broadcast service through a control unit on the basis of a URL for obtaining the property of the broadcast service. In more detail, the companion device 200 obtains the property of a broadcast service from the content/signaling server 400 on the basis of a URL for obtaining the property of the broadcast service. In more detail, the companion device 200 requests the property of a broadcast service from the content/signaling server 400 on the basis of a URL for obtaining the property of the broadcast service and then obtains the property of the broadcast service from the content/signaling server 400. Through this, the load of the broadcast communication device 100 resulting from a communication between the broadcast reception device 100 and the companion device 200 may be reduced. However, according to such an embodiment, even when the property of a broadcast service that the companion device 200 does not require is changed, the broadcast reception device 100 needs to notify the broadcast service property change. Accordingly, the broadcast reception device 100 needs to perform an unnecessary operation. As a necessary broadcast service property is set in advance when the companion device 200 requests a notification change from the broadcast reception device 100, unnecessary operations of the broadcast reception device 100 may be reduced. This will be described with reference to FIGS. 122 and 123.

FIG. 122 is a view illustrating a parameter representing a state of a broadcast service property that a broadcast reception device signals to a companion device, an action for broadcast service property, and an action argument according to another embodiment of the present invention.

The companion device 200 may designate a desired broadcast service property to be notified as requesting a property change notification of a broadcast service from the broadcast reception device 100. For this, the companion device 200 may include an action for designating the desired broadcast service property to be notified. At this point, the action may have a parameter representing a desired broadcast service property to be notified as an input argument. Such an action may be SetServiceProperty of FIG. 122. According to a specific embodiment, SetServiceProperty may be an essential action. Additionally, SetServiceProperty may have ServicePropertyName representing the type of a broadcast service property as an input argument. Specific operations of the broadcast reception device 100 and the companion device 200 will be described with reference to FIG. 123.

FIG. 123 is a ladder diagram illustrating operations when a broadcast reception device signals a broadcast service property to a companion device according to another embodiment of the present invention.

The broadcast reception device 100 and the companion device 200 generate a pairing session in operation S2061. In more detail, the broadcast reception device 100 may generate a pairing session with the companion device 200 through an IP communication unit 130. In more detail, the companion device 200 may generate a pairing session with the broadcast reception device 100 through a communication unit. As described above, the broadcast reception device 100 and the companion device 200 may generate a pairing session for bidirectional communication. In more detail, operations of the broadcast reception device 100 and the companion device 200 may be identical to those in the embodiment of FIG. 121.

The companion device 200 requests a specific property change notification of a broadcast service from the broadcast reception device 100 in operation S2063. In more detail, the companion device 200 may request a specific property change notification of a broadcast service from the broadcast reception device 100 through a control unit. The companion device 200 may request only a specific property change of a broadcast service necessary for providing broadcast service related additional services. According to a specific embodiment, the companion device 200 may request a specific property change notification of a broadcast service through an action for requesting only the specific property change notification. At this point, the action for requesting only the specific property change notification may be SetServiceProperty of FIG. 122. An operation of the companion device 200 to request a specific property change notification of a broadcast service from the broadcast reception device 100 may include the following operations. The companion device 200 requests a subscription for service property change notification from the broadcast reception device 100. When accepting the request for service property change notification subscription, the broadcast reception device 100 may transmit an acceptance message and a subscription identifier (SID) for identifying the subscription request to the companion device 200. The companion device 200 may request a specific property change notification of a broadcast service from the broadcast reception device 100 on the basis of the SID. In more detail, the companion device 200 may transmit both the SID and a specific property change of a broadcast service to be notified. Additionally, the companion device 200 may request a plurality of changed specific properties of a broadcast service from the broadcast reception device 100. At this point, the companion device 200 may request a plurality of specific properties of a broadcast service as in a list form.

The broadcast reception device 100 receives information signaling a broadcast service property on the basis of a broadcast service in operation S2065. In more detail, the broadcast reception device 100 may receive information signaling a broadcast service property from the broadcast transmission device 300 through the broadcast reception unit 110.

The broadcast reception device 100 checks whether a specific property of a broadcast is changed in operation S2067. In more detail, the broadcast reception device 100 may check whether a specific property of a broadcast service is changed through the control unit 150. In more detail, the broadcast reception device 100 may determine whether the specific property of a broadcast service is changed compared to before. In more detail, the broadcast reception device 100 may determine whether the specific property of a broadcast service is changed by comparing a previous value and the current value of the specific property of the broadcast service.

When the specific property of the broadcast service is changed, the broadcast reception device 100 notifies the companion device 200 whether the specific broadcast service property is changed on the basis of the information signaling the property of a broadcast service in operation S2069. In more detail, when the specific broadcast service property is changed, the broadcast reception device 100 notifies the companion device 200 whether the specific broadcast service property is changed through the control unit 150 on the basis of the information signaling the property of a broadcast service.

The companion device 200 requests a specific property of a broadcast service from the broadcast reception device 100 in operation S2071. In more detail, the companion device 200 may request a specific property of a broadcast service from the broadcast reception device 100 through a control unit. In more detail, when the broadcast reception device 100 transmits a specific property change notification of a broadcast service, the companion device 200 may request the specific property of the broadcast service from the broadcast reception device 100. Specific operations of the companion device 200 may be identical to those in the embodiment of FIG. 116.

The broadcast reception device 100 notifies the specific property of the broadcast service to the companion device 200 in operation S2073. The broadcast reception device 100 may notify the specific property of the broadcast service to the companion device 200 through the control unit 150. In more detail, the broadcast reception device 100 may notify the specific property of the broadcast service on the basis of a request of the companion device 200. For example, the broadcast reception device 100 may transmit the specific property of the broadcast service that the companion device 200 requests to the companion device 200.

Additionally, the companion device 200 does not obtain the specific property of the broadcast service from the broadcast reception device 100 but as described with reference to FIG. 121, obtains a URL for obtaining a broadcast service property and then obtains the specific property of the broadcast service on the basis of the URL for obtaining the broadcast service property. Through such an operation, unnecessary operations of the broadcast reception device 100 to notify the property change of a broadcast service to the companion device 200 may be reduced.

The broadcast reception device 100 may receive an emergency alert for disaster situations such as natural disasters, terrorism, and war through a network. Additionally, the broadcast reception device 100 may notify this to users. Through this, many people can recognize national disaster situations quickly and efficiently. However, if a user cannot stare at the broadcast reception device 100 all the time, there may be an emergency alert situation that is not recognized by the user. Even when a user cannot stare at the broadcast reception device 100 all the time, it is highly possible for the user to carry the companion device 200 such as a mobile phone or a tablet all the time. Accordingly, if the broadcast reception device 100 transmits an emergency alert to the companion device 200 and the companion device displays the emergency alert, a national disaster situation can be quickly notified to a user efficiently. This will be described with reference to FIGS. 124 to 136.

FIG. 124 is a view illustrating operations when an emergency alert is generated and transmitted through a broadcast network according to an embodiment of the present invention.

An alert system managing an emergency alert through broadcast service may receive an emergency situation from authorities having the authority to issue an emergency issue through Integrated Public Alert & Warning System (IPWS) or a message according to Common Alerting Protocol (CAP) through other sources. The alert system determines whether a CAP message corresponds to a current region. When the CAP message corresponds to the current region, the alert system inserts the CAP message into a broadcast signal. Accordingly, the CAP message is transmitted through a broadcast signal. An operation of the broadcast reception device 100 to receive a broadcast signal and transmit an emergency alert to a user is described with reference to FIG. 125.

FIG. 125 is a view when a broadcast reception device extracts and displays emergency information signaled through a broadcast network according to an embodiment of the present invention.

The broadcast transmission device 200 may extract an Emergency Alter Table (EAT) on the basis of a broadcast signal and may extract a CAP message from the EAT. Additionally, the broadcast transmission device 200 may obtain additional information relating to the emergency alert on the basis of an NRT service identifier in the EAT. In more detail, the broadcast reception device 200 may obtain additional information relating to the emergency alert on the basis of an EAS_NRT_service_id field in the EAT. In more detail, the broadcast reception device 200 may obtain information on a FLUTE session transmitting additional information relating to the emergency alert from a table signaling NRT service on the basis of the NRT service identifier in the EAT. At this point, the table signaling NRT service may be a Service Map Table (SMT). The broadcast reception device 200 may receive additional information relating to an emergency alert from a corresponding FLUTE session on the basis of information on the FLUTE session. The broadcast reception device 200 may receive the emergency alert and may then display the emergency alert on a service guide displaying information on a broadcast service and a broadcast service program. In more detail, the broadcast reception device 200 extracts a service identifier from a Guide Access Table (GAT) and extracts information corresponding to the service identifier from a table signaling NRT service to receive the emergency alert. According to a specific embodiment, the broadcast reception device 200 may obtain information on the FLUTE session of a service corresponding to the extracted service identifier from the GAT. Then, the broadcast reception device 200 may receive an emergency alert message on the basis of the information on the FLUTE session and may display the emergency alert message on the service guide. The format of the CAP message may be the same as FIG. 126.

Specific operations of the broadcast reception device 100 and the companion device 200 will be described with reference to FIGS. 127 to 136.

FIG. 51 is a view illustrating a parameter representing a state of an emergency alert that a broadcast reception device signals, an action for emergency alert, and an action argument according to an embodiment of the present invention.

According to an embodiment of the present invention, the parameter representing a state of an emergency alert may include at least one of a parameter representing information on an emergency alert message including an emergency alert and a parameter representing information on an emergency alert including all emergency alert messages. In more detail, when receiving an emergency alert, the broadcast reception device 100 may notify the information on the emergency alert message to the companion device 100. The information on the emergency alert will be described with reference to FIG. 128.

FIG. 128 is a view illustrating information on an emergency alert message signaled by a broadcast reception device according to an embodiment of the present invention.

The information on an emergency alert message may include at least one of the version of an emergency alert, the format of an emergency alert message, the date of receiving an emergency alert message, and the time of receiving an emergency alert message. In more detail, the information may include at least one of messageType representing the format of an emergency alert message, dateTime representing the date of receiving an emergency alert message and the time of receiving an emergency alert message, and version representing the version of an emergency alert. According to a specific embodiment, information on a message including an emergency alert may be in XML format as shown in FIG. 128. However, the format of a message including an emergency alert is not limited thereto.

Again, referring to FIG. 127, a parameter representing a state of an emergency alert that a broadcast reception device signals, an action for emergency alert, and an action argument are described according to an embodiment of the present invention.

Additionally, the companion device 200 may request information on an emergency alert including all emergency alert messages through an action. At this point, the broadcast reception device 100 may signal to the companion device 200 the information on an emergency alert including all emergency alert messages through the parameter including information on an emergency alert. According to a specific embodiment, the parameter representing a state of an emergency alert may include at least one of EmergencyAlert and EmergencyAlertProperty. EmergencyAlert includes information on a message including an emergency alert. According to a specific embodiment, EmergencyAlert may be an essential parameter and may have a string data type. The broadcast reception device 100 may transmit EmergencyAlert through an eventing protocol of UPnP. According to a specific embodiment, when the broadcast reception device 100 receives an emergency alert, EmergencyAlertProperty includes information on an emergency alert. EmergencyAlertProperty is an essential parameter and may have a string data type. Additionally, an action for requesting information on an emergency alert including all emergency alert message may be GetAllEmergencyAlertMessage. According to a specific embodiment, GetAllEmergencyAlertMessage may be an essential action. Additionally, GetAllEmergencyAlertMessage may have EmergencyAlertProperty as an output argument.

Operations of the broadcast reception device 100 and the companion device 200 will be described with reference to FIG. 129.

FIG. 129 is a ladder diagram illustrating operations when a broadcast reception device signals an emergency alert to a companion device according to an embodiment of the present invention.

The broadcast reception device 100 and the companion device 200 generate a pairing session in operation 52101. In more detail, the broadcast reception device 100 may generate a pairing session with the companion device 200 through an IP communication unit 130. In more detail, the companion device 200 may generate a pairing session with the broadcast reception device 100 through a communication unit. As described above, the broadcast reception device 100 and the companion device 200 may generate a pairing session for bidirectional communication. In more detail, operations of the broadcast reception device 100 and the companion device 200 may be identical to those in the embodiment of FIG. 113.

The companion device 200 requests an emergency alert reception notification from the broadcast reception device 100 in operation S2103. In more detail, the companion device 200 may request an emergency alert reception notification from the broadcast reception device 100 through a control unit. In more detail, the companion device 200 may request an emergency alert reception notification from the broadcast reception device 100 through the UPnP protocol. According to a specific embodiment, the companion device 200 may requests an event subscription for an emergency alert reception notification from the broadcast reception device 100 on the basis of an eventing protocol.

The broadcast reception device 100 receives a message including an emergency alert from the broadcast transmission unit 300 in operation S2105. In more detail, the broadcast reception device 100 may receive an emergency alert message from the broadcast transmission device 300 through the broadcast reception unit 110.

The broadcast reception device 100 notifies information on the emergency alert message to the companion device 200 on the basis of the emergency alert message in operation S2107. In more detail, the broadcast reception device 100 may notify information on the emergency alert message to the companion device 200 through the control unit 150 on the basis of the emergency alert message. According to a specific embodiment, the broadcast reception device 100 may notify the companion device 200 of the information on the emergency alert message through a parameter representing the information on the emergency alert message. According to a specific embodiment, the parameter representing the information on the emergency alert message may be EmergencyAlert of FIG. 128.

The companion device 200 requests the information on the emergency alert from the broadcast reception device 100 in operation S2109. In more detail, the companion device 200 may request an emergency alert from the broadcast reception device 100 through a control unit. According to a specific embodiment, the companion device 200 may request an emergency alert through an action requesting an emergency alert. According to a specific embodiment, the action requesting an emergency alert may be GetEmergencyAlertMessage of FIG. 128.

The broadcast reception device 100 notifies information on an emergency alert including all emergency alert messages to the companion device 200 in operation S2111. In more detail, the broadcast reception device 100 may notify information on the emergency alert including all emergency alert messages to the companion device 200 through the control unit 150. However, in such a case, since all emergency alert message need to be transmitted and received, this may serve as a load to operations of the broadcast reception device 100 and the companion device 200. Accordingly, a method of efficiently transmitting an emergency alert message to the companion device 200 is required.

The broadcast reception device 100 may extract information necessary for the companion device 200 from an emergency alert message and may then transmit the extracted information to the companion device 200. According to a specific embodiment, the broadcast reception device 100 may extract from the emergency alert message at least one of an identifier for identifying an emergency alert, information representing the category of an emergency alert, information representing a description for an emergency alert, information representing a region corresponding to an emergency alert, information representing the urgency of an emergency alert, information representing the severity of a disaster causing an emergency alert, and information representing the certainty of a disaster causing an emergency alert. According to a specific embodiment, the broadcast reception device 100 may extract from the emergency alert message at least one of identifier that is an element for identifying an emergency alert, category that is an element representing the category of an emergency alert, description that is an element representing a description for an emergency alert, areaDesc that is an element representing a region corresponding to an emergency alert, urgency that is an element representing the urgency of an emergency alert, severity that is an element representing the severity of a disaster causing an emergency alert, and certainty that is an element representing the certainty of a disaster causing an emergency alert.

The companion device 200 may determine the priority of an emergency alert and may operate on the basis of the priority of the emergency alert. A method of determining the priority of an emergency alert will be described with reference to FIGS. 130 to 132.

FIGS. 130 to 132 are views illustrating the criteria of a broadcast reception device to determine the priority of an emergency alert according to an embodiment of the present invention.

The companion device 200 may classify the priority of an emergency alert on the basis of each value of information representing the urgency of an emergency alert, information representing the severity of a disaster causing an emergency alert, and information representing the certainty of a disaster causing an emergency alert. At this point, the companion device 200 may determine the priority of an emergency alert according to a value having the highest priority among information representing the urgency of an emergency alert, information representing the severity of a disaster causing an emergency alert, and information representing the certainty of a disaster causing an emergency alert. According to a specific embodiment, the companion device 200 may classify the priority of an emergency alert into three urgencies according to values of information representing the urgency of an emergency alert, information representing the severity of a disaster causing an emergency alert, and information representing the certainty of a disaster causing an emergency alert. For example, as shown in FIG. 130, it is determined that the companion device 200 has the highest priority when the Urgency element corresponds to Immediate or Expected, has a medium priority lower than the highest priority and higher than the lowest priority when the Urgency element corresponds to Future, has the lowest priority when the Urgency element corresponds to Past, and has a priority corresponding to an initial value when the Urgency element corresponds to Unknown. At this point, the initial value may have a medium priority lower than the highest priority and higher than the lowest priority. Additionally, as shown in FIG. 130, it is determined that the companion device 200 has the highest priority when the Severity element corresponds to Extreme or Severe, has a medium priority lower than the highest priority and higher than the lowest priority when the Severity element corresponds to Moderate, has the lowest priority when the Severity element corresponds to Minor, and has a priority corresponding to an initial value when the Severity element corresponds to Unknown. At this point, the initial value may have a medium priority lower than the highest priority and higher than the lowest priority. Additionally, as shown in FIG. 54, it is determined that the companion device 200 has the highest priority when the Certainty element corresponds to Very likely or likely, has a medium priority lower than the highest priority and higher than the lowest priority when the Certainty element corresponds to Possible, has the lowest priority when the Certainty element corresponds to Unlikely, and has a priority corresponding to an initial value when the Certainty element corresponds to Unknown. At this point, the initial value may have a medium priority lower than the highest priority and higher than the lowest priority.

According to another embodiment, the companion device 200 may assign points on the basis of each value of information representing the urgency of an emergency alert, information representing the severity of a disaster causing an emergency alert, and information representing the certainty of a disaster causing an emergency alert, and may then determine the priority of an emergency alert according to the point sum. According to a specific embodiment, the companion device 200 may assign points with the same weight to information representing the urgency of an emergency alert, information representing the severity of a disaster causing an emergency alert, and information representing the certainty of a disaster causing an emergency alert. For example, as shown in FIG. 131, the companion device 200 may assign five points when the Urgency element corresponds to Immediate, four points when the Urgency element corresponds to Expected, three points when the Urgency element corresponds to Future, two points when Urgency element corresponds to Past, and one point when Urgency element corresponds to Unknown. Additionally, as shown in FIG. 131, the companion device 200 may assign five points when the Severity element corresponds to Extreme, four points when the Severity element corresponds to Severe, three points when the Severity element corresponds to Moderate, two points when Severity element corresponds to Minor, and one point when Severity element corresponds to Unknown. Additionally, as shown in FIG. 131, the companion device 200 may assign five points when the Certainty element corresponds to Very likely, four points when the Certainty element corresponds to likely, three points when the Certainty element corresponds to Possible, two points when Certainty element corresponds to Unlikely, and one point when Certainty element corresponds to Unknown. At this point, when the point sum is greater than 10 or less than 15, the companion device 200 determines that an emergency alert has the highest priority. Additionally, when the point sum is greater than 5 or less than 10, the companion device 200 determines that an emergency alert has a medium priority lower than the highest priority and higher than the lowest priority. Additionally, when the point sum is greater than 0 or less than 5, the companion device 200 determines that an emergency alert has the lowest priority.

Additionally, according to another specific embodiment, the companion device 200 may assign points with different weights to information representing the urgency of an emergency alert, information representing the severity of a disaster causing an emergency alert, and information representing the certainty of a disaster causing an emergency alert. For example, as shown in FIG. 132, the companion device 200 may assign nine points when the Urgency element corresponds to Immediate, eight points when the Urgency element corresponds to Expected, seven points when the Urgency element corresponds to Future, five points when Urgency element corresponds to Past, and zero point when Urgency element corresponds to Unknown. Additionally, as shown in FIG. 132, the companion device 200 may assign five points when the Severity element corresponds to Extreme, four points when the Severity element corresponds to Severe, three points when the Severity element corresponds to Moderate, two points when Severity element corresponds to Minor, and zero point when Severity element corresponds to Unknown. Additionally, as shown in FIG. 132, the companion device 200 may assign six points when the Certainty element corresponds to Very likely, five points when the Certainty element corresponds to likely, four points when the Certainty element corresponds to Possible, three points when Certainty element corresponds to Unlikely, and zero point when Certainty element corresponds to Unknown. At this point, when the point sum is greater than 10 or less than 15, the companion device 200 determines that an emergency alert has the highest priority. Additionally, when the point sum is greater than 5 or less than 10, the companion device 200 determines that an emergency alert has a medium priority lower than the highest priority and higher than the lowest priority. Additionally, when the point sum is greater than 0 or less than 5, the companion device 200 determines that an emergency alert has the lowest priority.

The companion device 200 may display an emergency alert on the basis of the priority of an emergency alert.

According to a specific embodiment, the companion device 200 may change at least one of an alarm sound according to an emergency alert, the duration of an alarm, the number of alarms, and an emergency alert display time on the basis of the priority of an emergency alert. For example, as the priority of an emergency alert is higher, the companion device 200 may allow an alarm sound to be higher. Additionally, as the priority of an emergency alert is higher, the companion device 200 may allow an alarm sound to be longer.

According to the embodiments described with reference to FIGS. 127 and 129, the broadcast reception device 100 needs to transmit all emergency alert message to the companion device 200. However, the companion device 200 may require only part of information of an emergency alert message. Accordingly, the broadcast reception device 200 requires an operating method thereof to transmit only part of information of an emergency alert message that the companion device 200 requires. This will be described in more detail with reference to FIGS. 133 and 134.

FIG. 133 is a view illustrating a parameter representing a state of an emergency alert that a broadcast reception device signals, an action for emergency alert, and an action argument according to another embodiment of the present invention.

The companion device 200 may designate specific information of emergency information that the companion device 200 wants to obtain while requesting information on an emergency alert from the broadcast reception device 100. Specific information of an emergency alert may be one or more information among a plurality of information included in an emergency alert message. At this point, the broadcast reception device 100 may transmit specific information on an emergency alert to the companion device 200. For this, the companion device 200 may use an action for requesting specific information on an emergency alert. At this point, the action may have a parameter for identifying specific information on an emergency alert as an input argument. According to a specific embodiment, a parameter that the companion device 200 wants to obtain specific information of an emergency alert may be EmergencyAlertField. According to a specific embodiment, EmergencyAlertField may be an essential parameter and may have a string data type. An action for requesting specific information on an emergency alert may be GetEmergencyAlerMessage. GetEmergencyAlerMessage is an essential parameter and may have EmergencyAlertField as an input argument. Specific operations of the broadcast reception device 100 and the companion device 200 will be described with reference to FIG. 134.

FIG. 134 is a ladder diagram illustrating operations when a broadcast reception device signals an emergency alert to a companion device according to another embodiment of the present invention.

The broadcast reception device 100 and the companion device 200 generate a pairing session in operation S2121. In more detail, the broadcast reception device 100 may generate a pairing session with the companion device 200 through an IP communication unit 130. In more detail, the companion device 200 may generate a pairing session with the broadcast reception device 100 through a communication unit. As described above, the broadcast reception device 100 and the companion device 200 may generate a pairing session for bidirectional communication. In more detail, operations of the broadcast reception device 100 and the companion device 200 may be identical to those in the embodiment of FIG. 129.

The companion device 200 requests an emergency alert reception notification from the broadcast reception device 100 in operation S2123. In more detail, the companion device 200 may request an emergency alert reception notification from the broadcast reception device 100 through a control unit. In more detail, operations of the companion device 200 may be identical to those in the embodiment of FIG. 129.

The broadcast reception device 100 receives an emergency alert message including an emergency alert on the basis of broadcast service in operation S2125. In more detail, the broadcast reception device 100 may receive an emergency alert message including an emergency alert from the broadcast transmission device 300 through the broadcast reception unit 110.

The broadcast reception device 100 notifies information on the emergency alert message to the companion device 200 on the basis of the emergency alert message in operation S2127. In more detail, the broadcast reception device 100 may notify information on the emergency alert message to the companion device 200 through the control unit 150 on the basis of the emergency alert message. Additionally, according to a specific embodiment, the broadcast reception device 100 may notify the companion device 200 of the information on the emergency alert message through a parameter representing the information on the emergency alert message. According to a specific embodiment, the broadcast reception device 100 may notify the companion device 200 of the information on the emergency alert message through a parameter representing the information on the emergency alert message. According to a specific embodiment, the parameter representing the emergency alert message may be EmergencyAlert of FIG. 128.

The companion device 200 requests specific information on the emergency alert from the broadcast reception device 100 in operation S2129. The companion device 200 may requests specific information on the emergency alert from the broadcast reception device 100 through a control unit. At this point, the specific information on the emergency alert may be information necessary for the companion device 200 to provide additionally information on the emergency alert. According to a specific embodiment, the companion device 200 may request from the broadcast reception device 100 at least one of an identifier for identifying an emergency alert, information representing the category of an emergency alert, information representing a description for an emergency alert, information representing a region corresponding to an emergency alert, information representing the urgency of an emergency alert, information representing the Severity of a disaster causing an emergency alert, and information representing the certainty of a disaster causing an emergency alert in the emergency alert message. For example, the companion device 200 may request from the broadcast reception device 100 at least one of identifier that is an element for identifying an emergency alert, category that is an element representing the category of an emergency alert, description that is an element representing a description for an emergency alert, areaDesc that is an element representing a region corresponding to an emergency alert, urgency that is an element representing the urgency of an emergency alert, severity that is an element representing the severity of a disaster causing an emergency alert, and certainty that is an element representing the certainty of a disaster causing an emergency alert in the emergency alert message. According to a specific embodiment, the companion device may request specific information on the emergency alert from the broadcast reception device 100 through the GetEmergencyAlertMessage action and EmergencyAlertField of FIG. 133.

The broadcast reception device 100 extracts specific information on the emergency alert on the basis of the emergency alert message in operation S2131. In more detail, the broadcast reception device 100 may extract the specific information on the emergency alert through the control unit 150 on the basis of the emergency alert message. In more detail, the broadcast reception device 100 may extract the specific information on the emergency alert from the emergency alert message through the control unit 150.

The broadcast reception device 100 notifies a specific property on the emergency alert to the companion device 200 in operation S2133. In more detail, the broadcast reception device 100 may notify the specific property on the emergency alert to the companion device 200 through the control unit 150. In more detail, the broadcast reception device 100 may notify the specific property on the emergency alert on the basis of a request of the companion device 200.

However, when the broadcast reception device 100 interoperates with a plurality of companion devices 200, as the broadcast reception device 100 directly transmits the specific information on the emergency alert necessary for the companion device 200, this may cause the overload to an operation of the broadcast reception device 100. Accordingly, a method of signaling an emergency alert to the companion device 200, which reduces the load of the broadcast reception device 100, may be required. This will be described with reference to FIG. 135.

FIG. 135 is a ladder diagram illustrating operations when a broadcast reception device signals an emergency alert to a companion device according to another embodiment of the present invention.

The broadcast reception device 100 and the companion device 200 generate a pairing session in operation S2141. In more detail, the broadcast reception device 100 may generate a pairing session with the companion device 200 through an IP communication unit 130. In more detail, the companion device 200 may generate a pairing session with the broadcast reception device 100 through a communication unit. As described above, the broadcast reception device 100 and the companion device 200 may generate a pairing session for bidirectional communication. In more detail, operations of the broadcast reception device 100 and the companion device 200 may be identical to those in the embodiment of FIG. 134.

The companion device 200 requests an emergency alert reception notification from the broadcast reception device 100 in operation S2143. In more detail, the companion device 200 may request an emergency alert reception notification from the broadcast reception device 100 through a control unit. In more detail, operations of the companion device 200 may be identical to those in the embodiment of FIG. 134.

The broadcast reception device 100 receives an emergency alert message including an emergency alert on the basis of broadcast service in operation S2145. In more detail, the broadcast reception device 100 may receive an emergency alert message including an emergency alert from the broadcast transmission device 300 through the broadcast reception unit 110.

The broadcast reception device 100 notifies a URL for obtaining information on an emergency alert message and information on an emergency alert to the companion device 200 on the basis of the emergency alert message in operation S2147. In more detail, the broadcast reception device 100 notifies a URL for obtaining information on an emergency alert message and information on an emergency alert to the companion device 200 through the control unit 150 on the basis of the emergency alert message.

The companion device 200 obtains information on an emergency alert on the basis of a URL for obtaining the information on the emergency alert. In more detail, the companion device 200 may obtain information on an emergency alert on the basis of a URL for obtaining the information on the emergency alert through a control unit. In more detail, the companion device 200 may obtain information on an emergency alert from the content/signaling server 400 on the basis of a URL for obtaining the information on the emergency alert. In more detail, the companion device 200 may request information on an emergency alert from the content/signaling server 400 on the basis of a URL for obtaining the information on the emergency alert and may then obtain the information on the emergency alert from the content/signaling server 400. Through this, the load of the broadcast communication device 100 resulting from a communication between the broadcast reception device 100 and the companion device 200 may be reduced.

When the broadcast reception device 100 transmits a user interface (UI) representing an emergency alert to the companion device 200, the load for processing the emergency alert of the companion device 200 may be reduced. This will be described with reference to FIG. 136.

FIG. 136 is a ladder diagram illustrating operations when a broadcast reception device signals an emergency alert to a companion device according to another embodiment of the present invention.

The broadcast reception device 100 and the companion device 200 generate a pairing session in operation S2161. In more detail, the broadcast reception device 100 may generate a pairing session with the companion device 200 through an IP communication unit 130. In more detail, the companion device 200 may generate a pairing session with the broadcast reception device 100 through a communication unit. As described above, the broadcast reception device 100 and the companion device 200 may generate a pairing session for bidirectional communication. In more detail, operations of the broadcast reception device 100 and the companion device 200 may be identical to those in the embodiment of FIG. 135.

The companion device 200 requests an emergency alert reception notification from the broadcast reception device 100 in operation S2163. In more detail, the companion device 200 may request an emergency alert reception notification from the broadcast reception device 100 through a control unit. In more detail, operations of the companion device 200 may be identical to those in the embodiment of FIG. 135.

The broadcast reception device 100 receives an emergency alert message including an emergency alert on the basis of broadcast service in operation S2165. In more detail, the broadcast reception device 100 may receive an emergency alert message including an emergency alert from the broadcast transmission device 300 through the broadcast reception unit 110.

The broadcast reception device 100 notifies information on an emergency alert message and UI information on an emergency alert to the companion device 200 on the basis of the emergency alert message in operation S2167. In more detail, the broadcast reception device 100 notifies the information on the emergency alert message and the UI information on the emergency alert to the companion device 200 through the control unit 150 on the basis of the emergency alert message. At this point, the UI information on the emergency alert may include a list of UIs representing the emergency alert.

The companion device 200 requests a UI for emergency alert from the broadcast reception device 100 on the basis of the UI information on the emergency alert in operation S2169. In more detail, the companion device 200 may request a UI for emergency alert from the broadcast reception device 100 through a control unit on the basis of the UI information on the emergency alert.

The broadcast reception device 100 transmits a URI for obtaining the UI for emergency alert to the companion device 200 on the basis of a request of the companion device 200 in operation S2171. The broadcast reception device 100 may transmit a UI for obtaining the UI for emergency alert through the control unit 150 on the basis of a request of the companion device 200.

The companion device 200 displays the UI for emergency alert on the basis of a URI for obtaining the UI for emergency alert in operation S2173. The companion device 200 may display a UI for emergency alert on the basis of a URI for obtaining the UI for emergency alert. In more detail, the companion device 200 may obtain a UI on the basis of a URI for obtaining the UI for emergency alert. At this point, the companion device 200 may obtain the UI for emergency information fro an external server. For example, the companion device 200 may receive at least one of image files, HTML files, and XML files for the UI for emergency information. At this point the external server may be the content/signaling server 400. According to another specific embodiment, the companion device 200 may store a UI for emergency alert in advance and may call a UI corresponding to URI among stored UIs. Additionally, the companion device 200 may display the UI for emergency obtained through such an operation. Since the companion device 200 processes an emergency alert through such an operation, the load of the companion device 200 may be reduced.

A companion device 200 may provide enhanced service relating to broadcast service. For this, a broadcast reception device 100 may transmit NRT data to the companion device 200. Especially, the broadcast reception device 100 may transmit signaling information a content item for NRT service to the companion device 200. The content item is one file or a set of a plurality of files necessary for NRT service presentation. In more detail, the content item may be one file or a set of a plurality of files that an NRT service provider intends to treat by a single unit in order to present NRT service. NRT data signaling information for the companion device 200 will be described with reference to FIG. 137.

FIG. 137 is a view illustrating NRT data signaling information for a companion device according to an embodiment of the present invention.

The NRT data signaling information for the companion device 200 may include at least one of an identifier for identifying NRT data, consumption model information representing a consumption model of NRT data, downloading state information representing a state that the broadcast reception device 100 downloads NRT data, and information on a content item configuring NRT data. The information on a content item may include at least one of an identifier for identifying a content item, a content item name representing the name of a content item, size information representing the size of a content item, presentation length information representing the presentation time of a content item, and URL information representing URL through which a content item is downloadable from a content server. The NRT data signaling information for the companion device 200 may be in XML format.

The NRT data signaling information for the companion device 200 may be in XML format as shown in an embodiment of FIG. 137. Additionally, as shown in an embodiment of FIG. 137, the NRT data signaling information for the companion device 200 may include at least one of DataId, ConsumptionModel, and DownloadingStatutContentItem as an attribute.

DataId represents the unique identifier of NRT data. In a specific embodiment, only one DataId may exist. In a specific embodiment, one DataId may exist. DataId may have an unsigned short data type.

ConsumptionModel represents the consumption model of NRT data. ConsumptionModel may represent one of Browse & Download, portal, push, Triggered, Push Scripted, Portal Scripted, and Electronic Program Guide (EPG). In more detail, Browse & Download represents the content from which NRT service is downloadable. Additionally, portal represents that NRT service provides a similar experience with a web browser. Additionally, push represents that NRT service provides content based on a user request. Triggered represents that NRT service provides an A/V program synchronized application. Push Scripted represents that a declarative object (DO) providing a content based on a user request and representing an application of NRT service provides a specific UI. Portal Scripted represents that NRT service provides a similar experience with a web browser and a DO provides a specific UI. EPG represents that NRT service provides a content consumed by the EPG application of the broadcast reception device 100. In a specific embodiment, one ConsumptionModel may exist. In a specific embodiment, ConsumptionModel may have a string data type.

DownloadingStatus represents a downloading state of NRT data of the broadcast reception device 100. The downloading state of the NRT data may represent at least one of a downloading representing that download is in progress, a completion representing a downloading completion, and an error representing a download failure. In a specific embodiment, one DownloadingStatus may exist. In a specific embodiment, DownloadingStatus may have a string data type.

ContentItem represents a content item that NRT data includes. In a specific embodiment, NRT data may include one or a plurality of content items. Accordingly, one or a plurality of ContentItem may exist.

ContentItem may include at least one of ContentItemId, ContentItemName, ContentItemSize, PlaybackLength, and URL as an attribute.

ContentItemId is an identifier for identifying a content item. In a specific embodiment, one ContentItemId may exist. In a specific embodiment, contentItemId may have an unsigned short data type.

ContentItemName represents the name of a content item. In a specific embodiment, one or a plurality of ContentItemName may exist. In a specific embodiment, ContentItemName may have a string data type.

ContentItemSize represents the size of a content item. In a specific embodiment, ContentItemSize may be displayed by byte units. In a specific embodiment, one ContentItemSize may exist. Additionally, in a specific embodiment, ContentItemSize may have an unsigned short data type.

PlaybackLength represents the playback length of a content item. PlaybackLength may exist only when a content item is video or audio. In a specific embodiment, one or a plurality of PlaybackLength may exist. In a specific embodiment, PlaybackLength may have an unsigned short data type.

URL represents URL through which a content item is received from a content server.

FIG. 138 is a view when a broadcast reception device generates NRT data signaling information for a companion device on the basis of NRT data signaling information for the broadcast reception device according to an embodiment of the present invention.

The broadcast reception device 100 may receive NRT data signaling information for the broadcast reception device 100 on the basis of a broadcast signal. The broadcast reception device 100 may transmit NRT data signaling information for the companion device 200 on the basis of the NRT data signaling information for the broadcast reception device 100. In more detail, the broadcast reception device 100 may transmit NRT data signaling information for the companion device 200 on the basis of the NRT data signaling information for the broadcast reception device 100. The broadcast reception device 100 may transmit the generated NRT data signaling information to the companion device 200. At this point, the broadcast reception device 100 may extract at least one of an identifier for identifying NRT data, consumption model information representing the consumption model of NRT data, and information on a content item that NRT data includes, from the NRT data signaling information for the broadcast reception device 100. The information on a content item may include at least one of a content item name representing the name of a content item, a content item identifier for identifying a content item, a presentation length representing the presentation time of a content item, and a content item size representing the size of a content item.

In a specific embodiment, signaling information for the broadcast reception device 100 may be divided into information signaling NRT data and information signaling a content item that NRT data includes. In more detail, the information signaling NRT data may be an ATSC standard Service Map Table (SMT). Additionally, the information signaling a content item may be an ATSC standard Non-Real-Time Information Table (NRT-IT). For example, the broadcast reception device 100 may extract a service identifier corresponding to NRT data from an SMT and may then map it to the identifier of NRT data. Additionally, the broadcast reception device 100 may extract a consumption model corresponding to NRT data from an SMT and may then map it to consumption model information. Additionally, the broadcast reception device 100 may extract a content name from an NRT IT and may then map it to a content item name. Additionally, the broadcast reception device 100 may extract a content linkage from an NRT IT and may then map it to a content identifier. Additionally, the broadcast reception device 100 may extract a presentation length from an NRT IT and may then map it to a presentation length. Additionally, the broadcast reception device 100 may extract a content length from an NRT IT and may then map it to a content item size. Additionally, the broadcast reception device 100 may extract an internet location from an NRT IT and may then map it to a URL.

Additionally, in a specific embodiment, the broadcast reception device 100 may generate NRT data signaling information for the companion device 200 on the basis of a request of the companion device 200. In more detail, the broadcast reception device 100 may generate NRT data signaling information for the companion device 200, which includes the property of NRT data that the companion device 200 requests.

The broadcast reception device 100 may generate NRT data signaling information for the companion device 200 by extracting only information necessary for the companion device 200 from NRT signaling information for the broadcast reception device 100, thereby reducing communication traffic with the companion device 200. Additionally, through this, the broadcast reception device 100 may reduce the load of the companion device 200 for NRT data signaling information processing.

FIG. 139 is a view illustrating a variable for NRT data, an action for NRT data acquisition, and an action argument according to an embodiment of the present invention.

The broadcast reception device 100 may signal NRT data to the companion device 200 by using a variable representing the property of NRT data and a variable for identifying NRT data. When there is a variation in NRT data, the broadcast reception device 100 may transmit a variable representing the property of NRT data to the companion device 200. Additionally, the companion device 200 may request the property of NRT data to be obtained from the broadcast reception device 100 by using a variable for identifying NRT data.

In a specific embodiment, the variable representing the property of NRT data may be referred to as NRTDataProperty as shown in FIG. 139. NRTDataProerty may have a string data type as an essential variable. When the companion device 200 requests an NRT data signaling notification from the broadcast reception device 100, the broadcast reception device 100 may transmit NRTDataProerty to the companion device 200. The variable for identifying NRT data may be referred to as NRTDataID as shown in FIG. 139. NRTDataID is an essential variable and may have a string data type.

The companion device 200 may use an action for requesting NRT data signaling information in order to request signaling information of NRT data from the broadcast reception device 100. The action for requesting NRT data signaling information may use a variable for identifying NRT data as an input argument and a variable representing the property of NRT data as an output argument. At this point, the action requesting NRT data signaling information may be referred to as GetNRTDataProperty as shown in FIG. 139. An input argument of GetNRTDatProperty may be NRTDataID. An output argument of GetNRTDatProperty may be NRTDataProperty. Operations of the broadcast reception device 100 and the companion device 200 will be described in more detail with reference to FIGS. 140 and 141.

FIG. 140 is a view when a broadcast reception device signals NRT data to a companion device according to an embodiment of the present invention.

The broadcast reception device 100 and the companion device 200 generate a pairing session in operation S2181. In more detail, the broadcast reception device 100 may generate a pairing session with the companion device 200 through the IP communication unit 130. In more detail, the companion device 200 may generate a pairing session with the broadcast reception device 100 through a communication unit. As described above, the broadcast reception device 100 and the companion device 200 may generate a pairing session for interactive communication. Specific operations of the broadcast reception device 100 and the companion device 200 may be identical to those of the embodiment of FIG. 136. Additionally, the broadcast reception device 100 may generate a pairing session on the basis of the compatibility with an application of the companion device 200 during a process for generating a pairing session. In more detail, the broadcast reception device 100 may generate a pairing session when it is compatible with an application of the companion device 200. In more detail, in order to check the compatibility, the broadcast reception device 100 may check at least one of the application version and the application identifier of the companion device 200. In another specific embodiment, the companion device 200 may check the compatibility with an application of the broadcast reception device 100 during a process for generating a pairing session. In more detail, the companion device 200 may generate a pairing session when it is compatible with an application of the broadcast reception device 100. In more detail, in order to check the compatibility, the companion device 200 may check at least one of the application version and the application identifier of the broadcast reception device 100.

The companion device 200 requests an NRT data signaling information notification from the broadcast reception device 100 in operation S2183. In more detail, the companion device 200 requests an NRT data signaling information notification from the broadcast reception device 100 through a control unit. In more detail, the companion device 200 may request an NRT data signaling information notification from the broadcast reception device 100 by using an UPnP protocol. In a specific embodiment, the companion device 200 may request a subscription of an event for the property of NRT data from the broadcast reception device 100 on the basis of an eventing protocol.

The broadcast reception device 100 receives NRT data signaling information for the broadcast reception device 100 on the basis of broadcast service in operation S2185. In more detail, the broadcast reception device 100 may receive NRT data signaling information from the broadcast transmission device 300 through the broadcast reception unit 110.

The broadcast reception device 100 receives NRT data on the basis of NRT data signaling information in operation S2187 and operation S2189. In more detail, the broadcast reception device 100 may receive NRT data from a broadcast network through the broadcast reception unit 110 on the basis of the NRT data signaling information. Additionally, the broadcast reception device 100 may receive NRT data from an internet network through the IP communication unit 130 on the basis of the NRT data signaling information.

The broadcast reception device 100 may notify NRT data signaling information for the companion device 200 on the basis of the NRT data signaling information for the broadcast reception device 100 in operation S2191. In more detail, the broadcast reception device 100 may notify the companion device 200 of NRT data signaling information for the companion device 200 through the control unit 150 on the basis of the NRT data signaling information for the broadcast reception device 100. As described with reference to FIG. 138, the broadcast reception device 100 may generate NRT data signaling information for the companion device 200 on the basis of the NRT data signaling information. The broadcast reception device 100 may transmit the generated NRT data signaling information for the companion device 200 to the companion device 200. Additionally, as described above, the broadcast reception device 100 may generate NRT data signaling information for the companion device 200, which includes an NRT data property that the companion device 200 requests.

As described above, the companion device 200 may request NRT data signaling information for the companion device 200 from the broadcast reception device 100 to obtain the NRT data signaling information for the companion device 200 in operation S2193 and operation S2195. In more detail, the companion device 200 may transmit an identifier for identifying NRT data to receive NRT data signaling information corresponding to the identifier. At this point, the broadcast transmission device 100 and the companion device 200 may use an action and a variable described with reference to FIG. 139.

The companion device 200 may receive NRT data on the basis of NRT data signaling information. In more detail, the companion device 200 may receive NRT data through an internet network on the basis of NRT data signaling information. In another specific embodiment, the companion device 200 may receive NRT data from the broadcast reception device 100 on the basis of NRT data signaling information. Through this, when the companion device 200 cannot receive broadcast service directly or cannot access a server providing NRT data through an internet network, it may receive NRT data.

In FIG. 140, after all NRT data is received, NRT data signaling information for the companion device 200 is transmitted to the companion device 200. In FIG. 141, the case that the broadcast reception device 100 transmits NRT data signaling information before receiving all NRT data will be described.

However, if such an operation is performed, the companion device 200 may need to receive NRT data through a broadcast network or an internet network on the basis of NRT data signaling information for the companion device 200.

FIG. 141 is a view when a broadcast reception device signals NRT data to a companion device according to another embodiment of the present invention.

The broadcast reception device 100 and the companion device 200 generate a pairing session in operation S2201. In more detail, the broadcast reception device 100 may generate a pairing session with the companion device 200 through the IP communication unit 130. In more detail, the companion device 200 may generate a pairing session with the broadcast reception device 100 through a communication unit. As described above, the broadcast reception device 100 and the companion device 200 may generate a pairing session for interactive communication. Specific operations of the broadcast reception device 100 and the companion device 200 may be identical to those of the embodiment of FIG. 140.

The companion device 200 requests an NRT data signaling information notification from the broadcast reception device 100 in operation S2203. In more detail, the companion device 200 requests an NRT data signaling information notification from the broadcast reception device 100 through a control unit. In more detail, the companion device 200 may request an NRT data signaling information notification from the broadcast reception device 100 by using an UPnP protocol. In a specific embodiment, the companion device 200 may request a subscription of an event for the property of NRT data from the broadcast reception device 100 on the basis of an eventing protocol.

The broadcast reception device 100 receives NRT data signaling information for the broadcast reception device 100 on the basis of broadcast service in operation S2205. In more detail, the broadcast reception device 100 may receive NRT data signaling information from the broadcast transmission device 300 through the broadcast reception unit 110.

The broadcast reception device 100 may notify NRT data signaling information for the companion device 200 on the basis of the NRT data signaling information for the broadcast reception device 100 in operation S2208 and operation 2209. In more detail, the broadcast reception device 100 may notify the companion device 200 of NRT data signaling information for the companion device 200 through the control unit 150 on the basis of the NRT data signaling information for the broadcast reception device 100. As described with reference to FIG. 138, the broadcast reception device 100 may generate NRT data signaling information for the companion device 200 on the basis of the NRT data signaling information. The broadcast reception device 100 may transmit the generated NRT data signaling information for the companion device 200 to the companion device 200. Additionally, as described above, the broadcast reception device 100 may generate NRT data signaling information for the companion device 200, which includes an NRT data property that the companion device 200 requests.

The broadcast reception device 100 receives NRT data on the basis of NRT data signaling information in operation S2187 and operation S2211. In more detail, the broadcast reception device 100 may start to receive NRT data from a broadcast network through the broadcast reception unit 110 on the basis of the NRT data signaling information. Additionally, the broadcast reception device 100 may start to receive NRT data from an internet network through the IP communication unit 130 on the basis of the NRT data signaling information.

The broadcast reception device 100 notifies the companion device 200 of a download state of NRT data in operation S2213. The broadcast reception device 100 may notify the download state of NRT data to the companion device 200 through the control unit 150. The broadcast reception device 100 may display the download state of NRT data as a downloading representing that download is in progress, a completion representing a downloading completion, and an error representing a download failure. At this point, when the download of NRT data is in process, the broadcast reception device 100 may display a download completed percentage. For example, the broadcast reception device 100 may display a download state "downloading . . . 30% completed". Additionally, the broadcast reception device 100 may notify the download state of NRT data to the companion device 200 at a predetermined time interval. For example, the broadcast reception device 100 may notify the download state of NRT data to the companion device 200 every 10 seconds. At this point, a notification period may be determined on the basis of a request of the companion device 200. For example, the companion device 200 may transmit a notification period while requesting an NRT data signaling information notification from the broadcast reception device 100. Additionally, the broadcast reception device 100 may notify the download state of NRT data according to a notification period that the companion device 200 requests. Additionally, the broadcast reception device 100 may notify the download state of NRT data to the companion device 200 on the basis of a download completed percentage. For example, when the NRT data download of 30%, 60%, and 100% is completed, the broadcast reception device 100 may notify the download state of NRT data to the companion device 200.

The companion device 200 may receive NRT data on the basis of NRT data signaling information. In a specific embodiment, when the companion device 200 receives the completion of NRT data download from the broadcast reception device 100, it may receive NRT data from the broadcast reception device 100 on the basis of NRT data signaling information. Through this, when the companion device 200 cannot receive broadcast service directly or cannot access a server providing NRT data through an internet network, it may receive NRT data. Additionally, through this, as soon as the NRT data downloading of the broadcast reception device 100 is completed, the companion device 200 may request NRT data from the broadcast reception device 100.

In the embodiment of FIG. 141, when compared to FIG. 140, the companion device 200 may receive NRT data signaling information for the companion device 200 faster. However, the companion device 200 may not know that the broadcast reception device 100 completes the downloading of NRT data. This may be resolved as the broadcast reception device 100 transmits a downloading state of NRT data to the companion device 200.

The broadcast reception device 100 may signal a media component to the companion device 200 or may transmit a media component to the companion device 200. However, there are many kinds of the companion device 200 interoperating with the broadcast reception device 100. The capabilities of various companion devices 200 may be different from each other. Accordingly, it is very difficult to provide a media component that all companion devices 200 present. Additionally, when the companion device 200 cannot present a received media component, a user feels uncomfortable. To solve this, it is necessary for the broadcast reception device 100 to signal device capability information that signals the capability of a device necessary for presenting a media component to the companion device 200. This will be described with reference to FIGS. 142 to 147.

FIG. 142 is a view illustrating device capability information that a broadcast reception device signals to a companion device according to an embodiment of the present invention.

The broadcast reception device 100 signals device capability information that represents the capability of a device necessary for presenting a media component to the companion device 200. The device capability information may include information on a plurality of media components. The device capability information may include at least one of a media component identifier for identifying a media component, a media component type representing the type of a media component, information on video when a media includes the video, audio codec information representing the codec of audio when a media component includes the audio, a subtitle codec representing the encoding format of a subtitle when a media component includes the subtitle, application version information representing the version of an application when a media component includes the application, a capability code when a media component is an NRT content item, an NRT file, or an OnDemand component, and a media component URL representing a URL for obtaining a media component. Information on a video included in a media component may include at least one of video codec information representing the codec of video, video resolution information representing the resolution of video, and screen ratio information representing the aspect ratio of video.

The device capability information may be in XML, format as shown in an embodiment of FIG. 142. The device capability information may include one or a plurality of ComponentItem representing one media component as an attribute. ComponentItem may include at least one of ComponentID, ComponentType, Video, AudioCodec, CCCodec, App Version, CapabilityCode, and AvailComponentURL.

ComponentID represents an identifier for identifying a media component. In a specific embodiment, one ComponentID may exist in each ComponentItem. In a specific embodiment, ComponentID may have an unsignedShort data type.

ComponentType represents the type of a media component. In a specific embodiment, one ComponentType may exist in each ComponentItem. In a specific embodiment, ComponentType may have a string data type.

Video represents information on a video that a media component includes. Video may include at least one of VideoCodec, Resolution, and AspectRatio as an attribute.

VideoCodec represents the codec of a video that a media component includes. In a specific embodiment, one VideoCodec may exist in each Video. In a specific embodiment, VideoCodec may have a string data type.

Resolution represents the resolution of a video that a media component includes. In a specific embodiment, one Resolution may exist in each Video. In a specific embodiment, Resolution may have a string data type.

AspectRatio represents the aspect ratio of a video that a media component includes. In a specific embodiment, one AspectRatio may exist in each Video. In a specific embodiment, AspectRatio may have a string data type.

AudioCodec represents the codec of an audio that a media component includes. In a specific embodiment, AudioCodec may have a string data type.

CCCodec represents the format of a subtitle that a media component includes. In a specific embodiment, CCCodec may have a string data type.

AppVersion represents the version of an application that a media component includes. In a specific embodiment, AppVersion may have an integer type.

When a media component includes an OnDemand component, an NRT content item, or an NRT file, CapabilityCode represents a capacity code corresponding to the OnDemand component, the NRT content item, or the NRT file. At this point, a value of the capability code may represent a value defined in ATSC NRT standards. In a specific embodiment, CapabilityCode may have a string data type.

AvailComponentURL represents a URL for obtaining a media component. In a specific embodiment, AvailComponentURL may include the same content as a media component and may represent a URL for receiving an alternative media component having a different device capability necessary for presentation. In a specific embodiment, AvailComponentURL may have a string data type.

FIG. 143 is a view illustrating a parameter for device capability information, an action for device capability information acquisition, and the factor of an action.

The broadcast reception device 100 may transmit device capability information to the companion device 200. In more detail, the companion device 200 may request a notification for device capability information from the broadcast reception device 100. When receiving capability information, the broadcast reception device 100 may signal device capability information to the companion device 200. Additionally, the companion device 200 may obtain capability information by requesting the capability information from the broadcast reception device 100. At this point, the broadcast reception device 100 and the companion device 200 may use a parameter, an action, and the factor of an action in an embodiment of FIG. 143.

DeviceCapabilityProperty represents device capability. The broadcast reception device 100 may notify DeviceCapabilityProperty to the companion device 200 according to a request of the companion device 200. In a specific embodiment, the broadcast reception device 100 may use an eventing protocol of UPnP.

ComponentURL represents a URL for receiving a media component.

GetComponentItem is an action that the companion device 200 requests capability information from the broadcast reception device 100. When the companion device 200 performs GetCompoentItem, the broadcast reception device 100 may output DeviceCapabilityProperty to the companion device 200.

GetComponentURL is an action that the companion device 200 requests a URL for receiving a media component from the broadcast reception device 100. When the companion device 200 performs GetComponentURL, the broadcast reception device 100 may output ComponentURL to the companion device 200. Specific operations of the broadcast reception device 100 and the companion device 200 will be described with reference to FIG. 144.

FIG. 144 is a view illustrating that a broadcast reception device signals device information to a companion device according to an embodiment of the present invention.

The broadcast reception device 100 and the companion device 200 create a pairing session in operation S2301. In more detail, the broadcast reception device 100 may create a pairing session with the companion device 200 through the IP communication unit 130. In more detail, the companion device 200 may create a pairing session with the broadcast reception device 100 through a communication unit. As described above, the broadcast reception device 100 and the companion device 200 may create a pairing session for two-way communication. Specific operations of the broadcast reception device 100 and the companion device 200 may be identical to those in the embodiment of FIG. 140.

In more detail, the companion device 200 may request a device capability information notification from the broadcast reception device 100 in operation S2303. In more detail, the companion device 200 may request a device capability information notification from the broadcast reception device 100 through a control unit. As described above, the companion device 200 may request a device capability information notification from the broadcast reception device 100 by using UPnP eventing protocol.

The broadcast reception device 100 receives broadcast service signaling information on the basis of broadcast service in operation S2305. In more detail, the broadcast reception device 100 may receive broadcast service signaling information from the broadcast transmission device 300 through the broadcast reception unit 110.

The broadcast reception device 100 may extract device capability information that signals the capability of a device necessary for presenting a media component from the service signaling information in operation S2307. The broadcast reception device 100 may extract device capability information that signals the capability of a device necessary for presenting a media component from the service signaling information in operation S2307. In a specific embodiment, the device capability information extracted by the broadcast reception device 100 may have the same format as the device capability information described with reference to FIG. 142.

The broadcast reception device 100 notifies the device capability information to the companion device 200 in operation S2309. In more detail, the broadcast reception device 100 may notify the device capability information to the companion device 200 through the control unit 150. Additionally, the broadcast reception device 100 may edit the extracted capability information to generate device capability information for the companion device 200. At this point, the broadcast reception device 100 may notify the device capability information for the companion device 200 to the companion device 200. In a specific embodiment, the device capability information for the companion device 200 may include only a property that the companion device 100 requests. In a specific embodiment, a parameter representing device capability information may be DeviceCapability-Property of FIG. 143.

The companion device 200 may request a media component from the broadcast reception device 100 on the basis of device capability information in operation S2311. The companion device 200 may request a media component from the broadcast reception device 100 through a control unit on the basis of device capability information. In more detail, the companion device 200 may determine whether the specification of the companion device 200 satisfies a device capability included in device capability information. For example, when a media component includes video, the companion device 200 may determine whether it has a codec for playing the video. Alternatively, when a media component includes audio, the companion device 200 may determine whether it has a codec for playing the audio. Alternatively, when a media component includes an application, the companion device 200 may determine whether it supports a corresponding version of the application. Alternatively, when a media component includes a subtitle, the companion device 200 may determine whether it supports the type of a corresponding subtitle. At this point, when a device capability is satisfied, the companion device 200 may request a media component from the broadcast reception device 100.

The companion device 200 receives a media component from the broadcast reception device 100 in operation S2313. The companion device 200 may receive a media component from the broadcast reception device 100 through a control unit.

The companion device 200 presents a media component in operation S2315. The companion device 200 may present a media component through a control unit.

However, the companion device 100 may not satisfy a device capability necessary for presenting a media component. In such a case, an operation of the companion device 100 is described with reference to FIG. 145.

FIG. 145 is a view illustrating that a broadcast reception device signals device information to a companion device according to an embodiment of the present invention.

Creating a pairing session by the broadcast transmission device 100 and the companion device 200 and notifying, by the broadcast transmission device 100, device capability information to the companion device 200 are identical to those described with reference to FIG. 144. Accordingly, description for this is omitted.

The companion device 200 displays to a user that media component presentation is impossible on the basis of device capability information in operation S2331. The companion device 200 may display to a user that media component presentation is impossible on the basis of device capability information through a control unit. In more detail, when the specification of the companion device 200 does not satisfy a device capability included in device capability information, the companion device 200 may display that the presentation of a media component is impossible. For example, when a media component includes video and the companion device 200 does not have a codec necessary for playing the video, the companion device 200 may display to a user that the video cannot be played. Alternatively, when a media component includes audio and the companion device 200 does not have a codec necessary for playing the audio, the companion device 200 may display to a user that the audio cannot be played. Alternatively, when a media component includes an application and the companion device 200 does not support a corresponding version of the application, the companion device 200 may display that the application cannot be executed. Alternatively, when a media component includes a subtitle and the companion device 200 does not support a corresponding subtitle version, the companion device 200 may display that the subtitle cannot be played.

In FIG. 145, there is no problem in the case that the companion device 200 cannot satisfy an essential device capability necessary for presenting a media component. However, when the companion device 200 cannot satisfy a non-essential capacity for the presentation of a media component, the companion device 200 may need to provide an opportunity for selecting the presentation of a media component to a user. This will be described with reference to FIG. 146.

FIG. 146 is a view illustrating that a broadcast reception device signals device information to a companion device according to another embodiment of the present invention.

Creating a pairing session by the broadcast transmission device 100 and the companion device 200 and notifying, by the broadcast transmission device 100, device capability information to the companion device 200 are identical to those described with reference to FIG. 144. Accordingly, description for this is omitted.

When the capability of the companion device 200 does not satisfy a device capability included in device capability information, the companion device 200 receives a user input on whether to present a media component in operation S2351. The companion device 200 may receive a user input on whether to present a media component through a control unit. In more detail, the companion device 200 may display that it cannot satisfy a device capability necessary for the presentation of a media component and may receive a user input on whether to present a media component from a user. For example, when a media component includes scalable video encoding and the companion device 200 does not support an enhancement layer, the companion device 200 may display that it is possible to play only a base layer and receive a user input. Alternatively, when a media component includes multi-channel audio and the companion device 200 does not support the multi-channel audio, the companion device 200 may display that it is possible to play only audios of some channels and receive a user input. When not satisfying both non-essential capabilities and essential capabilities, the companion device 200 may receive a user input on whether to present a media component.

The companion device 200 may request a media component from the broadcast reception device 100 on the basis of a user input in operation S2353. The companion device 200 may request a media component from the broadcast reception device 100 through a control unit on the basis of a user input.

The companion device 200 receives a media component from the broadcast reception device 100 in operation S2355. The companion device 200 may receive a media component from the broadcast reception device 100 through a control unit.

The companion device 200 presents a media component in operation S2357. The companion device 200 may present a media component through a control unit.

Through this, even when not satisfying a device capability necessary for a media component presentation, the companion device 200 may provide an option for media component presentation to a user.

At this point, since the companion device 200 does not satisfy a device capability, a media component presentation may not be smooth. In order for a smooth presentation of a media component, a media component that the companion device 200 can present needs to be received. For this, the companion device 200 may receive from the content/signaling server 400 an alternative media component including the same content as a media component and having a different device capability necessary for presentation. This will be described with reference to FIG. 147.

FIG. 147 is a view illustrating that a broadcast reception device signals device information to a companion device according to another embodiment of the present invention.

Creating a pairing session by the broadcast transmission device 100 and the companion device 200 and notifying, by the broadcast transmission device 100, device capability information to the companion device 200 are identical to those described with reference to FIG. 144. Accordingly, description for this is omitted.

The companion device 200 requests a media component URL representing a URL for receiving a media component from the broadcast reception device 100 on the basis of device capability information in operation S2381. The companion device 200 may request a media component URL from the broadcast reception device 100 through a control unit on the basis of device capability information. In more detail, when not satisfying a device capability in device capability information, the companion device 200 may request a media component URL. Additionally, a media component URL may represent a URL for receiving alternative media component including the same content as a media component but having a different device capability necessary for presentation.

The broadcast reception device 100 transmits a media component URL to the companion device 200 in operation S2383. The broadcast reception device 100 may transmit a media component URL to the companion device 200 through the control unit 150.

The companion device 200 receives an alternative media component from the content/signaling server 400 on the basis of an alternative media component URL. In more detail, the companion device 200 performs the following operations.

The companion device 200 requests an alternative media component from the content/signaling server 400 on the basis of a media component URL in operation S2385. The companion device 200 may request a media component from the content/signaling server 400 on the basis of a media component URL. In more detail, the companion device 200 may request an alternative media component by transmitting at least one of the capability or the companion device 200 and a component identifier for identifying a media component. In a specific embodiment, the content/signaling server 400 may know which media component an alternative media component that the companion 200 requests is to replace through a component identifier. Additionally, the content/signaling server 400 may find an alternative media component that the companion device 200 can present among a plurality of alternative media components through the capability of the companion device 200 that the companion device 200 transmits.

The companion device 200 receives an alternative media component from the content/signaling server 400 in operation S2387. The companion device 200 may receive an alternative media component from the content/signaling server 400 through a control unit. However, if there is no alternative media component satisfying the capability of the companion device 200 in the content/signaling server 400, a message that there is no alternative media component may be received. At this point, a message that there is no alternative media component may be delivered through a Boolean variable having a value of TRUE or FALSE. Additionally, the companion device 200 may display a message that there is no alternative media component to a user.

The companion device 200 presents a media component in operation S2389. The companion device may present a media component through a control unit. Through this, the companion device 200 may receive a presentable alternative media component including the same content as a media component. Accordingly, more companion devices 200 may interoperate with the broadcast reception device 100.

The present invention is not limited to the features, structures, and effects described in the above embodiments. Furthermore, the features, structures, and effects in each embodiment may be combined or modified by those skilled in the art. Accordingly, it should be interpreted that contents relating to such combinations and modifications are included in the scope of the present invention.

While this invention has been particularly shown and described with reference to preferred embodiments thereof, it will be understood by those skilled in the art that various changes in form and details may be made therein without departing from the spirit and scope of the invention as defined by the appended claims. For example, each component in an embodiment is modified and implemented. Accordingly, it should be interpreted that differences relating to such modifications and applications are included in the scope of the appended claims.

The invention claimed is:

1. A companion device for interoperating with a broadcast service that a television receives, the companion device comprising:
   a transceiver that connects the companion device with the television; and
   a controller that:
      controls the transceiver to transmit an information request for the broadcast service to the television and receive a response from the television including capability information representing a capability for presenting a media component belonging to the broadcast service,
      determines whether a capability of the companion device satisfies the capability represented by the capability information, and
      in response to determining that the capability of the companion device does not satisfy the capability represented by the capability information, controls the transceiver to receive a user input on whether to present the media component, or controls the transceiver to transmit a request of a uniform resource locator (URL) for an alternative media component.

2. The companion device according to claim 1, wherein in response to determining that the user input is to present the media component, the controller further controls the transceiver to receive the media component and controls the screen to display the received second media component.

3. The companion device according to claim 1, wherein the alternative media component belongs to the broadcast service of which capability is different from the capability of the media component represented by the capability information and receives the URL for displaying the alternative media component based on the URL.

4. The companion device according to claim 1, wherein the capability information comprises at least one of information on a video that the media component includes, information on a codec of an audio that the media component includes, and information on a subtitle format that the media component includes.

5. The companion device according to claim 4, wherein the information on the video that the media component includes comprises at least one of a codec necessary for playback of the video, and a resolution of the video.

6. The companion device according to claim 1, wherein the controller receives an emergency alert message for alerting a disaster situation,
wherein the emergency alert message includes an identifier for identifying an emergency alert, first information representing a category of the emergency alert, second information representing a priority of the emergency alert and third information representing a region corresponding to the emergency alert, and
wherein the second information includes a plurality of ranks for determining priority of the emergency alert.

7. An operating method of a companion device interoperating with a broadcast service that a television receives, the method comprising:
connecting the companion device with the television;
transmitting an information request for the broadcast service to the television;
receiving a response from the television including capability information representing a capability for presenting a media component belonging to the broadcast service;
determining whether a capability of the companion device satisfies the capability represented by the capability information; and
in response to determining that the capability of the companion device does not satisfy the capability represented by the capability information, receiving a user input on whether to present the media component, or transmitting a request of a uniform resource locator (URL) for an alternative media component.

8. The method according to claim 7, further comprising:
in response to determining that the user input is to present the media component, receiving the media component and controlling the screen to display the received second media component.

9. The method according to claim 7, wherein the alternative media component belongs to the broadcast service of which capability is different from the capability of the media component represented by the capability information and receives the URL for displaying the alternative media component based on the URL.

10. The method according to claim 7, wherein the capability information comprises at least one of information on a video that the media component includes, information on a codec of an audio that the media component includes, and information on a subtitle format that the media component includes.

11. The method according to claim 10, wherein the information on the video that the media component includes comprises at least one of a codec necessary for playback of the video, and a resolution of the video.

12. The method according to claim 7, wherein the companion device receives an emergency alert message for alerting a disaster situation,
wherein the emergency alert message includes an identifier for identifying an emergency alert, first information representing a category of the emergency alert, second information representing a priority of the emergency alert and third information representing a region corresponding to the emergency alert, and
wherein the second information includes a plurality of ranks for determining priority of the emergency alert.

13. The method according to claim 7, wherein the broadcast service includes an emergency alert message for alerting a disaster situation,
wherein the emergency alert message includes an identifier for identifying an emergency alert, first information representing a category of the emergency alert, second information representing a priority of the emergency alert and third information representing a region corresponding to the emergency alert, and
wherein the second information includes a plurality of ranks for determining priority of the emergency alert.

* * * * *